US012578841B2

(12) United States Patent
Grammatico et al.

(10) Patent No.: US 12,578,841 B2
(45) Date of Patent: Mar. 17, 2026

(54) METHOD AND SYSTEM FOR INDICATING VEHICLE OPERATING CONDITIONS ON A GRAPHICAL USER INTERFACE WITH GRAPH-AXIS CONTROL

(71) Applicant: Snap-on Incorporated, Kenosha, WI (US)

(72) Inventors: Joseph R. Grammatico, El Dorado Hills, CA (US); Joshua C. Covington, San Juan Bautista, CA (US); Roy S. Brozovich, Campbell, CA (US); Patrick S. Merg, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/784,436

(22) Filed: Jul. 25, 2024

(65) Prior Publication Data

US 2024/0383332 A1     Nov. 21, 2024

Related U.S. Application Data

(63) Continuation of application No. 17/710,588, filed on Mar. 31, 2022, now Pat. No. 12,077,045.

(51) Int. Cl.
G01D 5/24 (2006.01)
B60K 35/10 (2024.01)
(Continued)

(52) U.S. Cl.
CPC ......... G01D 5/24466 (2013.01); B60K 35/10 (2024.01); B60K 35/26 (2024.01);
(Continued)

(58) Field of Classification Search
CPC ........ G06F 3/04; G06F 3/0482; G06F 3/0483; G06F 2203/04806; G01D 5/24;
(Continued)

(56) References Cited

U.S. PATENT DOCUMENTS 8,754,911 B2    6/2014  Kim
10,163,280 B1   12/2018  Covington
(Continued)

OTHER PUBLICATIONS

European Patent Office, Communication pursuant to Article 94(3) EPC for European application No. 23711902.9 dated Sep. 22, 2025.
(Continued)

*Primary Examiner* — Hai H Huynh
*Assistant Examiner* — Johnny H Hoang
(74) *Attorney, Agent, or Firm* — McDonnell Boehnen Hulbert & Berghoff LLP

(57) ABSTRACT

A method includes writing vehicle data parameters (VDPs) into a memory in order of a vehicle outputting the VDPs. The method also includes displaying a first view of a graphical user interface (GUI) on a display. The GUI includes one or more VDP graphs, a graph-axis control, and a first vehicle operating condition (VOC) indicator at the graph-axis control. The method also includes displaying a second view of the GUI on the display in response to a selection of the first VOC indicator. The first and second views include first and second sets of VDP graphs, respectively. The second set of VDP graphs includes VDPs not represented in the first set of VDP graphs. Graph-axis control segments within the graph-axis control in the first and second views cover different portions of the graph-axis control. The graph-axis control segments correspond to different portions of the VDPs written into the memory.

21 Claims, 45 Drawing Sheets

(51) Int. Cl.

| | |
|---|---|
| *B60K 35/26* | (2024.01) |
| *B60K 35/80* | (2024.01) |
| *B60K 35/85* | (2024.01) |
| *G01D 5/244* | (2006.01) |
| *G06F 3/0482* | (2013.01) |
| *G06F 3/0484* | (2022.01) |
| *B60K 35/21* | (2024.01) |
| *B60K 35/22* | (2024.01) |
| *B60K 35/28* | (2024.01) |

(52) U.S. Cl.
CPC .............. *B60K 35/80* (2024.01); *B60K 35/85* (2024.01); *G06F 3/0482* (2013.01); *G06F 3/0484* (2013.01); *B60K 35/213* (2024.01); *B60K 35/22* (2024.01); *B60K 35/28* (2024.01); *B60K 2360/117* (2024.01); *B60K 2360/164* (2024.01); *G06F 2203/04803* (2013.01); *G06F 2203/04806* (2013.01)

(58) Field of Classification Search
CPC .... G01D 5/24466; B60K 35/10; B60K 35/26; B60K 35/80; B60K 35/85; B60K 35/00; B60K 2370/117; B60K 2370/152; B60K 2370/155; B60K 2370/164
USPC .......................................................... 701/101
See application file for complete search history.

(56) References Cited

U.S. PATENT DOCUMENTS

| | | | |
|---|---|---|---|
| 10,956,003 | B2 | 3/2021 | Covington |
| 2013/0282229 | A1 | 10/2013 | Wittliff et al. |
| 2014/0075356 | A1 | 3/2014 | Gray et al. |
| 2014/0277908 | A1 | 9/2014 | Fish et al. |
| 2015/0007078 | A1* | 1/2015 | Feng ..................... G06F 3/0482 715/771 |
| 2016/0124587 | A1 | 5/2016 | Covington et al. |
| 2016/0124605 | A1 | 5/2016 | Covington et al. |
| 2016/0124609 | A1 | 5/2016 | Covington et al. |
| 2016/0124612 | A1 | 5/2016 | Covington et al. |
| 2016/0124635 | A1 | 5/2016 | Covington et al. |
| 2016/0133066 | A1* | 5/2016 | Lavie ..................... G07C 5/008 701/31.4 |
| 2019/0026962 | A1 | 1/2019 | Gintz et al. |
| 2019/0122459 | A1 | 4/2019 | Covington |
| 2020/0134934 | A1 | 4/2020 | Covington et al. |
| 2021/0048940 | A1 | 2/2021 | Covington et al. |
| 2021/0049836 | A1 | 2/2021 | Covington et al. |
| 2021/0049844 | A1 | 2/2021 | Covington |
| 2023/0311653 | A1 | 10/2023 | Grammatico et al. |

OTHER PUBLICATIONS

Denso; How they work, Crankshaft Position Sensor; downloaded from the world wide web at https://www.denso-am.eu/products/automotive-aftermarket/engine-management-systems/camshaft-crankshaft-sensors/how-they-work/ on Sep. 29, 2021; 5 pages.
International Searching Authority; International Search Report, Written Opinion of the International Searching Authority, and Notification of transmittal of the International Search Report and The Written Opinion of the International Searching Authority for International Application No. PCT/US2023/062835, dated May 23, 2023.

* cited by examiner

WRITING, INTO A MEMORY, VDPS OUTPUT BY A PARTICULAR VEHICLE, WHEREIN:
- EACH VDP CORRESPONDS TO A PID FROM AMONG A SET OF MULTIPLE DIFFERENT PIDS
- THE MEMORY INCLUDES A NON-TRANSITORY COMPUTER-READABLE MEMORY

⌐ 141

DISPLAYING, ON A DISPLAY, A FIRST VIEW OF A GUI, WHEREIN:
- THE GUI INCLUDES ONE OR MORE VDP GRAPHS, A GRAPH-AXIS CONTROL, AND A FIRST VOC INDICATOR AT THE GRAPH-AXIS CONTROL
- THE FIRST VIEW OF THE GUI INCLUDES A FIRST SET OF VDP GRAPHS FROM AMONG THE ONE OR MORE VDP GRAPHS
- EACH VDP GRAPH OF THE ONE OR MORE VDP GRAPHS CORRESPONDS TO AT LEAST A PARTIAL AMOUNT OF THE VDPS
- EACH PARTIAL AMOUNT OF THE VDPS CORRESPONDS TO A RESPECTIVE PID
- THE GRAPH-AXIS CONTROL INCLUDES A FIRST GRAPH-AXIS CONTROL SEGMENT, A SECOND GRAPH-AXIS CONTROL SEGMENT, AND A CURSOR POSITION INDICATOR AT THE FIRST GRAPH-AXIS CONTROL SEGMENT
- THE FIRST GRAPH-AXIS CONTROL SEGMENT IN THE FIRST VIEW OF THE GUI CORRESPONDS TO A FIRST PORTION OF THE VDPS
- AT LEAST SOME OF THE FIRST PORTION OF THE VDPS ARE REPRESENTED WITHIN THE FIRST SET OF VDP GRAPHS
- THE SECOND GRAPH-AXIS CONTROL SEGMENT IN THE FIRST VIEW OF THE GUI CORRESPONDS TO A SECOND PORTION OF THE VDPS
- THE SECOND PORTION OF THE VDPS IS NOT REPRESENTED WITHIN THE FIRST SET OF VDP GRAPHS
- EACH VDP GRAPH DISPLAYED ON THE DISPLAY INCLUDES A CURSOR CORRESPONDING TO A POSITION OF THE CURSOR POSITION INDICATOR AT THE FIRST GRAPH-AXIS CONTROL SEGMENT
- THE FIRST GRAPH-AXIS CONTROL SEGMENT AND THE SECOND GRAPH-AXIS CONTROL SEGMENT COVER FIRST RESPECTIVE PORTIONS OF THE GRAPH-AXIS CONTROL WITHIN THE FIRST VIEW OF THE GUI

⌐ 142

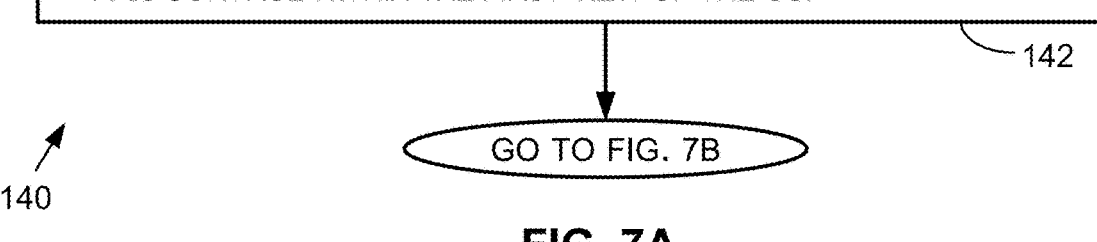

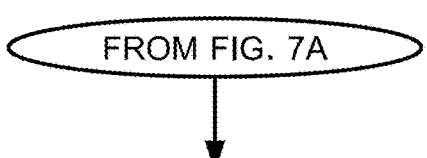

FROM FIG. 7A

DISPLAYING, ON THE DISPLAY, A SECOND VIEW OF A GUI IN RESPONSE TO A SELECTION OF THE FIRST VOC INDICATOR, WHEREIN:

- THE SECOND VIEW OF THE GUI INCLUDES A SECOND SET OF VDP GRAPHS FROM AMONG THE ONE OR MORE VDP GRAPHS, THE GRAPH-AXIS CONTROL, THE FIRST GRAPH-AXIS CONTROL SEGMENT, AND THE SECOND GRAPH-AXIS CONTROL SEGMENT
- THE FIRST GRAPH-AXIS CONTROL SEGMENT IN THE SECOND VIEW OF THE GUI CORRESPONDS TO A THIRD PORTION OF THE VDPS
- AT LEAST SOME OF THE THIRD PORTION OF THE VDPS ARE REPRESENTED WITHIN THE SECOND SET OF VDP GRAPHS
- THE SECOND GRAPH-AXIS CONTROL SEGMENT IN THE SECOND VIEW OF THE GUI CORRESPONDS TO A FOURTH PORTION OF THE VDPS
- THE FOURTH PORTION OF THE VDPS IS NOT REPRESENTED WITHIN THE SECOND SET OF VDP GRAPHS
- THE FIRST GRAPH-AXIS CONTROL SEGMENT AND THE SECOND GRAPH-AXIS CONTROL SEGMENT COVER SECOND RESPECTIVE PORTIONS OF THE GRAPH-AXIS CONTROL WITHIN THE SECOND VIEW OF THE GUI THAT DIFFER FROM THE FIRST RESPECTIVE PORTIONS OF THE GRAPH-AXIS CONTROL

143

L PIXELS HIGH

DISPLAY ELEMENT
136

M PIXELS WIDE $N_1$ FRAMES
(E.G., 1,000 FRAMES, $N_1$ FRAMES / M PIXELS = 1 FRAME / PIXEL) ← 365

$N_2$ FRAMES
(E.G., 2,000 FRAMES, $N_2$ FRAMES / M PIXELS = 2 FRAMES / PIXEL) ← 366

$N_3$ FRAMES
(E.G., 5,000 FRAMES, $N_3$ FRAMES / M PIXELS = 5 FRAMES / PIXEL) ← 367

$N_4$ FRAMES
(E.G., 10,000 FRAMES, $N_4$ FRAMES / M PIXELS = 10 FRAMES / PIXEL) ← 368

1

METHOD AND SYSTEM FOR INDICATING VEHICLE OPERATING CONDITIONS ON A GRAPHICAL USER INTERFACE WITH GRAPH-AXIS CONTROL

REFERENCE TO RELATED APPLICATION

This application is a continuation application of U.S. patent application Ser. No. 17/710,588, entitled "method and system for indicating vehicle operating conditions on a graphical user interface with graph-axis control," which was filed on Mar. 31, 2022 and was published as United States Patent Application Publication No. 2023/0311653 A1 on Oct. 5, 2023.

U.S. patent application Ser. No. 17/710,588 and United States Patent Application Publication No. 2023/0311653 A1 are incorporated herein by reference.

BACKGROUND

Most vehicles are serviced at least once during their useful life. In many instances, a vehicle is serviced at a facility with professional mechanics (e.g., technicians). The technicians can use any of a variety of non-computerized hand tools to service (e.g., diagnose, maintain, or repair) any of the wide variety of mechanical components on a vehicle. The technicians from time to time also use computerized tools to service a vehicle.

Such computerized tool can include a vehicle service tool with a display that is configured to receive vehicle data messages. Some of the vehicle data messages include a parameter identifier (PID) and corresponding parameter value. The vehicle service tool can display a threshold and an indicator when a received parameter value breaches the threshold.

The vehicle service tool can determine being changed from a landscape orientation to a portrait orientation or vice versa and responsively change a presentation of vehicle data parameter graphs displayed by the display. Alternatively, the vehicle service tool can change the presentation of the vehicle data parameter graphs being displayed in response to the display receiving a drag-and-drop input or a pinch-and-expand input.

Overview

Several example implementations that relate to servicing a vehicle based on graphing vehicle data parameters are described. In at least some of the implementations, vehicle data parameters output by a vehicle are written into a memory and displayed within a graphical user interface (GUI). The GUI can show the vehicle data parameters within a vehicle data parameter (VDP) graph. A different view of the GUI can be displayed in response to a selection of a vehicle operating condition (VOC) indicator shown within the GUI. The different views of the GUI are helpful for servicing the vehicle.

In a first implementation, a method is provided. The method comprises writing, into a memory, vehicle data parameters output by a particular vehicle. Each VDP corresponds to a parameter identifier (PID) from among a set of multiple different PIDs. The memory includes a non-transitory computer-readable memory. The method also includes displaying, on a display, a first view of a GUI. The GUI includes one or more VDP graphs, a graph-axis control, and a first VOC indicator at the graph-axis control. The first view of the GUI includes a first set of VDP graphs from among the one or more VDP graphs. Each VDP graph of the one or more VDP graphs corresponds to at least a partial amount of the vehicle data parameters. Each partial amount of the vehicle data parameters corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the vehicle data parameters. At least some of the first portion of the vehicle data parameters are represented within the first set of VDP graphs. The second graph-axis control segment in the first view of the GUI corresponds to a second portion of the vehicle data parameters. The second portion of the vehicle data parameters is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI. The method further includes displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

In a second implementation, a computing system is provided. The computing system includes a display, a processor, and a non-transitory computer-readable medium having stored thereon instructions executable by the processor to perform functions. The functions include writing, into the memory, vehicle data parameters output by a particular vehicle. Each VDP corresponds to a PID from among a set of multiple different PIDs. The functions further include displaying, on the display, a first view of a GUI. The GUI includes one or more VDP graphs, a graph-axis control, and a first VOC indicator at the graph-axis control. The first view of the GUI includes a first set of VDP graphs from among the one or more VDP graphs. Each VDP graph of the one or more VDP graphs corresponds to at least a partial amount of the vehicle data parameters. Each partial amount of the vehicle data parameters corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the vehicle data parameters. At least some of the first portion of the vehicle data parameters are represented within the first set of VDP graphs. The second graph-axis control segment in the first view of the GUI corresponds to a second portion of the vehicle data parameters. The second portion of the vehicle data parameters is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI. The functions further include displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

In a third implementation, a non-transitory computer-readable medium is provided. The non-transitory computer-readable medium has stored thereon instructions executable by a processor to cause a computing system to perform functions. The functions include writing, into the memory, vehicle data parameters output by a particular vehicle. Each VDP corresponds to a PID from among a set of multiple different PIDs. The functions also include displaying, on the display, a first view of a GUI. The GUI includes one or more VDP graphs, a graph-axis control, and a first vehicle operating condition (VOC) indicator at the graph-axis control. The first view of the GUI includes a first set of VDP graphs from among the one or more VDP graphs. Each VDP graph of the one or more VDP graphs corresponds to at least a partial amount of the vehicle data parameters. Each partial amount of the vehicle data parameters corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the vehicle data parameters. At least some of the first portion of the vehicle data parameters are represented within the first set of VDP graphs. The second graph-axis control segment in the first view of the GUI corresponds to a second portion of the vehicle data parameters. The second portion of the vehicle data parameters is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI. The functions further include displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 7A and FIG. 7B show a flowchart depicting a set of functions that can be carried out in accordance with the example implementations.

Figure 1:
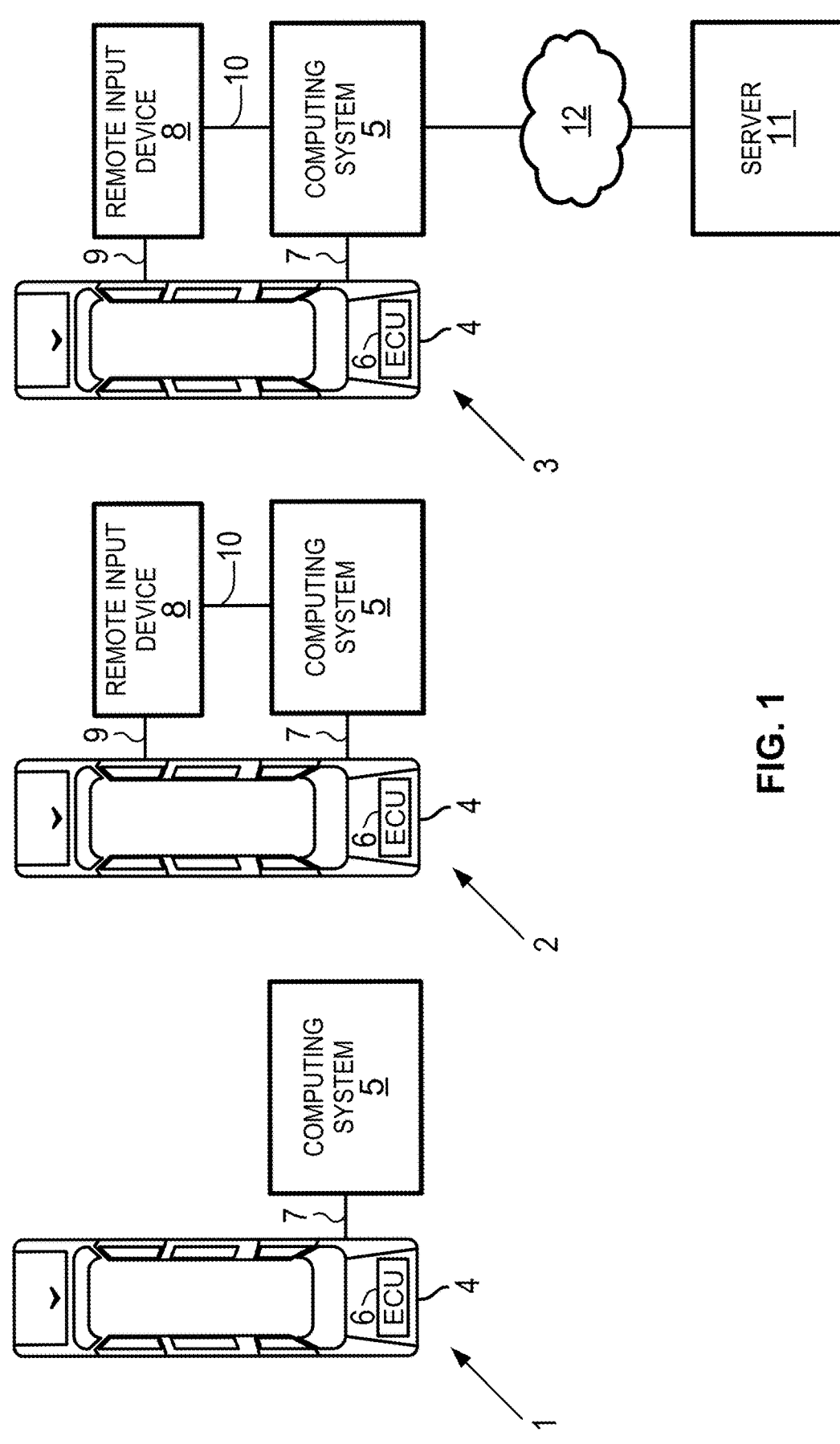
FIG. 1 is a diagram showing operating environments in accordance with the example implementations.

All the figures are schematic and not necessarily to scale.

DETAILED DESCRIPTION

I. Introduction

This description describes several example implementations that relate to servicing a vehicle based on graphing vehicle data parameters. In at least some of the implementations, a computing system receives vehicle data parameters from a vehicle, writes the vehicle data parameters into a memory and displays vehicle data parameters within a GUI. The GUI can show the vehicle data parameters within a VDP graph.

The computing system can determine when a vehicle data parameter corresponding to a particular PID breaches a threshold corresponding to that PID. In response to the threshold breach, the GUI can show a VOC indicator. The VOC indicator can be displayed at and/or on a graph-axis control. The graph-axis control is configured to control aspects corresponding to VDP graph(s). The graph-axis control can also be configured to control aspects corresponding to the display of non-PID data shown within the GUI.

In some cases, a technician uses the computing system to capture vehicle data parameters while driving the vehicle on a test drive. For safety reasons, the technician may not look at the computing system display until after the technician has completed the test drive or at least stopped the vehicle during the test drive. In other cases, a technician uses the computing system to capture vehicle data parameters while the vehicle engine is idling, the vehicle transmission is in park, the computing system is located inside the passenger compartment of the vehicle, and the technician is outside the passenger compartment of the vehicle. In at least some of the aforementioned cases or in other cases, the technician may not look at computing system display until several minutes (e.g., two to sixty minutes) have passed since the threshold breach was detected and the VOC indicator was added to the GUI. By the time the technician looks at the computing system display, a graph of vehicle data parameters (corresponding to the PID) shown on the GUI may no longer include the vehicle data parameter that was determined to breach the threshold corresponding to the PID.

The computing system can determine a selection of the VOC indicator and responsively change from one view of the GUI to another view of the GUI. The other view of the GUI can include a VDP graph that includes the vehicle data parameter that was determined to breach the threshold corresponding to the PID. The other view of the GUI can show additional data the technician can use to diagnose why a vehicle is malfunctioning. As an example, the additional data can include non-PID data that was captured at about the time the vehicle data parameter breached the threshold corresponding to the PID. About the time could include the time the vehicle data parameter breached the threshold corresponding to the PID, as well as a time before and/or after the time the vehicle data parameter breached the threshold corresponding to the PID. As another example, the additional data can include vehicle data parameters corresponding to other PID(s) and indications whether a vehicle data parameter corresponding to another PID breached a threshold corresponding to the other PID and whether that breach took place before, after, or at the same time the breach corresponding to the vehicle data parameter corresponding to the originally discussed PID occurred.

In at least some implementations, a GUI includes one or more containers. A container is an element of a GUI and/or an element of a page displayable on a display. A container is associated with content that can be displayed within an area of a GUI and/or a page defined for the container. As an example, the content associated with a container can include one or more from among: a user-selectable control (USC), a graph (e.g., a VDP graph), a graph-axis control, a graph-axis control segment, an icon, text, an image, a video, a PID, a parameter value corresponding to a PID, or non-PID data.

Other examples of content displayable within a container are also possible. The application drawings show at least some of those other examples.

A container can be associated with a default location within a GUI and/or a displayable page. In some implementations, the default location within a GUI and/or a page to display the container is fixed. In at least some implementations, a location to display the container can change, such as by moving the container from one location (e.g., a default location) within the GUI and/or page to another location within the GUI and/or page, and/or by increasing or decreasing a size of an area of the container. In at least some implementations, a GUI can include multiple portions (e.g., first and second portions) and the multiple portions can be output on multiple, distributed displays (e.g., the first portion is displayed on a first display and the second portion is displayed on a second display).

A container can be related to one or more other containers. As an example, two or more containers can be related as defined by a hierarchical relationship in which a first of the two containers is within a second of the two containers, and/or the second of the two containers includes the first container. In accordance with this example, the second container is considered to be as parent container, whereas the first container is considered to be a sub-container (and/or a child container). Although the example hierarchical relationship refers to the first container being within the second container, the hierarchical relationship does not require that displaying the first and second containers includes displaying the first container, wholly or even partly, within a boundary established for the second container. For example, in some implementations, displaying the first container could include displaying at least a portion of the first container beyond the boundary established for the second container.

A sub-container is a container that corresponds to a parent container. In at least some implementations, a container defined within a GUI and/or page as being within another container is a sub-container. The container that includes that sub-container is a parent container. A sub-container can be a parent container to one or more other sub-containers.

The containers within the user-interfaces of the example implementations can be displayed using various container properties. As an example, in at least some implementations, a container can have a boundary property. A boundary property can be non-visible, such that no visible boundary is displayed while the container having that boundary property is displayed. A different boundary property can be visible, such that a visible boundary is displayed while the container having that boundary property is displayed. As an example, a visible boundary could specify one or more of a line thickness, color, or a drop shadow. Other examples of a container property are also possible.

One or more of the application drawings include numeric and/or alphanumeric characters that represent data displayed on a GUI rather than a reference number that is shown in proximity to a reference line in a drawing. Some of the numeric and/or alphanumeric characters are referenced in the drawings using a reference number while others are not. Some numeric and/or alphanumeric characters contained in this description are not shown in the drawings. Parenthesis are used to indicate the numeric and/or alphanumeric characters that are contained in this description, but are not shown in the drawings.

II. Example Systems

A. Operating Environment

FIG. 1 is a diagram showing an operating environment 1, 2, 3 in which the example implementations can operate. Other examples of an operating environment for an example implementation are also possible. The operating environment 1 includes a vehicle 4 and a computing system 5. The vehicle 4 includes an electronic control unit (ECU) (e.g., one or more ECUs). An ECU is one example of a vehicle component. The vehicle 4 and the computing system 5 are operatively coupled to each other using a communication link 7. The operatively coupling between the vehicle 4 and the computing system 5 need not be permanent, such that the computing system 5 can be operatively coupled to a different vehicle. The communication link 7 can be a wired and/or wireless communication link.

In at least some implementations, the communication link 7 includes one or more communication channels. In at least some of those implementations, the communication link 7 includes power circuits (e.g., a battery-connected circuit connected to a positive terminal of a battery and a circuit connected to a negative terminal of the battery), and one or more communication channels. A communication channel within the communication link 7 can directly or indirectly connect the computing system 5 to the vehicle 4.

The operating environment 2 includes the aspects of the operating environment 1 as well as a remote input device 8. The remote input device 8 can be operatively coupled to the vehicle 4 via a communication link 9 and/or to the computing system 5 via a communication link 10. As an example, the remote input device 8 can be a meter, an oscilloscope, a global positioning system (GPS) receiver, a microphone, or a thermal imaging device. Other examples of the remote input device 8 are also possible. The communication link 9, 10 can be a wired and/or wireless communication link. The communication link 9 can include one or more conductors for powering the remote input device 8 when the remote input device 8 is connected to the vehicle 4. The communication link 9 can include one or more circuits for carrying signals (e.g., electrical or optical) generated by the vehicle 4.

The operating environment 3 includes the aspects of the operating environment 2 as well as a server 11. The computing system 5 can be operatively coupled to the server 11 via a communication link 12. The communication link 12 can include one or more various network components, such as switches, modems, gateways, antennas, cables, transmitters, and/or receivers. The communication link 12 can include a wide area network (WAN). The WAN can carry data using packet-switched and/or circuit-switched technologies. The WAN can include an air interface or wire to carry the data. The communication link 12 can comprise a network or at least a portion of a network that carries out communications using a Transmission Control Protocol (TCP) and the Internet Protocol (IP), such as the communication network commonly referred to as the Internet.

B. Computing System

Figure 2:
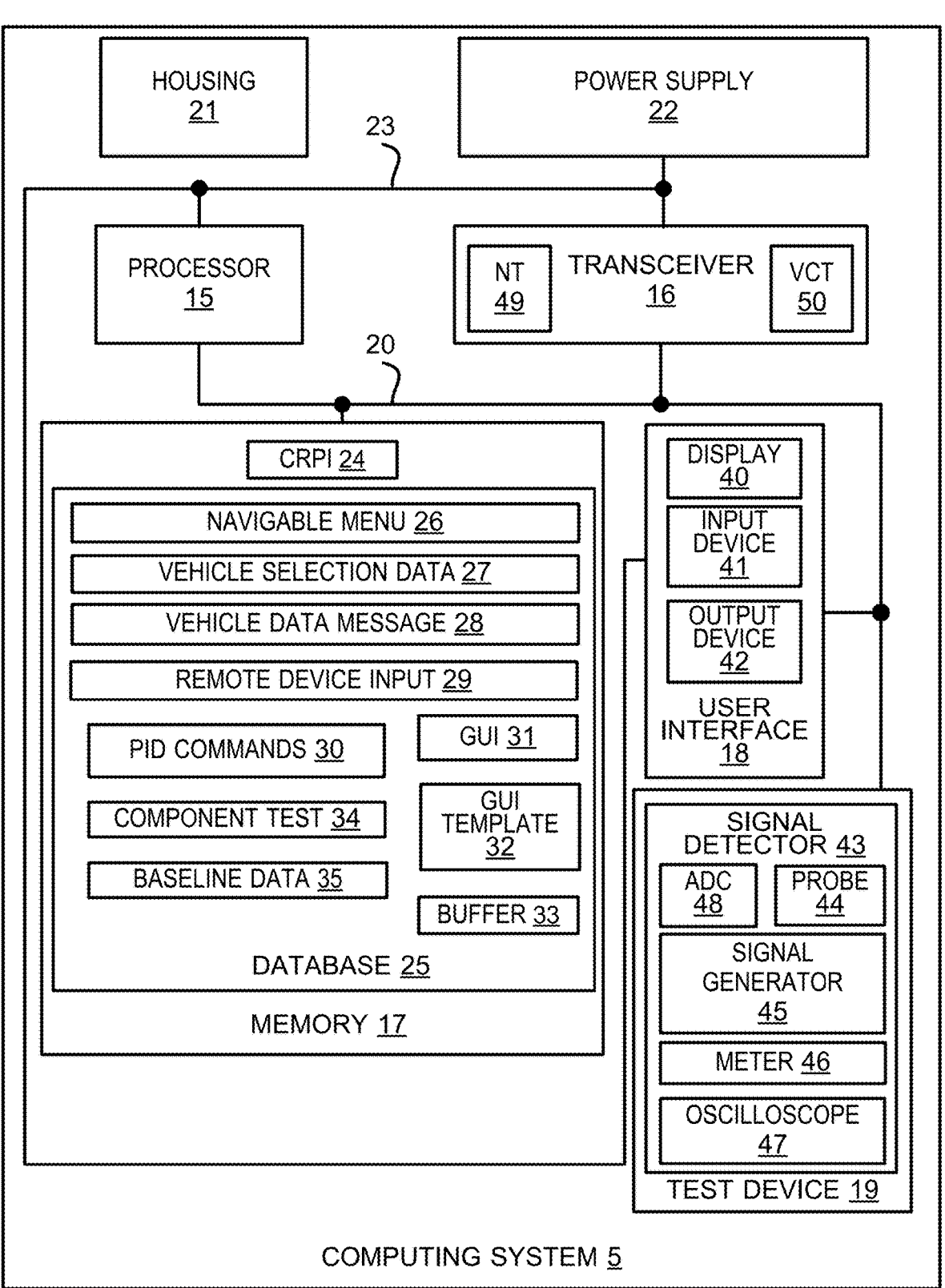
FIG. 2 is a block diagram of a computing system in accordance with the example implementations.

Next, FIG. 2 is a block diagram of the computing system 5. As shown in FIG. 2, the computing system 5 can include one or more from among: a processor 15, a transceiver 16, a memory 17, a user interface 18, or a test device 19. Two or more of those components can be operatively coupled together via a data bus 20. In at least some implementations, the computing system 5 includes a housing 21 and/or a power supply 22. In some at least some implementations, the computing system 5 includes and/or is arranged as a vehicle diagnostic tool or a vehicle scanner. Accordingly, the computing system 5 can be referred to as a "vehicle diagnostic tool," a "vehicle scanner," a "vehicle scan tool," and/or a "vehicle repair tool." In at least some of those implementations or in other implementations, the computing system 5 includes or is operatively connectable to one or more from among: a tablet device, a cellular phone, a laptop or desktop computer, or a head-mountable device (HMD).

The housing 21 surrounds at least a portion of one or more from among: the processor 15, the transceiver 16, the memory 17, the data bus 20, the power supply 22 and/or a power supply circuit 23. The housing 21 can support a substrate. In at least some example implementations, at least a portion of one or more of the following is/are mounted on and/or connected to a substrate supported by the housing 21: the processor 15, the transceiver 16, the memory 17, the data bus 20, the power supply 22 and/or the power supply circuit 23.

1. Processor

Figure 5:
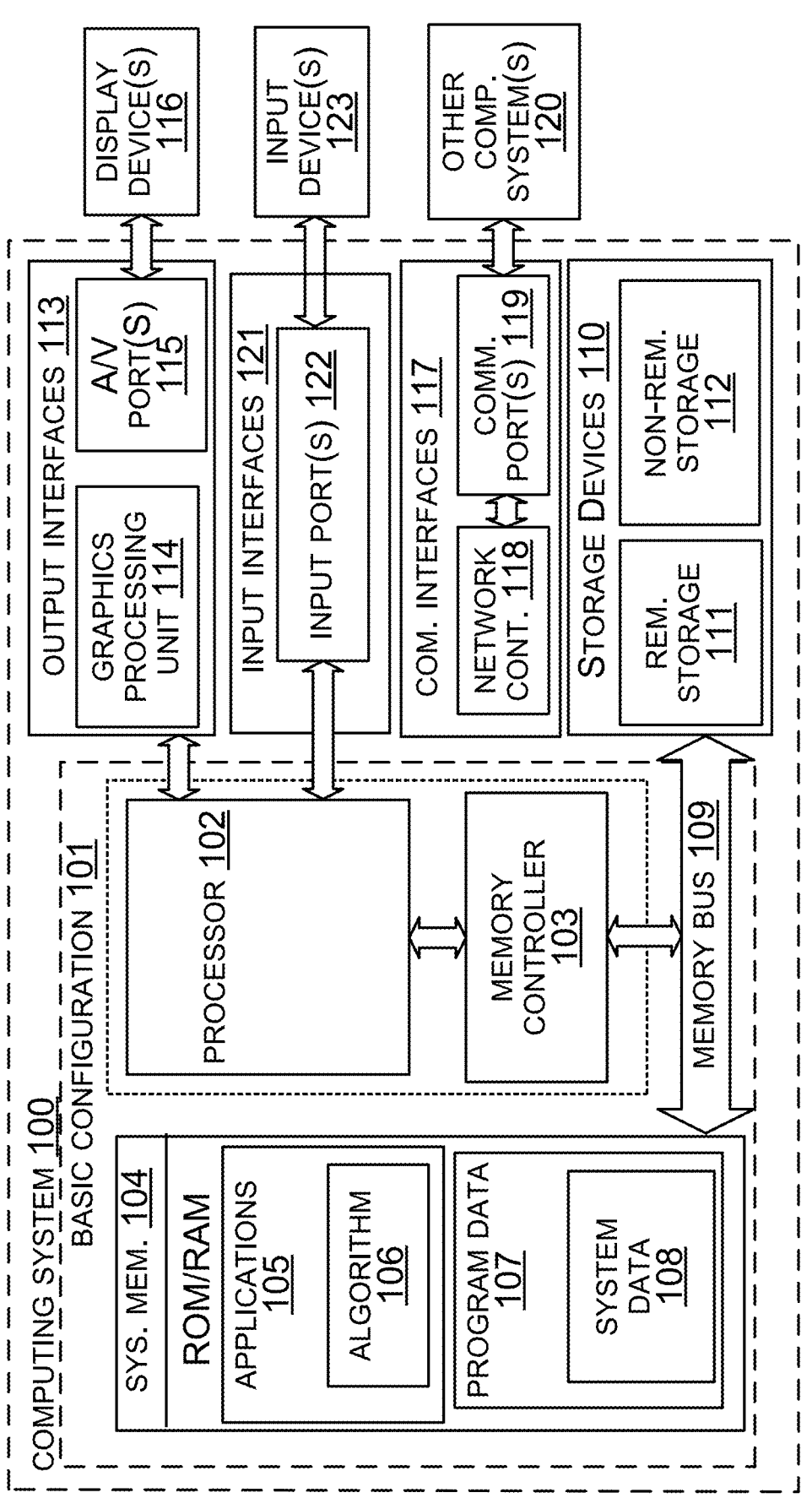
FIG. 5 is a functional block diagram illustrating a computing system that is arranged in accordance with the example implementations.

A processor, such as the processor 15, a processor 102 shown in FIG. 5, or any other processor discussed in this description, can comprise one or more processors. Any processor discussed in this description can thus be referred to as "at least one processor" or "one or more processors." Any processor discussed in this description can include a general purpose processor (e.g., an INTEL® single core microprocessor or an INTEL® multicore microprocessor), a special purpose processor (e.g., a digital signal processor, a graphics processor (e.g., a graphics processing unit (GPU)), an embedded processor, a field-programmable gate array (FPGA), or an application specific integrated circuit (ASIC) processor). Moreover, for an implementation in which the processor 15 is arranged like the INTEL® multicore microprocessor, the processor 15 can include one or more INTEL® XEON® processors having between four and fifty-six cores. Furthermore, any processor discussed in this description can include or be operatively coupled to a memory controller that controls a flow of data going to and from a memory.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). For example, the processor 15 can execute CRPI 24 stored in the memory 17. In at least some implementations of the server 11, the processor 15 can be programmed to perform any or all function(s) described in this description as being performed by the computing system 5.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

The description of any or all function(s) that include the processor 15 and/or the computing system 5 transmitting data can include the processor 15 causing the transceiver 16 to transmit the data. Similarly, the description of any or all function(s) that include the processor 15 and/or the computing system 5 receiving data can include the processor 15 receiving the data from the transceiver 16. Additionally, the description of any or all function(s) that include the transceiver 16 transmitting data can include the processor 15 or the computing system 5 transmitting the data. Likewise, the description of any or all function(s) that include the transceiver 16 receiving data can include the processor 15 or the computing system 5 receiving the data.

2. Memory

A memory, such as the memory 17 or any other memory discussed in this description, can include one or more memories. A memory can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory memory can include, for example, CRPI provided over a communication link, such as the communication link 12. The communication link can include a digital or analog communication link. The communication link can include a wired communication link including one or more wires or conductors, or a wireless communication link including an air interface.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory.

3. Transceiver

A transceiver, such as the transceiver 16 or any other transceiver discussed in this description, can include one or more transceivers. Each transceiver includes one or more transmitters configured to transmit data onto a network and/or a data bus within the device (e.g., the computing system 5 or the server 11) including the transceiver. Each transceiver includes one or more receivers configured to receive data or a communication carried over a network and/or a data bus within the device (e.g., the computing system 5 or the server 11) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

For purposes of this description and with respect to the vehicle, a network can be configured as a vehicle network, a non-vehicle network, or a multi-purpose network. The vehicle network is at least partly on-board the vehicle 4 and has an on-board diagnostic connector (OBDC) and one or more electronic controls units interconnected to the OBDC and/or to each other. In at least some implementations, the computing system 5 includes a harness that operatively connects to the OBDC in the vehicle 4 and allows the computing system 5 to be disposed outside of the vehicle 4. In those or in other implementations, the computing system 5 is configured to communicate with the OBDC and can be disposed within or outside of the vehicle 4. The non-vehicle network is off-board of the vehicle 4 and includes one or more network nodes outside of the vehicle 4. The multi-purpose network is contained at least partly within the vehicle 4 and at least partly off-board the vehicle 4. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoW-PAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3rd Generation Partnership Project (3GPP) standards organization, such as the 5G NR, first phase or 5G NR, second phase communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as TCP/IP, an IEEE® 802.3 Ethernet communication standard for a LAN, a data over cable service interface specification (DOCSIS standard), such as DOCSIS 3.1, a universal serial bus (USB) specification, a VDM protocol, or some other wired communication standard or protocol. Examples of a VDM protocol are listed in Section V of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor." Transmission of data over the conductor can occur electrically and/or optically.

In accordance with at least some implementations, the transceiver 16 includes a network transceiver 49 and a vehicle communications transceiver 50. The network transceiver 49 is configured to communicate over a non-vehicle network and/or a multi-purpose network. The vehicle communications transceiver 50 is configured to communicate over a vehicle network and/or a multi-purpose network. The transceiver 16 can be configured as a gateway to communicate over a multi-purpose network. The transceiver 16 is also configured to communicate over the data bus 20.

In at least some implementations, the network transceiver 49 includes a modem, a network interface card, a local area network (LAN) on motherboard (LOM), and/or a chip mountable on a circuit board. As an example, the chip can include a CC3100 WI-FI® network processor available from Texas Instruments, Dallas, Texas, a CC256MODx Bluetooth® Host Controller Interface (HCI) module available from Texas instruments, or a different chip for communicating via WI-FI®, BLUETOOTH® or another communication protocol.

In at least some implementations, the vehicle communications transceiver 50 includes a chip mountable on a circuit board. As an example, for the SAE J1939 VDM protocol, the chip could include a CAN transceiver, part number SN65HVD251-Q1 sold by Texas Instruments, Dallas, Texas, the high-speed CAN transceiver, part number TJA1043 sold by NXP Semiconductors N.V., Eindhoven, Netherlands, or some other chip configured for the SAE J1939 VDM protocol. As another example, for the SAE J1708 VDM protocol, the chip can include a J1708 transceiver, part number MAX344E sold by Maxim Integrated Products, Inc., San Jose, California, or some other chip configured for the SAE J1708 VDM protocol. Other examples of chips configured for communicating using a particular VDM protocol are also possible.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The network transceiver 49 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 49 can be arranged to transmit an SMS message using a short message peer-to-peer protocol or using some other protocol.

The data transmitted by the transceiver 16, the network transceiver 49, and/or the vehicle communications transceiver 50 can include a destination identifier or address of a computing device (e.g., an ECU within the vehicle 4 or the server 11) to which the data is to be transmitted. The data or communications transmitted by the transceiver 16, the network transceiver 49, and/or the vehicle communications transceiver 50 can include a source identifier or address of the computing system 5.

The transceiver 16 can be referred to as a communications interface. Accordingly, the transceiver 16 can include and/or be configured like a communication interface 117 shown in FIG. 5. The data transmitted by the transceiver 16 can comprise any data described herein as being transmitted, output, and/or provided by the computing system 5. The data received by the transceiver 16 can comprise any data described herein as being received by the computing system 5, such as one or more from among: vehicle identifying information, a DTC, a VDM, a PID, a PID parameter value, a frame, a baseline, a command, a menu selection, a GUI, or a GUI template. Other examples of that data are also possible.

4. User Interface

The user interface 18 includes a display 40. The display 40 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) (such as include a backlit, color LCD), or a display with a touch panel, such as an LCD display with a touch panel. As an example, the touch panel can include a capacitive touch panel, a resistive touch panel, a surface wave touch panel, an acoustic pulse recognition touch panel, an infrared touch panel, optical imaging touch panel, or a strain gauge touch panel. The display 40 can include a different type of display as well or instead. A display with a touch panel can be referred to as a touch panel display and/or a touch screen display.

In at least some implementations, a display of the display 40 is affixed (e.g., removably affixed) to a substrate of the housing 21 and/or to the housing 21. In those or in other implementations, a display of the display 40 is on and/or within a wearable device, such as a pair of glasses or goggles, a head-mountable display, or a wrist display, such as a wristwatch (e.g., a smartwatch). In at least some implementations, the housing 21 includes a laptop housing.

The display 40 is configured to display a GUI, such as a GUI 31 stored in the memory 17 and/or a GUI shown in any one of FIG. 8 to FIG. 35. The display 40 can also be configured to display a menu, a still image (such as a visible light image, a thermal image, and/or a blended image based on a visible light image and a thermal image), a video, a text file (such as a text file with a PDF file extension or an XML file extension), a hypertext markup language file, and/or a web page. In at least some implementations, the display 40 is configured to display a horizontal scroll bar and/or a vertical scroll bar. The horizontal scroll bar and the vertical scroll bar can be used to cause the display 40 to display content of a currently displayed page, but not currently displayed on the display 40. A web page displayable on the display 40 can include any content shown in or described with respect to any one or more of FIG. 8 to FIG. 35. Other examples of content displayable on the display 40 are also possible.

The user interface 18 includes an input device 41. The input device 41 is configured to generate signals representative of user inputs from a user of the computing system 5. In at least some implementations, the input device 41 includes a keyboard or keypad including one or more keys configured to be pressed or otherwise manipulated by the user. In at least some implementations, the input device 41 includes a touchpad or trackpad of a laptop computer housing. In at least some implementations, the input device 41 includes a computer mouse. In at least some implementations, the input device 41 includes a microphone configured for receiving sound waves, such as sound waves produced by the user speaking words in a vocabulary of the computing system 5. In at least some implementations, the input device 41 includes a wearable device, such as a watch wearable on an arm or a head-mountable display (e.g., glasses or goggles with a display). In at least some of those implementations, a selection can be made in response to the processor 15 detecting gestures captured by a camera within the input device 41. The display 40 configured as a touch screen display can also receive user inputs from a user of the computing system 5. Accordingly, the input device 41 can include the display 40 when configured as a touch screen display. The processor 15 determines the user inputs based on the signals generated by the input device 41. At least some of the user inputs are representative of a user-selectable control (USC) being selected from a GUI displayed on the display 40.

The user interface 18 includes an output device 42. The output device 42 is configured to present content to a user of the computing system 5. As an example, the output device 42 can present content visually, audibly, and/or haptically. To present content visually, the output device 42 can include and/or operatively communicate with the display 40 to visually present content, such as the navigable menu 26 or the GUI 31. To present content audibly, the output device 42 can include an audio speaker and electrical circuitry to convert digital data representative of the content into an audio signal for driving the audio speaker. To present content haptically, the output device 42 can include an eccentric rotating mass vibration motor and/or a linear resonant actuator to output the content haptically. As an example, the content presented haptically can include content that indicates a PID threshold has been breached.

In at least some implementations, the housing 21 includes a single housing and the user interface 18 and other components of the computing system 5 are contained at and/or within the single housing. In at least some other implementations, the housing 21 includes multiple housings such that different portions of the user interface 18 and other portions of the computing system 5 are distributed to be at and/or within the multiple different housings.

5. Additional Components

A power supply, such as the power supply 22 or any other power supply discussed in this description, can be arranged in any of a variety of configurations. As an example, the power supply can be configured to include circuitry to receive alternating current (AC) current from an AC electrical supply (e.g., electrical circuits operatively connected to an electrical wall outlet) and convert the AC current to a DC current for supplying to one or more of the components connected to the power supply 22. As another example, the power supply can be configured to include a battery or be battery operated. As yet another example, the power supply can be configured to include a solar cell or be solar operated. Moreover, a power supply can be configured to include electrical circuit(s) to distribute electrical current throughout the device or system including that power supply. As an example, those electrical circuit(s) include the power supply circuit 23 that connects to the processor 15, the transceiver 16, the memory 17, the user interface 18, and/or the test device 19. Other examples of a power supply are also possible.

In at least some implementations, the computing system 5 includes the housing 21. The housing 21 surrounds at least a portion of the following: the processor 15, the transceiver 16, the memory 17, the user interface 18, the test device 19, the data bus 20, the power supply 22, and/or the power supply circuit 23. The housing 21 can support a substrate. In at least some example implementations, at least a portion of the following: the processor 15, the transceiver 16, the memory 17, the user interface 18, the signal detector 43, the data bus 20, the power supply 22, and/or the power supply circuit 23 is/are mounted on and/or connected to a substrate of the housing 21. The housing 21 can be made from various materials. For example, the housing 21 can be made from a plastic material (e.g., acrylonitrile butadiene styrene (ABS)) and a thermoplastic elastomer used to form a grip on the housing 21.

6. Test Device

The test device 19 is configured to perform at least a part of a component test, such as the component test 34. In at least some implementations, performing the component test can include the processor 15 executing program instructions of the CRPI 24. Execution of at least some of those program instructions can include executing program instructions to configure the test device 19 for performing the component test 34.

As an example, the test device 19 can include a signal detector 43. The signal detector 43 can include one or more from among: a probe 44, a signal generator 45, a meter 46, an oscilloscope 47, or an analog-to-digital converter 48 (i.e., an ADC). The signal detector 43 can detect a signal, such as from the remote input device 8, and responsively output a representation of the detected signal on the display 40.

The probe 44 can include one or more probes. In some implementations, the probe 44 includes one or more oscilloscope probes for the oscilloscope 47. In those or in alternative implementations, the probe 44 includes one or more meter test leads. Each probe of the probe 44 can include a first end configured for connection to an input jack of the meter 46 or of the oscilloscope 47. Each probe also includes a second end configured for connection to or contacting a vehicle component, such as a connector pin within the vehicle 4 or an electrical conductor within the vehicle 4.

The meter 46 can include a single purpose meter, such as a volt meter. Alternatively, the meter 46 can include a multi-meter, such as a digital volt-ohm meter. The oscilloscope 47 can include a single channel or multi-channel oscilloscope. In at least some implementations, outputs of the meter 46 and the oscilloscope 47 are displayed on the display 40.

The signal generator 45 can output a signal onto a probe connected to the signal detector 43 for use in measuring a signal. For instance, the signal generator 45 can output a voltage differential onto the probe 44 (e.g., a red test lead and a black test lead) and onto a circuit for use in measuring a resistance of the circuit. The analog-to-digital converter 48 can be configured to convert an analog signal on the probe into a digital signal. A digital signal representing a signal detected by the signal detector 43 can be output onto the data bus 20 for transmission to the processor 15.

In at least some implementations, the test device 19 is included within the housing 21 along with the processor 15, the transceiver 16, the memory 17, and the user interface 18. In at least some other implementations, the test device 19 is included within the remote input device 8.

7. Example Memory Content

The memory 17 stores computer-readable data. As shown in FIG. 2, the memory 17 includes a database 25. The processor 15 can write data into the memory 17 and read data stored within the memory 17. The memory 17 contains computer-readable program instructions (CRPI) 24. The database 25 can include one or more of the following computer-readable data: a navigable menu 26, vehicle selection data 27, a vehicle data message 28, a remote device input 29, PID commands 30, a GUI 31, a GUI template 32, a buffer 33, a component test 34, or baseline data 35.

The navigable menu 26 includes a menu that can be output on the display 40. The input device 41 can be used to make selections on the navigable menu 26 to allow a user to navigate the navigable menu 26. The navigable menu 26 can include multiple levels. A lower level of the navigable menu can be displayed in response to selecting a menu selection (other than a back menu selection) shown on the display 40. A prior level of the navigable menu 26 can be viewed in response to selecting a back menu selection. As an example, the navigable menu 26 can include a user-selectable control to cause a GUI from which a vehicle identifier can be entered to be displayed on the display 40. As another example, the navigable menu 26 can include a user-selectable control to select PIDS to be sent to the vehicle 4 to request PID data (e.g., one or more parameter values corresponding to a PID) for displaying in a GUI on the display 40.

The vehicle selection data 27 can include data that represents relationships between vehicle model years and the types of vehicles that were built for and/or during each model year. For instance, for a given model year, the vehicle selection data 27 can include data that indicates all vehicle makes that include at least one type of vehicle for the given model year, and for each of those vehicle makes, the vehicle selection data 27 can include data that indicates all vehicle models that correspond to one of the vehicle makes that built at least one type of vehicle for the given model year. In at least some implementations, the vehicle selection data 27 can include data that indicates all engines that are used in each vehicle model. The vehicle selection data 27 can include data that indicates other criteria that can be used to distinguish different groups of common (i.e., like) vehicles. The processor 15 can generate a vehicle selection menu within the navigable menu 26 based on the vehicle selection data 27.

The vehicle data message 28 can include one or more vehicle data messages received from the vehicle 4. In at least some implementations, the one or more vehicle data messages include entire messages received from the vehicle 4. In at least some implementations, the one or more vehicle data messages stored as the vehicle data message 28 includes a portion of the vehicle data messages received from the vehicle 4. As an example, that portion of the vehicle data messages includes a PID and corresponding parameter value(s) from each of the received vehicle data messages. In at least some implementations, the vehicle data message 28 stores the received vehicle data messages using a first-in-first-out (FIFO) arrangement. The vehicle data messages stored most recently in the vehicle data message 28 can include the live vehicle data messages discussed elsewhere in this description.

The remote device input 29 includes data received from or based on data received from the remote input device 8. As an example, the input data received from the remote input device 8 can be received via the network transceiver 49 or the test device 19. In one respect, the remote device input 29 can include a message transmitted over the communication link 10 or data carried within the message. As an example, the data carried within the message can include location information that indicates a location of the vehicle 4 and/or the computing system 5. In another respect, the remote device input 29 can include a digital value of an analog signal received on the probe 44 at the meter 46 or the oscilloscope 47. As an example, the analog signal can include an analog signal output from a sensor within the vehicle 4, such as a crankshaft position sensor, a camshaft position sensor, or a throttle position sensor. The processor 15 can write remote device inputs into the buffer 33. For example, the processor 15 can write remote device inputs into frames being written into the buffer 33.

The PID commands 30 can include one or more PIDs for requesting PID parameter values. A PID command can include a PID. A PID command can include an identifier of an ECU that generated vehicle data parameters corresponding to a PID. A PID can be included within the CRPI 24, the navigable menu 26, the vehicle data message 28, mapping data, and/or an index described in this description. The PID commands 30 can includes sets of commands for different types of vehicles, such as vehicles corresponding to different Y/M/M identifiers. Table A shows example PIDs, PID descriptions, and ECUs that provide PID parameter values in response to receiving a PID command. A PID command can represent a PID, and PID description, and/or an identifier of an ECU using hexadecimal data.

TABLE A

| PID | PID description | ECU |
|---|---|---|
| 1 | Fuel system status | Powertrain control module |
| 2 | Calculated engine load | Powertrain control module |
| 3 | Engine coolant temperature | Powertrain control module |
| 4 | Short term fuel trim-bank 1 | Powertrain control module |
| 5 | Long term fuel trim-bank 1 | Powertrain control module |
| 6 | Fuel pump pressure | Powertrain control module |
| 7 | Intake manifold absolute pressure | Powertrain control module |
| 8 | Engine RPM | Powertrain control module |
| 9 | Vehicle speed | Powertrain control module |
| 10 | Timing advance | Powertrain control module |
| 11 | Intake air temperature | Powertrain control module |
| 12 | MAF air flow rate | Powertrain control module |
| 13 | Commanded EGR | Powertrain control module |
| 14 | EGR error | Powertrain control module |
| 15 | Fuel tank level input | Powertrain control module |
| 16 | Relative throttle position | Powertrain control module |
| 17 | Fuel type | Powertrain control module |
| 18 | Evaporator system vapor pressure | Powertrain control module |
| 19 | Mass air flow sensor | Powertrain control module |
| 20 | Intake manifold air temperature | Powertrain control module |
| 21 | Fuel injection timing | Powertrain control module |
| 22 | Engine oil temperature | Powertrain control module |
| 23 | Boost pressure control | Powertrain control module |
| 24 | Exhaust gas recirculation temperature | Powertrain control module |
| 25 | Turbocharger RPM | Powertrain control module |
| 26 | Wastegate control | Powertrain control module |
| 27 | Engine run time | Powertrain control module |
| 28 | Fuel pressure control system | Powertrain control module |
| 29 | Engine percent torque data | Powertrain control module |
| 30 | Injection pressure control system | Powertrain control module |
| 31 | Fuel pump voltage | Powertrain control module |
| 32 | Fuel pump relay | Powertrain control module |
| 33 | Short term fuel pump trim | Powertrain control module |
| 34 | Air conditioning compressor state | Powertrain control module |
| 35 | Air conditioning high side pressure | Powertrain control module |
| 36 | Air conditioning low side pressure | Powertrain control module |
| 37 | Engine control ECU DTC | Powertrain control module |
| 38 | Anti-lock brake ECU DTC | Anti-lock brake control module |
| 39 | Traction control ECU DTC | Traction control system module |
| 40 | Airbag system ECU DTC | Supplemental inflatable restraint control mod. |
| 41 | Powertrain control ECU DTC | Powertrain control module |
| 42 | Oil change life | Powertrain control module |
| 43 | Engine control ECU calibration number | Powertrain control module |
| 44 | Anti-lock brake ECU calibration number | Anti-lock brake control module |
| 45 | Traction control ECU calibration number | Traction control system module |
| 46 | Airbag system ECU calibration number | Supplemental inflatable restraint control mod. |
| 47 | Powertrain control ECU calibration number | Powertrain control module |
| 48 | Air conditioning switch voltage | HVAC control module |
| 49 | Fuel rail pressure | Powertrain control module |
| 50 | HVAC actuator direction | HVAC control module |
| 51 | HVAC fan motor switch | HVAC control module |
| 52 | HVAC motor speed percentage | HVAC control module |
| 53 | HVAC interior ambient air temperature | HVAC control module |
| 54 | Fuel pump state | |
| 55 | HVAC exterior ambient air temperature | HVAC control module |
| 56 | HVAC sun load sensor | HVAC control module |
| 57 | Fan speed indicated | HVAC control module |
| 58 | Air conditioning compressor status | HVAC control module |
| 59 | Fan speed demanded | HVAC control module |
| 60 | Evaporator temperature | HVAC control module |
| 61 | Rear cabin interior ambient temperature | HVAC control module |
| 62 | Misfire counts | Powertrain control module |
| 63 | O2 sensor-bank 1-sensor 1 | Powertrain control module |
| 64 | O2 sensor-bank 1-sensor 2 | Powertrain control module |
| 65 | O2 sensor-bank 2-sensor 1 | Powertrain control module |
| 66 | O2 sensor-bank 2-sensor 2 | Powertrain control module |
| 67 | Fan speed indicated | HVAC control module |
| 68 | Audio volume | Radio control module |
| 69 | Speaker fade setting | Radio control module |
| 70 | Speaker balance setting | Radio control module |
| 71 | Horn input | Body control module |
| 72 | Left front door lock switch status | Body control module |

TABLE A-continued

| PID | PID description | ECU |
|-----|----------------|-----|
| 73 | Right front door lock switch status | Body control module |
| 74 | Left rear door lock switch status | Body control module |
| 75 | Left rear door lock switch status | Body control module |
| 76 | Battery voltage | Powertrain control module |
| 77 | Brake pad wear sensors | Anti-lock brake control module |

The GUI 31 can include one or more GUI or content to populate a GUI to be displayed on the display 40. As an example, the GUI 31 can include a GUI or aspects of a GUI shown in FIG. 8 to FIG. 35. The GUI template 32 can include one or more templates. The processor 15 can select a particular GUI template based on what data is to be output on the display 40. The selected GUI template can be based on a particular display mode selected for the computing system 5, such as a graph view mode or a list view mode. The selected GUI template can be based on the content of frames stored within the buffer 33. For example, if the frames include PID data for ten different PIDs, then the selected GUI template can include containers for displaying the PID data for ten different PIDs.

Figure 3:
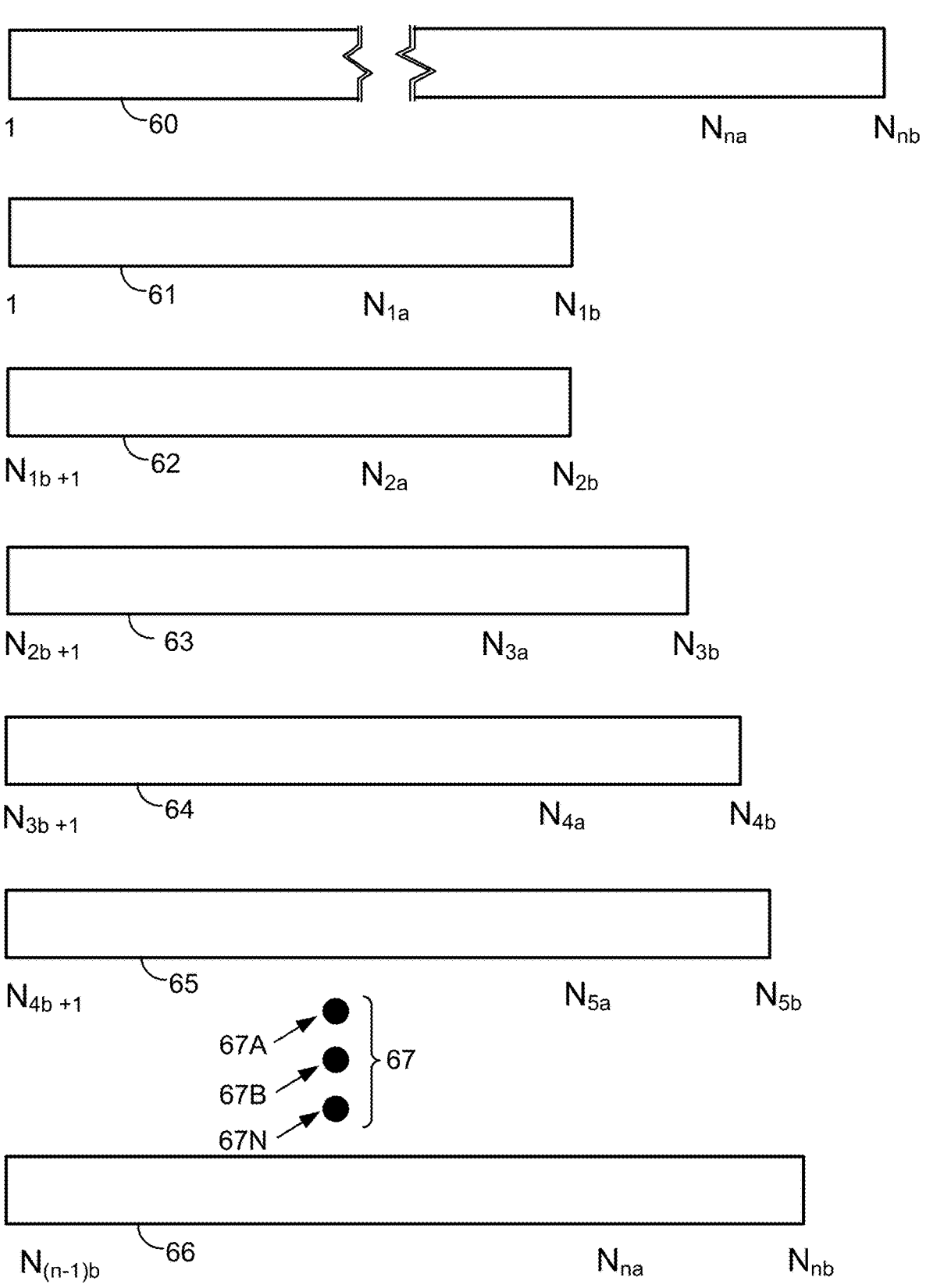
FIG. 3 shows a buffer in accordance with the example implementations.
Figure 4:
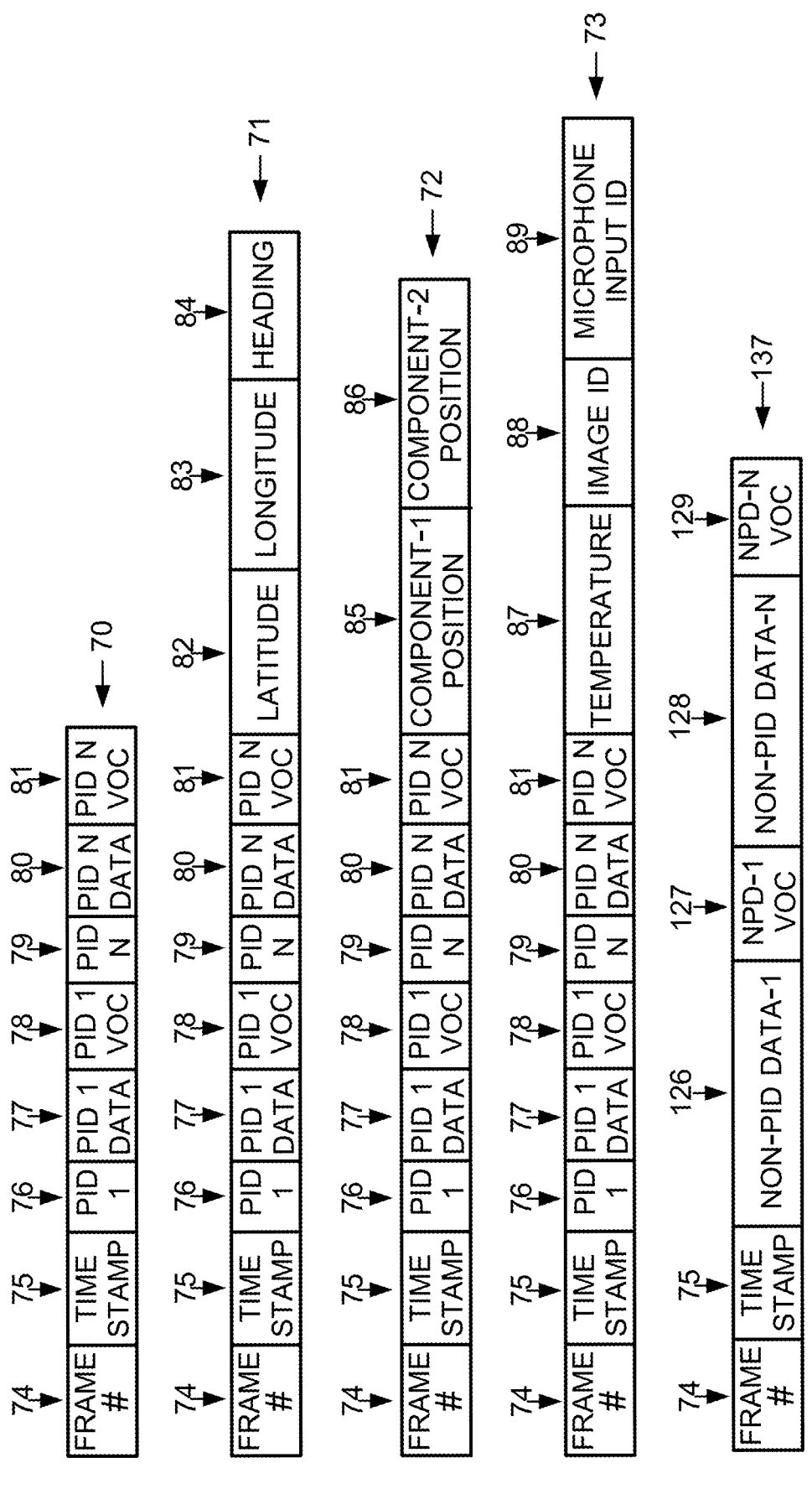
FIG. 4 shows frames in accordance with the example implementations.

The buffer 33 stores frame(s) of data to be displayed within a GUI. As an example, a frame can be based on content that is to be populated into containers of a GUI. Accordingly, the buffer 33 can store different frames based on which GUI is being displayed on the display 40. The buffer 33 can include a portion of the vehicle data message 28 (e.g., a PID and PID parameter value of a vehicle data message received from the vehicle 4). The buffer 33 can include a portion of the remote device input 29, such as digital values corresponding to analog signals received at the test device 19. An example buffer is shown in FIG. 3. Examples of frames that can be stored within the buffer 33 are shown in FIG. 4.

The component test 34 can include one or more component tests. Each component test can include computer-readable program instructions (e.g., a component test module) executable to perform the component test. Execution of a component test module can include configuring the test device 19 for performing the component test for the component and/or vehicle to be tested. Table B includes example index values/identifiers and component tests. The index values/identifiers can be used within computer-readable program instructions and/or communications (e.g., a communication from the server 11) to identify a component test that is to be executed.

TABLE B

| Index Value/<br>Identifier | Component Test |
|---------------------------|----------------|
| CT1 | Frequency test |
| CT2 | Signature test |
| CT3 | Out of range no signal test |
| CT4 | Voltage test |
| CT5 | Current test |
| CT6 | Resistance test |
| CT7 | Capacitance test |
| CT8 | Temperature test |
| CT9 | Pressure test |
| CT10 | Tail pipe emission test |
| CT11 | Continuity test |
| CT12 | Fuel pump voltage test |
| CT13 | HVAC actuator voltage test |
| CT14 | Fuel pump signature test |
| CT15 | HVAC actuator temperature test |

TABLE B-continued

| Index Value/<br>Identifier | Component Test |
|---------------------------|----------------|
| CT16 | Exhaust gas cylinder balance test |
| CT17 | Air conditioning pressure test |
| CT18 | Air conditioning test during recycle and recharge |
| CT19 | Crankshaft position sensor |
| CT20 | Camshaft position sensor |
| CT21 | Throttle position sensor |

The baseline data 35 includes one or more threshold values corresponding to a PID. As an example, the threshold(s) can include a maximum threshold and/or a minimum threshold corresponding to the PID. In at least some implementation, a maximum threshold or minimum threshold corresponding to a PID can be a parameter value that corresponds to a value when a diagnostic trouble code is set to indicate a malfunction is occurring. In at least some implementations, a threshold value corresponding to a PID is a default threshold value for the computing system 5. In those and/or in other implementations, a threshold value corresponding to a PID is a user-selected threshold value. In at least some implementations, a baseline threshold indicator is displayed within a vehicle data parameter graph. In at least some of those implementations, user-selected threshold levels are displayed within a vehicle data parameter graph, but default threshold levels are not displayed within the vehicle data parameter graph. In those and other implementations, breaching a default threshold level can result in displaying a vehicle operating condition (VOC) indicator within a GUI.

The CRPI 24 can comprise multiple program instructions. The CRPI 24 can include data structures, objects, programs, routines, or other program modules that can be accessed by the processor 15 and executed by the processor 15 to perform a particular function or group of functions and are examples of program codes for implementing steps or functions for methods described in this description as being performed by the computing system 5, the processor 15, and/or some other component of the computing system 5.

As an example, the CRPI 24 can include program instructions executable to perform one or more functions of the flowchart 140 shown in FIG. 7A and FIG. 7B. As another example, the CRPI 24 can include program instructions executable to perform a method described as including one or more functions of the flowchart 140. As yet another example, the CRPI 24 can include program instructions executable to perform a function shown in any of the EEEs described below.

As another example, the CRPI 24 can include program instruction executable to detect contact with a particular area of a touch panel of the display 40 where a user-selectable control is displayed on the display 40, and to execute other particular program instructions or a particular data entry assigned to the particular area of the touch panel. The processor 15 determines the other particular program instructions or a particular data entry assigned to the particular area of the touch panel based on which GUI is being displayed on the display 40 when the contact with the touch panel is made.

As yet another example, the CRPI 24 can include program instruction executable to detect use of the input device 41 to select a user-selectable control displayed at a particular area of the display 40, and to execute other particular program instructions or a particular data entry assigned to the particular area of the touch panel. The processor 15 determines the other particular program instructions or a particular data entry assigned to the particular area of the display 40 based on which GUI is being displayed on the display 40 when the input device 41 is used to make the selection.

As still yet another example, the CRPI 24 can include program instruction executable to engage additional buffer segments within a buffer (e.g., with the buffer 33 and/or the memory 17). As an example, engaging an additional buffer segment can include the processor 15 calculating how much memory space is needed to store a particular number of frames for the displayed GUI. The calculation of memory space is based, at least in part, on how many PIDs are represented in the GUI and how many different types of non-PID data are represented in the GUI. The calculation of memory space is further based, at least in part, on the type of PIDs represented in the GUI and the types of non-PID data represented in the GUI. The type of PIDs can be based on how many data bytes are used to represent a parameter value for the PID. The type of non-PID data can be based on whether the non-PID data includes a file, such as an image or audio file. As another example, engaging an additional buffer segment can include reserving a portion of memory addresses within the memory 17 for storing a particular number of frames. As shown in FIG. 3, the particular number of frames can vary depending on how many buffer segments have been engaged for storing frames. As yet another example, engaging an additional buffer segment can include writing data for a first or subsequent frame in the buffer segment.

Next, FIG. 3 shows a buffer 60 in accordance with the example implementations. The buffer 33 in FIG. 2 can be configured like the buffer 60. The buffer 60 is configured to store a quantity of frames. The quantity of frames can be $N_{nb}$ frames, where $N_{nb}$ represents a numerical quantity. The subscript n within $N_{nb}$ represents a quantity of buffer segments. The subscript b within $N_{nb}$ represents the last frame of a buffer segment, one of which can be the last frame of the buffer 60. A particular frame within each buffer segment can be indicated using an indicator in the form of $N_{na}$, wherein subscript n within $N_{nb}$ represents a quantity of buffer segments. An amount of memory needed to store different frames in the memory 17 can vary. The buffer 60 can include a dedicated amount of memory addresses in the memory 17 for storing the maximum amount of data expected to be received if data for all frames in the buffer 33 are received.

The buffer 60 includes multiple buffer segments. FIG. 3 shows a buffer segment 61, 62, 63, 64, 65, 66 and an indicator 67 of one or more intermediate buffer segments. As an example, the indicator 67 shows the buffer 60 could include a buffer segment 67A, 67B, 67N, where 67N represents the nth buffer segment represented by the indicator 67. In accordance with a different implementation, the indicator 67 includes the buffer segment 67A and the buffer segment 67N, where N equals zero such that the intermediate buffer segment includes only a single intermediate buffer segment.

The rectangles shown in FIG. 3 represent a size of the buffer segments. For example, the rectangles for the buffer segment 61 and the buffer segment 62 are the same size to represent that multiple buffer segments can be the same size (e.g., store the same quantity of frames). As another example, the rectangles for the buffer segment 63, the buffer segment 64, and the buffer segment 65 are different sizes to represent that multiple buffer segments can be different sizes (e.g., store different quantities of frames).

Table C shows example data corresponding to a buffer that includes five buffer segments (e.g., the buffer segment 61, 62, 63, 64, 65) in accordance with an example implementation. The second column of Table C indicates how many frames can be stored in a corresponding buffer segment. The third column of Table C indicates a first frame number for each buffer segment. The fifth column of Table C indicates a last frame number for each buffer segment. The fourth column of Table C indicates a particular frame number within each buffer segment. In Table C, the particular frame number is different than the first and last frame numbers for the same buffer segment. The particular frame number can indicate a frame at which point the processor 15 engages a next buffer segment. For example, as the processor 15 is writing frames into the buffer segment 61 and reaches frame Nia (e.g., frame "800"), the processor 15 can engage the buffer segment 62.

In some implementations, specifying or determining a particular frame for the last buffer segment in the buffer 33 is not necessary because the processor 15 does not engage another buffer segment after the last buffer segment (e.g., the buffer segment 65) in the buffer 33 is engaged during a current vehicle data session. In other implementations, a particular frame (e.g., $N_{5a}$ (e.g., frame "19,000")) within the last buffer segment (e.g., the buffer segment 65) in the buffer 33 is specified or determined because the processor 15 engages a different buffer segment within the buffer 33 upon reaching that particular frame. As an example, using a first-in-first-out (FIFO) approach, the processor 15 engages the buffer segment 61 upon reaching the particular frame in the last buffer segment. In at least some of those implementations, the processor 15 overwrites frames in the buffer segment 61 one at a time sequentially starting at frame "1" after the processor 15 engages the buffer segment 61 while the buffer segment 65 is already engaged for writing frames of data.

TABLE C

| Buffer segment | Frame quantity | First frame | Particular frame | Last frame |
|---|---|---|---|---|
| 61 | 1,000 | 1 | 800 ($N_{1a}$) | 1,000 ($N_{1b}$) |
| 62 | 1,000 | 1,001 ($N_{1b+1}$) | 1,600 ($N_{2a}$) | 2,000 ($N_{2b}$) |
| 63 | 3,000 | 2,001 ($N_{2b+1}$) | 4,200 ($N_{3a}$) | 5,000 ($N_{3b}$) |
| 64 | 5,000 | 5,001 ($N_{3b+1}$) | 9,000 ($N_{4a}$) | 10,000 ($N_{4b}$) |
| 65 | 10,000 | 10,001 ($N_{4b+1}$) | 19,000 ($N_{5a}$) | 20,000 ($N_{5b}$) |

Table D shows example data corresponding to a buffer that includes five buffer segments (e.g., the buffer segment 61, 62, 63, 64, 65) in accordance with an example implementation. The data in the first, second, third, and fifth columns in Table C and Table D are identical. The fourth column of Table D indicates a particular frame number within each buffer segment. Unlike Table C, however, the particular frame number for each buffer segment in Table D is identical to the last frame number for the same buffer segment.

TABLE D

| Buffer segment | Frame quantity | First frame | Particular frame | Last frame |
|---|---|---|---|---|
| 61 | 1,000 | 1 | 1,000 ($N_{1a}$) | 1,000 ($N_{1b}$) |
| 62 | 1,000 | 1,001 ($N_{1b+1}$) | 2,000 ($N_{2a}$) | 2,000 ($N_{2b}$) |
| 63 | 3,000 | 2,001 ($N_{2b+1}$) | 5,000 ($N_{3a}$) | 5,000 ($N_{3b}$) |
| 64 | 5,000 | 5,001 ($N_{3b+1}$) | 10,000 ($N_{4a}$) | 10,000 ($N_{4b}$) |
| 65 | 10,000 | 10,001 ($N_{4b+1}$) | 20,000 ($N_{5a}$) | 20,000 ($N_{5b}$) |

Table E shows example data corresponding to a buffer that includes eight buffer segments (e.g., the buffer segment 61, 62, 63, 64, 65, 66, 67A, 67B) in accordance with an example implementation. The second column of Table E indicates how many frames can be stored in a corresponding buffer segment. The third column of Table E indicates a first frame number for each buffer segment. The fifth column of Table E indicates a last frame number for each buffer segment. The fourth column of Table E indicates a particular frame number within each buffer segment. In Table E, the particular frame number is different than the first and last frame numbers for the same buffer segment (although could be the same as the last frame number for the same buffer segment similar to particular frame numbers shown in Table D).

TABLE E

| Buffer segment | Frame quantity | First frame | Particular frame | Last frame |
|---|---|---|---|---|
| 61 | 1,000 | 1 | 1,000 ($N_{1a}$) | 1,000 ($N_{1b}$) |
| 62 | 1,000 | 1,001 ($N_{1b+1}$) | 2,000 ($N_{2a}$) | 2,000 ($N_{2b}$) |
| 63 | 3,000 | 2,001 ($N_{2b+1}$) | 5,000 ($N_{3a}$) | 5,000 ($N_{3b}$) |
| 64 | 5,000 | 5,001 ($N_{3b+1}$) | 10,000 ($N_{4a}$) | 10,000 ($N_{4b}$) |
| 65 | 10,000 | 10,001 ($N_{4b+1}$) | 20,000 ($N_{5a}$) | 20,000 ($N_{5b}$) |
| 67A | 10,000 | 20,001 ($N_{5b+1}$) | 29,000 ($N_{6a}$) | 30,000 ($N_{6b}$) |
| 67B | 10,000 | 30,001 ($N_{6b+1}$) | 39,000 ($N_{7a}$) | 40,000 ($N_{7b}$) |
| 66 | 10,000 | 40,001 ($N_{7b+1}$) | 49,000 ($N_{8a}$) | 50,000 ($N_{8b}$) |

Next, FIG. 4 shows a frame 70, 71, 72, 73, 137 in accordance with the example implementations. The frame 70 includes a frame number 74, a time stamp 75, a PID 76, PID data 77, a VOC status indicator 78, a PID 79, PID data 80, and a VOC status indicator 81. The PID data 77 and the VOC status indicator 78 correspond to the PID 76. Likewise, the PID data 80 and the VOC status indicator 81 correspond to the PID 79. The frame number 74 and the time stamp 75 can be used as a frame identifier to distinguish a frame from other frames. The PID 76, the PID data 77, and the VOC status indicator 78 in FIG. 4 include a "1" to represent a first PID. In contrast, the PID 79, the PID data 80, and the VOC status indicator 81 in FIG. 4 include an "N" to represent an Nth PID. Accordingly, a frame shown as including the PID 76, the PID data 77, the VOC status indicator 78, the PID 79, the PID data 80, and the VOC status indicator 81 can include one or more PIDs between the first and Nth PIDs and corresponding PID data and VOC status indicator for each of the one or more other PIDs.

In at least some implementations in which each frame of a set of multiple frames includes a frame number, the frame numbers can be assigned sequentially to the frames from using whole numbers that increase as each additional frame number is assigned to a next frame in the set of multiple frames.

In at least some implementations, the time stamp 75 can represent a time corresponding to when the frame is generated, such as a start time that indicates when generation of the frame begins or an end time that indicates when generation of the frame ends. In at least some implementations, the time stamp 75 can represent a time that indicates when a vehicle data message requesting or containing PID data is transmitted from or received by the computing system 5. A time stamp can indicate a date in addition to a time.

The VOC status indicator 78, 81 can indicate whether the corresponding PID data 77, 80, respectively, breaches a threshold corresponding to the PID 76, 79, respectively. In at least some implementations, the VOC status indicator 78, 81 can indicate whether a breach of PID data within a particular set of frames is a first breach of the PID data for the PID 76, 79, respectively. As an example, the particular set of frames can include all frames generated by the computing system 5 during a single instance of being operatively coupled to the vehicle 4.

The frame 71, 72, 73 also includes the frame number 74, the time stamp 75, the PID 76, the PID data 77, the VOC status indicator 78, the PID 79, the PID data 80, and the VOC status indicator 81. The frame 137 also includes the frame number 74 and the time stamp 75. The frame 137 also includes non-PID data-1 126, a VOC status indicator 127, non-PID data-N 128, and a VOC status indicator 129. The VOC status indicator 127, 129 can indicate whether the corresponding non-PID data 126, 128, respectively, breaches a threshold corresponding to the non-PID data 126, 128, respectively. In at least some implementations, the VOC status indicator 127, 129 can indicate whether a breach of non-PID data within a particular set of frames is a first breach of the non-PID data for the non-PID data 126, 128, respectively. As an example, the Nth value of the non-PID data-N can be zero such that the only non-PID data contained in the frame 137 is the non-PID data-1 126. Alternatively, the value of N within the non-PID data-N 128 can be greater than zero. The non-PID data-1 126 and the non-PID data-N 128 can include any of the non-PID data discussed in this description or some other non-PID data. In general, the non-PID data can include data generated by the signal detector 43 (e.g., the meter 46 or the oscilloscope 47) when connected to a component (e.g., a sensor) in the vehicle 4. More specifically, those example non-PID data or other examples of non-PID data can include video data, audio data, haptic sensor data, accelerometer output data, yaw rate sensor data, crankshaft position sensor data, camshaft position sensor data, wheel speed sensor data, temperature data, or location data. Other examples of the non-PID data stored within a frame of data are also possible.

A frame can include location information. In at least some implementations, the location information can be contained in PID data corresponding to a PID. In at least some other implementations, the location information can include location information the computing system 5 receives from a GPS receiver. The GPS receiver can be located within the computing system 5, within the vehicle 4, or otherwise. With regard to location information, as an example, the frame 71 also includes a latitude 82, a longitude 83, and a heading 84. Other types of data to indicate a location within a frame are also possible.

Figures 38, 39:
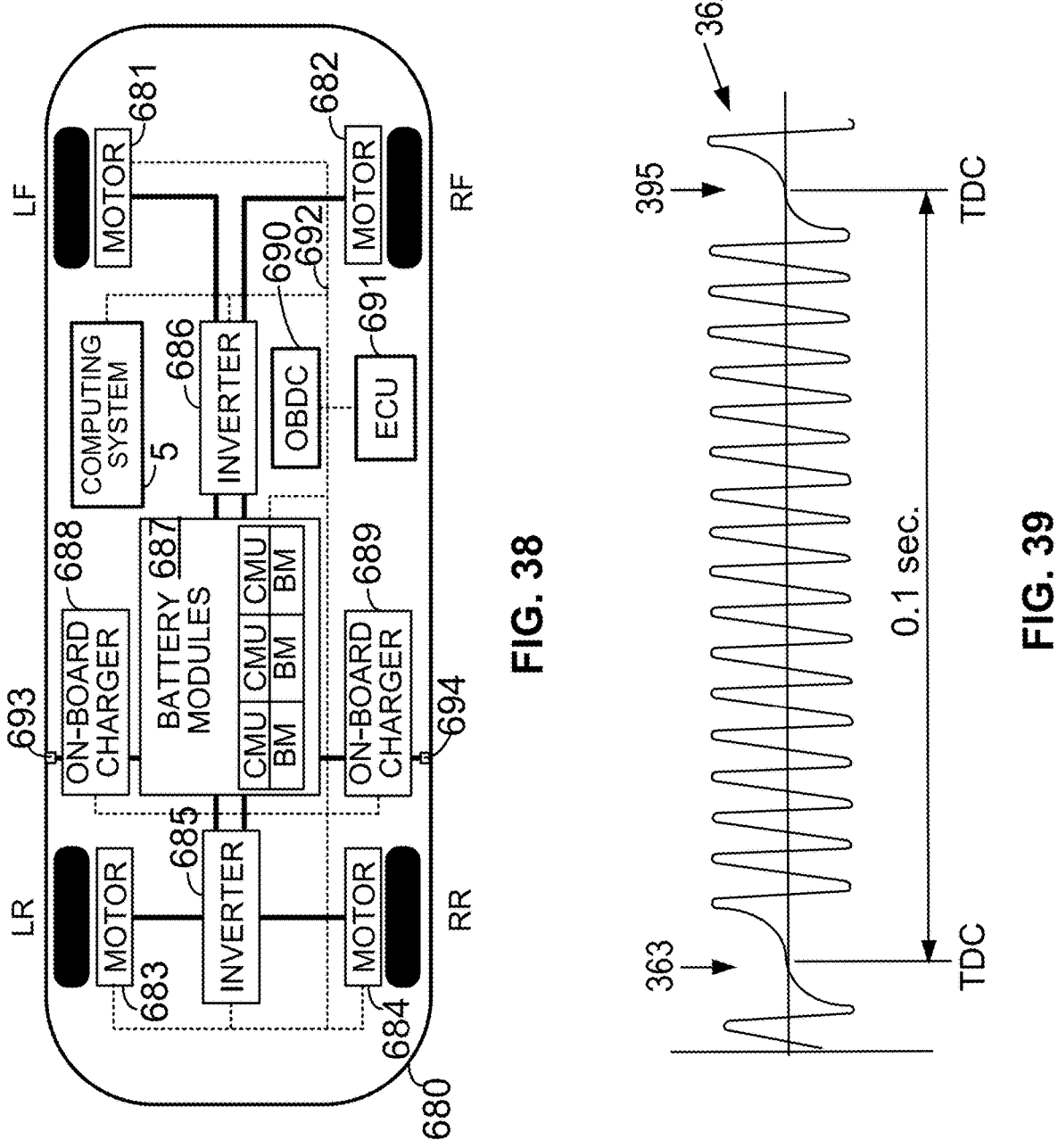
FIG. 38 is a diagram of a vehicle showing example placement of a computing system in accordance with at least some of the example implementations.
FIG. 39 shows non-PID data in accordance with the example implementations.

A frame can include component position information. The frame 72 includes component position information for two different components, but a frame with component position could include position information for a different quantity of components, such as one or three or more components. The frame 72 includes a component-1 position 85 and a component-2 position 86. As an example, the component-1 position 85 can indicate a position of a crankshaft position within the vehicle 4 and the component-2 position 86 can indicate a position of a camshaft position within the vehicle 4. As another example, the crankshaft position and/or camshaft position can be a number of degrees between and including 0° and 360°. In at least some implementations, the component position information can be contained in PID data corresponding to a PID. In at least some other implementations, the component position information can include information the processor 15 determines by the meter 46 or the oscilloscope 47 measuring a signal from a sensor within the vehicle 4, such as a crankshaft position sensor or a camshaft position sensor. Other examples of a position sensor in the vehicle include a throttle position sensor, a clutch position sensor, a pedal position sensor, a PRNDL position sensor, a transmission fork position sensor, or a seat position sensor. FIG. 39 shows non-PID that can correspond to at least some of the position data of a component listed above.

A frame can include component temperature information, image information, and an audio input. For example, the frame 73 also includes a temperature 87, an image identifier 88, and a microphone input identifier 89. In at least some implementations, the temperature 87 and the image identifier 88 can include a temperature determined by a thermal imaging device and an image captured by the thermal imaging device, respectively. The microphone input identifier 89 can indicate an audio file generated and/or received by the computing system 5 as the frame 73 was being generated. As an example, the audio file can include data representing audio received at a microphone during a test drive of the vehicle 4 with the computing system 5 operatively coupled to the vehicle 4. The received audio can, for example, include words spoken by a user of the computing system 5 to memorialize some occurrence during the test drive, such as "just drove over rail-road tracks" or "malfunction indicator lamp just turned off."

A frame can include data arranged in an order as shown in FIG. 4 or in some other order. A frame can include other data to signify a beginning or end of the frame. As an example, a frame can include start byte(s) with data to indicate a beginning of a frame and/or a length of a frame (e.g., a quantity of data bytes). As another example, a frame can include end byte(s) such as a checksum byte among others.

Table F shows data in accordance with example implementations. For example, Table F shows data corresponding to frames numbered "65" to "76." The data corresponding to those frames include time stamps, PID parameter values, and status that indicates whether a VOC warrants displaying a VOC indicator with a GUI. In accordance with at least some implementations, the VOC status data is stored for only the first occurrence of a VOC that warrants displaying a VOC indicator for each PID.

The time stamps are ordered from an early time to a later time. Each sequential time stamp is 0.002 seconds later than the prior time stamp. In accordance with the data shown in Table F, the PIDs "1," "2," "3," "4," "5" are requested once per second. In accordance with other implementations, PID parameters can be requested more often than once per second or less often than once per second.

In accordance with the data shown in Table F, each frame includes five PID parameter values. In accordance with other implementations, each frame can include more than five PID parameter values or fewer than five PID parameters. Moreover, each frame can include or correspond to a non-PID datum or non-PID data.

Figure 11:
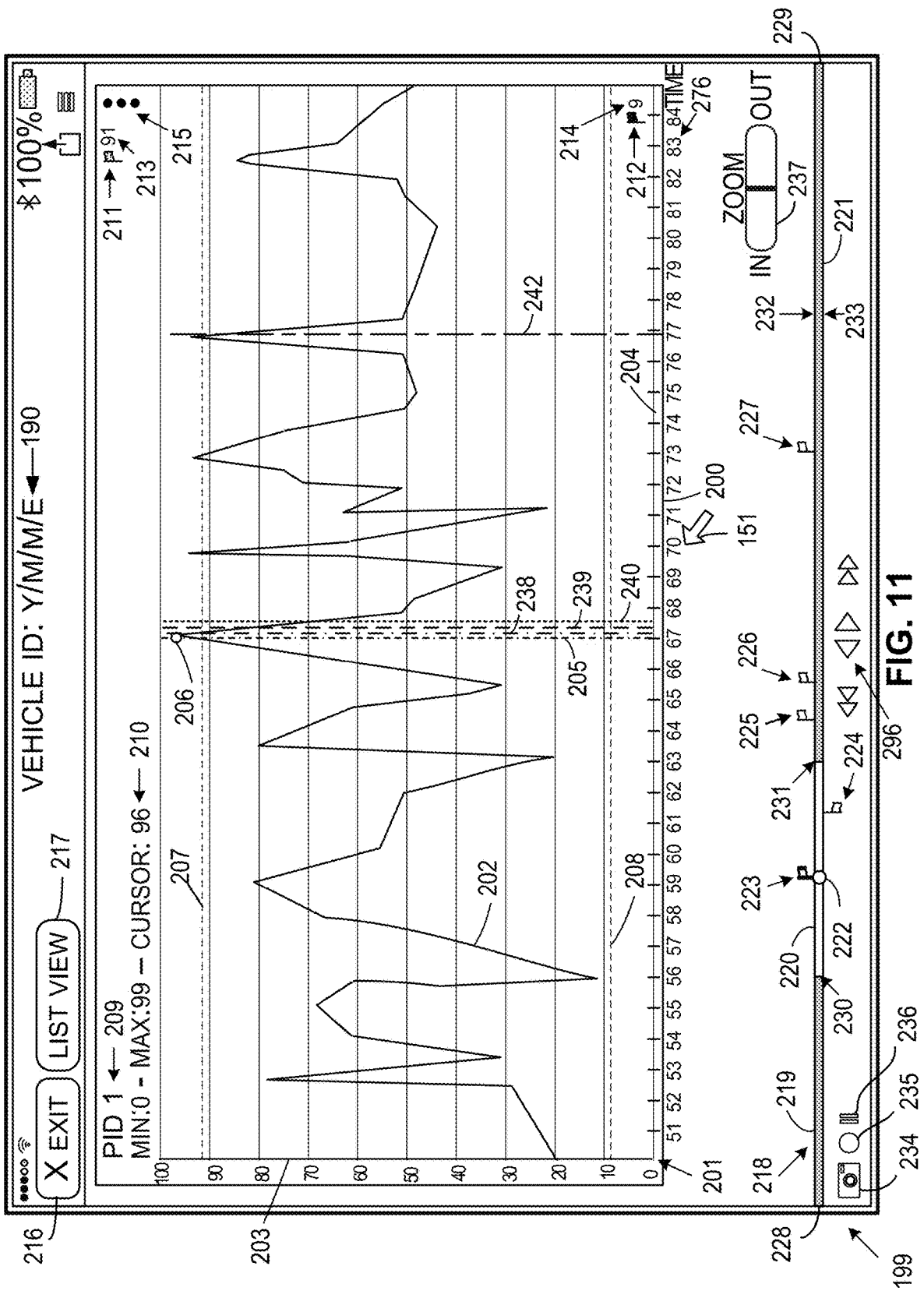

The PID parameter values in Table F are for PIDs "1," "2," "3," "4," "5." A waveform 202 shown in FIG. 11 represents the PID "1" parameter values for frames "65" to "76" (listed in Table F). The waveform 202 represents other parameter values for PID "1" stored in other frames. A VDP graph 201 shown in FIG. 11 includes cursors and VOC indicators corresponding the VOC status data shown in Table F. A graphical frame counter 276 in FIG. 11 shows numeric indicators for the frames "65" to "76" (listed in Table F), as well as for frames "51" to "64" and frames "77" to "84."

The buffer 33 can contain the data shown in Table F as well as additional data for frames captured prior to the frame "65," such as frames numbered "1" to "64" and frames captured after the frame "76," such as the frames numbered "77" to "N." In this case, "N" can be the maximum frame number that can be stored in the buffer 33.

TABLE F

| Frame # | Time | PID 1 PV | PID 1 VOC | PID 2 PV | PID 2 VOC | PID 3 PV | PID 3 VOC | PID 4 PV | PID 4 VOC | PID 5 PV | PID 5 VOC |
|---|---|---|---|---|---|---|---|---|---|---|---|
| 65 | 0:01.050 | 35 | — | — | — | — | — | — | — | — | — |
| 65 | 0:01.052 | — | — | 73 | — | — | — | — | — | — | — |
| 65 | 0:01.054 | — | — | — | — | 12.8 | — | — | — | — | — |
| 65 | 0:01.056 | — | — | — | — | — | — | 5.2 | — | — | — |
| 65 | 0:01.058 | — | — | — | — | — | — | — | — | 0.75 | — |
| 66 | 0:01.060 | 31 | — | — | — | — | — | — | — | — | — |
| 66 | 0:01.062 | — | — | 56 | — | — | — | — | — | — | — |
| 66 | 0:01.064 | — | — | — | — | 12.8 | — | — | — | — | — |
| 66 | 0:01.066 | — | — | — | — | — | — | 5.1 | — | — | — |
| 66 | 0:01.068 | — | — | — | — | — | — | — | — | 0.36 | — |
| 67 | 0:01.070 | 96 | YES | — | — | — | — | — | — | — | — |
| 67 | 0:01.072 | — | — | 95 | YES | — | — | — | — | — | — |
| 67 | 0:01.074 | — | — | — | — | 9.2 | YES | — | — | — | — |
| 67 | 0:01.076 | — | — | — | — | — | — | 5.1 | — | — | — |
| 67 | 0:01.078 | — | — | — | — | — | — | — | YES | 0.98 | — |
| 68 | 0:01.080 | 51 | — | — | — | — | — | — | — | — | — |
| 68 | 0:01.082 | — | — | 95 | — | — | — | — | — | — | — |
| 68 | 0:01.084 | — | — | — | — | 8.7 | — | — | — | — | — |
| 68 | 0:01.086 | — | — | — | — | — | — | 5.2 | — | — | — |
| 68 | 0:01.088 | — | — | — | — | — | — | — | — | 1.00 | — |
| 69 | 0:01.090 | 48 | — | — | — | — | — | — | — | — | — |
| 69 | 0:01.092 | — | — | 96 | — | — | — | — | — | — | — |
| 69 | 0:01.094 | — | — | — | — | 8.5 | — | — | — | — | — |
| 69 | 0:01.096 | — | — | — | — | — | — | 5.2 | — | — | — |
| 69 | 0:01.098 | — | — | — | — | — | — | — | — | 0.96 | — |

TABLE F-continued

| Frame # | Time | PID 1 PV | PID 1 VOC | PID 2 PV | PID 2 VOC | PID 3 PV | PID 3 VOC | PID 4 PV | PID 4 VOC | PID 5 PV | PID 5 VOC |
|---|---|---|---|---|---|---|---|---|---|---|---|
| 70 | 0:01.100 | 32 | — | — | — | — | — | — | — | — | — |
| 70 | 0:01.102 | — | — | 95 | — | — | — | — | — | — | — |
| 70 | 0:01.104 | — | — | — | — | 8.5 | — | — | — | — | — |
| 70 | 0:01.106 | — | — | — | — | — | — | 5.1 | — | — | — |
| 70 | 0:01.108 | — | — | — | — | — | — | — | — | 0.93 | — |
| 71 | 0:01.110 | 92 | — | — | — | — | — | — | — | — | — |
| 71 | 0:01.112 | — | — | 96 | — | — | — | — | — | — | — |
| 71 | 0:01.114 | — | — | — | — | 8.5 | — | — | — | — | — |
| 71 | 0:01.116 | — | — | — | — | — | — | 5.1 | — | — | — |
| 71 | 0:01.118 | — | — | — | — | — | — | — | — | 0.96 | — |
| 72 | 0:01.120 | 23 | — | — | — | — | — | — | — | — | — |
| 72 | 0:01.122 | — | — | 96 | — | — | — | — | — | — | — |
| 72 | 0:01.124 | — | — | — | — | 8.5 | — | — | — | — | — |
| 72 | 0:01.126 | — | — | — | — | — | — | 5.1 | — | — | — |
| 72 | 0:01.128 | — | — | — | — | — | — | — | — | 0.47 | — |
| 73 | 0:01.130 | 62 | — | — | — | — | — | — | — | — | — |
| 73 | 0:01.132 | — | — | 97 | — | — | — | — | — | — | — |
| 73 | 0:01.134 | — | — | — | — | 8.5 | — | — | — | — | — |
| 73 | 0:01.136 | — | — | — | — | — | — | 5.1 | — | — | — |
| 73 | 0:01.138 | — | — | — | — | — | — | — | — | 0.47 | — |
| 74 | 0:01.140 | 52 | — | — | — | — | — | — | — | — | — |
| 74 | 0:01.142 | — | — | 98 | — | — | — | — | — | — | — |
| 74 | 0:01.144 | — | — | — | — | 8.5 | — | — | — | — | — |
| 74 | 0:01.146 | — | — | — | — | — | — | 5.1 | — | — | — |
| 74 | 0:01.148 | — | — | — | — | — | — | — | — | 0.56 | — |
| 75 | 0:01.150 | 72 | — | — | — | — | — | — | — | — | — |
| 75 | 0:01.152 | — | — | 98 | — | — | — | — | — | — | — |
| 75 | 0:01.154 | — | — | — | — | 8.5 | — | — | — | — | — |
| 75 | 0:01.156 | — | — | — | — | — | — | 5.1 | — | — | — |
| 75 | 0:01.158 | — | — | — | — | — | — | — | — | 0.27 | — |
| 76 | 0:01.160 | 91 | — | — | — | — | — | — | — | — | — |
| 76 | 0:01.162 | — | — | 99 | — | — | — | — | — | — | — |
| 76 | 0:01.164 | — | — | — | — | 8.5 | — | — | — | — | — |
| 76 | 0:01.166 | — | — | — | — | — | — | 0.3 | — | — | — |
| 76 | 0:01.168 | — | — | — | — | — | — | — | — | 0.56 | YES |

Next, TABLE G shows data that can be written into a memory in accordance with the example implementations. Column-1 includes time stamps. Each time stamp can indicate a time when data in one or more of the other columns in that row was received and/or written into the memory. Column-2 includes PIDs. As an example the PIDs can include N different PIDs, where N is some quantity of different PIDs. Column-3 includes PID parameter values corresponding to the PID in that row. Column-4 includes frame indicators corresponding to the other data in row including the frame indicator. Column-5 includes non-PID data from an input referred to as Input-1. Column-6 includes non-PID data from an input referred to as Input-2. TABLE G represents an implementation in which the PID parameter values for some PIDs correspond to non-PID data (e.g., the parameter values for PID-1 correspond to non-PID data from the Input-1 and the parameter values for PID-2 correspond to non-PID data from the Input-2). The time stamps shown in Column-1 and/or the frame indicators shown in Column-4 can be non-PID data as well. In at least some implementations, the processor 15 generates the frame indicators and is received from an input internal to the processor 15. The "---" characters represent that no non-PID data represented within that column corresponds to the PID parameter value represented in the row including those characters. The lower numbered time stamps represent an earlier time stamp compared to a larger numbered time stamp.

TABLE G

| Column-1 Time Stamp | Column-2 PID | Column-3 PID PV | Column-4 Frame | Column-5 Non-PID | Column-6 Non-PID |
|---|---|---|---|---|---|
| T1 | PID-1 | PID-1 PV | Frame-1 | Input-1 | — |
| T2 | PID-2 | PID-2 PV | Frame-1 | — | Input-2 |
| T3 | PID-3 | PID-3 PV | Frame-1 | — | — |
| T4 | PID-N | PID-N PV | Frame-1 | — | — |
| T5 | PID-1 | PID-1 PV | Frame-2 | Input-1 | — |
| T6 | PID-2 | PID-2 PV | Frame-2 | — | Input-2 |
| T7 | PID-3 | PID-3 PV | Frame-2 | — | — |
| T8 | PID-N | PID-N PV | Frame-2 | — | — |
| T9 | PID-1 | PID-1 PV | Frame-3 | Input-1 | — |
| T10 | PID-2 | PID-2 PV | Frame-3 | — | Input-2 |
| T11 | PID-3 | PID-3 PV | Frame-3 | — | — |
| T12 | PID-N | PID-N PV | Frame-3 | — | — |
| T13 | PID-1 | PID-1 PV | Frame-N | Input-1 | — |
| T14 | PID-2 | PID-2 PV | Frame-N | — | Input-2 |
| T15 | PID-3 | PID-3 PV | Frame-N | — | — |
| T16 | PID-N | PID-N PV | Frame-N | — | — |

Next, TABLE H shows data that can be written into a memory in accordance with the example implementations. This data is identical to the data in TABLE G except that Column-5 shows that non-PID from Input-1 is stored for each PID parameter value in TABLE G.

TABLE H

| Column-1 Time Stamp | Column-2 PID | Column-3 PID PV | Column-4 Frame | Column-5 Non-PID | Column-6 Non-PID |
|---|---|---|---|---|---|
| T1 | PID-1 | PID-1 PV | Frame-1 | Input-1 | — |
| T2 | PID-2 | PID-2 PV | Frame-1 | Input-1 | Input-2 |

TABLE H-continued

| Column-1 Time Stamp | Column-2 PID | Column-3 PID PV | Column-4 Frame | Column-5 Non-PID | Column-6 Non-PID |
|---|---|---|---|---|---|
| T3 | PID-3 | PID-3 PV | Frame-1 | Input-1 | — |
| T4 | PID-N | PID-N PV | Frame-1 | Input-1 | — |
| T5 | PID-1 | PID-1 PV | Frame-2 | Input-1 | — |
| T6 | PID-2 | PID-2 PV | Frame-2 | Input-1 | Input-2 |
| T7 | PID-3 | PID-3 PV | Frame-2 | Input-1 | — |
| T8 | PID-N | PID-N PV | Frame-2 | Input-1 | — |
| T9 | PID-1 | PID-1 PV | Frame-3 | Input-1 | — |
| T10 | PID-2 | PID-2 PV | Frame-3 | Input-1 | Input-2 |
| T11 | PID-3 | PID-3 PV | Frame-3 | Input-1 | — |
| T12 | PID-N | PID-N PV | Frame-3 | Input-1 | — |
| T13 | PID-1 | PID-1 PV | Frame-N | Input-1 | — |
| T14 | PID-2 | PID-2 PV | Frame-N | Input-1 | Input-2 |
| T15 | PID-3 | PID-3 PV | Frame-N | Input-1 | — |
| T16 | PID-N | PID-N PV | Frame-N | Input-1 | — |

Next, TABLE I shows data that can be written into a memory in accordance with the example implementations. This data is identical to the data in TABLE G except TABLE I includes rows including the time stamps T2.1, T6.1, and T9.0 and the rows including the time stamps T2, T6, and T10 show "---" in Column-6 instead of Input-2. TABLE I is included to show that non-PID data corresponding to PID parameter value may not be received and/or stored at the same time as the PID parameter value. For example, the non-PID data Input-2 received and/or stored at T2.1 and T6.1 represents the non-PID data Input-2 received and/or stored closest in time to the PID parameter values received and/or stored at the time stamps T2 and T6, respectively. The "1" in a time stamp is used to represent a time stamp is closer in time to the previous, lower numbered time stamp than to the next higher numbered time stamp. On the other hand, the "9" in a time stamp is used to represent a time stamp is closer in time to the next higher numbered time stamp than to the previous, lower numbered time stamp.

TABLE I

| Column-1 Time Stamp | Column-2 PID | Column-3 PID PV | Column-4 Frame | Column-5 Non-PID | Column-6 Non-PID |
|---|---|---|---|---|---|
| T1 | PID-1 | PID-1 PV | Frame-1 | Input-1 | — |
| T2 | PID-2 | PID-2 PV | Frame-1 | — | — |
| T2.1 | — | — | — | — | Input-2 |
| T3 | PID-3 | PID-3 PV | Frame-1 | — | — |
| T4 | PID-N | PID-N PV | Frame-1 | — | — |
| T5 | PID-1 | PID-1 PV | Frame-2 | Input-1 | — |
| T6 | PID-2 | PID-2 PV | Frame-2 | — | — |
| T6.1 | — | — | — | — | Input-2 |
| T7 | PID-3 | PID-3 PV | Frame-2 | — | — |
| T8 | PID-N | PID-N PV | Frame-2 | — | — |
| T9 | PID-1 | PID-1 PV | Frame-3 | Input-1 | — |
| T9.9 | — | — | — | — | Input-2 |
| T10 | PID-2 | PID-2 PV | Frame-3 | — | — |
| T11 | PID-3 | PID-3 PV | Frame-3 | — | — |
| T12 | PID-N | PID-N PV | Frame-3 | — | — |
| T13 | PID-1 | PID-1 PV | Frame-N | Input-1 | — |
| T14 | PID-2 | PID-2 PV | Frame-N | — | Input-2 |
| T15 | PID-3 | PID-3 PV | Frame-N | — | — |
| T16 | PID-N | PID-N PV | Frame-N | — | — |

The PIDs and non-PID data in Table G, Table H, and Table I can be any of a variety of PIDs and non-PID data. As an example, each PID in Table G can include a PID listed in Table A or some other PID. As another example, the non-PID data Input-1 can include one from among: location data, crankshaft position data, camshaft position data, or a temperature, and the non-PID data Input-2 can include a different one from among: location data, crankshaft position data, camshaft position data, or a temperature.

C. Computing System and Computer Program Product

Next, FIG. 5 is a block diagram illustrating a computing system 100. The server 11 comprises a computing system. The server 11 and/or the computing system 5 can comprise any or all of the components of the computing system 100.

In a basic configuration 101, the computing system 100 can include a processor 102 and a system memory 104. A memory bus 109 can be used for communicating between the processor 102 and the system memory 104. Depending on the desired configuration, the processor 102 can be of any type including but not limited to a microprocessor (μP), a microcontroller (μC), a digital signal processor (DSP), or any combination thereof. A memory controller 103 can also be used with the processor 102, or in some implementations, the memory controller 103 can be an internal part of the processor 102.

Depending on the desired configuration, the system memory 104 can be of any type including but not limited to volatile memory (such as RAM), non-volatile memory (such as ROM, flash memory, etc.) or any combination thereof. The system memory 104 can include one or more applications 105, and program data 107. The program data 107 can include system data 108 that can be directed to any number of types of data. In at least some example implementations, the applications 105 can be arranged to operate with the program data 107 on an operating system executable by the processor 102.

For a computing system configured as the computing system 5, the application 105 can include an algorithm 106 that is arranged to perform one or more or all of the functions described as being performed by the computing system 5. Moreover, the system data 108 for the computing system 5 can include one or more of the following types of data: the navigable menu 26, the vehicle selection data 27, the vehicle data message 28, the remote device input 29, the PID commands 30, the GUI 31, the GUI template 32, the buffer 33, the component test 34, or the baseline data 35. The processor 15 can be configured like the processor 102. The memory 17 can be configured as part of or all of the system memory 104 and/or the data storage devices 110. The transceiver 16 can be configured as part of or all of the communication interface 117.

The computing system 100 can have additional-features or functionality, and additional interfaces to facilitate communications between the basic configuration 101 and any devices and interfaces. For example, data storage devices 110 can be provided including removable storage devices 111, non-removable storage devices 112, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, or other data such as the data stored in a computer-readable memory, such as the memory 17.

The system memory 104 and the data storage devices 110 are examples of computer-readable memory, such as the memory 17. The system memory 104 and the data storage devices 110 can include, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by the computing system 100.

For the computing system 5, the computing system 100 can include or be implemented as a portion of a small-form factor portable (e.g., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeo-ngtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 105, or the program data 107 can include an application downloaded to the communication interface 117 from the APP STORE® online retail store, from the GOOGLE PLAY® online retail store, or another source of the applications or the CRPI described herein for use on the computing system.

Additionally or alternatively, the computing system 100 can include or be implemented as part of a personal computing system (including both laptop computer and non-laptop computer configurations), or a server. In some implementations, the disclosed methods can be implemented as CRPI encoded on a non-transitory computer-readable storage media in a machine-readable format, or on other non-transitory media or articles of manufacture.

The computing system 100 can also include output interfaces 113 that can include a graphics processing unit 114, which can be configured to communicate to various external devices such as display devices 116 or speakers via one or more audio-visual (A/V) ports 115 or a communication interface 117. The communication interface 117 can include a network controller 118, which can be arranged to facilitate communications with one or more other computing systems 120 over a network communication via one or more communication ports 119. The computing system 100 can include an input interface 121 that includes one or more input ports 122. The input ports 122 can be configured to communicate to various input devices 123 such as a keyboard, a computer mouse, a microphone, or a display device, such as the display devices 116. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, communication media can include wired media such as a wired network or direct-wired connection, and wireless media such as acoustic, radio frequency (RF), infrared (IR) and other wireless media.

Figure 6:
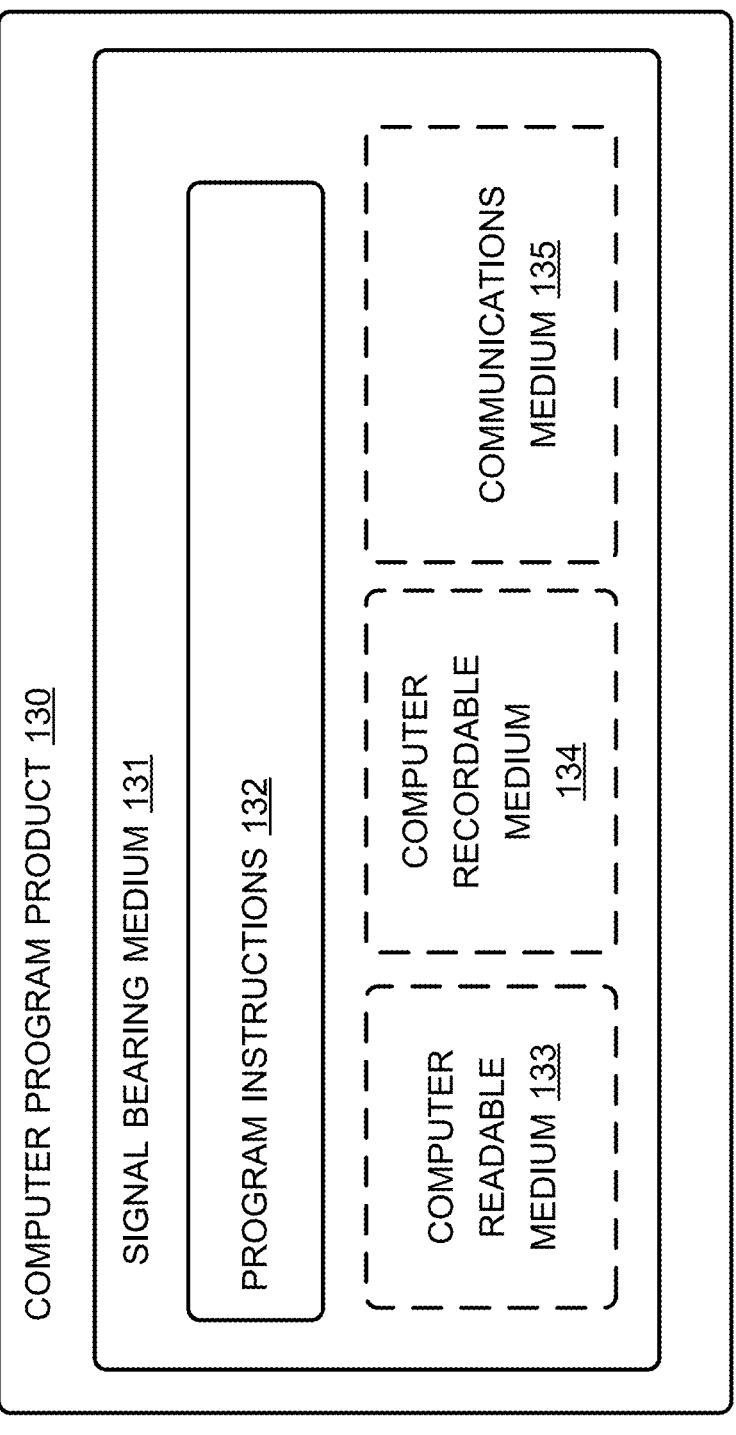
FIG. 6 is a schematic illustrating a conceptual partial view of a computer program product for executing a computer process on a computing system in accordance with the example implementations.

Next, FIG. 6 is a schematic illustrating a conceptual partial view of an example computer program product 130 that includes a computer program for executing a computer process on a computing system, arranged according to at least some implementations presented herein. In at least some implementations, the example computer program product 130 is provided using a signal bearing medium 131. The signal bearing medium 131 can include one or more programming instructions 132 that, when executed by one or more processors can provide functionality or portions of the functionality described in this description with respect to any other figure. In some implementations, the signal bearing medium 131 encompasses a computer-readable memory 133, such as, but not limited to, a hard disk drive, a Compact Disc (CD), a Digital Video Disk (DVD), a digital tape, or any other memory described herein. In those or in other implementations, the signal bearing medium 131 encompasses a computer recordable medium 134, such as, but not limited to, memory, read/write (R/W) CDs, R/W DVDs, etc. In those or in still other implementations, the signal bearing medium 131 encompasses a communications medium 135, such as, but not limited to, a digital and/or an analog communication medium (e.g., a fiber optic cable, a waveguide, a wired communications link, a wireless communication link, etc.). Thus, for at least some implementations, the signal bearing medium 131 can be conveyed by a wireless form of the communications medium 135 (e.g., a wireless communications medium conforming to the IEEE 802.11 standard or another transmission protocol).

The one or more programming instructions 132 can be, for example, computer executable and/or logic implemented instructions. In some examples, a computing system such as the computing system 100 of FIG. 4 can be configured to provide various operations, functions, or actions in response to the programming instructions 132 conveyed to the computing system 100 by one or more of the computer-readable memory 133, the computer recordable medium 134, and/or the communications medium 135.

The computing system 5, the server 11, and the computing system 100 can comprise a power source. In accordance with the example implementations, a power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source described herein can include various circuit protectors and signal conditioners. The power sources described herein can provide a way to transfer electrical currents to other elements that operate electrically.

III. Example Operation

Next, FIG. 7A and FIG. 7B show a flowchart 140 depicting a set of functions that can be carried out in accordance with the example implementations. The flowchart 140 includes the functions shown in block 141 through block 143. A variety of methods can be performed using all of the functions shown in the flowchart 140 or any proper subset of the functions shown in the flowchart 140. Any of those methods can be performed with other functions such as one or more of the other functions described in this description. For example, the methods can include one or more functions contained in an enumerated example embodiment (EEE) shown below, such as EEE 1 or any EEE dependent directly or indirectly upon EEE 1.

One or more or all of the functions shown in the flowchart 140 and/or one or more of the other functions described in this description can be performed by one or more processors of a computing system. In at least some implementations, a computing system that performs at least one of the functions includes one or more from among: the computing system 5, the server 11, or the computing system 100.

Block 141 includes writing, into a memory, vehicle data parameters (VDPs) output by a particular vehicle. Each VDP corresponds to a PID from among a set of multiple different PIDs. The memory includes a non-transitory computer-readable memory, such as the memory 17 or the system memory 104.

Next, block 142 includes displaying a first view of a GUI on a display. The GUI includes one or more VDP graphs, a graph-axis control, and a first vehicle operating condition (VOC) indicator at the graph-axis control. The first view of GUI includes a first set of VDP graphs from among the one or more VDP graphs. Each VDP graph of the one or more VDP graphs corresponds to at least a partial amount of the VDPs. Each partial amount of the VDPs corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the VDPs. At least some of the first portion of the VDPs are represented within the first set of VDP graphs. The second graph-axis control segment in the first view of the GUI corresponds to a second portion of the VDPs. The second portion of the VDPs is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI.

Figure 10:
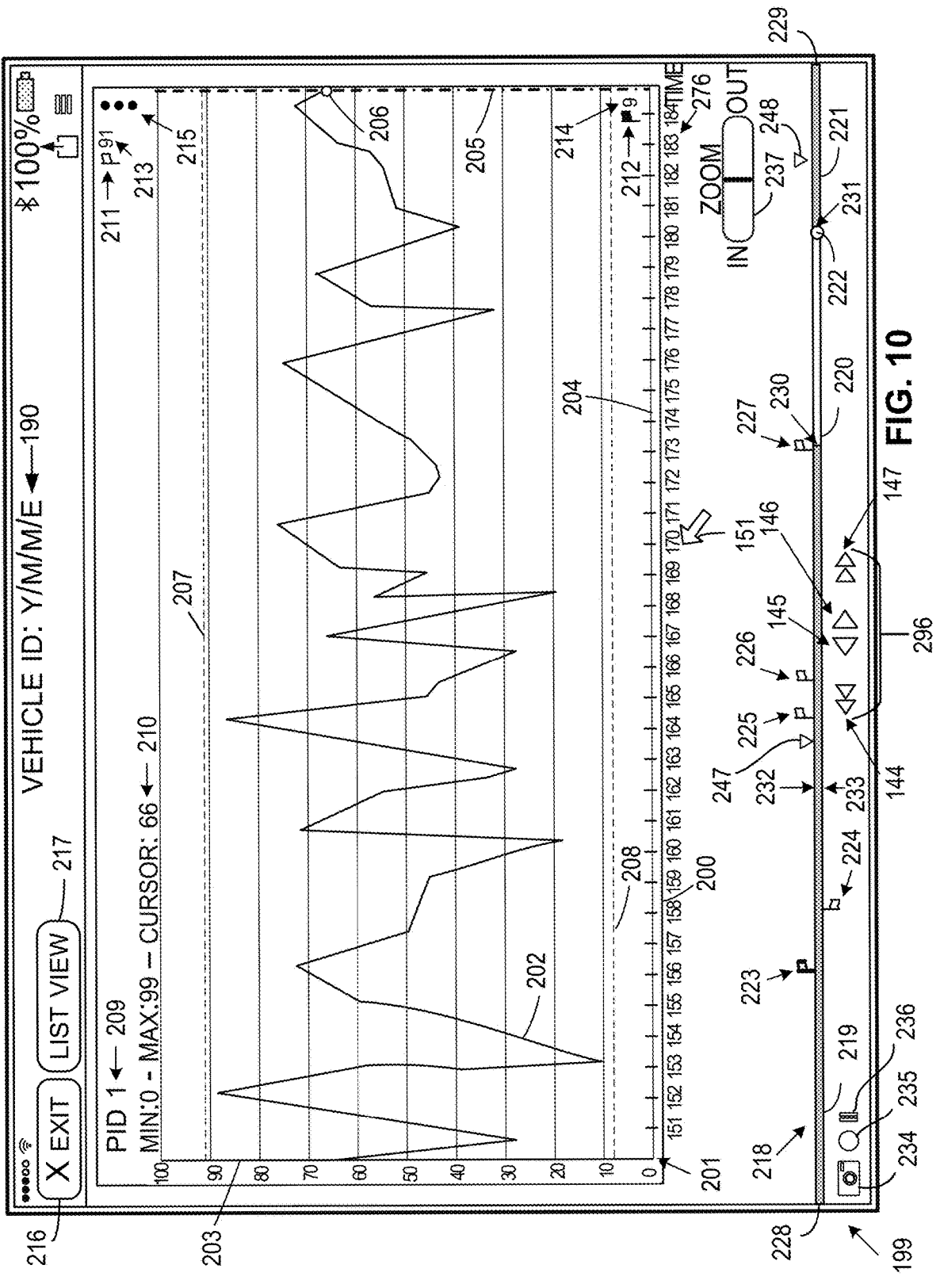
Figure 23:
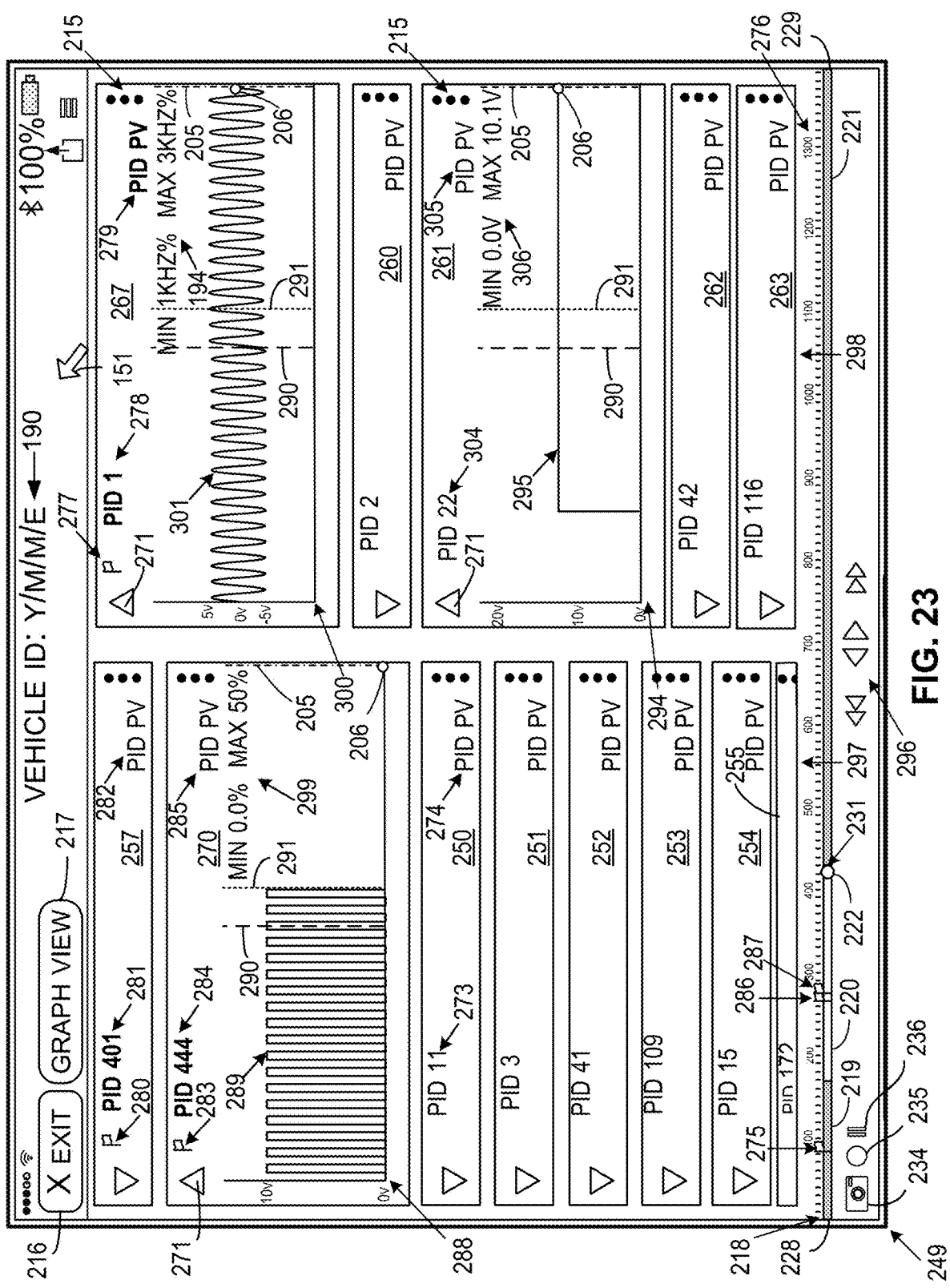

Table J shows examples of aspects discussed with respect to block 142 and shown in FIG. 10 and FIG. 23. Those aspects are not limited to the examples listed in Table J.

TABLE J

| Block 142 Aspect | FIG. 10 Reference | FIG. 23 Reference |
|---|---|---|
| First view of GUI | 199 | 249 |
| One or more VDP graphs | 201 | 288, 294, 300 |
| Graph-axis control | 218 | 218 |
| First VOC | 223 | 275 |
| Respective PID | 209 | 284, 304, 278 |
| First graph-axis control segment | 220 | 220 |
| Second graph-axis control segment | 219 | 219 |
| Cursor position indicator | 222 | 222 |

Block 142 recites that each VDP graph of the one or more VDP graphs corresponds to at least a partial amount of the VDPs. For at least some implementations, the one or more VDP graphs include two or more VDP graphs corresponding to different PIDs. In that way, the VDPs can include a respective partial amount of the VDPs for each of the different PIDs. For at least some other implementations, the one or more VDP graphs include a single VDP graph corresponding to a particular PID. After a given number of VDPs for the particular PID are received, some of the given number of VDPs are no longer displayed for a particular view of a GUI including the single VDP graph. In that case, the partial amount of VDPs include the VPS represented within the VDP graph. Prior to given number of VDPs for the particular PID being received, the VDP graph may represent all of the received VDPs for the particular PID within the VDP graph.

Next, block 143 includes displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

Figure 24:
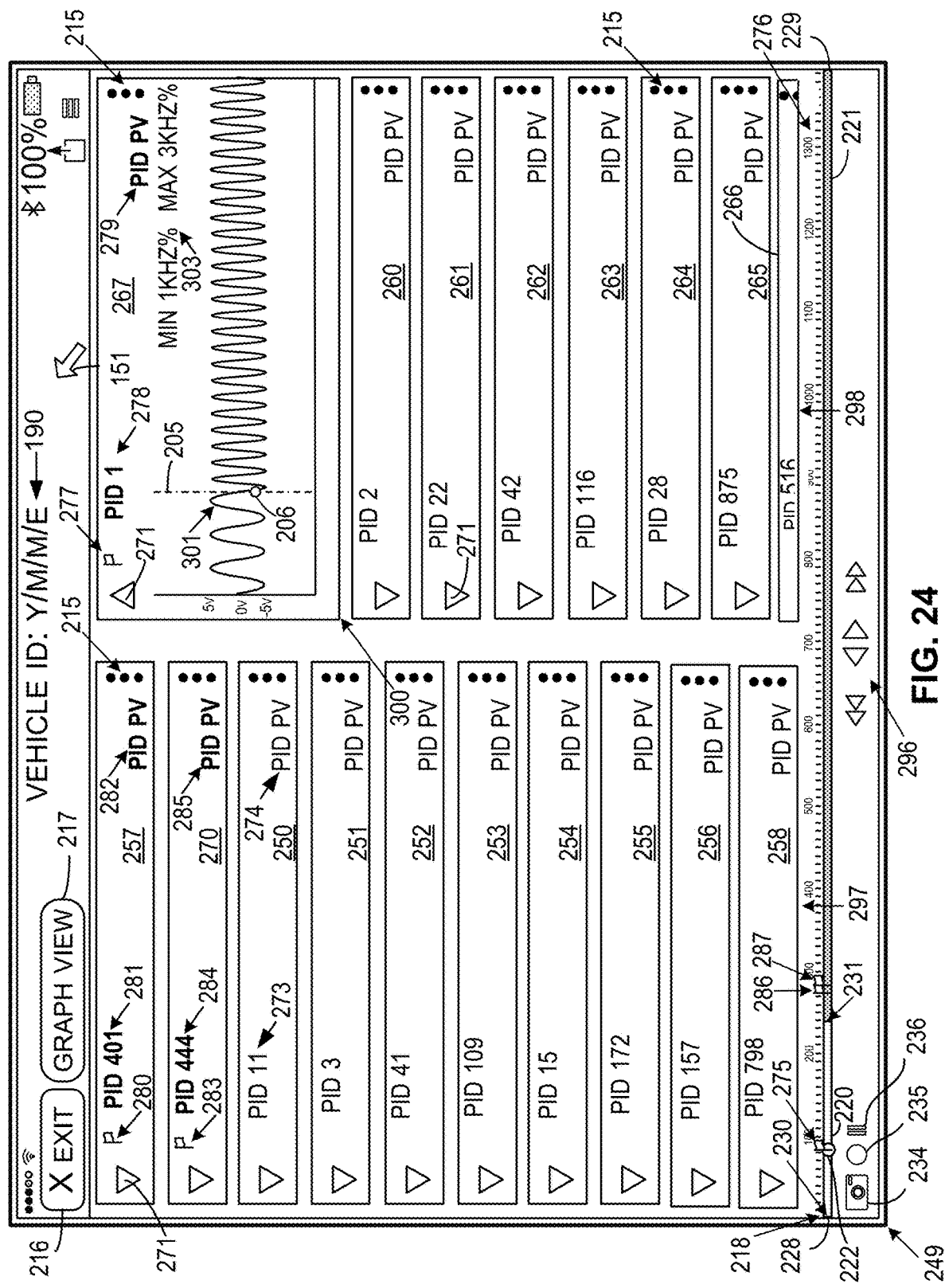

Table K shows examples of aspects discussed with respect to block 142 and shown in FIG. 11 and FIG. 24. Those aspects are not limited to the examples listed in Table K.

TABLE K

| Block 142 Aspect | FIG. 11 Reference | FIG. 24 Reference |
|---|---|---|
| Second view of GUI | 199 | 249 |
| One or more VDP graphs | 201 | 300 |
| Graph-axis control | 218 | 218 |
| First VOC | 223 | 275 |
| Respective PID | 209 | 278 |
| First graph-axis control segment | 220 | 220 |
| Second graph-axis control segment | 219 | 221 |
| Cursor position indicator | 222 | 222 |

In at least some of the implementations of a method including one or more or all of the functions shown in the flowchart 140, a first PID of the multiple different PIDs is associated with a first threshold. The one or more VDP graphs include a particular VDP graph. The particular VDP graph is a graph of vehicle data parameters written into the memory for the first PID. The first vehicle operating condition indicator is added onto the graphical user interface in response to a VDP corresponding to the first PID breaching the first threshold. In at least some of these implementations, the second set of VDP graphs includes the particular VDP graph. In at least some of these implementations, the first set of VDP graphs does not include the particular VDP graph.

Figure 27:
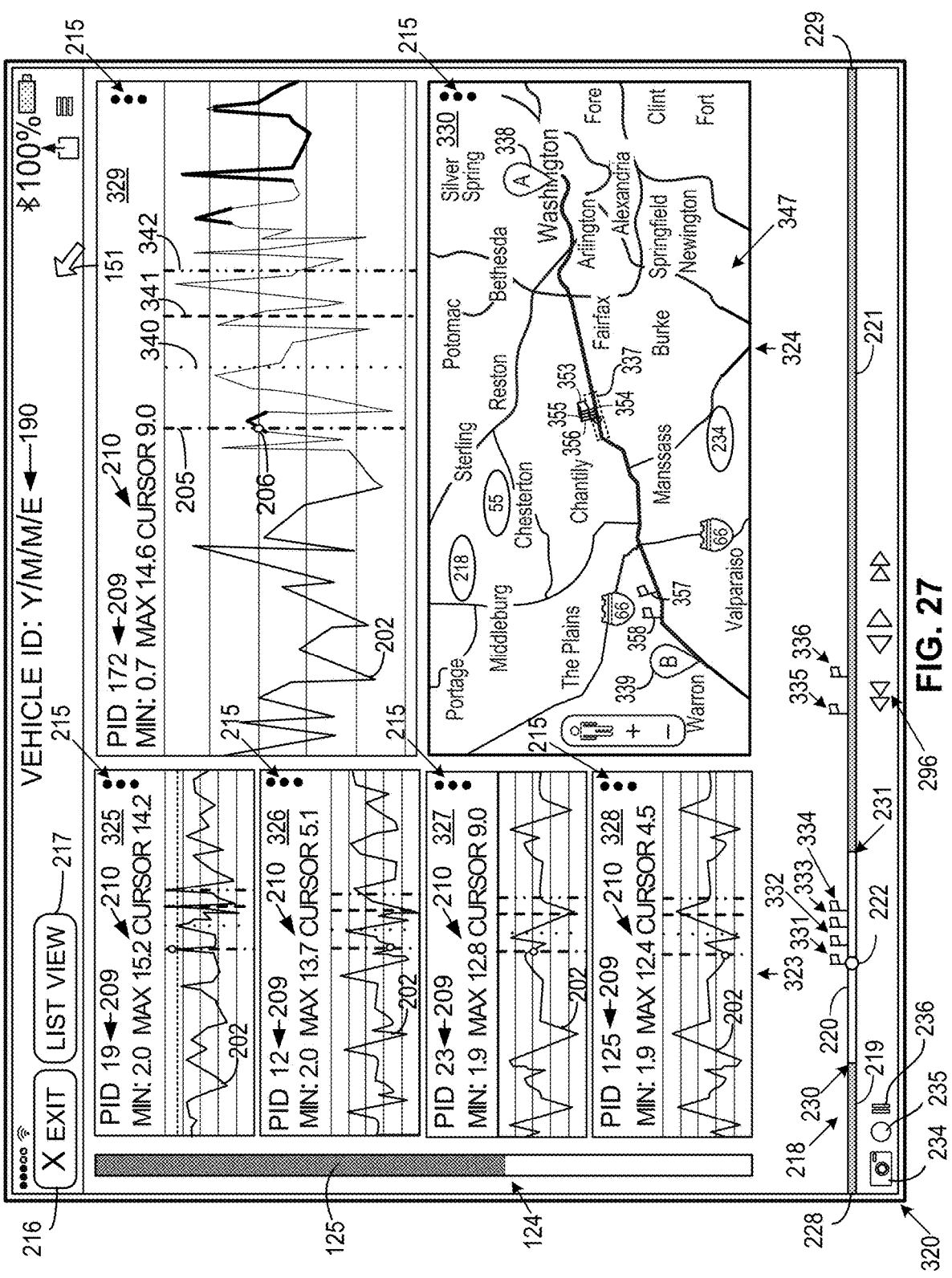

In at least some of the implementations of a method including one or more or all of the functions shown in the flowchart 140, a GUI that includes the one or more VDP graphs also includes a scroll bar and slider (e.g., a scroll bar 124 and slider 125 shown in FIG. 27). The slider can be moved within the scroll bar. In response to determining the slider is moved within the scroll bar, the processor 15 can change a view of the GUI output on the display 40 from a first view of the GUI to a second view of the GUI. The second view of the GUI shown on the display 40 can include a VDP graph that is not shown on while the first view of the GUI is shown on the display 40.

In at least some of the implementations of a method including one or more or all of the functions shown in the flowchart 140, a first PID of the multiple different PIDs is associated with a first threshold. The one or more VDP graphs include a particular VDP graph. The particular VDP graph is a graph of vehicle data parameters written into the memory for the first PID. The first vehicle operating condition indicator is added onto the graphical user interface in response to a VDP corresponding to the first PID breaching the first threshold. The particular VDP graph is positioned at a first area of the display when displaying the first view of the GUI and is positioned at a second area of the display when displaying the second view of the GUI. The first area is different than the second area. As an example, the second area of the display is closer to a top of the display 40 as compared to the first area of the display 40.

In at least some of the implementations of a method including one or more or all of the functions shown in the flowchart 140, the method further includes pausing, in response to a selection of the first vehicle operating condition indicator, the writing of vehicle data parameters into the memory. The method also includes adding onto each VDP graph of the second set of VDP graphs a cursor to indicate when pausing the writing of vehicle data parameters into the memory occurred with respect to the particular vehicle outputting vehicle data parameters represented on each VDP graph of the second set of VDP graphs. The pausing of writing vehicle data parameters and the adding of cursor(s) to indicate the pausing can also occur while the first of the GUI is shown on the display.

In at least some of the implementations of a method including one or more or all of the functions shown in the flowchart 140, the method further includes writing, into the memory, non-PID data based on an order in which the non-PID data are received. Each VDP corresponds to a non-PID datum of the non-PID data. The graphical user interface includes a user-selectable control to select which of the vehicle data parameters are shown in the first set of VDP graphs or the second set of VDP graphs based on a particular non-PID datum from among the non-PID data. In at least some of these implementations, each VDP corresponds to a respective non-PID datum of the non-PID data. In at least some other implementations, two or more of the VDPs, but not all of the VDPs correspond to a common non-PID datum of the non-PID data. TABLE G, TABLE H, and TABLE I and the corresponding description show and describe examples of the non-PID data.

In at least some of the implementations described in the preceding paragraph, the non-PID data include location data corresponding to a location of a vehicle that output the vehicle data parameters. As an example, the location data are based on signals received from a global navigation satellite system. As another example, the location data are based on signals received from a terrestrial system, such as a cell phone tower.

In at least some of the implementations described in any one of the two preceding paragraphs, each VDP corresponds to a single, respective non-PID datum. Alternatively, two or more of the VDPs written into the memory correspond to a common non-PID datum.

In at least some of the implementations described in any one of the three preceding paragraphs, each VDP and each non-PID datum corresponds to a respective time stamp indicative of when each VDP and each non-PID datum is received. As an example, each VDP corresponds to a non-PID datum whose time stamp is closest in time to the time stamp corresponding to the VDP. As another example, each VDP corresponds to a non-PID datum whose time stamp is closest in time before the time stamp corresponding to the VDP. As yet another example, each VDP corresponds to a non-PID datum whose time stamp is closest in time after the time stamp corresponding to the VDP.

In at least some of the implementations described in any one of the four preceding paragraphs, the method further includes determining a voltage measurement by measuring, using an oscilloscope or voltmeter, a voltage on an electrical circuit connected to a crankshaft or camshaft position sensor within an internal combustion engine in the particular vehicle. The method further includes determining the non-PID data based on the voltage measurement. The non-PID data include position data corresponding to a particular position of the crankshaft or camshaft within the internal combustion engine.

In at least some of the implementations described in the preceding paragraph, determining the non-PID data based on the voltage measurement includes determining a first particular position of the crankshaft or camshaft based on the voltage measurement indicating a particular portion of a timing rotor passing a sensor for detecting the first particular position of the crankshaft or camshaft.

In at least some of the implementations described in the preceding paragraph, the method further includes determining the non-PID data based on the voltage measurement further includes determining a second particular position of the crankshaft or camshaft based on consecutive voltage measurements indicating the particular portion of the timing rotor and an amount of time occurring between the consecutive voltage measurements.

In at least some of the implementations described in any one of the two preceding paragraphs, the method further includes displaying within one or more VDP graphs in the first or second set of VDP graphs a respective indicator corresponding to the non-PID data relative to when the non-PID was determined and the vehicle data parameters shown in the one or more VDP graphs in the first or second set of VDP graphs were received.

In at least some of the implementations described in any one of the eight preceding paragraphs, the non-PID data includes first non-PID data from a first input and second non-PID data from a second input. The non-PID datum of the non-PID data is from among the first non-PID data. At least some of the vehicle data parameters correspond to non-PID data from among the first non-PID data and non-PID data from among the second non-PID data.

In at least some of the implementations described in any one of the nine preceding paragraphs, the graphical user interface includes multiple containers including a particular container. The first set of VDP graphs and the second set of VDP graphs are disposed within some of the containers. The non-PID data is displayed within the particular container. The method further includes determining, by a processor, a selection of the particular container has occurred, and displaying, on the display, a third view of the graphical user interface. The third graphical user interface shows the particular container in a full-screen mode. The third graphical user interface includes a control to change a display of the non-PID data in the particular container instead of the graph-axis control.

In at least some of the implementations of a method including one or more or all of the functions shown in the flowchart 140, the graph-axis control is based on one or more from among: a time, a location of the particular vehicle, a mileage of the particular vehicle, a crankshaft position within an engine of the particular vehicle, a camshaft position within the engine of the particular vehicle, a temperature indicated within a thermal image, or a quantity of frames that include at least one of the vehicle data parameters.

In at least some of the implementations described in the preceding paragraph, the method further includes changing units corresponding to the graph-axis control from first units to second units in response to: (1) determining a user-selectable control corresponding to the second units is selected from the display, (2) determining a first data container displaying first non-PID data is selected from the first view of the GUI or the second view of the GUI, or (3) determining a second data container displaying vehicle data parameters corresponding to second non-PID data is selected from the first view of the GUI or the second view of the GUI. As an example, the first non-PID data can include one from among: location data, crankshaft position data, camshaft position data, or a temperature, and the second non-PID data can include a different one from among: location data, crankshaft position data, camshaft position data, or a temperature.

In at least some of the implementations of a method including one or more or all of the functions shown in the flowchart 140, the method further includes determining, by a processor while displaying the first view of the GUI, a change to a zoom setting for the graphical user interface. The method also includes changing, on the display based on the change to the zoom setting, a size of the first graph-axis control segment, a size of the second graph-axis control segment, and a quantity of vehicle data parameters within the first portion of the vehicle data parameters. The change to the zoom setting includes zooming in or zooming out. In response to zooming in: (1) changing the size of the first graph-axis control segment and the size of the second graph-axis control segment includes decreasing the size of the first graph-axis control segment and increasing the size of the second graph-axis control segment, and (2) changing the quantity of vehicle data parameters within the first portion of the vehicle data parameters includes decreasing the quantity of vehicle data parameters within the first portion of the vehicle data parameters. In response to zooming out: (1) changing the size of the first graph-axis control segment and the size of the second graph-axis control segment includes increasing the size of the first graph-axis control segment and decreasing the size of the second graph-axis control segment, and (2) changing the quantity of vehicle data parameters within the first portion of the vehicle data parameters includes increasing the quantity of vehicle data parameters within the first portion of the vehicle data parameters.

In at least some of the implementations of a method including one or more or all of the functions shown in the flowchart 140, the graphical user interface further includes a first control and a second control. Additionally, the method includes determining, by a processor, a selection of the first control has occurred. The method also includes stopping, by the processor in response to determining the selection of the first control has occurred, the writing of vehicle data parameters into the memory. The method further includes determining, by the processor, a selection of the second control has occurred after stopping the writing of vehicle data parameters into the memory. The method also includes re-starting, by the processor in response to determining the selection of the second control has occurred, the writing of vehicle data parameters into the memory. Still further, the method includes displaying within each VDP graph of the first set of VDP graphs, a respective first cursor. Each respective first cursor represents a position within each VDP graph of the first set of VDP graphs where writing of vehicle data parameters stopped.

In at least some of the implementations described in the preceding paragraph, the first control and the second control are part of a single control. The first control toggles to the second control in response to a selection of the first control. The second control toggles to the first control in response to a selection of the second control.

In at least some of the implementations described in the preceding paragraph, determining the selection of the first control has occurred includes determining that the first vehicle operating condition indicator displayed within the graphical user interface has been selected.

In at least some of the implementations described in any one of the two preceding paragraphs, each VDP graph of the first set of VDP graphs includes a second cursor that corresponds to an axis-position selector on GUI.

In at least some of the implementations of a method including one or more or all of the functions shown in the flowchart 140, the memory includes a buffer comprising a first buffer segment and a second buffer segment. The first buffer segment is configured to store a first quantity of frames. The second buffer segment is configured to store a second quantity of frames. Writing the vehicle data parameters into the memory includes writing at least a first portion of the first quantity of frames into the first buffer segment. The graph-axis control includes a first end, a second end opposite the first end, and a first point between the first end and the second end. The cursor position indicator moves within the graph-axis control from the first end towards the first point as a first portion of the first quantity of frames are written into the first buffer segment. The cursor position indicator moves within the graph-axis control from the first point towards the second end as a second portion of the first quantity of frames are written into the first buffer segment. The cursor position indicator moves within the graph-axis control back to the first-point after the second portion of the first quantity of frames are written into the first buffer segment and then moves from the first point towards the second end as additional frames are written into the first buffer segment or as a first portion of the second quantity of frames are written into the second buffer segment. Prior to any of the second portion of the first quantity of frames being written into the first buffer segment, the graph-axis control represents the first quantity of frames, and after the second portion of the first quantity of frames are written into the first buffer segment and while a first portion of the second quantity of frames are written into the second buffer segment, the graph-axis control represents a sum of the first quantity of frames and the second quantity of frames.

In at least some of the implementations described in the preceding paragraph, the buffer further comprises a third buffer segment. The third buffer segment is configured to store a third quantity of frames. Writing the vehicle data parameters into the memory includes writing at least a first portion of the second quantity of frames into the second buffer segment. The graph-axis control includes a second point between the first end and the second end. The cursor position indicator moves within the graph-axis control back to the second point after the first portion of the second quantity of frames are written into the second buffer segment and then moves from the second point towards the second end as additional frames are written into the second buffer segment or as at least a first portion of the third quantity of frames are written into the third buffer segment. After the first portion of the first quantity of frames are written into the first buffer segment and prior to the first portion of the second quantity of frames being written into the second buffer segment, the graph-axis control represents the sum of the first quantity of frames and the second quantity of frames, and after the first portion of the second quantity of frames have been written into the second buffer segment and while a first portion of the third quantity of frames are written into the third buffer segment, the graph-axis control represents a sum of the first quantity of frames, the second quantity of frames and the third quantity of frames.

In at least some of the implementations described in any one of the two preceding paragraphs, the first point is a point between the first end and a mid-point between the first end and the second end, or a point between the mid-point and the second end.

In at least some of the implementations described in the preceding paragraph, the mid-point is a horizontal mid-point.

In at least some of the implementations described in two paragraphs above, the mid-point is a vertical mid-point.

In at least some of the implementations described in any one of the five preceding paragraphs, the first portion of the first quantity of frames is fifty percent of the first quantity of frames.

In at least some of the implementations described in any one of the five preceding paragraphs, the first portion of the first quantity of frames includes an entirety of the first quantity of frames.

In at least some of the implementations described in any one of the six preceding paragraphs, the first point is identical to the second point.

In at least some of the implementations described in any one of the seven preceding paragraphs, the first buffer segment and the second buffer segment are different buffers.

In at least some of the implementations described in any one of the eight preceding paragraphs, the first quantity of frames equals the second quantity of frames. In at least some of those implementations, a size of the first buffer segment is equal to a size of the second buffer segment.

In at least some of the implementations described in any one of the nine preceding paragraphs, the first portion of the first quantity of frames includes an entire portion of the first quantity of frames.

In at least some of the implementations of a method including one or more or all of the functions shown in the flowchart 140, the cursor position indicator is movable in response to a user input, and the cursor in each vehicle data parameter graph is re-positioned in response to the user input.

In at least some of the implementations of a method including one or more or all of the functions shown in the flowchart 140, a first PID of the multiple different PIDs is associated with a first threshold. The first threshold includes a minimum threshold and displaying the first VOC indicator includes displaying the first VOC indicator below the graph-axis control, or the first threshold includes a maximum threshold and displaying the first VOC indicator includes displaying the first VOC indicator above the graph-axis control.

In at least some of the implementations of a method including one or more or all of the functions shown in the flowchart 140, the method further includes: (1) determining, by a processor, discontinuance of receiving vehicle data parameters for a particular PID or particular non-PID data, and (2) displaying, on the display, an indicator of the determined discontinuance. The indicator of the determined discontinuance is displayed on the graph-axis control, adjacent the graph-axis control, within a container including a VDP graph corresponding to the particular PID, adjacent the container including the VDP graph corresponding to the particular PID, within a container including the particular non-PID data received prior to the discontinuance, or adjacent the container including the particular non-PID data received prior to the discontinuance.

In at least some of the implementations described in the preceding paragraph, the GUI includes a user-selectable control selectable to pause or stop the writing of vehicle data parameters into the memory. Examples of that user-selectable control include the USC 235, 236 shown in FIG. 10. In response to selecting the USC 235, 236, the processor 15 can: (1) transmit a VDM to request an ECU to stop transmitting the vehicle data parameters, (2) stop transmitting requests for the vehicle data parameters, (3) stop reading vehicle data parameters received by the VCT 50, and/or (4) stop writing vehicle data parameters into the memory 17. In response to selecting the USC 235, 236, the processor 15 can: (1) stop reading data the processor 15 receives from the signal detector 43 or from a companion device, such as a smart phone providing GPS data via the network transceiver 49 and/or to the signal detector 43 or the companion device, (2) transmit a signal to request the signal detector 43 or the companion device to stop providing non-PID data to the processor 15 or the network transceiver 49, (3) stop reading non-PID data received from the signal detector 43 or from a companion device, and/or (4) stop writing non-PID data into the memory 17.

In at least some of the implementations of a method including one or more or all of the functions shown in the flowchart 140, the cursor position indicator includes and/or is arranged as a cursor positioner. The cursor positioner is movable within the graph-axis control. In at least some implementations, the graph-axis control includes a first end and a second end. In at least some of those implementations, the cursor positioner is: (1) movable towards the first end if not currently positioned at the first end, (2) movable towards the second end if not currently positioned at the second end, and/or (3) movable towards an end of the second graph-axis control segment if not currently positioned at the end of the second graph-axis control segment.

In at least some implementations, the cursor position indicator moves within a graph-axis control as each frame of data is received and/or written into the memory 17 (e.g., the buffer). That movement of the cursor position indicator can occur in a direction towards a second end of the graph-axis controls (as described below). Movement of the cursor position indicator can stop in response to pausing or stopping of receiving and/or writing frames of data into the memory.

In at least some of the implementations described in the preceding paragraph, PID data received and/or written into the memory 17 can be graphed within a VDP graph. Graphing the PID data within the VDP graph can include extending a waveform within the VDP graph by extending the waveform from a position corresponding to a most-recent prior parameter value for a PID corresponding to the VDP graph to a position corresponding to the most-recent parameter value for that same PID. In at least some of those implementations, a vertical cursor within the VDP graph moves horizontally to the position corresponding to the most-recent parameter value. In at least some of those implementations, the VDP graph is contained within a container. In at least some of those implementations, the container includes one or more of the aspects shown in any of the containers shown in the drawings.

In at least some of the implementations described in one or more of the two preceding paragraphs, non-PID data received and/or written into the memory 17 can be output within a GUI including a VDP graph. In at least some of those implementations, the non-PID data is displayed graphically, textually, and/or pictorially. In at least some of those implementations, the non-PID data is displayed within a container. In at least some of those implementations, the container includes one or more of the aspects shown in any of the containers shown in the drawings.

IV. Example Graphical User Interfaces

Next, each of FIG. 8 to FIG. 35 shows an example GUI. The processor 15 is configured to output a GUI, such as any GUI shown in FIG. 8 to FIG. 35 on a display, such as the display 40. In at least some implementations, one or more of the GUI shown in FIG. 8 to FIG. 35 and/or any content contained within one or more of those GUIs can be stored in the GUI 31. In those or in other implementations, one or more of the GUIs shown and/or any content contained within one or more of those GUIs in FIG. 8 to FIG. 35 can be stored in the GUI 31 and provided to the computing system 5 from the server 11 via the communication link 12. At least some of the example GUIs are described as including one or more containers. Moreover, at least some of the example GUI are described as including one or more user-selectable controls (USCs).

In at least some implementations described herein or shown in the drawings, a GUI is described as having a USC. In accordance with those implementations, the processor 15 is configured to determine a selection of the USC and to execute program instructions and/or perform a data entry in response to determining the USC has been selected. Additionally, in at least some of the implementations including a GUI with a USC, the USC is configured to expand to show alternative aspects pertaining to the USC. For example, the USC expands in one or more directions (e.g., downward, or downward and rightward) to show the alternative aspect(s) that are selectable while the USC is displayed in its expanded state. Each alternative aspect can correspond to a separate USC that is selectable to select the corresponding alternative aspect. Selection of a USC corresponding to an alternative aspect can cause the processor 15 to execute program instructions and/or perform a data entry in response to determining the USC corresponding to an alternative aspect has been selected. The processor 15 can make a determination base on the data entry and/or in response to executing the program instructions. As noted, selection of a USC can occur via contact with a touch panel display and/or via the input device 41.

At least some of the GUIs shown in the drawings, include a vehicle identifier 190. In at least some implementations, the vehicle identifier 190 represents a selected vehicle using a Y/M/M/E. In other implementations, the vehicle identifier 190 represents a selected vehicle using different vehicle identifier format, such as one of the other vehicle identifier formats described in this description.

Figure 8:
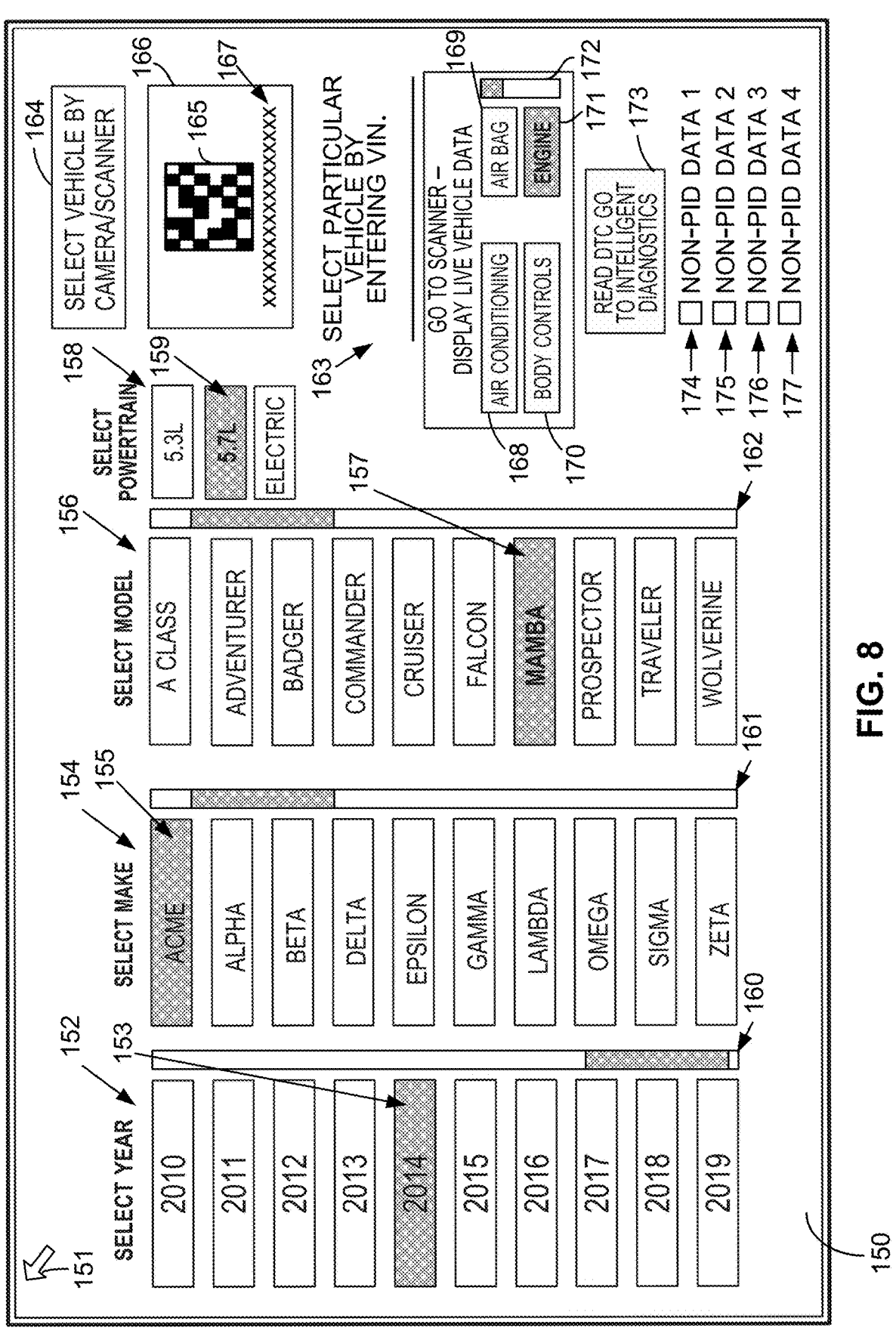
FIG. 8, FIG. 9, FIG. 10, FIG. 11, FIG. 12, FIG. 13, FIG. 14, FIG. 15, FIG. 16A, FIG. 16B, FIG. 16C, FIG. 17A, FIG. 17B, FIG. 17C, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, and FIG. 35 show an example GUI in accordance with the example implementations.

In particular, FIG. 8 shows a GUI 150 that includes a vehicle selection menu. The vehicle selection data 27 can also include data that represents relationships between vehicle model years and the types of vehicles that were built for and/or during each model year. For instance, for a given model year, the vehicle selection data 27 can include data that indicates all vehicle makes that include at least one type of vehicle for the given model year, and for each of those vehicle makes, the vehicle selection data 27 can include data that indicates all vehicle models that correspond to one of the vehicle makes that built at least one type of vehicle for the given model year. In at least some implementations, the vehicle selection data 27 can include data that indicates all engines that are used in each vehicle model. The vehicle selection data 27 can include data that indicates other criteria that can be used to distinguish different groups of common (i.e., like) vehicles. The other criteria can, for example, include a fuel system on the vehicle and/or an indicator of whether the vehicle is 2-wheel or 4-wheel drive. The processor 15 can generate a vehicle selection menu based on the other data within the vehicle selection data 27.

The GUI 150 can include a display pointer 151 movable to point to a USC or another item of the GUI 150. The processor 15 can detect the USC or the other item of the GUI 150 is selected when the display pointer 151 is disposed on the USC or the other item of the GUI 150. The other GUIs shown in the figures can also include a cursor, similar to the display pointer 151 shown in FIG. 8, for use in selecting an item within the GUI including the display pointer 151. For implementations in which the display 40 includes a touch screen display, the GUIs shown in FIG. 8 to FIG. 40 may or may not include a display pointer. The display pointer 151 can be moved using the input device 41. The input device 41 can include an input device such as a two-button mouse or a keypad for selecting an aspect in a GUI pointed at by the display pointer 151.

As shown in FIG. 8, the GUI 150 includes a year selection menu 152 in which a year selector 153 representing the year 2014 has been selected. The GUI 150 includes a make selection menu 154 in which a make selector 155 representing a make Acme has been selected. The GUI 150 includes a model selection menu 156 in which a model selector 157 representing the model Mamba has been selected. Other example year, makes and models are possible. The GUI 150 includes a powertrain selection menu 158 in which an engine selector USC 159 representing the 5.7 liter engine has been selected. The year selection menu 152 includes a scroll bar 160 to cause the year selection menu 152 to display year(s) not currently shown in the year selection menu 152. Similarly, the make selection menu 154 includes a scroll bar 161 to cause the make selection menu 154 to display make(s) not currently shown in the make selection menu 154. Likewise, the model selection menu 156 includes a scroll bar 162 to cause the model selection menu 156 to display model(s) not currently shown in the model selection menu 156. Other examples of a selected year, make, model, and engine are also possible.

In at least some implementations, the make selection menu 154 is populated with vehicle makes after a year is selected from the year selection menu 152. Similarly, in at least some implementations, the model selection menu 156 is populated with vehicle models after a year is selected from the year selection menu 152 and after a make is selected from the make selection menu 154. Similarly, in at least some implementations, the powertrain selection menu 158 is populated with powertrain identifiers after a model is selected from the model selection menu 156 is populated with vehicle models after a year is selected from the year selection menu 152 and after a make is selected from the make selection menu 154. In alternative implementations, each of the year selection menu 152, the make selection menu 154, the model selection menu 156, or the powertrain selection menu 158 is in a separate GUI without the other of the year selection menu 152, the make selection menu 154, the model selection menu 156, and the powertrain selection menu 158.

In at least some implementations, the GUI 150 also includes a VIN USC 163 for entering an identifier of a particular vehicle. As an example, the VIN USC 163 can be used to type or key-in a vehicle identification number (VIN) associated with the particular vehicle. As another example, the VIN USC 163 can be used to cause the vehicle communications transceiver 50 to request a VIN from an ECU in the vehicle 4. The processor 15 can receive the requested VIN and determine at least a year, make, model, and a serial number of the particular vehicle from the VIN.

The GUI 150 includes a vehicle selector USC 164 for capturing a visual indication of a particular vehicle. As an example, in response to selection of the vehicle selector USC 164, the processor 15 can cause a camera of the input device 41 to capture an image, such as an image of a code 165 representing a VIN, and to cause a GUI, such as the GUI 150 or a different GUI, to display a window 166 showing the image of code 165 and to display a representation of the alpha-numeric representation of the VIN 167 as determined by the processor 15 decoding the code 165. As yet another example, in response to selection of the vehicle selector USC 164, the processor 15 can cause a scanner of the input device 41 to generate an image, such as an image of the code 165, and to cause a GUI, such as the GUI 150 or a different GUI, to display the window 166 showing the image of the code 165 and to display a representation of the alpha-numeric representation of the VIN 167 as determined by the processor 15 decoding the code 165.

In at least some implementations, the GUI 150 includes user-selectable controls to select a particular system or component of interest for displaying live vehicle data. Live vehicle data is vehicle data that a computing system, such as the computing system 5, received most-recently from the vehicle. The amount of live vehicle data can vary so long as the amount of live vehicle data includes the vehicle data most-recently received, such as the most recent PID parameter value for a PID currently displayed on the display 40. As an example, the GUI 150 includes a system selector USC 168, 169, 170, 171 configured to indicate a selection of an air conditioning system, an air bag system, a body control system, or an engine system, respectively. The GUI 150 can include a scroll bar 172 to cause a different system selector USC (for selecting a different component or system) to be displayed within the GUI 150.

In at least some implementations, the GUI 150 includes an intelligent diagnostics USC 173. In response to determining the intelligent diagnostics USC 173 has been selected, the processor 15 can transmit one or more vehicle data messages to request DTC from an ECU within the vehicle 4 and to display a GUI for an intelligent diagnostics operating mode of the computing system 5.

The GUI 150 also includes a non-PID data USC 174, 175, 176, 177 selectable to by a user to select non-PID data that is to be determined, stored in frames, and displayed in a GUI. As an example, the non-PID data USC 174 can be used to select location information, the non-PID data USC 175 can be used to select crankshaft position sensor data, the non-PID data USC 176 can be used to select camshaft position sensor data, and the USC 178 can be used to select thermal imager temperature data. In at least some implementations, the non-PID data USC 174, 175, 176, 177 is arranged as a checkbox.

Figure 9:
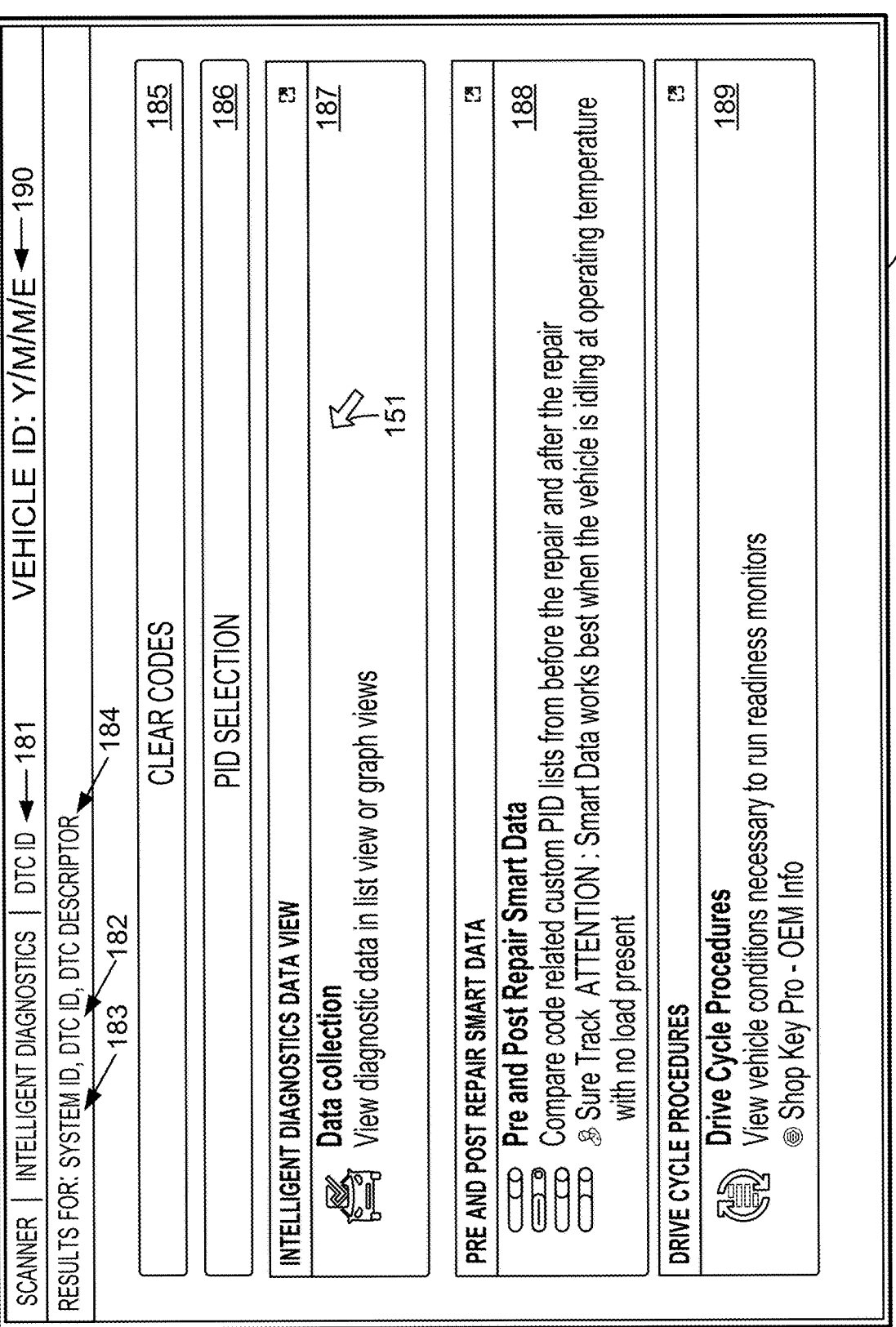

Next, FIG. 9 shows a GUI 180 having a GUI identifier 181 that indicates the GUI 180 pertains to the intelligent diagnostic operating mode with respect to a DTC corresponding to a DTC identifier 182. In at least some implementations, the DTC can be determined in response to a selection of the intelligent diagnostics USC 173 shown in FIG. 8. The GUI 180 also includes a system identifier 183, and a DTC descriptor 184 corresponding to a DTC that corresponds to the DTC identifier 182. As an example, the system identifier 183 is "Engine," the DTC identifier 182 is "P0171," and the DTC descriptor 184 is "P0171, System too lean (bank 1)." As another example, the system identifier

183 is "Body Control," the DTC identifier 182 is "B1413," and the DTC descriptor 184 is "B1413—Driver Power Window Circuit Short to Ground." Other examples of the DTC identifier 182, the DTC descriptor 184, and the system identifier 183 are also possible.

The GUI 180 includes a clear codes USC 185, a PID selection USC 186, a data collection USC 187, a pre-and-post repair smart data USC 188, and a drive cycle procedure USC 189. In response to a selection of the clear codes USC 185, the processor 15 can transmit one or more VDMs to request one or more ECU in the vehicle 4 to clear DTC set active by those ECU(s). In response to a selection of the PID selection USC 186, the processor 15 can output a GUI from which a user can select PID(s) to be viewed within a GUI, such as a GUI displayed in response to the data collection USC 187, but with a set of PIDs selected by a user.

In response to a selection of the pre-and-post repair smart data USC 188, the processor 15 can cause the display 40 to display a GUI that shows a list of PIDs and parameters that were obtained by the processor 15 prior to a repair being made to the vehicle and a list of PIDs and parameters that were obtained by the processor 15 after the vehicle was repaired. In response to a selection of the drive cycle procedure USC 189, the processor 15 can cause the display 40 to display a GUI showing drive cycle procedures and PIDs and parameter values captured during performance of a drive cycle procedure.

The GUI 180 also includes a vehicle identifier 190. The vehicle identifier 190 is shown to include a Y/M/M/E, which is described in section V below. Other forms of the vehicle identifier 190, at least some of which are described in section V below, are possible.

Next, FIG. 10 shows a GUI 199 including container 200. The container 200 includes a VDP graph 201. The VDP graph 201 includes a waveform 202, a vertical axis 203, and a horizontal axis 204. The container 200 can also include one or more from among: a cursor 205, a cursor point 206, an upper baseline threshold indicator 207, a lower baseline threshold indicator 208, a PID 209 that is represented by the waveform 202, and PID parameter values 210. The PID parameter values 210 include a minimum parameter value received for the PID 209, a maximum parameter value received for the PID 209, and a cursor parameter value for the PID 209. The cursor parameter value for the PID 209 corresponds to the cursor point 206 on the waveform 202. The cursor parameter value for the PID 209 can be the most recently received parameter value for the PID 209. In accordance with that example and FIG. 10, the cursor point 206 would be located at a right-most side of the waveform 202. As shown in FIG. 10, the PID 209 has the value "1." In other figures, the PID 209 can have the value "1" or some other value.

As PID parameter values are received and/or written into the memory 17 (e.g., as part of a frame within the buffer 33) with the cursor position indicator 222 positioned at the divider 231, the cursor position indicator 222 and the divider 231 can shift towards a second end of the graph-axis control 218 by one frame. If the waveform 202 extends across the VDP graph 201 in its entirety, the waveform 202 and one or more cursors within the VDP graph can shift towards the vertical axis 203 by one frame. This shifting can occur automatically when the writing of data into the buffer 33 is not paused or stopped due to use of the USC 236 or the USC 235, respectively.

The vertical axis 203 can include a unit value for each horizontal grid line. The horizontal axis 204 can include a time value for each division (e.g., each division represented using a vertical line segment) on the horizontal axis 204. As an example, an amount of time between each division on the horizontal axis can be a number of seconds or some portion of a second.

The container 200 includes a VOC icon 211, 212 and a PID parameter value 213, 214 corresponding to the VOC icon 211, 212, respectively. Those aspects can be contained within the VDP graph 201. In at least some implementations, the PID parameter value 213, 214 is a default parameter value. In at least some other implementations, the PID parameter value 213, 214 is a user-selected parameter value. In at least some implementations, the upper baseline threshold indicator 207 corresponds to the VOC icon 211 and the PID parameter value 213, and the lower baseline threshold indicator 208 corresponds to the VOC icon 212 and the PID parameter value 214. The container 200 also includes an additional-features USC 215 that is selectable to cause the processor 15 to present one or more other selectable functions corresponding to the VDP graph 201 or the VDP graph 201 and the GUI 199. Any aspect described as being included within the container 200 (not including the VDP graph 201) can be contained in the VDP graph 201.

The GUI 199 also includes a graph-axis control 218. The graph-axis control 218 includes a first end 228, a second end 229, a graph-axis control segment 219, 220, 221, a cursor position indicator 222, and a divider 230, 231. In at least some implementations, the cursor position indicator 222 is configured as a cursor positioner that a user can select and move within the graph-axis control 218. That movement can be towards the first end 228 or towards the second end 229. The divider 230 divides the graph-axis control 218 between the graph-axis control segment 219 and the graph-axis control segment 220. The divider 231 divides the graph-axis control 218 between the graph-axis control segment 220 and the graph-axis control segment 221. The first end 228 can also be a first end of the graph-axis control segment 219 and the divider 230 can be a second end of the graph-axis control segment 219. The divider 230 can be a first end to the graph-axis control segment 220 and the divider 231 can be a second end of the graph-axis control segment 220. The divider 231 can be a first end of the graph-axis control segment 221 and the second end 229 can be a second end of the graph-axis control segment 221. The graph-axis control 218 also includes a first side 232 (e.g., a top side) and a second side 233 (e.g., a bottom side).

The graph-axis control 218 can include and/or be arranged as a container. In at least some implementations, the processor 15 can control which graph-axis control segments are displayed in that container, sizes of the graph-axis control segments displayed in the container, and positions of the cursor position indicator 222 within the container.

In at least some implementations, the divider 230, 231 can coincide with an edge of the cursor position indicator 222. As shown in FIG. 10, the divider 231 coincides with the cursor position indicator 222 when the cursor position indicator 222 is positioned at an end of the graph-axis control segment 220 closest to the second end 229. Similarly, the divider 230 coincides with the cursor position indicator 222 when the cursor position indicator 222 is positioned at an end of the graph-axis control segment 220 closest to the first end 228. As shown in FIG. 10, the divider 230 can be arranged as a vertical line segment when the cursor position indicator 222 is positioned away from the end of the graph-axis control segment 220 closest to the first end 228. Similarly, but as shown in FIG. 11, the divider 231 can be arranged as a vertical line segment when the cursor position indicator 222 is positioned away from the end of the graph-axis control segment 220 closest to the second end 229.

The graph-axis control segment 219, 220, 221 corresponds to a portion of the memory 17. In one respect, the graph-axis control segment 219, 220, 221 can correspond to portion(s) of the buffer 33. In another respect, the graph-axis control segment 219, 220 can correspond to a quantity of frames written into the memory 17 (e.g., written into portion(s) of the buffer 33), and the graph-axis control segment 221 corresponds to a capacity of the memory 17 (e.g., a capacity of portion(s) of the buffer 33) into which a quantity of frames can still be written into the memory 17 (e.g., portion(s) of the buffer 33). In yet another respect, the graph-axis control segment 219, 220 can correspond to a quantity of VDPs written into the memory 17 (e.g., written into portion(s) of the buffer 33), and the graph-axis control segment 221 corresponds to a capacity of the memory 17 (e.g., a capacity of portion(s) of the buffer 33) into which a quantity of VDPs can still be written into the memory 17 (e.g., portion(s) of the buffer 33). In still yet another respect, since it takes an amount of time to generate a frame and the graph-axis control segment 219, 220, 221 can represent a quantity of frames, the graph-axis control segment 219, 220, 221 can also represent quantities of time.

The GUI 199 includes a VOC indicator 223, 224, 225, 226, 227. In at least some implementations, the VOC indicator 223, 224, 225, 226, 227 is at the graph-axis control 218. In at least some implementations, a VOC indicator being at the graph-axis control 218 includes the VOC indicator being adjacent to the graph-axis control 218. In at least some other implementations, a VOC indicator being at the graph-axis control 218 includes the VOC indicator being on and/or within the graph-axis control 218.

In at least some implementations, a VOC indicator is displayed at (e.g., on or above) the first side 232 or at (e.g., on or below) the second side 233. As shown in FIG. 10, the VOC indicator 224 is below the second side 233 and the VOC indicator 225 is above the first side 232. In at least some implementations, the VOC indicators that correspond to PIDs and are at and/or above the first side 232 represent that an upper baseline threshold for those PIDs has been breached, whereas the VOC indicators that correspond to PIDs and are at and/or below the second side 233 represent that a lower baseline threshold for those PIDs has been breached.

The VOC indicator 223 is a stacked VOC indicator based on two or more vehicle operating conditions, whereas each of the VOC indicator 224, 225, 226, 227 corresponds to a single vehicle operating condition. In at least some implementations, a stacked VOC indicator includes multiple VOC indicators where a portion of one VOC indicator overlays a portion of another VOC indicator. In at least some implementations, a stacked VOC indicator includes multiple VOC indicators where one VOC indicator is overlaid upon all of the other VOC indicators of the multiple VOC indicators. In at least some of those latter implementations, a stacked VOC indicator differs in appearance from a VOC indicator corresponding to a single VOC to allow a user to distinguish between those VOC indicators.

In at least some implementations, a VOC includes a condition when a PID parameter value for a PID breaches a threshold. In accordance with at least some of those implementations, the processor 15 determines a VOC by determining the first parameter value amongst the received parameter values for a PID breaches a threshold corresponding to the PID. In at least some implementations, the processor 15 outputs a GUI with no more than one VOC indicator for each PID. Accordingly, and based on the view of the GUI 199 shown in FIG. 10, the processor 15 can write parameter values into the buffer 33 for PIDs even though the view of the GUI does not currently display a container to show a VDP graph of PID parameter values for a PID other than the PID 209 (e.g., PID "1").

In at least some other implementations, the processor 15 outputs a GUI with multiple VOC indicators for a particular PID. As an example, if the particular PID is associated with multiple baseline thresholds, such as an upper baseline threshold and a lower baseline threshold, the processor 15 can output a GUI with a VOC indicator to represent a received parameter value corresponding to the particular PID breached the upper baseline threshold and a different received parameter value corresponding to the particular PID breached the lower baseline threshold. In at least some implementations, a particular PID can be associated with three or more baseline thresholds, such as a default upper and lower baseline threshold and one or more user-defined baseline thresholds.

The GUI 199 also includes the display pointer 151 and the vehicle identifier 190. The GUI 199, as well as other GUI, can include an exit-view USC 216. The exit-view USC 216 is selectable to cause the processor 15 to display a most-recently displayed GUI instead of the GUI from which the exit-view USC 216 is selected. The GUI 199, as well as other GUI, can include a view-selection USC 217. The view-selection USC 217 is selectable to cause the processor 15 to change a view mode of PID(s) shown on the display 40. Changing the view mode can include changing a view mode within the GUI 199 or causing a different GUI to be displayed on the display 40. In at least some implementations, the selectable view modes of PIDs include a graph view mode and a list view mode.

In at least some implementations, a VOC indicator within a GUI represents that a DTC has been set within the vehicle 4. In at least some implementations, a VOC indicator corresponding to setting of a DTC has an appearance that differs from a VOC indicator corresponding to breaching of a PID baseline threshold to distinguish between different types of VOC indicators.

In at least some implementations, a VOC indicator within a GUI (e.g., a VOC indicator at the graph-axis control 218) is a user-selectable control that is selectable to cause the processor 15 to display different data within a GUI containing the selected VOC indicator, display a different GUI, or display a different view of the GUI being displayed. Examples of the processor 15 causing different data, a different GUI, or a different GUI view to be displayed in response to selection of a VOC indicator are described below.

The GUI 199 also includes a USC 234, 235, 236. The USC 234 is selectable to cause the processor 15 to capture a screen shot of the display 40. The screen shot can be stored within the memory 17, e.g., within the database 25. The USC 235 is selectable to cause the processor 15 to stop the writing of data (e.g., frames and/or VDPs) into the buffer 33 and to cause the processor 15 to continue writing data into the buffer 33 if the USC 236 is selected while storage of the VDPs into the buffer 33 is stopped. The USC 236 is selectable to cause the processor 15 to pause the storing of data (e.g., frames and/or VDPs) into the buffer 33 if the processor 15 is currently operating in a mode in which data (e.g., PID parameter values and/or non-PID data) are being written into the buffer 33 and to cause the processor 15 to continue storing data into the buffer 33 if the USC 236 is selected while storage of the VDPs into the buffer 33 is paused.

The GUI 199 also includes a zoom USC 237 selectable to change a zoom setting corresponding to the VDP graph 201. FIG. 10 shows the zoom USC 237 at a mid-point zoom level setting. The zoom USC 237 is selectable to move from the mid-point zoom level setting (or another zoom level setting) towards a maximum zoom-in level setting so that the waveform 202 displayed within the container 200 represents fewer data parameters corresponding to the PID 209 relative to the number of data parameters corresponding to the PID 209 represented by the waveform 202 when the zoom USC 237 is set to the mid-point zoom level. Similarly, the zoom USC 237 is selectable to move from the mid-point zoom level setting (or another zoom level setting) towards a maximum zoom-out level setting so that the waveform 202 represents more data parameters corresponding to the PID 209 relative to the number of data parameters corresponding to the PID 209 represented by the waveform 202 when the zoom USC 237 is set to the mid-point zoom level.

FIG. 10 also shows a buffer point 247, 248. In at least some implementations, the buffer point 247 and/or the buffer point 248 is shown in the GUI 199. In other implementations, the buffer point 247 and/or the buffer point 248 is not shown in the GUI 199. The buffer point 248 can indicate a point on the graph-axis control 218 at which the processor 15 changes a view of a GUI in response to engaging another buffer segment for storing frames of PID and/or non-PID data. The buffer point 247 can indicate a point in the graph-axis control 218 where the cursor position indicator 222 will be shown after the processor 15 changes the GUI view. As an example, the buffer point 248 can correspond to the particular frame data in a given row of Table C, Table D, or Table E before the processor 15 changes the GUI view, and the buffer point 247 can correspond to the particular frame data in the same given row of Table C, Table D, or Table E after the processor 15 changes the GUI view.

The GUI 199 and other GUIs shown in the drawings includes a forward/reverse USC 296. In at least some implementations, the forward/reverse USC 296 includes a USC selectable to cause the processor 15 to display a waveform in motion within a GUI. The motion can be in a forward direction or a reverse direction. Displaying a waveform of PID parameter values in a reverse direction results in displaying additional PID parameter values captured just prior to the earliest captured PID parameter value currently displayed within the GUI. Displaying a waveform of PID parameter values in a forward direction results in displaying additional PID parameter values captured just after to the latest captured PID parameter value currently displayed within the GUI. In at least some implementations, the motion resulting from a selection of the forward/reverse USC 296 can include displaying the waveform in motion in a reverse direction at an increased rate compared to the motion in the reverse direction as discussed above. Likewise, in at least some implementations, the motion resulting from a selection of the forward/reverse USC 296 can include displaying the waveform in motion in a forward direction at an increased rate compared to the motion in the forward direction as discussed above.

In at least some implementations, the USC 296 includes a USC 144, 145, 146, 147. In at least some of those implementations, in response to a selection of the USC 144, 145, 146, 147, the processor 15 repositions the cursor position indicator 222, the cursor 205, and the cursor point 206 by an F quantity of frames so long as the cursor position indicator 222, the cursor 205, and the cursor point 206 can be repositioned by that quantity of frames. More specifically, the USC 144, 145 is used for repositioning the cursor position indicator 222, the cursor 205, and the cursor point 206 by F frames earlier than a current frame represented by the cursor position indicator 222, the cursor 205, and the cursor point 206. In contrast, the USC 146, 147 is used for repositioning the cursor position indicator 222, the cursor 205, and the cursor point 206 by F frames later than the current frame represented by the cursor position indicator 222, the cursor 205, and the cursor point 206.

Additionally, in at least some implementations, the F quantity of frames for the USC 145, 146 is one frame and the F quantity of frames for the USC 144, 147 is more than one frame, such as ten frames. The selection of the USC 144, 145, 146, 147 can include a press and release before a threshold amount of time passes or a press and release after the threshold amount of time passes one or more times. As an example, the threshold amount of time can be one second.

If the selection of the USC 144, 145, 146, 147 is a press and release after the threshold amount of time passes one or more times, the processor 15 can modify the frame adjustment quantity to reposition the cursor position indicator 222, the cursor 205, and the cursor point 206 as the USC 144, 145, 146, 147 continues to be pressed. In some implementations, the frame adjustment can include one adjustment by the F quantity of frames per each consecutive threshold amount of time passing. For example, the frame adjustment quantity for the USC 144, 147 for the first five seconds can be as follows: $1^{st}$ second: ten frames per second, $2^{nd}$ second: twenty frames per second, $3^{rd}$ second: thirty frames per second, $4^{th}$ second: forty frames per second, and $5^{th}$ second: fifty frames per second. Other examples of adjusting the quantity of frames associated with a selection of the USC 144, 145, 146, 147 are also possible.

The GUI 199 includes a graphical frame counter 276. The graphical frame counter 276 includes numerical and non-numerical indicators to represent, in connection with the cursor position indicator 222, a quantity of PID parameter values and/or frames that have been received by the computing system 5 while connected to the vehicle 4 during a current data collection session. Any view of the GUI 199 shown in the drawings that doesn't show any or all of the graphical frame counter 276 can include the un-shown portions of the graphical frame counter 276.

Next, FIG. 11 shows an alternative view of the GUI 199. In the view of the GUI 199 shown in FIG. 11 relative to the view shown in FIG. 10, the size of the graph-axis control segment 219 is smaller/shorter, the size of the graph-axis control segment 220 is identical, the graph-axis control segment 220 is closer to the first end 228 and further from the second end 229, and the size of the graph-axis control segment 221 is bigger/longer. The cursor position indicator 222 is at the mid-point of the graph-axis control segment 220 (e.g., at the mid-point between the divider 230 and the divider 231). Additionally, the cursor position indicator 222 is positioned at the VOC indicator 223. As noted, the VOC indicator 223 is stacked (e.g., a portion of one or more VOC indicators is positioned on a portion of one or more other VOC indicators). In at least some implementations, a VOC indicator displayed in a GUI represents that one or more VOC indicators is stacked completely on top of one or more other VOC indicators. Such VOC indicator can be displayed to represent that multiple vehicle operating conditions warranting display of a VOC indicator occurred and/or were determined at a common time and/or a common frame, or at times relatively close to one another relative to how much time is represented by the horizontal axis 204.

In the view of the GUI 199 shown in FIG. 11, the container 200 includes the cursor 205 and a cursor 238, 239, 240, 242. In this view, the cursor 205, 238, 239, 240 corresponds to a first, second, third, and fourth VOC indicator within a group of stacked VOC indicators represented by the VOC indicator 223. The cursor 242 corresponds to the VOC indicator 224. The cursor 238, 239, 240 are relatively close to the cursor 205 as compared to the cursor 242. The cursor point 206 is positioned at the cursor 205.

In the view of the GUI 199 shown in FIG. 11, frame numbers ("51" to "84") of the graphical frame counter 276 are shown under the horizontal axis 204 for describing other aspects of the GUI 199 and with respect to the data shown in Table F. In any implementations containing frame numbers in a GUI, the frame numbers can be disposed within a container including a VDP graph or outside of such a container (as shown in FIG. 11). The data in Table F contains data with respect to frames "65" to "76." The cursor 205, 238, 239, 240 represent that a VOC corresponding to the VOC indicator 223 occurred during the capture and/or storage of the data for frame "67" and the cursor 242 represents that a VOC corresponding to the VOC indicator 224 occurred during the capture and/or storage of the data for frame "76."

As noted, a cursor that corresponds to a VOC indicator can be displayed in a VDP graph. In a first case, the cursor that corresponds to a VOC indicator also corresponds to a PID represented by a waveform within the VDP graph. In a second case, the cursor that corresponds to a VOC indicator does not correspond to a PID represented by a waveform within the VDP graph, but rather to a different PID, such as a PID represented by a waveform within a different VDP graph. Different cursor formats can be used to distinguish the cursor for those two cases. For example, the cursor discussed in the first case can be displayed using a first cursor format, and the cursor discussed in the second case can be displayed using a second cursor format. In at least some implementations, a cursor displayed using the first cursor format includes a cursor displayed using a solid line, and a cursor displayed using the second cursor format includes a cursor displayed using a dashed line. In at least some other implementations, a cursor displayed using the first cursor format includes a cursor displayed using a dashed line, and a cursor displayed using the second cursor format includes a cursor displayed using a solid line. Additionally or alternatively, a cursor displayed using the first cursor format includes a cursor displayed using a first color, and a cursor displayed using the second cursor format includes a cursor displayed using a second color different than the first color.

In at least some instances, a VDP graph displays a single cursor corresponding to a VOC indicator using the first cursor format and multiple cursors (corresponding to respective VOC indicators) using the second cursor format. In at least some of those cases, the multiple cursors can be displayed using different respective colors, and at least some of those implementations, the VOC indicators can be displayed using the same color as a respective cursor.

Figure 12:
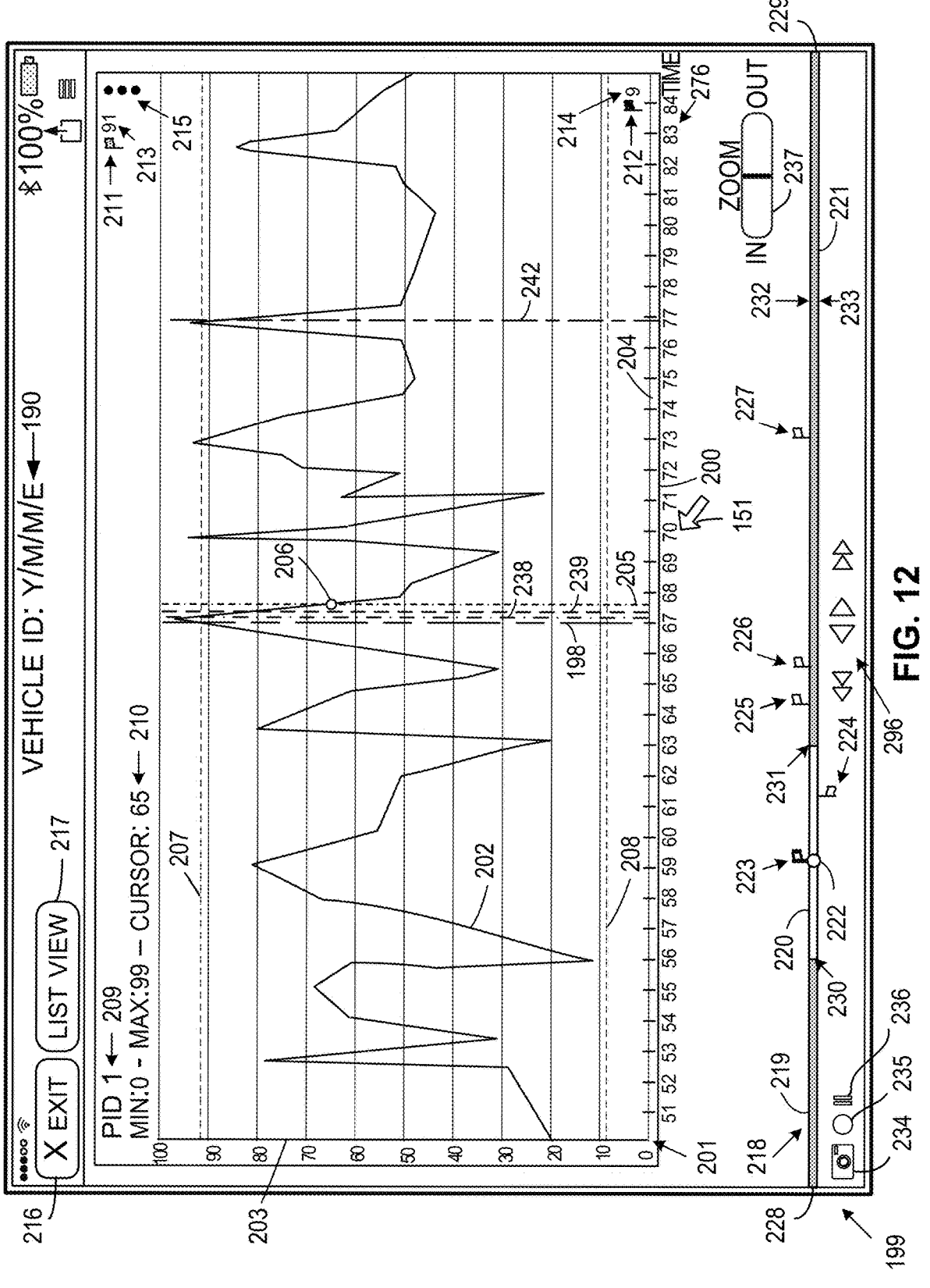

Next, FIG. 12 shows another alternative view of the GUI 199. In one respect, the GUI 199 shown in FIG. 12 can be output on the display 40 in response to a selection of the VOC indicator 223 when stacked as shown in FIG. 10. In another respect, the GUI 199 shown in FIG. 12, can be output on the display 40 in response to a selection of the cursor 240 from the GUI 199 as shown in FIG. 11. In accordance with that latter respect, a selection of a cursor corresponding to a first particular PID (e.g., PID "4") within a VDP graph for a second particular PID (e.g., PID "1") does not change which PID is represented by the VDP graph. For example, the VDP graph 201 shown in FIG. 12 continues to represent parameter values corresponding to PID "1" as indicated by PID 209.

FIG. 12 is similar to FIG. 11 except for the following differences. First, the cursor 205 corresponds to a last VOC indicator stacked at the VOC indicator 223. Referring to Table F, the last VOC indicator stacked at the VOC indicator 223 corresponds to PID "4" and frame "67." In at least some implementations, the cursor 205 is overlaid upon the cursor 240 (shown in FIG. 10) or displayed in lieu of the cursor 240, at least momentarily. That moment ends if the cursor 205 shifts towards the next frame along the graphical frame counter 276 as an additional frame is written into the buffer. Once the cursor 205 shifts, the cursor 240 can be displayed in the position from which the cursor 205 just shifted. Second, the cursor point 206 is located at the cursor 205, but at a different point along the waveform 202. Third, a cursor 198 corresponds to a first VOC indicator stacked at the VOC indicator 223. Referring to Table F, the first VOC indicator stacked at the VOC indicator 223 corresponds to PID "1" and frame "67." Considering the views of the GUI 199 shown in FIG. 11 and FIG. 12, a cursor and cursor point, such as the cursor 205 and the cursor point 206, can be moved and displayed at a portion of a waveform corresponding to a first VOC indicator within a stacked VOC indicator (as shown in FIG. 11) or can be moved and displayed at a portion of a waveform corresponding to a last VOC indicator within a stacked VOC indicator (as shown in FIG. 12). Fourth, the cursor parameter value for the PID parameter values 210 value has changed to "65" represented by cursor point 206 in FIG. 12.

For an implementation in which selection of a stacked VOC indicator results in displaying the multiple VOC indicators of the stacked VOC indicator spread out along the graph-axis control 218, the cursor position indicator 222 can be displayed at the first-in-time VOC indicator among the multiple VOC indicators or at the last-in-time VOC indicator among the multiple VOC indicators. In an alternative arrangement, the cursor position indicator 222 can be displayed at a VOC indicator that is in the middle of the multiple VOC indicators (e.g., the third of five VOC indicators, or the third or fourth of six VOC indicators, or in between the third or fourth of six VOC indicators).

Figure 13:
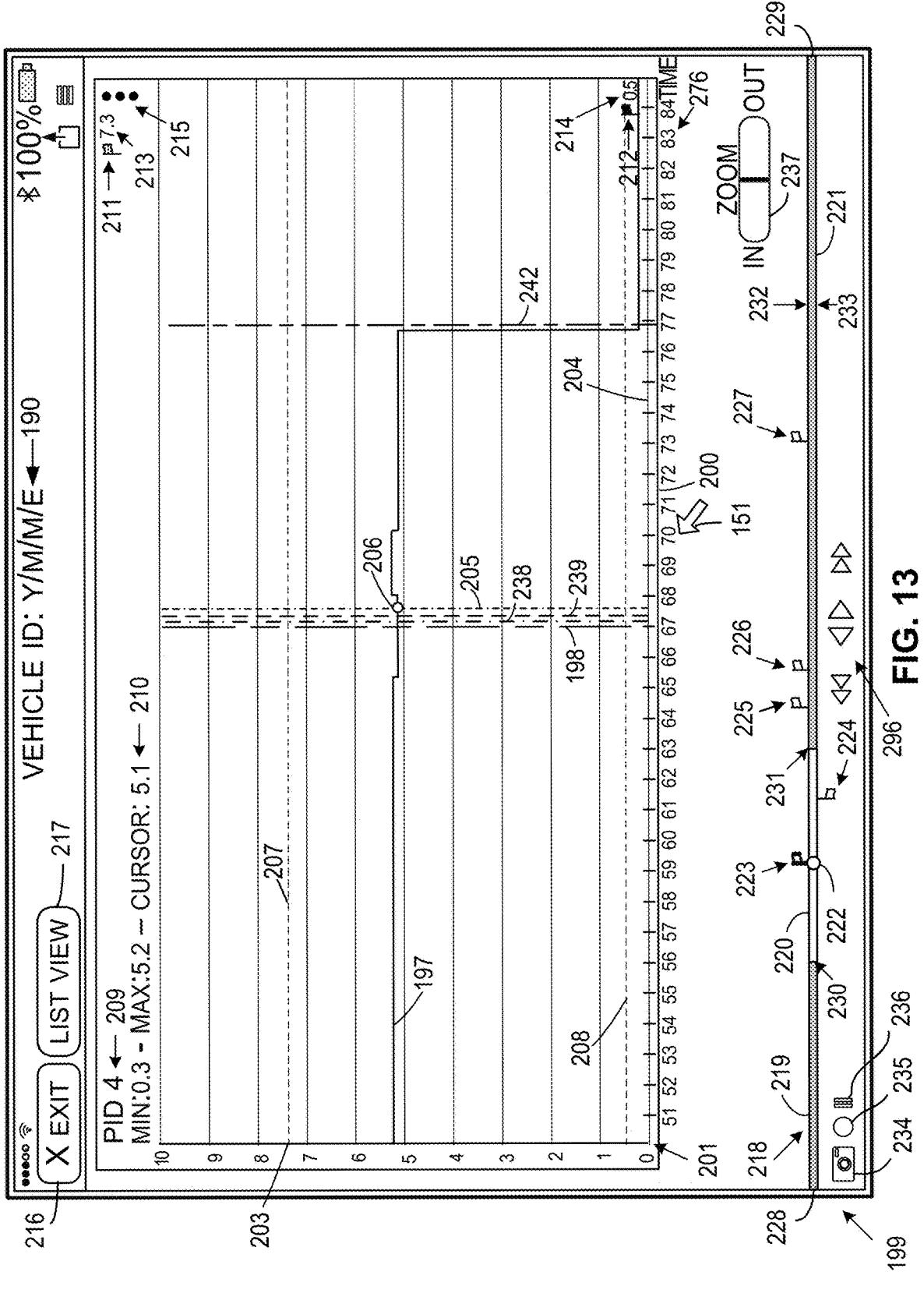

Next, FIG. 13 shows another alternative view of the GUI 199. The GUI 199 shown in FIG. 13 can be output on the display 40 in response to a selection of the cursor 205 or the cursor point 206 as shown in FIG. 12. The graph-axis control 218 is identical in FIG. 12 and FIG. 13, but the VDP graph 201 shown in FIG. 13 includes the waveform 197 instead of the waveform 202. In FIG. 13, the upper baseline threshold indicator 207 and the PID parameter value 213 are at the value "7.3" instead of the value "91" in FIG. 13. In FIG. 13, the lower baseline threshold indicator 208 and the PID parameter value 214 are at the value "0.5" instead of the value "9" in FIG. 13. In FIG. 13, the value of the PID 209 is "4" as a result of selecting the cursor 205 or the cursor point 206 (both of which in FIG. 12 correspond to the PID with the value "4") from the GUI 199 shown in FIG. 12. In FIG. 13, the PID parameter values 210 show values corresponding to the waveform 197. The cursor 198, 205, 238, 239 is identical in FIG. 12 and FIG. 13.

Figure 14:
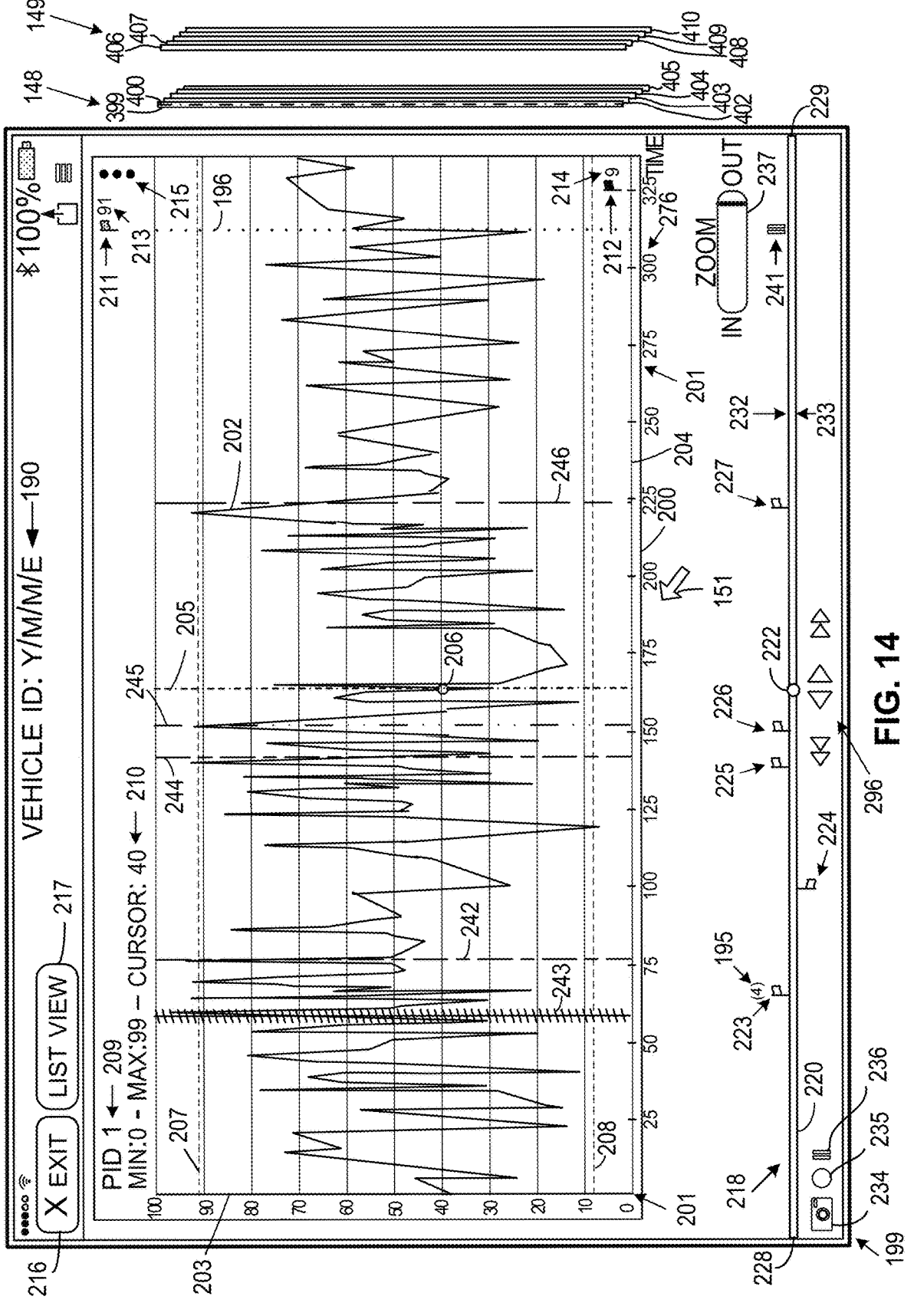

Next, FIG. 14 shows another alternative view of the GUI 199. In this view, the zoom USC 237 has been moved to a zoom-out position. As an example, the view of the GUI 199 shown in FIG. 14 can be displayed on the display 40 in response to moving the zoom USC 237 towards a maximum zoom-out setting while the GUI 199 is output as shown in FIG. 12. As another example, the view of the GUI 199 shown in FIG. 14 can be displayed on the display 40 in response to moving the zoom USC 237 towards a maximum zoom-out setting and then selecting the VOC indicator 223. As yet another example, the view of the GUI 199 shown in FIG. 14 can be displayed on the display 40 in response selecting the VOC indicator 223 and then moving the zoom USC 237 towards a maximum zoom-out setting.

The processor 15 increases the amount vehicle data parameters represented in the VDP graph 201 (e.g., increases the number of frames represented in the VDP graph 201) as the zoom USC 237 approaches a maximum zoom-out position. In response to selecting a zoom-out position, the processor 15 outputs data into the GUI 199 for more frames as compared to a setting of the zoom USC 237 further away from the full zoom-out position. As an example, the frame numbers in the graphical frame counter 276 include the frame numbers "25" to "325" in increments of twenty-five frames. Additionally, the graph-axis control segment 220 covers an entirety of the graph-axis control 218. In other words, in this view of the GUI 199, the graph-axis control segment 219, 221 is not part of the graph-axis control 218.

The cursor position indicator 222 in FIG. 14 is located at a horizontal mid-point of the graph-axis control segment 220. Accordingly, the cursor 205 is positioned at a horizontal mid-point of the waveform 202 shown in FIG. 14. The cursor parameter value at the PID parameter values 210 corresponds to the cursor point 206, which is positioned on the cursor 205. The VOC indicator 223, 224, 225, 226, 227 are shown in FIG. 14. Since more frames are represented in FIG. 14, the stacked VOC indicator 223 appears as a single VOC indicator without any overlap by a portion of another VOC indicator. In at least some implementations, the GUI 199 can include a numerical icon 195 to represent how many VOC indicators are part of a stacked VOC indicators. In FIG. 14, the numerical icon 195 is "4" to represent the VOC indicators corresponding to VOC status data for the PID "1" "2" "3" "4" in Table F.

The VDP graph 201 includes the cursor 242 corresponding to the VOC indicator 224. The VDP graph 201 also includes a cursor 243, 244, 245, 246 that corresponds to the VOC indicator 223, 225, 226, 227, respectively. In at least some implementations, a cursor that corresponds to a stacked VOC indicator can have an appearance different than a cursor that corresponds to a single VOC indicator.

The view of the GUI 199 in FIG. 14 represents an example use of the USC 236. As shown in FIG. 14, a pause icon 241 is displayed at the graph-axis control 218 to represent temporally when the USC 236 was selected relative to occurrence of the VOC that warranted the VOC indicator 223, 224, 225, 226, 227 being displayed at the graph-axis control 218. Additionally or alternatively, the VDP graph 201 can include a cursor 196 to represent when the USC 236 was selected relative to receipt of the PID parameter values represented by the waveform 202. In other words, the cursor 196 represents when receiving and/or writing of data into the buffer 33 is paused. In FIG. 14, the cursor 196 indicates that the USC 236 was selected at about the time when data for the frame "312" (falling between the number "300" and the number "325" on the graphical frame counter 276, but not explicitly listed on the graphical frame counter 276) was being captured. Since the waveform 202 extends beyond the frame "312" (falling between the number "300" and the number "325" on the graphical frame counter 276, but not explicitly listed on the graphical frame counter 276), FIG. 14 represents an implementation in which data for additional frames were captured after the USC 236 was selected. In at least some implementations, after pausing collection of data, the processor 15 can continue collecting data for writing into the buffer 33 after the USC 236 is selected while the collection of data is paused. In at least some other implementations, the processor 15 can continue collecting data for writing into the buffer 33 after a predetermined amount of time has passed since the USC 236 was selected to pause the collection of data to be written into the buffer 33. A separate cursor can be added onto each VDP graph displayed in a GUI each time the USC 236 is selected to pause receiving and/or writing data into the buffer 33.

In FIG. 14, the cursor 243 is wider than the cursor 242, 244, 245, 246. The different appearance can be implemented using various techniques, such as highlighting the cursor or increasing a thickness of the cursor. FIG. 14 shows a cursor 148, 149 using techniques to widen a cursor. The cursor 148, 149 is not within the GUI 199, but rather is shown as an example.

The cursor 148 includes a cursor 399, 400 and a drop shadow 402, 403, 404, 405. The cursor 148 also includes first and second cursors (not shown) overlaid by the cursor 399 and the cursor 400. The cursor 399 is formatted using a first cursor format. The cursor 400 is formatted using a second cursor format. In accordance with this example, using the first cursor format, the cursor 399 is a solid line and has an opacity that permits the cursor 400 to be shown when the cursor 399 is overlaid upon the cursor 400. Using the second cursor format, the cursor 400 is a dashed line. Although not shown in FIG. 14, using the first and second cursor formats respectively, the cursor 399 can be a first color and the cursor 400 can be a second color (different than the first color).

The drop shadow 402 represents a shadow of the cursor 399. The drop shadow 403 represents a shadow of the cursor 400. The drop shadow 404 represents a shadow of the first cursor overlaid by the cursor 399 and the cursor 400. The drop shadow 405 represents a shadow of the second cursor overlaid by the cursor 399 and the cursor 400. The processor 15 can select the drop shadow 402, 403, 404, 405 based on a z-index value assigned to the drop shadow 402, 403, 404, 405 and to an order in which the cursor 399, the cursor 400, first and the first and second cursors overlaid by the cursor 399 and the cursor 400 are overlaid by another cursor or overlay another cursor.

The cursor 149 includes a cursor 406 and a drop shadow 407, 408, 409, 410. The cursor 149 also includes first, second, and third cursors (not shown) overlaid by the cursor 406. The cursor 406 is formatted using a first cursor format. In accordance with this example, using the first cursor format, the cursor 406 is a solid line and has an opacity that prevents the first, second, and third cursors overlaid by the cursor 406 from being displayed when the cursor 406 overlays those cursors.

The drop shadow 407 represents a shadow of the cursor 406. The drop shadow 408 represents a shadow of the first cursor overlaid by the cursor 406. The drop shadow 409 represents a shadow of the second cursor overlaid by the cursor 406. The drop shadow 410 represents a shadow of the third cursor overlaid by the cursor 406. The processor 15 can select the drop shadow 407, 408, 409, 410 based on a z-index value assigned to the drop shadow 407, 408, 409, 410 and to an order in which the cursor 406 and the first, second, and third cursors are overlaid by the cursor 406 or another cursor or overlay another cursor.

Figure 15:
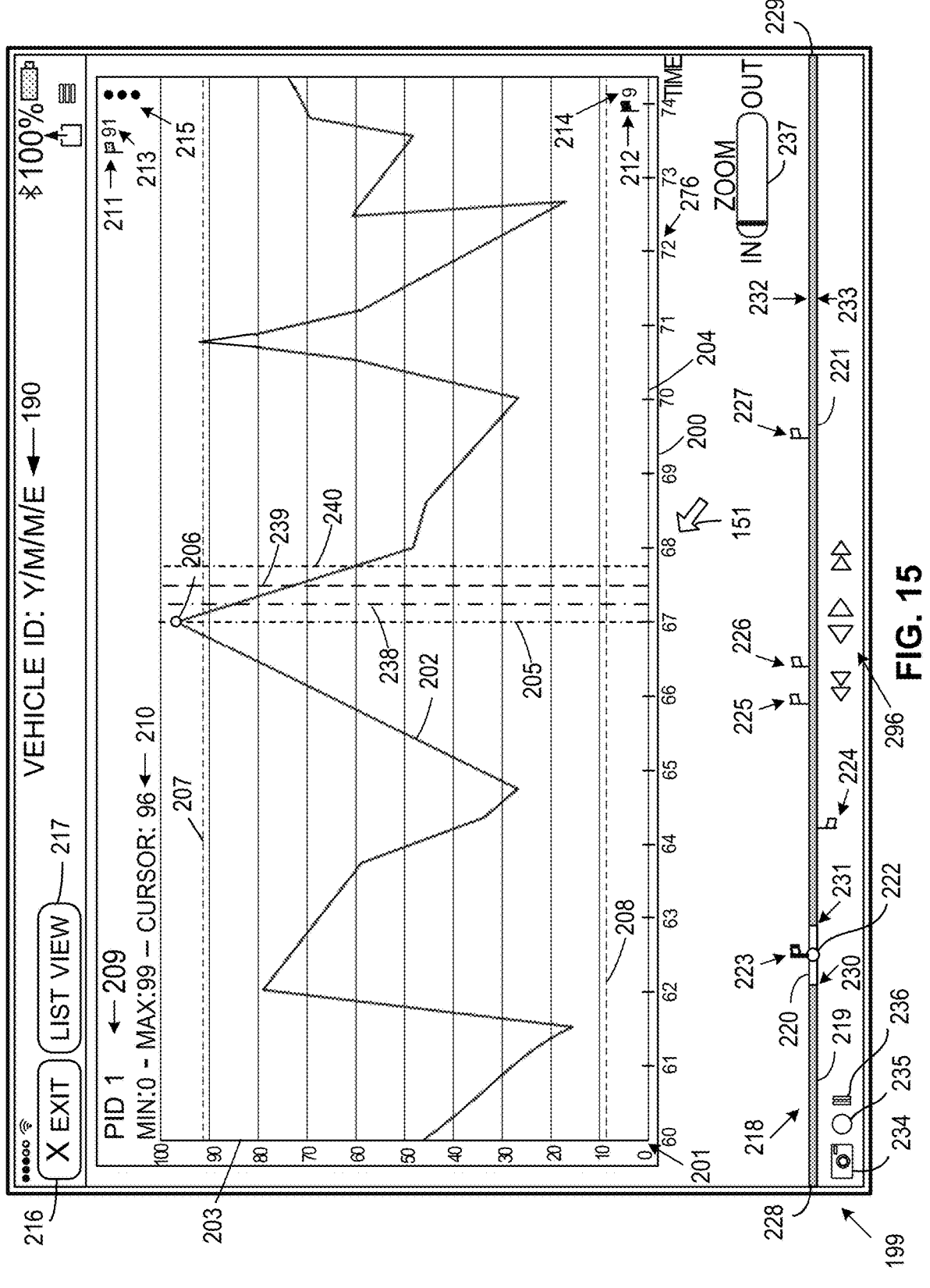

Next, FIG. 15 shows another alternative view of the GUI 199. In this view, the zoom USC 237 has been positioned to a zoom-in position. As an example, the view of the GUI 199 shown in FIG. 15 can be displayed on the display 40 in response to moving the zoom USC 237 towards a maximum zoom-in setting while the GUI 199 is output as shown in FIG. 12. As another example, the view of the GUI 199 shown in FIG. 15 can be displayed on the display 40 in response to moving the zoom USC 237 towards a maximum zoom-in setting and then selecting the VOC indicator 223. As yet another example, the view of the GUI 199 shown in FIG. 15 can be displayed on the display 40 in response selecting the VOC indicator 223 and then moving the zoom USC 237 towards a maximum zoom-in setting.

The processor 15 decreases the amount of vehicle data parameters represented in the VDP graph 201 (e.g., decreases the number of frames represented in the VDP graph 201) as the zoom USC 237 approaches a maximum zoom-in position. As an example, the frame numbers in the graphical frame counter 276 include the frame numbers "60" to "74" (which is fewer frame numbers compared to the view of the GUI 199 shown in FIG. 10 to FIG. 13). In the view of the GUI 199 shown in FIG. 15 relative to the view shown in FIG. 12, the size of the graph-axis control segment 219 is smaller/shorter, the size of the graph-axis control segment 220 is smaller/shorter, the graph-axis control segment is closer to the first end 228 and further from the second end 229, and the size of the graph-axis control segment 221 is bigger/longer.

The cursor position indicator 222 in FIG. 15 is located at a horizontal mid-point of the graph-axis control segment 220. Accordingly, the cursor 205 is positioned at a horizontal mid-point of the waveform 202 shown in FIG. 15. The cursor parameter value at the PID parameter values 210 corresponds to the cursor point 206, which is positioned on the cursor 205. The VOC indicator 223, 224, 225, 226, 227 are shown in FIG. 15.

The VDP graph 201 includes the cursor 205, 238, 239, 240 that corresponds to a first, second, third, and fourth VOC indicator, respectively, within a group of stacked VOC indicators represented by the VOC indicator 223. Table F shows that the VOC corresponding to the VOC indicator 223 were determined during the collection of data for frame "67." Likewise, Table F shows that the VOCs corresponding to the cursor 205, 238, 239, 240 in FIG. 15 were determined during the collection of data for frame "67."

Figure 16A:
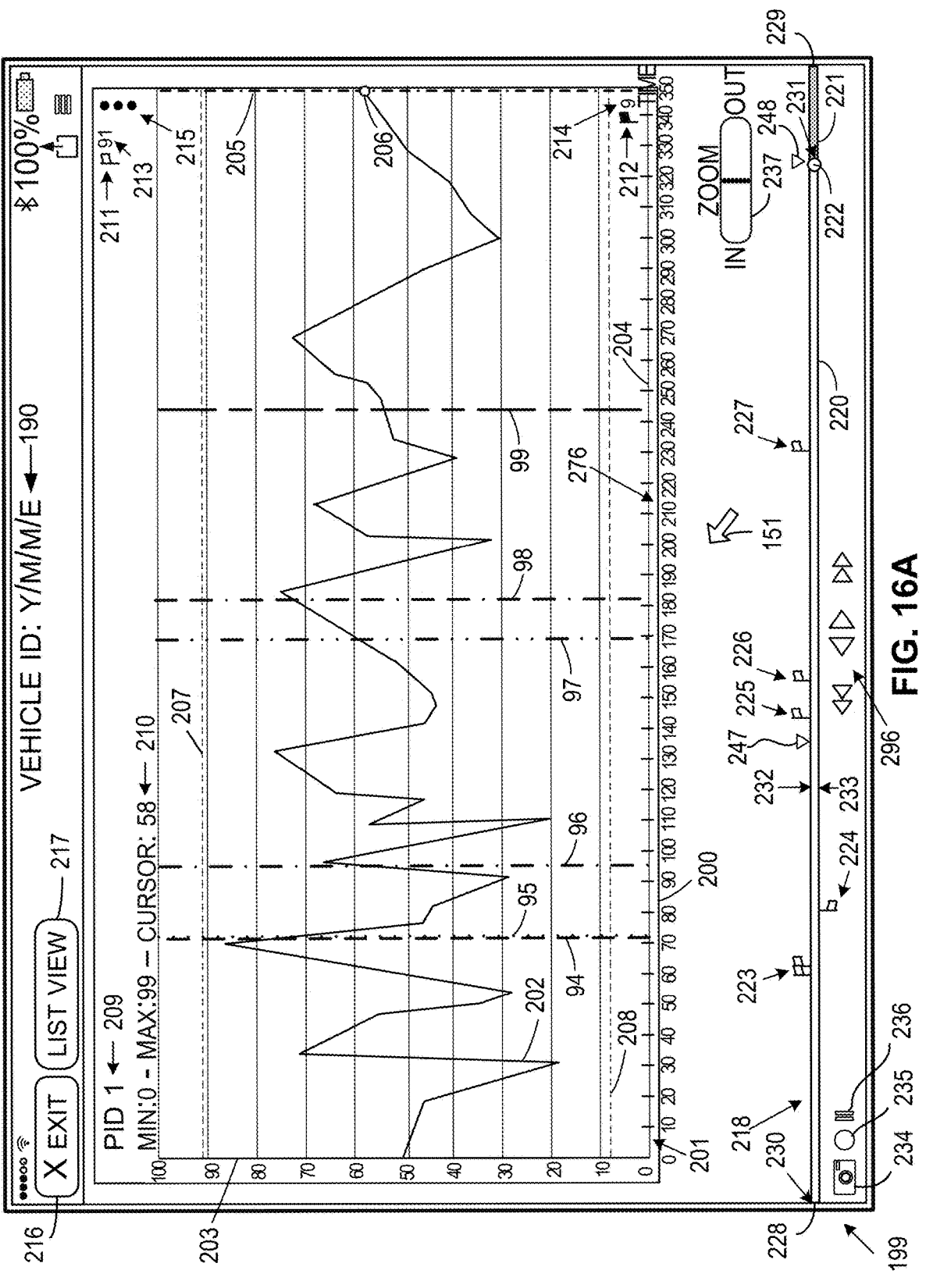

Next, FIG. 16A shows another alternative view of the GUI 199. In this view, the VDP graph 201 shows parameter values corresponding to the PID 209 (e.g., the PID "1") via the waveform 202. The graphical frame counter 276 in FIG. 16A shows numeric indicators "0" to "350" (incremented by ten). Those numeric indicators correspond to frame numbers. The graphical frame counter 276 can include numeric indicators that are incremented by a quantity other than ten frames. In this view, the graph-axis control 218 includes the graph-axis control segment 220, 221, where the graph-axis control segment 220 corresponds to a frame "1" to a frame "350," and the graph-axis control segment 221 corresponds to a frame "351" to a frame "400." In this view, the cursor 205 and the cursor position indicator 222 correspond to the frame "350." The parameter value corresponding to the cursor point 206 as shown in the PID parameter values 210 is "58."

The cursor position indicator 222 is positioned at the buffer point 248. The buffer point 248 represents a point in the graph-axis control 218 at which once the cursor position indicator 222 is positioned at the buffer point 248, the processor 15 engages another buffer segment. In at least some implementations, the processor 15 engages another buffer segment after the cursor position indicator 222 is positioned at the buffer point 248. As an example, based on the view of the GUI 199 shown in FIG. 16A, the processor 15 engages another buffer segment after the frame "350" is being written or has been written into the buffer 33, or just before the processor 15 begins writing data for frame "350" within the buffer 33. The buffer point 247 represents a point in the graph-axis control 218 where the cursor position indicator 222 is positioned in response to the processor 15 engaging another buffer segment. As noted before, the buffer point 247, 248 need not be displayed within the GUI 199.

The VOC indicator 223 is an occurrence of a stacked VOC indicator where one or more VOC indicators partially overlap at least one VOC indicator. The VOC indicator 224, 225, 226, 227 is not stacked upon another VOC indicator. The VDP graph 201 includes a cursor 94, 95 that corresponds to the stacked VOC indicators of the VOC indicator 223. The VDP graph 201 also includes a cursor 96, 97, 98, 99 that corresponds to the VOC indicator 224, 225, 226, 227, respectively. In implementations in which a stacked VOC indicator represents multiple VOC indicators completely stacked upon one another, a VDP graph can include a single cursor to represent the stacked VOC indicator. Other aspects shown in FIG. 16A are aspects described with respect to other drawings including the same aspects with a common reference number.

As noted previously, the cursor position indicator 222 can be repositioned from the buffer point 248 to the buffer point 247, but also as frames are written into the buffer 33. As an example, a length (e.g., a width) of the graph-axis control 218 can be one thousand pixel columns wide. Before any frame is written into the buffer 33 for a particular data session with the vehicle 4, the graph-axis control segment 221 may extend across an entirety of the graph-axis control 218, such that the graph-axis control segment 219, 220 are not shown within the graph-axis control 218. The processor 15 can determine how many pixel columns to use to represent a quantity of received frames within the graph-axis control 218. As an example, the processor 15 may divide the number of pixel columns in the length of the graph-axis control 218 (e.g., one thousand pixel columns) by the quantity of frames (e.g., "400" frames) represented by the graph-axis control 218 (e.g., "2.5" pixel columns per frame). The processor 15 can round the determined pixel columns per frame value (e.g., 3.0 pixels per frame).

Table L includes data based on example determinations made by the processor 15 to display the graph-axis control 218 with respect to FIG. 16A. Abbreviations in Table L and elsewhere in this description include CPI for cursor position indicator and GACS for graph-axis control segment. As an example, the cursor position indicator 222 can be depicted with a width of three pixel columns. Table L shows data for the frame "1" to a frame "14" and a frame "348" to a frame "350." The symbols "*" in a table represent that the processor 15 can determine data represented by that column for each of the rows corresponding to the "*" symbols.

In accordance with at least some implementations, the example one thousand pixel columns in the width of the display 40 can be numbered sequentially from a left side of the display 40 to a right side of the display 40 as "1" to "1,000." The value in the Frame×Pixels/Frame column increases by 2.5 for each additional frame. The value in the Position of CPI or VOC column is three consecutive pixel column numbers with the greatest number based on the corresponding value in the Frame×Pixels/Frame column. Based on the data in Table L, a person having ordinary skill in the art will understand that the cursor position indicator 222 shifts across the display 40 as additional frame(s) from the frame "1" to the frame "350" is/are written into the buffer 33. A width of the graph-axis control segment 220 increases (e.g., more pixels are used to represent the graph-axis control segment 220) as each additional frame from the frame "1" to the frame "350" is written into the buffer 33. Additionally, a width of the graph-axis control segment 221 decreases (e.g., fewer pixels are used to represent the graph-axis control segment 221) as each additional frame from the frame "1" to the frame "350" is written into the buffer 33.

TABLE L

| Frame | Frame × Pixels/Frame | Position of CPI 222 or VOC (Pixel column nos.) | GACS 219 (Pixel column nos.) | GACS 220 (Pixel column nos.) | GACS 221 (Pixel column nos.) |
|---|---|---|---|---|---|
| 1 | 2.5 | 1-3 | None | 1-3 | 4-1000 |
| 2 | 5 | 3-5 | None | 1-5 | 6-1000 |
| 3 | 7.5 | 6-8 | None | 1-8 | 9-1000 |
| 4 | 10 | 8-10 | None | 1-10 | 11-1000 |
| 5 | 12.5 | 11-13 | None | 1-13 | 14-1000 |
| 6 | 15 | 13-15 | None | 1-15 | 16-1000 |
| 7 | 17.5 | 16-18 | None | 1-18 | 19-1000 |
| 8 | 20 | 18-20 | None | 1-20 | 21-1000 |
| 9 | 22.5 | 21-23 | None | 1-23 | 24-1000 |
| 10 | 25 | 23-25 | None | 1-25 | 26-1000 |
| 11 | 27.5 | 26-28 | None | 1-28 | 29-1000 |
| 12 | 30 | 28-30 | None | 1-30 | 31-1000 |
| 13 | 32.5 | 31-33 | None | 1-33 | 34-1000 |
| 14 | 35 | 33-35 | None | 1-35 | 36-1000 |
| 15-347 | *** | *** | *** | *** | *** |
| 348 | 870 | 868-870 | None | 1-870 | 871-1000 |
| 349 | 872.5 | 871-873 | None | 1-873 | 874-1000 |
| 350 | 875 | 873-875 | None | 1-875 | 876-1000 |

Figure 16B:
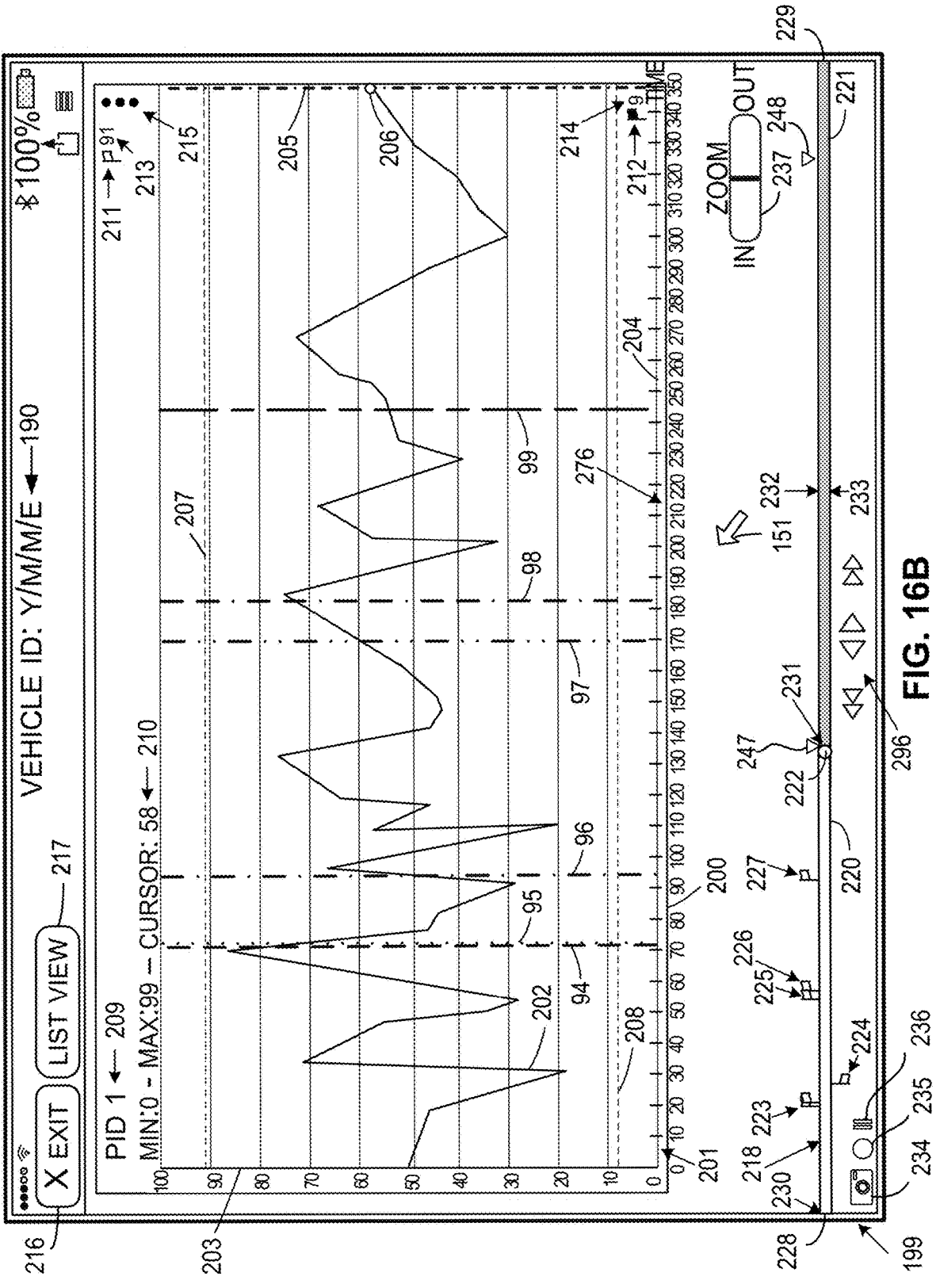

Next, FIG. 16B shows another alternative view of the GUI 199. In this view, the VDP graph 201 shows parameter values corresponding to the PID 209 (e.g., the PID "1") via the waveform 202. Like FIG. 16A, the graphical frame counter 276 in FIG. 16B shows numeric indicators "0" to "350." In this view, the graph-axis control 218 includes the graph-axis control segment 220, 221, where the graph-axis control segment 220 corresponds to a frame "1" to a frame "350," and the graph-axis control segment 221 corresponds to a frame "351" to a frame "800." In this view, the cursor 205 and the cursor position indicator 222 correspond to the frame "350." The parameter value corresponding to the cursor point 206 as shown in the PID parameter values 210 is "58."

The cursor position indicator 222 is positioned at the buffer point 247. As noted previously, the buffer point 247 represents a point in the graph-axis control 218 where the cursor position indicator 222 is positioned in response to the processor 15 engaging another buffer segment. As an example, considering FIG. 16A and FIG. 16B, the processor 15 can reposition the cursor position indicator 222 to its position shown in FIG. 16B as the frame "350" is being written into the buffer 33, in response to the frame "350" being written into the buffer 33, or just before the frame "350" is written into the buffer 33. The cursor position indicator 222 can move towards the second end 229 after moving to its position shown in FIG. 16B as each additional frame is written into the buffer 33. The cursor 205 can move rightward and the waveform 202 can be extended as each additional frame is written into the buffer 33. Comparing the waveform 202 shown in FIG. 16A and FIG. 16B, the waveform 202 is not compressed as the cursor position indicator 222 moves from the buffer point 248 to the buffer point 247. On the other hand, a positioning of the VOC indicator 223, 224 225, 226, 227 at and/or along the graph-axis control 218 is compressed.

Due to the compression, the VOC indicator 223 that is partially stacked in FIG. 16A is a completely stacked VOC indicator in FIG. 16B. In this case, all of the VOC indicators represented by the VOC indicator 223 overlap one or more other VOC indicators and/or overlap one or more other VOC indicators. The compression also results in the VOC indicator 226 partially overlapping the VOC indicator 225. The VOC indicator 224, 227 is not stacked upon another VOC indicator.

The VDP graph 201 includes a cursor 94, 95 that correspond to VOC indicators represented by the VOC indicator 223. The VDP graph 201 also includes the cursor 96, 97, 98, 99 that corresponds to the VOC indicator 224, 225, 226, 227. Other aspects shown in FIG. 16B are aspects described with respect to other drawings including the same aspects with a common reference number.

The buffer point 248 is shown in FIG. 16B and is described above. In FIG. 16A and FIG. 16B, the buffer point 248 is located at a common position at and/or along the graph-axis control 218. In at least some implementations, after the processor 15 engages another buffer segment, the processor 15 can reposition the buffer point 248 at and/or along the graph-axis control 218. As described above with respect to FIG. 3, engaging a next buffer segment can include engaging a buffer segment that is equal in size to a buffer segment into which data is currently being written or those two buffer segments can be different sizes. Accordingly, since the buffer point 248 in FIG. 16A corresponds to the frame "350," the buffer point 248 in FIG. 16B corresponds to a frame numbered greater than "350," such as a frame "700."

Table M includes data based on example determinations made by the processor 15 to display the graph-axis control 218 representing a width of eight hundred frames and with respect to FIG. 16B. As noted, the example one thousand pixel columns in the width of the display 40 can be numbered sequentially from a left side of the display 40 to a right side of the display 40 as "1" to "1,000." Table M includes data corresponding to the frame "1" to the frame "350" based on the graph-axis control 218 representing a width of eight hundred frames. The data for frame "350" in Table M corresponds to the view of the GUI 199 shown in FIG. 16B. For the implementation discussed with respect to FIG. 16B, the value in the Frame×Pixels/Frame column increases by 1.25 for each additional frame. The value in the Position of CPI or VOC column is three consecutive pixel column numbers with the greatest number based on the corresponding value in the Frame×Pixels/Frame column. A comparison of the data in Table L and Table M shows that fewer pixels (e.g., "875" pixels versus "438" pixels) are used to represent a width of three hundred fifty frames within the graph-axis control 218 via the graph-axis control segment 220. The column for graph-axis control segment 220 indicates the pixel column numbers that would be used to represent the graph-axis control segment 220 if the initial buffer segment includes eight hundred frames. Likewise, the column for graph-axis control segment 221 indicates the pixel column number that would be used to represent the graph-axis control segment 221 if the initial buffer segment includes eight hundred frames.

The processor 15 can use the data in Table M or its determinations indicative of that data to know where to display the cursor position indicator 222 and VOC indicators at and/or along the graph-axis control 218. For example, if the VOC indicator 225 is displayed in response to a PID parameter written in the buffer 33 for the frame "71" and the VOC indicator 226 is displayed in response to PID parameter written in the buffer 33 for the frame "72," data in the position of CPI or VOC column for the frame "72" and the frame "73" indicates which pixel column numbers (e.g., pixel columns at and/or along the graph-axis control 218) are to contain the VOC indicator 225, 226.

TABLE M

| Frame | Frame × Pixels/Frame | Position of CPI 222 or VOC (Pixel column nos.) | GACS 219 (Pixel column nos.) | GACS 220 (Pixel column nos.) | GACS 221 (Pixel column nos.) |
|---|---|---|---|---|---|
| 1 | 1.25 | 1-3 | None | 1-3 | 4-1000 |
| 2 | 2.5 | 1-3 | None | 1-3 | 4-1000 |
| 3 | 3.75 | 2-4 | None | 1-4 | 5-1000 |
| 4 | 5 | 3-5 | None | 1-5 | 6-1000 |
| 5 | 6.25 | 4-6 | None | 1-6 | 7-1000 |
| 6 | 7.5 | 6-8 | None | 1-8 | 9-1000 |
| 7 | 8.75 | 7-9 | None | 1-9 | 10-1000 |
| 8 | 10 | 8-10 | None | 1-10 | 11-1000 |
| 9 | 11.25 | 9-11 | None | 1-11 | 12-1000 |

TABLE M-continued

| Frame | Frame × Pixels/Frame | Position of CPI 222 or VOC (Pixel column nos.) | GACS 219 (Pixel column nos.) | GACS 220 (Pixel column nos.) | GACS 221 (Pixel column nos.) |
|---|---|---|---|---|---|
| 10 | 12.5 | 11-13 | None | 1-13 | 14-1000 |
| 11 | 13.75 | 12-14 | None | 1-14 | 15-1000 |
| 12 | 15 | 13-15 | None | 1-15 | 16-1000 |
| 13 | 16.25 | 14-16 | None | 1-16 | 17-1000 |
| 14 | 17.5 | 16-18 | None | 1-18 | 19-1000 |
| 15-297 | *** | *** | *** | *** | *** |
| 70 | 87.5 | 86-88 | None | 1-88 | 89-1000 |
| 71 | 88.75 | 87-89 | None | 1-89 | 90-1000 |
| 72 | 90 | 88-90 | None | 1-90 | 91-1000 |
| 73-92 | *** | *** | *** | *** | *** |
| 93 | 116.25 | 114-116 | None | 1-116 | 117-1000 |
| 94 | 117.5 | 116-118 | None | 1-118 | 119-1000 |
| 95 | 118.75 | 117-119 | None | 1-119 | 120-1000 |
| 96-168 | *** | *** | *** | *** | *** |
| 169 | 211.25 | 209-211 | None | 1-211 | 212-1000 |
| 170 | 212.5 | 211-213 | None | 1-213 | 214-1000 |
| 171 | 213.75 | 212-214 | None | 1-214 | 215-1000 |
| 172-180 | *** | *** | *** | *** | *** |
| 181 | 226.25 | 224-226 | None | 1-226 | 227-1000 |
| 182 | 227.5 | 226-228 | None | 1-228 | 229-1000 |
| 183 | 228.75 | 227-229 | None | 1-229 | 230-1000 |
| 184-242 | *** | *** | *** | *** | *** |
| 243 | 303.75 | 302-304 | None | 1-304 | 305-1000 |
| 244 | 305 | 303-305 | None | 1-305 | 306-1000 |
| 245 | 306.25 | 304-306 | None | 1-306 | 307-1000 |
| 246-347 | *** | *** | *** | *** | *** |
| 348 | 435 | 433-435 | None | 1-435 | 436-1000 |
| 349 | 436.25 | 434-436 | None | 1-436 | 437-1000 |
| 350 | 437.5 | 436-438 | None | 1-438 | 439-1000 |

Figure 16C:
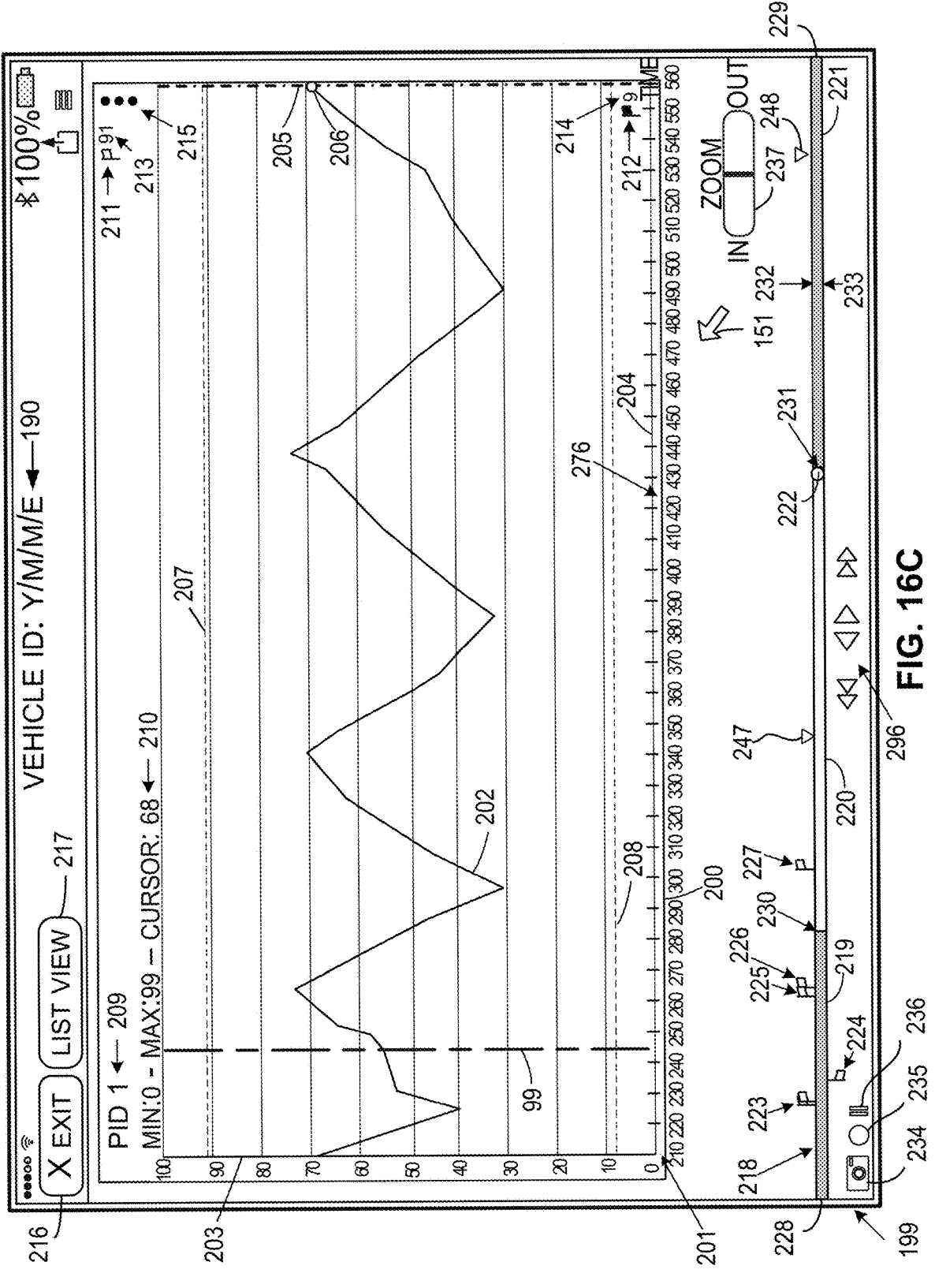

Next, FIG. 16C shows another alternative view of the GUI 199. In this view, the VDP graph 201 shows parameter values corresponding to the PID 209 (e.g., the PID "1") via the waveform 202. The graphical frame counter 276 in FIG. 16C shows numeric indicators "210" to "560" (incremented by ten). In this view, the graph-axis control 218 includes the graph-axis control segment 219, 220, 221, where the graph-axis control segment 219 corresponds to a frame "1" to a frame "209," the graph-axis control segment 220 corresponds to a frame "210" to a frame "560," and the graph-axis control segment 221 corresponds to a frame "561" to a frame "800." Additionally, in this view, the cursor 205 and the cursor position indicator 222 correspond to the frame "560." The parameter value corresponding to the cursor point 206 as shown in the PID parameter values 210 is "68."

The cursor position indicator 222 is positioned between the buffer point 247 and the buffer point 248. As an example, considering FIG. 16B and FIG. 16C, the processor 15 can reposition the cursor position indicator 222 to its position shown in FIG. 16C in response to a frame "301" to a frame "560" being written into the buffer 33.

In FIG. 16A, FIG. 16B, and FIG. 16C, the buffer point 248 is located at a common position at and/or along the graph-axis control 218. With the graph-axis control segment 221 in FIG. 16C representing the frame "561" to the frame "800," the buffer point 248 corresponds to a point between the frame "561" and the frame "800," such as the frame "700."

Since the graphical frame counter 276 starts at the numeric indicator "210," the VOC indicators corresponding to a frame numbered less than "210" (e.g., the VOC indicator 223, 224, 225, 226) is not shown in the VDP graph 201. The VOC indicator 223 is a partially stacked VOC indicator. The VOC indicator 226 partially overlaps the VOC indicator 225. The VOC indicator 224, 227 is not stacked upon another VOC indicator. The VDP graph 201 includes the cursor 99 that corresponds to the VOC indicator 227. The VOC indicator 223, 224, 225, 226 are at and/or along the graph-axis control segment 219. Since data corresponding to frames represented by the graph-axis control segment 219 are not represented by the waveform 202, a cursor corresponding to the VOC indicator 223, 224, 225, 226 is not shown in the VDP graph 201. Other aspects shown in FIG. 16C are aspects described with respect to other drawings including the same aspects with a common reference number.

Table N includes data based on example determinations made by the processor 15 to display the graph-axis control 218 representing a width of eight hundred frames and with respect to FIG. 16C. Table N includes data corresponding to the frame "300" to the frame "700" based on the graph-axis control 218 representing a width of eight hundred frames. In other words, the data in Table N represents a continuation of the data in Table M (e.g., data for frames occurring after frame "300." The data for frame "560" in Table M corresponds to the view of the GUI 199 shown in FIG. 16C. For the implementation discussed with respect to FIG. 16C, the value in the Frame×Pixels/Frame column increases by 1.25 for each additional frame. The value in the Position of CPI or VOC column is three consecutive pixel column numbers with the greatest number based on the corresponding value in the Frame×Pixels/Frame column.

The processor 15 can use the data in Table N or its determinations indicative of that data to know where to display the cursor position indicator 222 at and/or along the graph-axis control 218 and the data in Table M or its determinations indicative of that data to know where to display VOC indicators shown in FIG. 16B at and/or along the graph-axis control 218. For example, if the VOC indicator 227 is displayed in response to a PID parameter written in the buffer 33 for the frame "244," data in the position of CPI or VOC column for the frame "144" in Table M indicates which pixel column numbers (e.g., pixel columns at and/or along the graph-axis control 218) are to contain the VOC indicator 227.

TABLE N

| Frame | Frame × Pixels/Frame | Position of CPI 222 or VOC (Pixel column nos.) | GACS 219 (Pixel column nos.) | GACS 220 (Pixel column nos.) | GACS 221 (Pixel column nos.) |
|---|---|---|---|---|---|
| 300 | 375 | 373-375 | None | 1-375 | 376-1000 |
| 301 | 376.25 | 374-376 | None | 1-376 | 377-1000 |
| 302 | 377.5 | 376-378 | None | 1-378 | 379-1000 |
| 303 | 378.75 | 377-379 | None | 1-379 | 380-1000 |
| 304 | 380 | 378-380 | None | 1-380 | 381-1000 |
| 305 | 381.25 | 379-381 | None | 1-381 | 382-1000 |
| 306 | 382.5 | 380-382 | None | 1-382 | 383-1000 |
| 307 | 383.75 | 382-384 | None | 1-384 | 385-1000 |
| 308 | 385 | 383-385 | None | 1-385 | 386-1000 |
| 309 | 386.25 | 384-386 | None | 1-386 | 387-1000 |
| 310 | 387.5 | 386-388 | None | 1-388 | 389-1000 |
| 311 | 388.75 | 387-389 | None | 1-389 | 390-1000 |
| 312 | 390 | 388-390 | None | 1-390 | 391-1000 |
| 313 | 391.25 | 389-391 | None | 1-391 | 392-1000 |
| 314 | 392.5 | 391-393 | None | 1-393 | 394-1000 |
| 315-348 | *** | *** | *** | *** | *** |
| 349 | 436.25 | 434-436 | None | 1-436 | 437-1000 |
| 350 | 437.5 | 436-438 | None | 1-438 | 439-1000 |
| 351 | 438.75 | 437-439 | 1 | 2-439 | 440-1000 |
| 352 | 440 | 438-440 | 1-3 | 4-440 | 441-1000 |
| 353 | 441.25 | 439-441 | 1-4 | 5-441 | 442-1000 |
| 354 | 442.5 | 441-443 | 1-5 | 6-443 | 444-1000 |
| 355 | 443.75 | 442-444 | 1-6 | 7-444 | 445-1000 |
| 356 | 445 | 443-445 | 1-8 | 9-445 | 446-1000 |
| 357-558 | *** | *** | *** | *** | *** |
| 559 | 698.75 | 697-699 | 1-261 | 262-699 | 700-1000 |
| 560 | 700 | 698-700 | 1-263 | 264-700 | 701-1000 |
| 561 | 701.25 | 699-701 | 1-264 | 265-701 | 702-1000 |
| 562-697 | *** | *** | *** | *** | *** |
| 698 | 872.5 | 871-873 | 1-435 | 436-873 | 874-1000 |
| 699 | 873.75 | 872-874 | 1-436 | 437-874 | 875-1000 |
| 700 | 875 | 873-875 | 1-438 | 439-875 | 876-1000 |

Figure 17A:
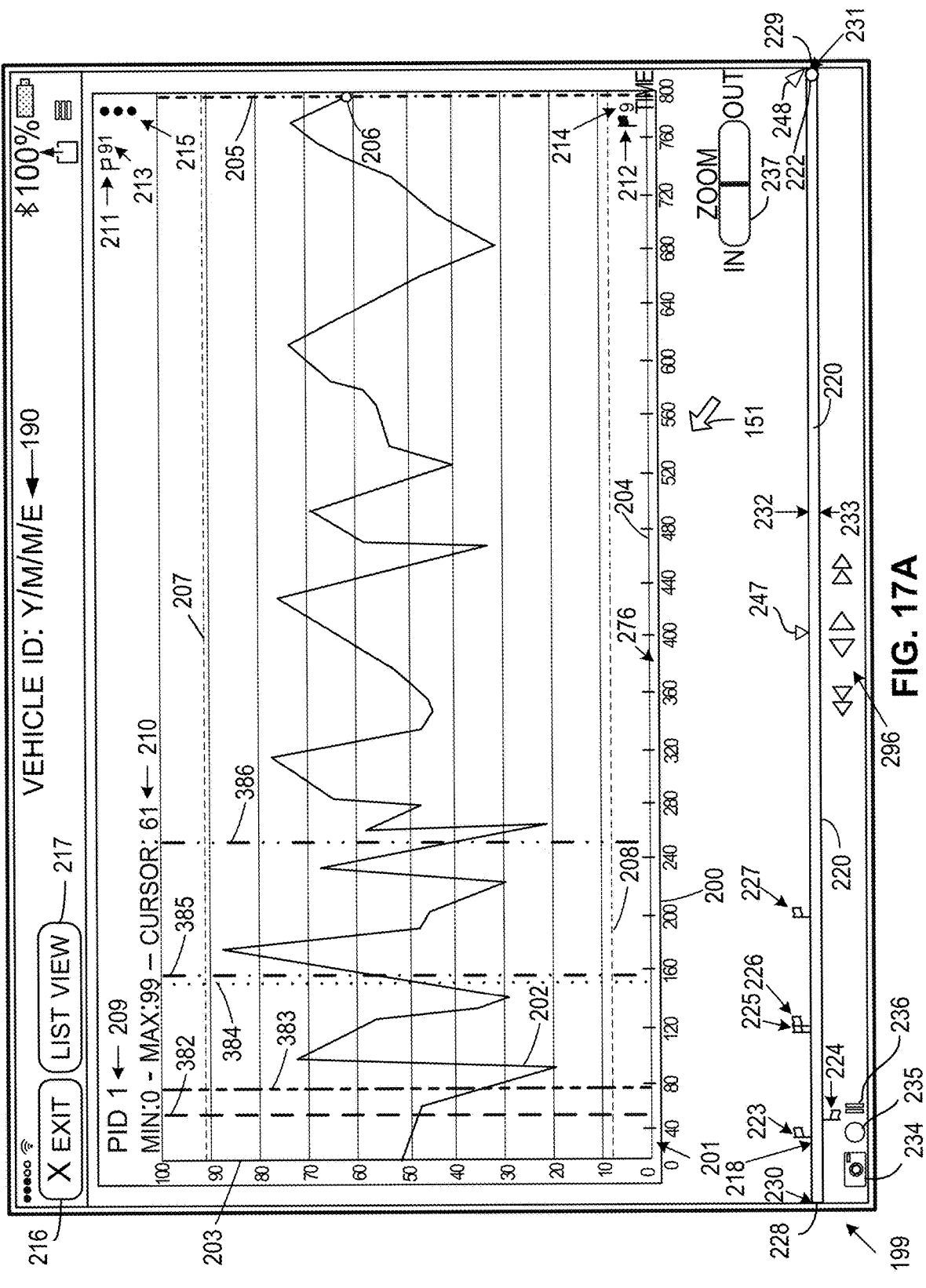

Next, FIG. 17A shows another alternative view of the GUI 199. In this view, the VDP graph 201 shows parameter values corresponding to the PID 209 (e.g., the PID "1") via the waveform 202. The graphical frame counter 276 in FIG. 17A shows numeric indicators "0" to "800" (incremented by forty). In this view, the graph-axis control 218 includes the graph-axis control segment 220, where the graph-axis control segment 220 corresponds to a frame "1" to a frame "800." In this view, the cursor 205 and the cursor position indicator 222 correspond to the frame "800." The parameter value corresponding to the cursor point 206 as shown in the PID parameter values 210 is "61." In the view of the GUI 199 shown in FIG. 17A, the buffer point 247 is positioned at the graph-axis control 218 and indicates where the cursor position indicator 222 will be repositioned in response to the processor 15 engaging another buffer segment, and the buffer point 248 is positioned at the graph-axis control 218 and a frame "800." The buffer point 247 is shown at a frame "400."

In accordance with the implementations in which a length (e.g., a width) of the graph-axis control 218 is one thousand pixels columns, each of eight hundred frames corresponds to a length of 1.25 pixel columns. The processor 15 rounds the number of pixel columns if a particular frame is represented by a number of pixel columns that includes a fractional amount.

Figure 40:
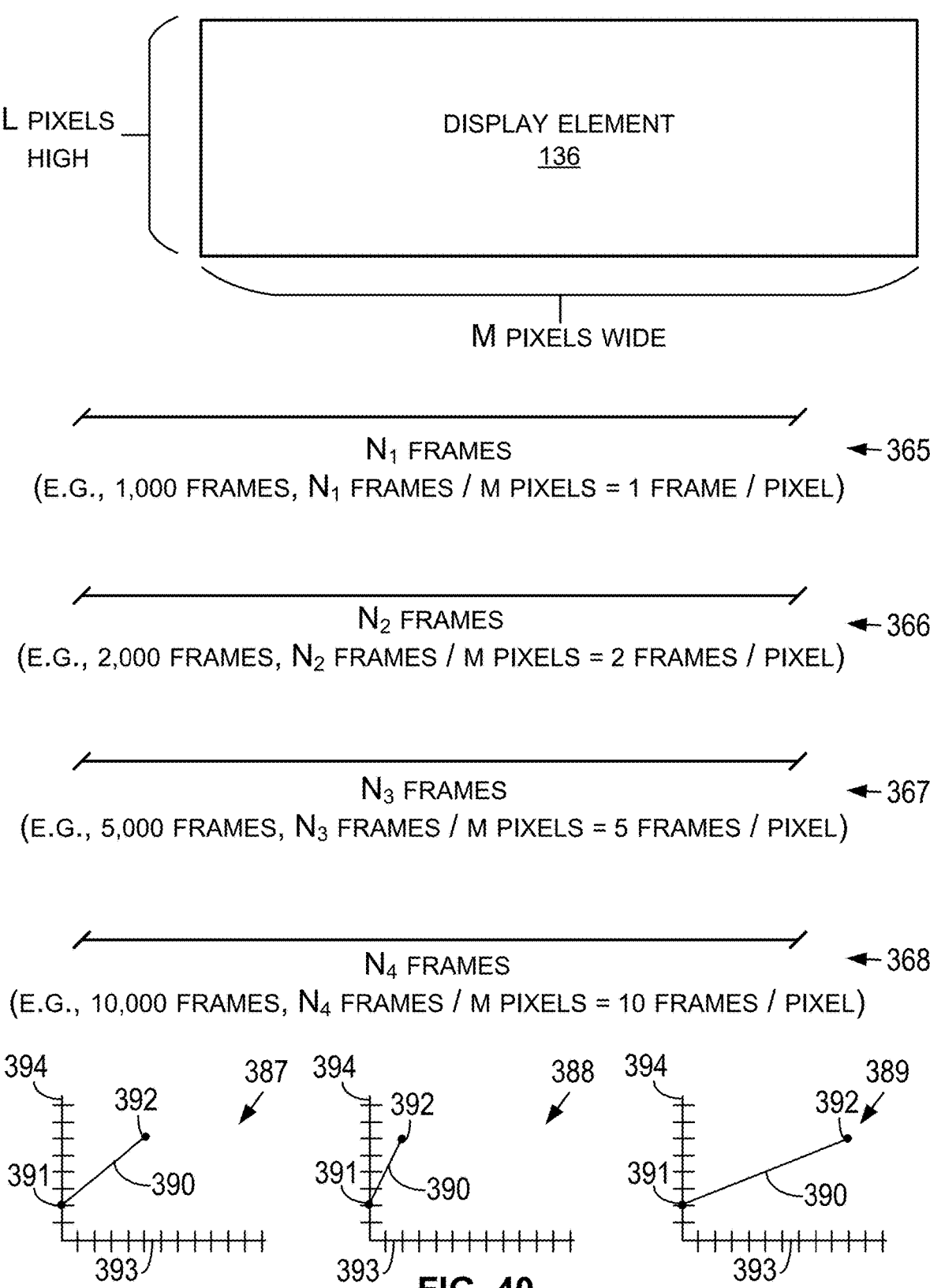
FIG. 40 shows a display and different frame-to-pixel resolutions corresponding to the display in accordance with the example implementations.

In a similar manner, a distance between two PID parameter values represented in the VDP graph can equal a number of pixel columns, and the number of pixel columns can be rounded if the number of pixel columns includes a fractional amount. As an example, the waveform 202 in FIG. 17A can extend across nine hundred pixel columns such that the distance between the graphed PID parameter values is 1.125 pixel columns (e.g., 900 pixel columns/800 frames). FIG. 40 illustrates an example of displaying a waveform using a number of pixel columns.

The VOC indicator 223, 224, 225, 226, 227 are displayed at the graph-axis control 218. The VOC indicator 226 is partially stacked upon the VOC indicator 225. The VDP graph 201 includes a cursor 382, 383, 384, 385, 386 that corresponds to the VOC indicator 223, 224, 225, 226, 227, respectively. Other aspects shown in FIG. 17A are aspects described with respect to other drawings including the same aspects with a common reference number. As discussed with respect to other drawings, the VOC indicator 223 can include a stacked VOC indicator.

The view of the GUI 199 shown in FIG. 17A can represent an occurrence of displaying a VDP graph and the graph-axis control 218 just prior to the processor 15 engaging another buffer segment into which additional PID and/or non-PID data can be written. Compared to FIG. 16A, FIG. 17A shows that different positions of buffer point 247, 248 are possible, and that different quantities of frames can be represented within the VDP graph 201 and the graphical frame counter 276.

Figure 17B:
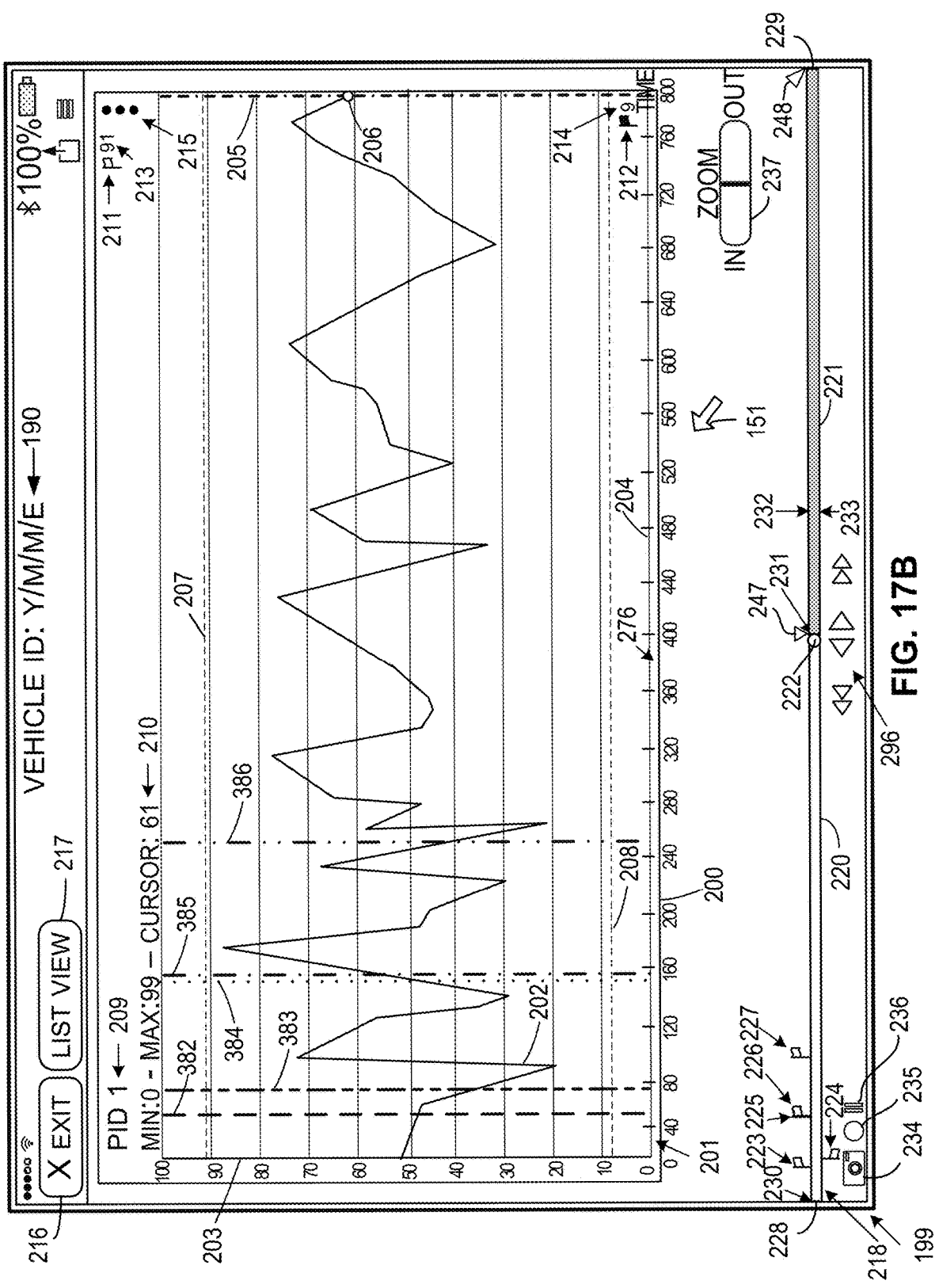

Next, FIG. 17B shows another alternative view of the GUI 199. In this view, the VDP graph 201 shows parameter values corresponding to the PID 209 (e.g., the PID "1") via the waveform 202. Like FIG. 17A, the graphical frame counter 276 in FIG. 17B shows numeric indicators "0" to "800." In this view, the graph-axis control 218 includes the graph-axis control segment 220, 221, where the graph-axis control segment 220 corresponds to a frame "1" to the frame "800," and the graph-axis control segment 221 corresponds to a frame "801" to a frame "1,600." In this view, the cursor 205 and the cursor position indicator 222 correspond to the frame "800." The parameter value corresponding to the cursor point 206 as shown in the PID parameter values 210 is "61."

The cursor position indicator 222 is positioned at the buffer point 247. Considering FIG. 17A and FIG. 17B, the processor 15 can reposition the cursor position indicator 222 to its position shown in FIG. 17B as the frame "800" is being written into the buffer 33, in response to the frame "800" being written into the buffer 33, or just before the frame "800" is written into the buffer 33. The cursor position indicator 222 can move towards the second end 229 after moving to its position shown in FIG. 17B as each additional frame is written into the buffer 33. The cursor 205 can move rightward and the waveform 202 can be extended as each additional frame is written into the buffer 33.

Comparing the waveform 202 shown in FIG. 17A and FIG. 17B, the waveform 202 is not compressed as the cursor position indicator 222 moves from the buffer point 248 to the buffer point 247. On the other hand, a positioning of the VOC indicator 223, 224 225, 226, 227 at and/or along the graph-axis control 218 is compressed. Due to the compression of the graph-axis control 218, distances between each of the VOC indicator 223, 224 225, 226, 227 and a different one of the VOC indicator 223, 224 225, 226, 227 is reduced. For example, the VOC indicator 226 is more fully stacked upon the VOC indicator 225.

The VDP graph 201 includes a cursor 382, 383, 384, 385, 386 that corresponds to the VOC indicator 223, 224, 225, 226, 227, respectively. Other aspects shown in FIG. 17B are aspects described with respect to other drawings including the same aspects with a common reference number.

Figure 17C:
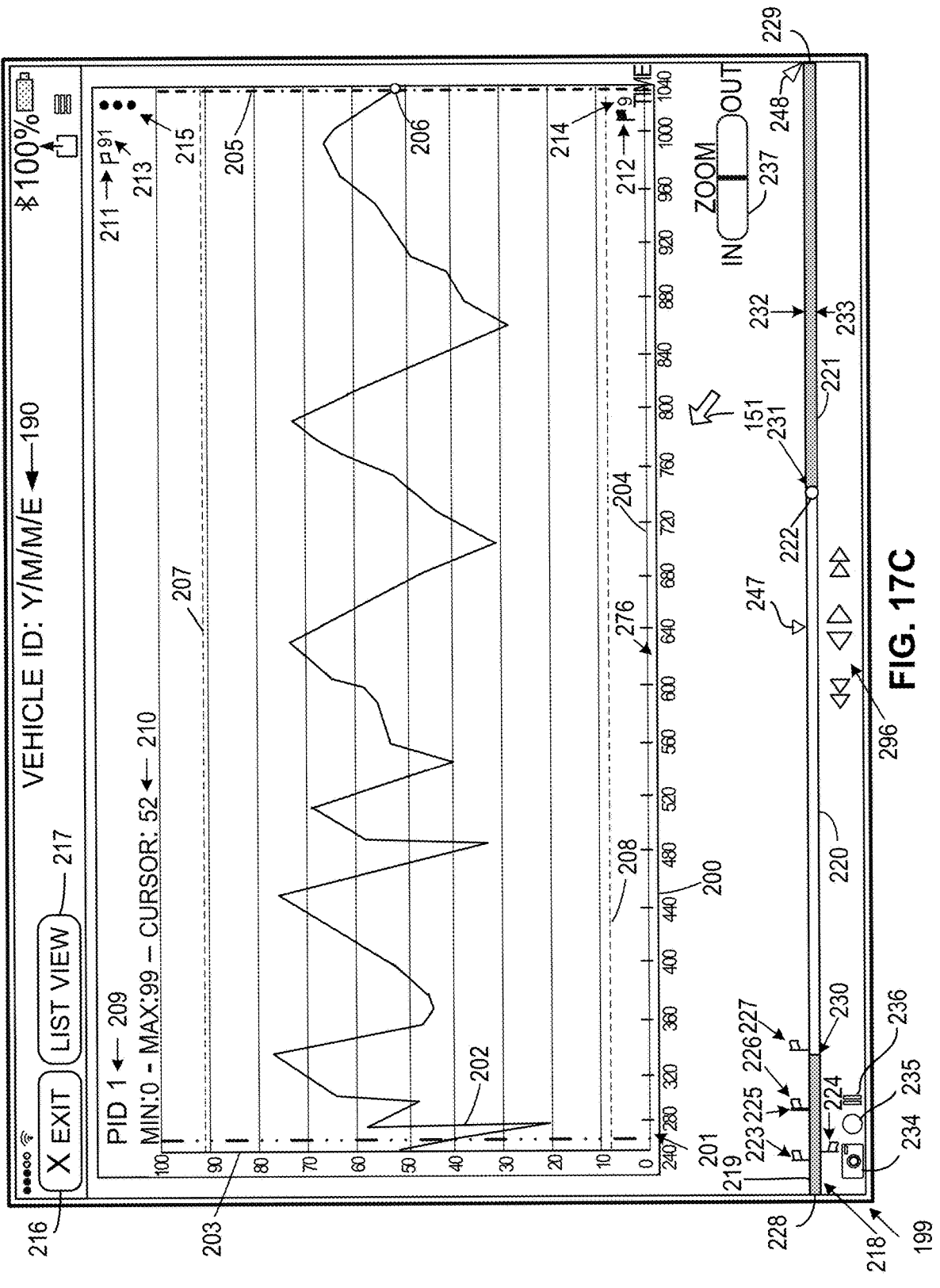

Next, FIG. 17C shows another alternative view of the GUI 199. In this view, the VDP graph 201 shows parameter values corresponding to the PID 209 (e.g., the PID "1") via the waveform 202. The graphical frame counter 276 in FIG. 17C shows numeric indicators "240" to "1040" (incremented by forty). In this view, the graph-axis control 218 includes the graph-axis control segment 219, 220, 221, where the graph-axis control segment 219 corresponds to a frame "1" to a frame "239," the graph-axis control segment 220 corresponds to a frame "240" to a frame "1040," and the graph-axis control segment 221 corresponds to a frame "1,041" to a frame "1,600." Additionally, in this view, the cursor 205 and the cursor position indicator 222 correspond to the frame "1,040." The parameter value corresponding to the cursor point 206 as shown in the PID parameter values 210 is "52."

The cursor position indicator 222 is positioned between the buffer point 247 and the buffer point 248. As an example, considering FIG. 17B and FIG. 17C, the processor 15 can reposition the cursor position indicator 222 to its position shown in FIG. 17C in response to a frame "801" to the frame "1,040" being written into the buffer 33.

The VDP graph 201 includes the cursor 386 corresponding to the VOC indicator 227 as the VOC indicator 227 is at and/or on the graph-axis control segment 220. The VDP graph 201 in FIG. 17C does not include the cursor 382, 383, 384, 385 shown in FIG. 17B, because the VOC indicator 223, 224, 225, 226 are at and/or on the graph-axis control segment 219. Other aspects shown in FIG. 17C are aspects described with respect to other drawings including the same aspects with a common reference number.

Figure 18:
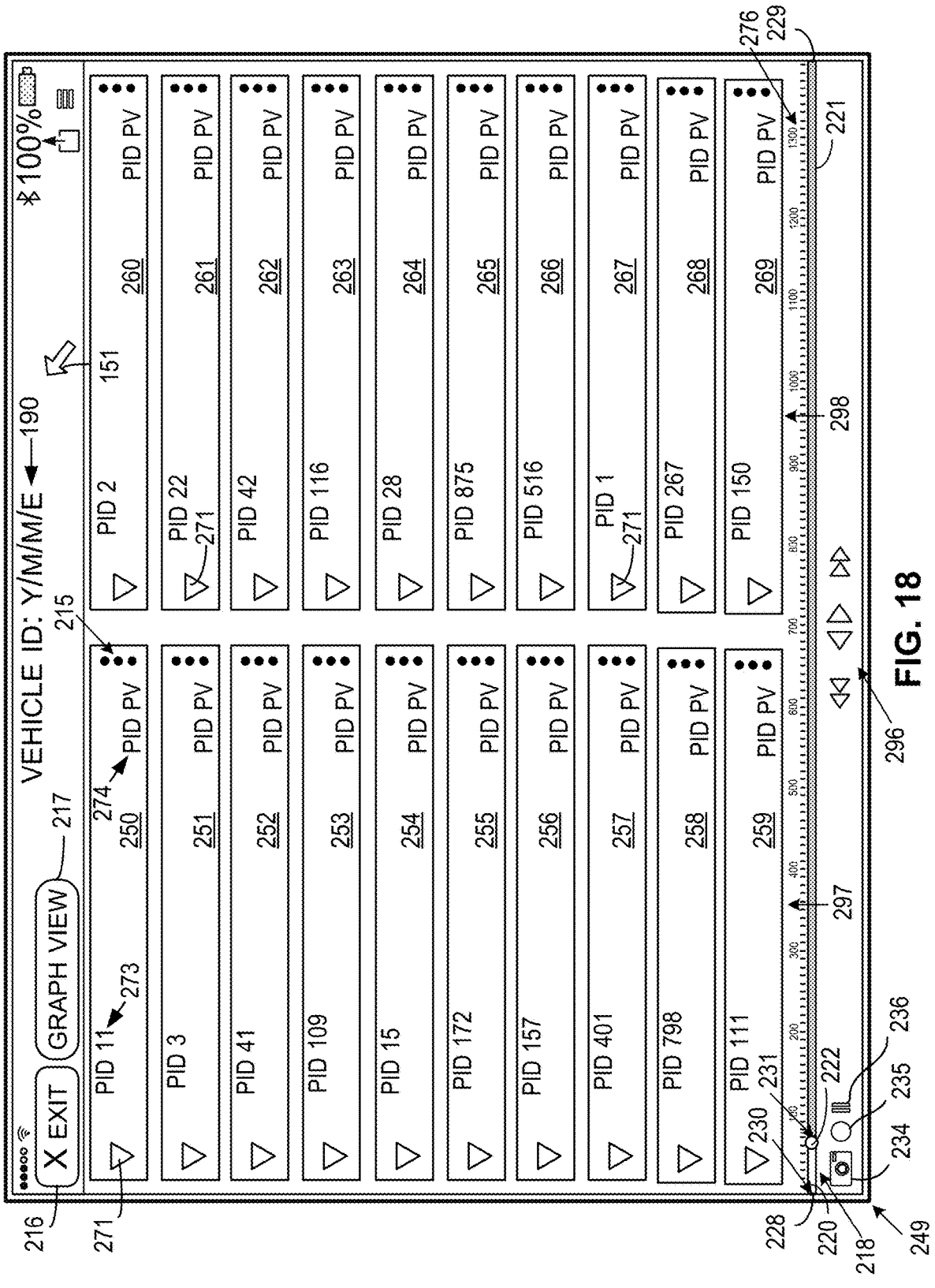

Next, FIG. 18 shows a GUI 249. The GUI 249 includes the display pointer 151, the vehicle identifier 190, the exit-view USC 216, the view-selection USC 217, the graph-axis control 218, and the USC 234, 235, 236. The view-selection USC 217 is selectable to cause the processor 15 to display a GUI in the graph mode instead of the list mode (shown in FIG. 18). In the view of the GUI 249 shown in FIG. 18, the graph-axis control 218 includes the graph-axis control segment 220, 221, and the divider 230 coincides with the first end 228 of the graph-axis control 218. The view of the GUI 249 shown in FIG. 18 does not include any VOC indicator along the graph-axis control 218.

The GUI 249 includes the graphical frame counter 276. The graphical frame counter 276 includes numerical and non-numerical indicators to represent, in connection with the cursor position indicator 222, a quantity of PID parameter values and/or frames that have been received by the computing system 5 while connected to the vehicle 4 during a current data collection session. In this implementation, a portion of the cursor position indicator 222 coincides with the divider 231. The GUI 249 includes the second end 229 of the graph-axis control 218 and the forward/reverse USC 296.

The GUI 249 includes a container 250, 251, 252, 253, 254, 255, 256, 257, 258, 259, 260, 261, 262, 263, 264, 265, 266, 267, 268, 269. Each of those containers includes a container resizer USC and an additional-features USC. Each container resizer USC in the 251, 252, 253, 254, 255, 256, 257, 258, 259, 260, 261, 262, 263, 264, 265, 266, 267, 268, 269 is represented like a container resizer USC 271 shown in the container 250. Some of those container resizer USCs are also identified as the container resizer USC 271. Similarly, each additional-features USC in the 251, 252, 253, 254, 255, 256, 257, 258, 259, 260, 261, 262, 263, 264, 265, 266, 267, 268, 269 is represented like an additional-features USC 215 shown in the container 250. Some of those additional-features USCs are also identified as the additional-features USC 215.

The container 250, 251, 252, 253, 254, 255, 256, 257, 258,259 is contained in a container column 297. The container 260, 261, 262, 263, 264, 265, 266, 267, 268, 269 is contained in a container column 298. The processor 15 can be configured to rearrange containers within a container column. In an alternative arrangement, a GUI can include containers arranged in rows (e.g., a container row) and the processor 15 can be configured to rearrange containers within a container row. A GUI in accordance with the example implementations can include containers in one or multiple container columns. The multiple container columns can include more than two container columns (as shown in FIG. 18).

Figure 20:
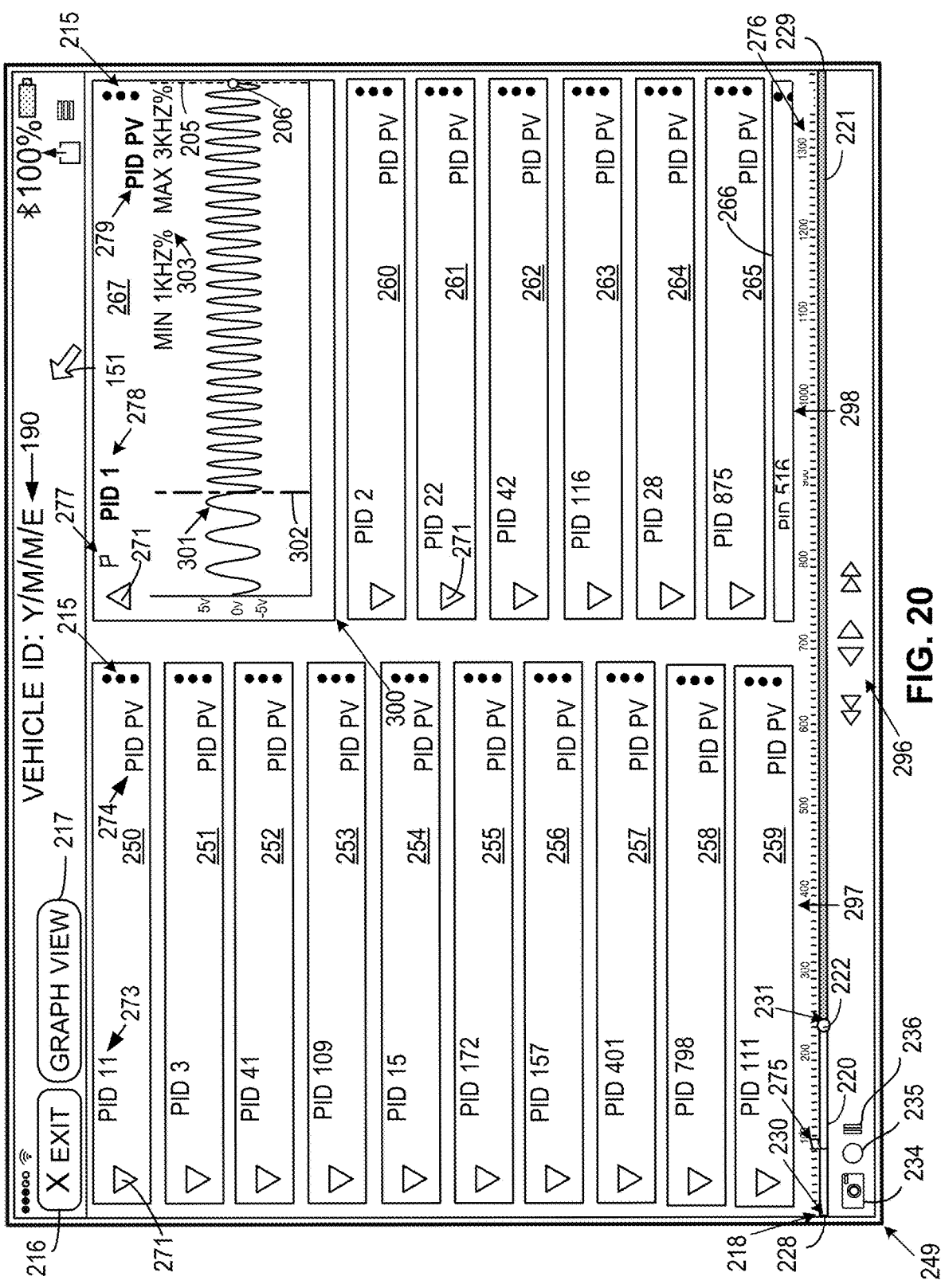

A container resizer USC within a GUI is selectable to cause the processor 15 to change a size of the container corresponding to the selected container resizer USC. As an example, in response to selecting the container resizer USC 271, the processor 15 can increase a size of the container 250. In other words, the processor 15 can change a size of a container from an unexpanded state to an expanded state. FIG. 20 shows an example in which the processor 15 has expanded the size of the container 267. In one respect, the processor 15 can expand the size of the container 267 in response to determining the container resizer USC 271 in the container 267 was selected. In response to selecting a container resizer USC while a container is an expanded state, the processor 15 can responsively display the container in an unexpanded state.

The container 251, 252, 253, 254, 255, 256, 257, 258, 259, 260, 261, 262, 263, 264, 265, 266, 267, 268, 269 includes a PID and a PID parameter value (shown as PID PV). The PID in the container 251, 252, 253, 254, 255, 256, 257, 258, 259, 260, 261, 262, 263, 264, 265, 266, 267, 268, 269 is represented like the PID 273 (e.g., PID "11") except that the PID shown in those other containers is a different number (e.g., different PID). The PID in the containers can include a PID description. For example, referring to the PID description shown in Table A, the PID 273 shown in the container 250 can include the PID description "Intake air temperature." The PID parameter value in the container 251, 252, 253, 254, 255, 256, 257, 258, 259, 260, 261, 262, 263, 264, 265, 266, 267, 268, 269 is represented like the PID parameter value 274 shown in the container 250. A PID parameter value can include an alphanumeric parameter value. For example, an alphanumeric value can be arranged like 10.0 volts, 50 Hz, 75.3%, 31.7 kPa, on, off, high, medium, low or some other alphanumeric value.

As noted, the GUI 249 is shown in the list view. In at least some implementations, a GUI displaying PIDs in the list view includes displaying the PIDs in containers without any graphical representation of the PIDs. In at least some of those implementations, a container can be expanded to display a graphical representation of a PID.

Figure 19:
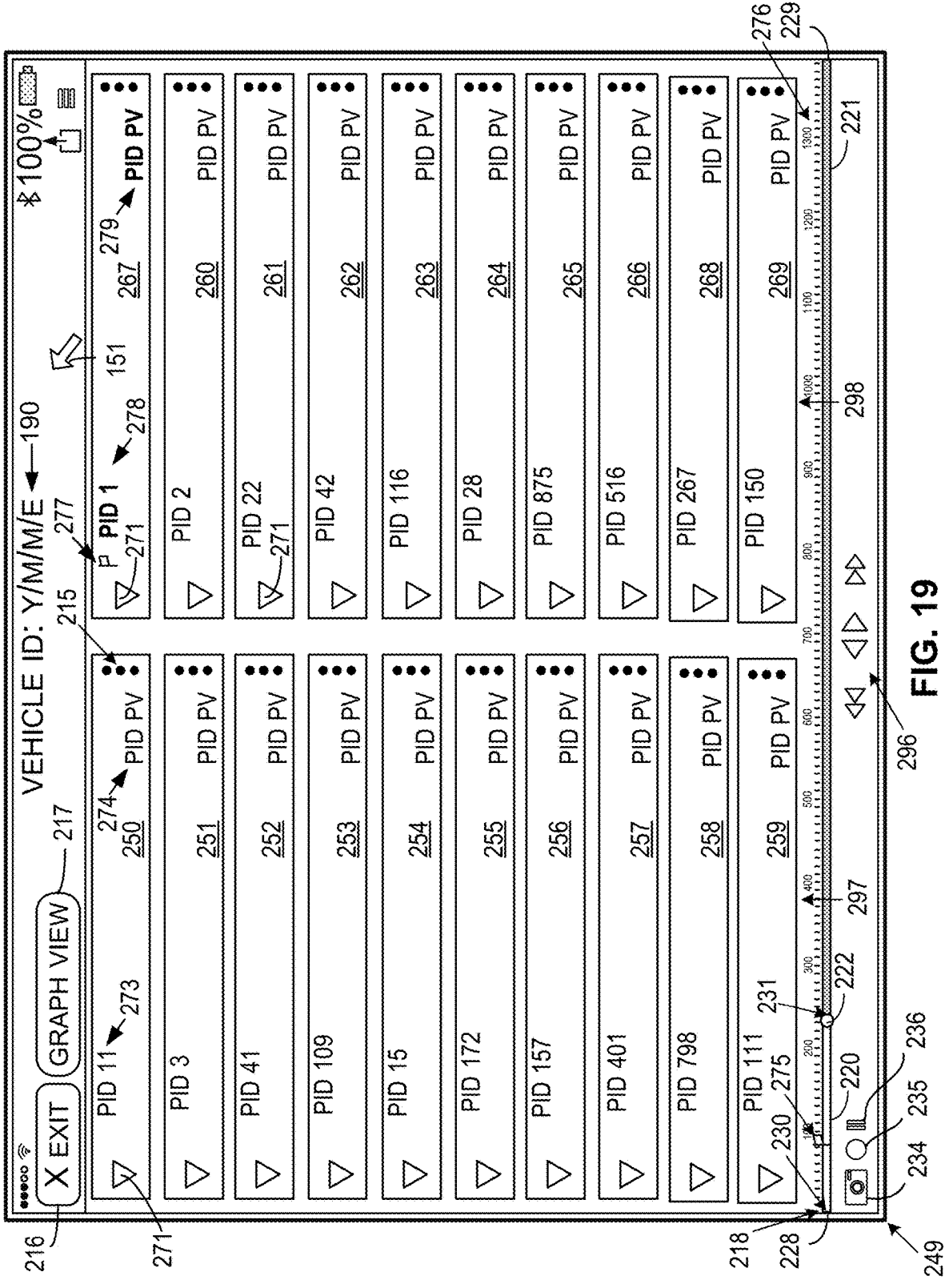

Next, FIG. 19 shows an alternative view of the GUI 249. In this view of the GUI 249, a horizontal length of the graph-axis control segment 220 is greater than a horizontal length of the graph-axis control segment 220 as shown in FIG. 18. Accordingly, the view of the GUI 249 in FIG. 19 compared to the view shown in FIG. 18 represents that more PID parameter values have been received and/or frames have been stored in the memory 17 (e.g., the buffer 33). In other words, the cursor position indicator 222 is positioned along the graph-axis control 218 between the "230" and "240" numerical indicators of the graphical frame counter 276 as compared to between the "60" and "70" numerical indicators of the graphical frame counter 276.

The view of the GUI 249 shown in FIG. 19 includes a VOC indicator 275. A portion of the VOC indicator 275 is positioned on the graph-axis control 218 and another portion of the VOC indicator 275 is positioned on the graphical frame counter 276. In other implementations, a VOC indicator can be positioned in other positions relative to the graph-axis control 218. For example, a VOC indicator can be positioned entirely within the graph-axis control 218, entirely within the graphical frame counter 276 or adjacent one or more of the graph-axis control 218 or the graphical frame counter 276, such as below the graph-axis control 218, above the graphical frame counter 276, or between the graph-axis control 218 and the graphical frame counter 276.

As a result of the processor 15 determining a vehicle operating condition corresponding to the VOC indicator 275, the processor 15 can rearrange the containers shown in the GUI 249. Rearranging the containers can result in displaying the container(s) corresponding to a VOC indicator at a particular portion of a GUI, such as a position in which those container(s) corresponding to a VOC indicator are the top-most displayed container(s). As shown in FIG. 19 (compared to FIG. 18), the container 267 was moved to be a top-most container within the container column 298, and the processor 15 moved the container 260 to the container 266 downward within the container column 298 between the new position of the container 267 and original position of the container 268. In at least some implementations in which a GUI includes multiple columns of containers and containers in those columns of containers can correspond to a VOC indicator, rearrangement of the containers within the multiple columns is limited to rearranging the containers within the column in which the containers are contained. In other implementations, rearrangement of the containers within the multiple columns of containers can include moving a container from a first column to a second column of containers. As an example, the processor 15 can move containers between columns of containers so that each column of containers includes the same number of containers corresponding to a VOC indicator or so that none of the multiple containers includes no more than one more container corresponding to a VOC indicator than the other columns of containers.

Additionally or alternatively, as a result of the processor 15 determining a vehicle operating condition corresponding to a PID, a GUI can include a VOC indicator within a container corresponding to the PID and can highlight a PID and/or PID parameter value within the container. As shown in FIG. 19, the container 267 includes: a VOC indicator 277, a PID 278 in a highlighted state (as compared to how PIDs are displayed in other containers shown in FIG. 19), and a PID parameter value 279 in a highlighted state (as compared to how PID parameter values are displayed in other containers shown in FIG. 19).

Next, FIG. 20 shows another alternative view of the GUI 249. In this view of the GUI 249, a horizontal length of the graph-axis control segment 220 is greater than a horizontal length of the graph-axis control segment 220 as shown in FIG. 18, but is identical to the horizontal length of the graph-axis control segment 220 shown in FIG. 19. In other words, the cursor position indicator 222 in FIG. 20 is positioned along the graph-axis control 218 between the "230" and "240" numerical indicators of the graphical frame counter 276.

A difference between FIG. 19 and FIG. 20 is that the container 267 is shown in an unexpanded state in FIG. 19 and in an expanded state in FIG. 20. In at least some implementations, the container 267 can be shown in the expanded state in response to a selection of the container resizer USC 271 in the container 267 as shown in FIG. 19. In at least some implementations, the container 267 can be shown in the expanded state as shown in FIG. 20 in response to the processor 15 detecting the vehicle operating condition that corresponds to the VOC indicator 275. In at least some implementations, the container 267 can be shown in the expanded state as shown in FIG. 20 in response to the processor 15 detecting a selection from the additional-features USC 272 within the container 267.

In order to expand a size of the container 267, the processor 15 rearranges other containers within the container column 298. As shown in FIG. 20 as compared to FIG. 19, the container 260 to the container 266 are moved downward to accommodate the expanded state of the container 267. Additionally, in order to accommodate the expanded state of the container 267, the container 266, 268, 269 are removed from the display 40. Selecting the container resizer USC 271 in the container 267 while in the expanded state, can cause the container 267 to be displayed in the unexpanded state, the container 260 to the container 266 to be moved upwards and the container 266, 268, 269 to be added back onto the display 40 (as shown in FIG. 19).

As shown in FIG. 20, the container 267 includes a VDP graph 300 when the container 267 is displayed in the expanded state. In other words, the container 267 shown in FIG. 20 is displayed in a graph view, but since at least one other container is still in its unexpanded state, the GUI 249 is still in a list view mode. The VDP graph 300 includes a waveform 301 representing values of the parameter values corresponding to the PID 278 (e.g., PID "1"). The VDP graph 300 also includes a cursor 302 corresponding to the VOC indicator 275. The cursor 205 within the VDP graph 300 corresponds to a position of the cursor position indicator 222 within the graph-axis control segment 220. The cursor point 206 on the waveform 202 corresponds to the PID parameter value 279 for the PID 278. The container 267 and/or the VDP graph 300 includes PID parameter values 303 that indicate a minimum and maximum parameter values received during a current data collection session for the vehicle 4.

Figure 21:
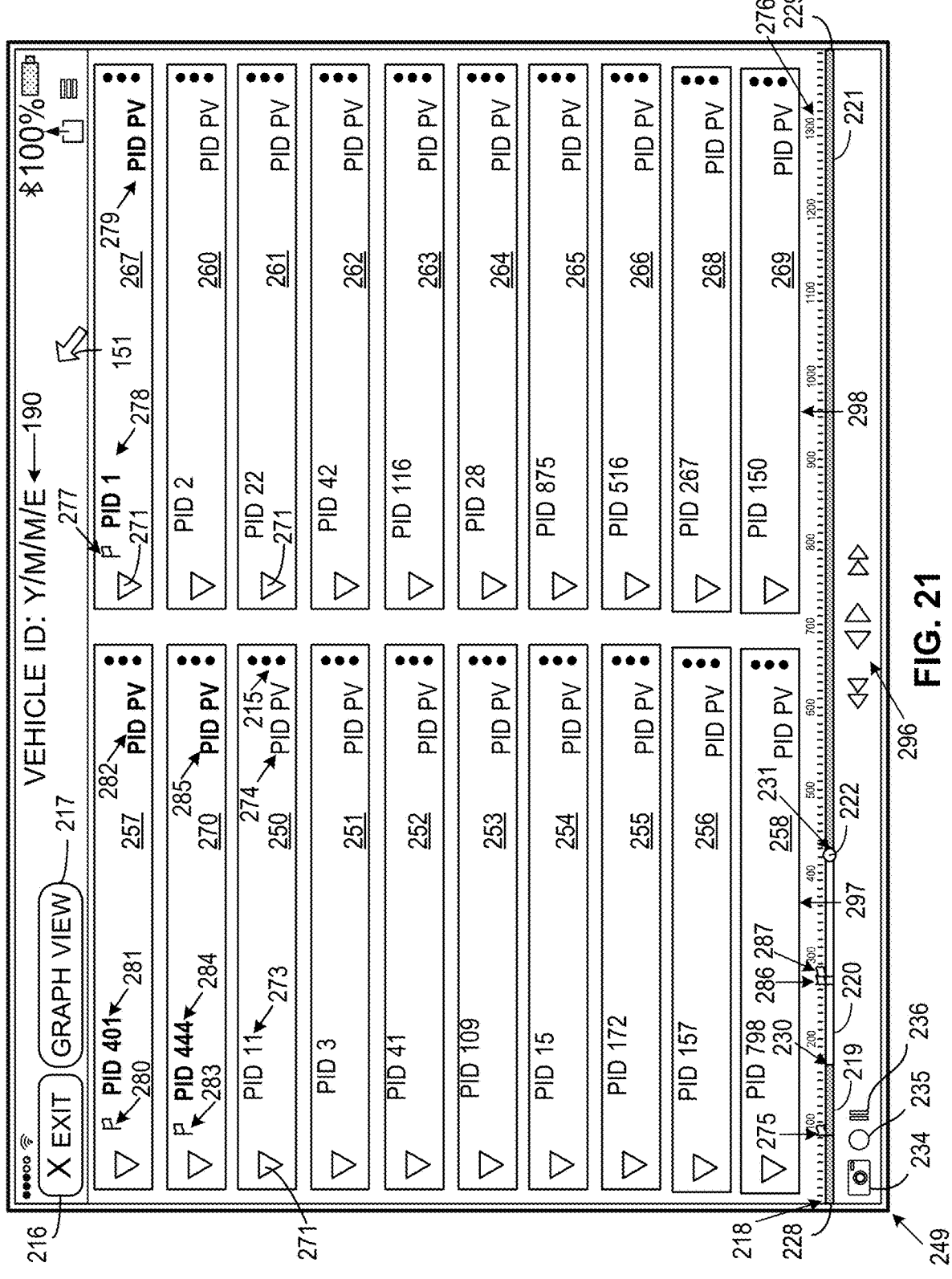

Next, FIG. 21 shows another alternative view of the GUI 249. In this view of the GUI 249 (as compared to the views shown in FIG. 18 to FIG. 20), a position of the graph-axis control segment 220 is positioned at a location further away from the first end 228 and closer to the second end 229. Additionally, the VOC indicator 275 continues to be displayed at the graph-axis control 218, but the VOC indicator 275 is now in the graph-axis control segment 219. Even more, a VOC indicator 286, 287 is displayed at the graph-axis control segment 220 in FIG. 21. As noted, the VOC indicator 275 corresponds to the PID 278 (e.g., PID "1") contained in the container 267. A portion of the VOC indicator 287 is stacked upon a portion of the VOC indicator 286. The VOC indicator 286 and the VOC indicator 287 are stacked VOC indicators. In FIG. 21, the cursor position indicator 222 is along the graph-axis control 218 between the "430" and "440" numerical indicators of the graphical frame counter 276.

The VOC indicator 286 corresponds to a PID 281 (e.g., a PID "401") contained in the container 257. The GUI 249 can begin displaying the VOC indicator 286 in response to the processor 15 determining an operating condition corresponding to the PID "401." In response to that determination, the processor 15 can rearrange the containers in the container column 297 so that the container 257 is located at a top of the container column 297 instead of being between the container 256 and the container 258 as shown in FIG. 18. The processor 15 can highlight the PID 281 and a PID parameter value 282 within the container 257, and add a VOC indicator 280 within the container 257.

The VOC indicator 287 corresponds to a PID 284 (e.g., a PID "444") contained in a container 270. The GUI 249 can begin displaying the VOC indicator 287 in response to the processor 15 determining an operating condition corresponding to the PID 284. The container 270 can be un-displayed within the GUI 249 before the processor 15 determines the operating condition corresponding to the PID 284. In response to that determination, the processor 15 can rearrange the containers in the container column 297 so that the container 270 is located below the container 257 at the top of the container column 297 and the container 250. The processor 15 can highlight the PID 284 and a PID parameter value 285 within the container 270, and add a VOC indicator 283 within the container 270. In response to displaying the container 270 within the container column 297, the container 259 can become an un-displayed container. One or more un-displayed containers can correspond to a container column or container row. In other words, each container column or container row can correspond to one or more un-displayed containers. The containers (within a container column) that correspond to a VOC indicator are rearranged from a top side of the container column 297 in an order in which the vehicle operating conditions are detected. In an alternative arrangement, each time a new VOC is determined, a container corresponding to a previously-detected VOC is moved downward and the container corresponding to the most-recently determined VOC is repositioned to the top of the container column 297.

Figure 22:
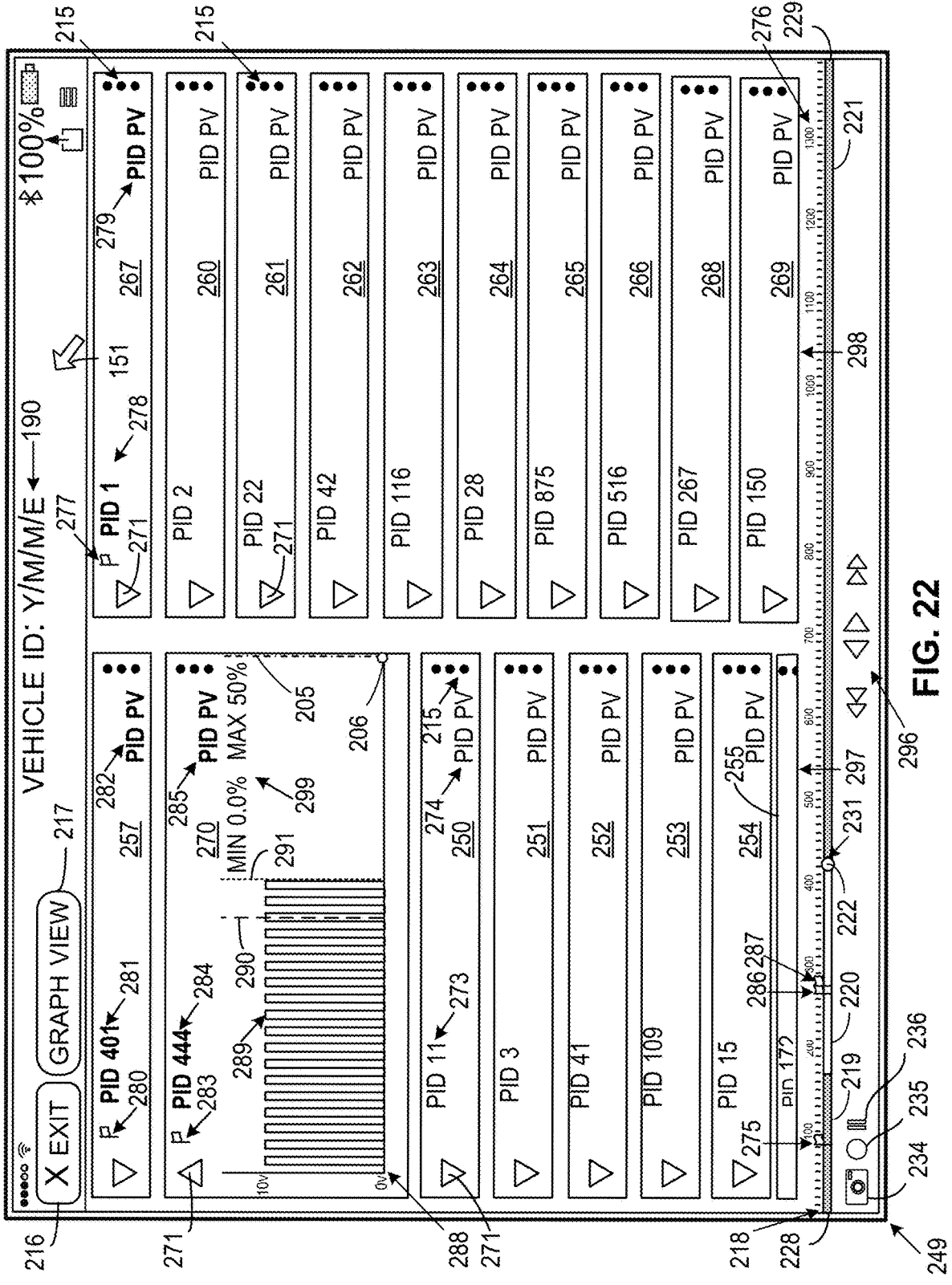

Next, FIG. 22 shows yet another alternative view of the GUI 249. In this view of the GUI 249, a position of the graph-axis control segment 220 is positioned at the same position as shown in FIG. 21. The VOC indicator 275, 286, 287 is displayed in FIG. 22. The container 270 in FIG. 22 is displayed in an expanded state as compared to the container 270 being displayed in an unexpanded state as shown in FIG. 21. In other words, the container 270 shown in FIG. 22 is displayed in a graph view (as the container 270 is displaying a VDP graph) and the container 270 shown in FIG. 21 is displayed in a list view (as the container 270 is not displaying a VDP graph).

In at least some implementations, the view of the GUI 249 shown in FIG. 22 can be displayed in response to the processor 15 determining the container resizer USC 271 in the container 270 has been selected. In those or in other implementations, the view of the GUI 249 shown in FIG. 22 can be displayed in response to the processor 15 determining the operating condition corresponding to the PID 284. In other words, in response to the processor 15 determining an operating condition corresponding to a PID, the processor 15 can begin displaying a container corresponding to that PID with a graph of parameter values corresponding to that PID.

In response to expanding a size of the container 270, the processor 15 can rearrange the container column 297 by moving the container 250, 251, 252, 253, 254, 255 below a lowest portion of the container 270. Due to a size of the GUI 249 and/or the display 40, only a portion of the container 255 is seen within the view of the GUI 249 shown in FIG. 22. Additionally, the container 256, 258 becomes an un-displayed container.

In the expanded state, the container 270 includes a VDP graph 288 and the minimum and maximum parameter values 299 received for the PID 284 during a current data collection session for the vehicle 4. The VDP graph 288 includes a waveform 289, the cursor 205, the cursor point 206, and a cursor 290, 291. The cursor 205 corresponds to a position of the cursor position indicator 222 within the graph-axis control segment 220 (e.g., at a right-most position (as shown in FIG. 22), a mid-point, a left-most position, a point between the left-most point and the mid-point, or a point between the mid-point and the right-most point.

The cursor 290 corresponds to the PID 281 and the VOC indicator 286. The cursor 291 corresponds to the PID 284 and the VOC indicator 287. The cursor 291 is positioned at a point of the waveform 289 at which the periodic nature of the waveform 289 that varies between 0 and 10 volts stops and remains constant at 0 volts. That circumstance can coincide with the processor 15 determining the frequency of the waveform 289 has gone below a minimum threshold corresponding to the PID 284.

In at least some implementations, in which a VDP graph includes multiple cursors corresponding to a respective VOC indicator, each cursor can have different characteristics to distinguish the cursors from each other. FIG. 22 represents the different characteristics using different types of dashed lines. In at least some implementations, the different characteristics can include different colors. In at least some of those implementations, each VOC indicator and corresponding cursor pair can be displayed using a different respective color. As an example, the VOC indicator 286 and the cursor 290 can be colored blue and the VOC indicator 287 and the cursor 291 can be colored red.

Next, FIG. 23 shows yet another alternative view of the GUI 249. In this view of the GUI 249, a horizontal length of the graph-axis control segment 220 is greater than a horizontal length of the graph-axis control segment 220 as shown in FIG. 18, but is identical to the horizontal length of the graph-axis control segment 220 shown in FIG. 20 and FIG. 21. In other words, the cursor position indicator 222 in FIG. 23 is positioned along the graph-axis control 218 between the "430" and "440" numerical indicators of the graphical frame counter 276 and a position of the graph-axis control segment 220 is positioned at the same position as shown in FIG. 21 and in FIG. 22. The VOC indicator 275, 286, 287 corresponding to the PID 278, 281, 284, respectively, is displayed in FIG. 23.

In the view of the GUI 249 shown in FIG. 23, the container 261, 267, 270 are in the expanded state (e.g., a graph view) and the remaining containers are in an unexpanded state (e.g., in a list view).

As shown in FIG. 23 as compared to FIG. 22, the container 267 further includes a VDP graph 300, and the container 261 further includes a VDP graph 294. The VDP graph 300 includes a waveform 301 representing parameter values corresponding to the PID 278. The VDP graph 294 includes a waveform 295 representing parameter values corresponding to a PID 304. The container 261, 267 include minimum and maximum parameter values 306, 194 received for the PID 304, 278, respectively, during a current data collection session for the vehicle 4. The container 261 and/or the VDP graph 294 includes a PID parameter value 305 corresponding to the PID 304.

The VDP graph 288, 294, 300 shown in FIG. 23 also includes the cursor 205, the cursor point 206, and the cursor 290, 291. The cursor 205 in the VDP graph 288, 294, 300 corresponds to a position of the cursor position indicator 222 within the graph-axis control segment 220. The cursor 290 in the VDP graph 288, 294, 300 corresponds to the PID 281 and the VOC indicator 286. The cursor 291 in the VDP graph 288, 294, 300 corresponds to the PID 284 and the VOC indicator 287.

As an example, the view of the GUI 249 shown in FIG. 23 can be displayed in response to the processor 15 determining the container resizer USC 271 in the container 261 from the GUI 249 as shown in FIG. 22 is selected and afterwards that the container resizer USC 271 in the container 267 is selected. As another example, the view of the GUI 249 shown in FIG. 23 can be displayed in response to the processor 15 determining the container resizer USC 271 in the container 267 from the GUI 249 as shown in FIG. 22 is selected and afterwards that the container resizer USC 271 in the container 261 is selected.

As another example, the view of the GUI 249 shown in FIG. 23 can be displayed in response to the processor 15 determining the container resizer USC 271 in the container 261 from the GUI 249 as shown in FIG. 21 is selected and afterwards that the container resizer USC 271 in the container 267 and in the container 270 are selected. As another example, the view of the GUI 249 shown in FIG. 23 can be displayed in response to the processor 15 determining the container resizer USC 271 in the container 267 from the GUI 249 as shown in FIG. 21 is selected and afterwards that the container resizer USC 271 in the container 261 and in the container 270 are selected.

Next, FIG. 24 shows yet another alternative view of the GUI 249. In this view of the GUI 249, a horizontal length of the graph-axis control segment 220 is greater than a horizontal length of the graph-axis control segment 220 as shown in FIG. 18, but is identical to the horizontal length of the graph-axis control segment 220 shown in FIG. 19. The cursor position indicator 222 in FIG. 24 is positioned along the graph-axis control 218 between the "70" and "80" numerical indicators of the graphical frame counter 276. More particularly, the cursor position indicator 222 in FIG. 24 is positioned at the VOC indicator 275 along the graph-axis control 218. This can occur in response to the processor 15 determining the VOC indicator 275 was selected. Also, compared to FIG. 20 in which the cursor 205 and the cursor point 206 are positioned at a right end of both the waveform 301 and the VDP graph 300, and the cursor 302 is positioned at a point within the waveform 301 that corresponds to the VOC indicator 275, in FIG. 24, the cursor 205 is positioned at the point within the waveform 301 that corresponds to the VOC indicator 275 and the position at which the cursor 302 shown in FIG. 20 is displayed.

In at least some implementations, the cursor 205 covers any cursor corresponding to a VOC indicator if those two cursors are at a common position within a VDP graph. In at least some other implementations, a cursor corresponding to a VOC indicator covers the cursor 205 if those two cursors are at a common position within a VDP graph. In at least some of the aforementioned implementations, an opacity of one of the cursor 205 or the cursor corresponding to a VOC indicator is at a level such that the other one of those cursors is at least partially visible when the other cursor is overlaid upon it. In at least some of the implementations in which a cursor corresponding to a VOC indicator is overlaid upon the cursor 205 such that the cursor 205 is not visible, the cursor point 206 is still visible in the VDP graph at the cursor overlaying the cursor 205.

Furthermore, in at least some implementations in which cursors are displayed in multiple VDP graphs in a GUI and the cursors correspond to a stacked VOC indicator, a cursor displayed in a particular VDP graph for a particular PID represented by the stacked VOC indicator can be a first solid line cursor, such as a solid, red line cursor. Any other cursors corresponding to a VOC indicator in the particular VDP graph can be a dashed line cursor. Other cursor(s) corresponding to PID(s) represented by the stacked VOC indicator can be overlaid by the first solid line cursor or otherwise omitted from the particular VDP graph. If the GUI includes a different VDP graph for a different PID represented by the stacked VOC indicator, the different VDP graph can include a second solid line cursor to represent the VOC indicator and the different PID. The second solid line cursor can also be a solid, red line cursor. Any other cursors corresponding to a VOC indicator in the different VDP graph can be a dashed line cursor. Other cursor(s) corresponding to PID(s) represented by the stacked VOC indicator can be overlaid by second solid line cursor in the different VDP graph or otherwise omitted from the different VDP graph. The stacked VOC indicator discussed in this paragraph can be a fully stacked VOC indicator, rather than a partially stacked VOC indicator.

Figure 25:
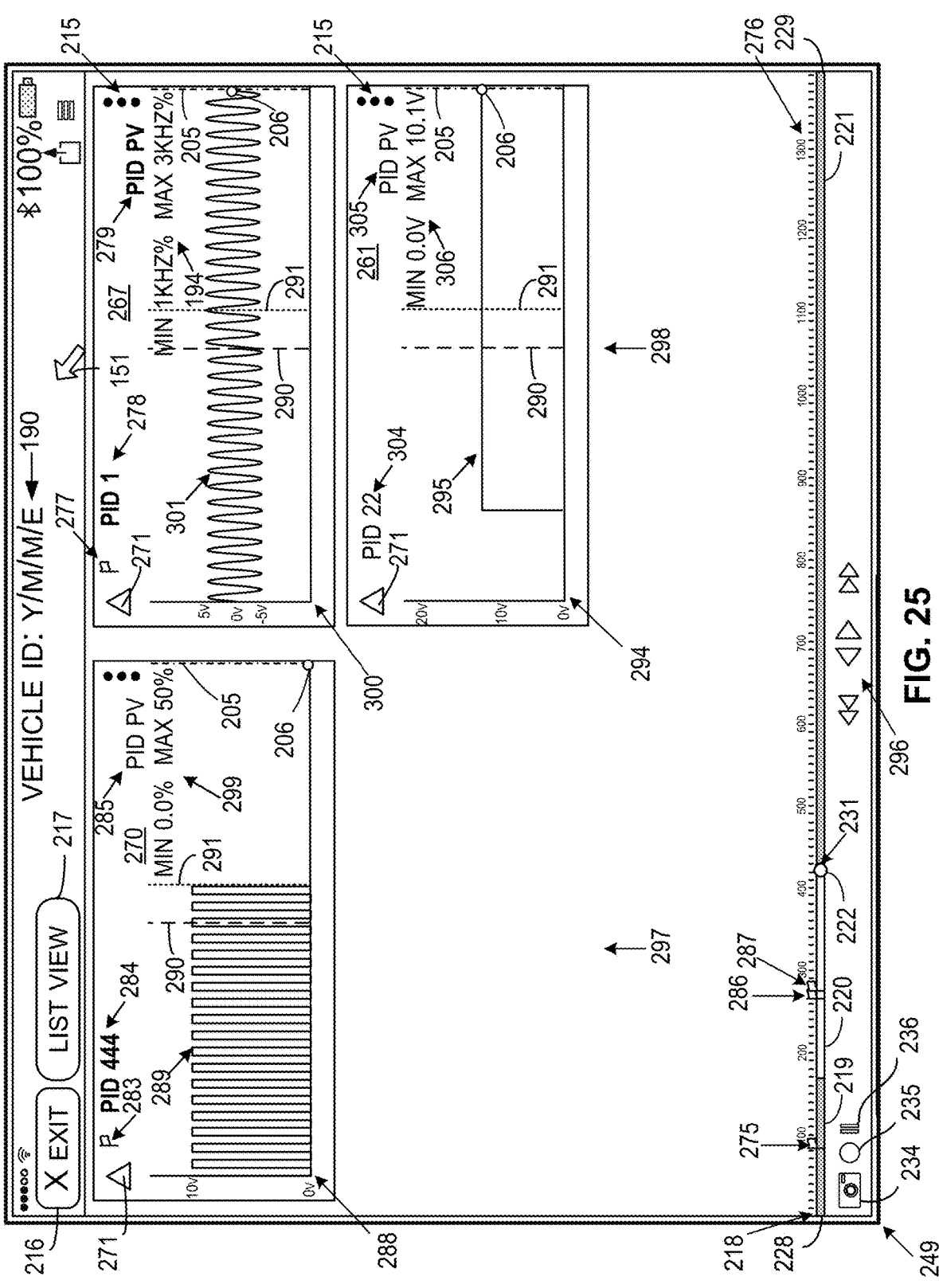

Next, FIG. 25 shows yet another alternative view of the GUI 249. In this view, the graph-axis control 218 is identical to the graph-axis control 218 shown in FIG. 23. Additionally, the container column 297 includes the container 270 and the container column 298 includes the container 267 and the container 261. The container 261, 267, 270 in FIG. 23 and FIG. 25 include the same content.

The processor 15 can output the GUI 249 as shown in FIG. 25 onto the display 40 in response to a selection of the view-selection USC 217 from the GUI 249 as shown in FIG.

23. In other words, the GUI 249 includes the container 261, 267, 270 in the expanded state without any containers in the unexpanded state in response to a selection of the view-selection USC 217 while the GUI 249 shows the container 261, 267, 270 in the expanded state and zero or more containers in an unexpanded state.

Figure 26:
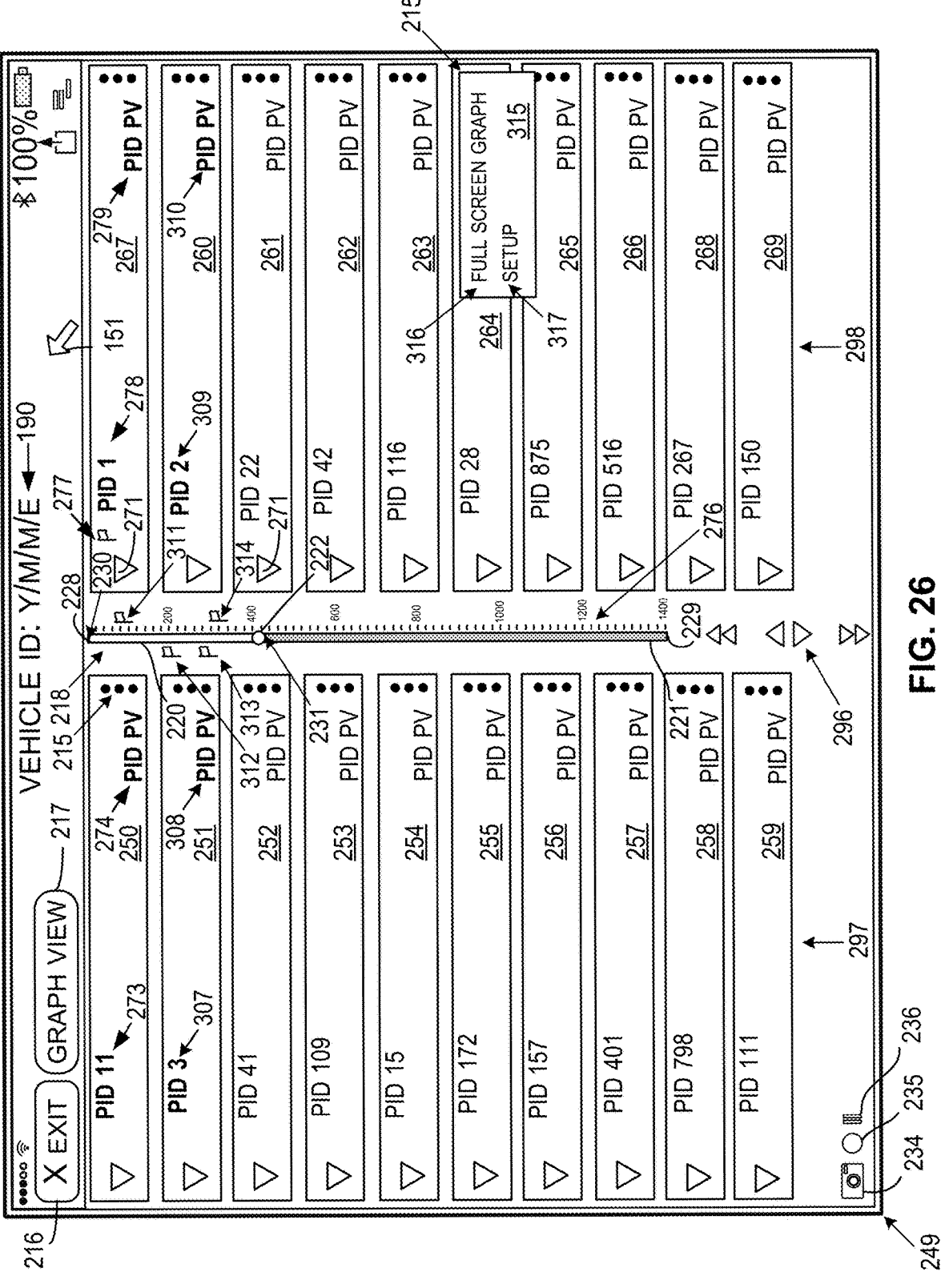

Next, FIG. 26 shows yet another alternative view of the GUI 249. In this view of the GUI 249, the graph-axis control 218 is arranged in between the container column 297 and the container column 298. Other example positions of the graph-axis control 218 in a GUI are also possible. The graph-axis control 218 includes the first end 228, the second end 229, the graph-axis control segment 220, 221, the divider 230, 231, the cursor position indicator 222, and the graphical frame counter 276. The GUI 249 shown in FIG. 26 also includes the forward/reverse USC 296.

In the view of the GUI 249 shown in FIG. 26, a VOC indicator 311, 312, 313, 314 is positioned at the graph-axis control 218. The VOC indicator 311, 314 is positioned on a side of the graph-axis control 218 adjacent the container column 298. Similarly, the VOC indicator 312, 313 is positioned on a side of the graph-axis control 218 adjacent the container column 297. The VOC indicator 311, 312, 313, 314 corresponds to the PID 278 in the container 267, the PID 273 in the container 250, the PID 307 in the container 251, and the PID 309 in the container 260, respectively. The container 250, 251, 260, 267 includes the PID parameter value 274, 308, 310, 279 that correspond to the PID 273, 307, 309, 278, respectively.

As shown in FIG. 26, the GUI 249 can include a USC 315 in response to selection of the additional-features USC 215 contained in the container 264. The USC 315 includes a USC 316, 317. In response to a selection of the USC 316, the processor 15 can cause the GUI 249 to display the container 264 in a full-screen mode. FIG. 10 to FIG. 17 show an example of the GUI 199, which is an example of displaying the container 200 in a full-screen mode. In accordance with the example implementations, the full-screen mode can include using an entire area defined for displaying containers within the GUI to display a single container.

In response to a selection of the USC 317, the processor 15 can cause a GUI to display one or more user-selectable controls for setting up a characteristic corresponding to the container including the USC 315 or, more generally, the GUI including the USC 315. As an example, the characteristic corresponding to the container can include a baseline threshold corresponding to a PID. The baseline threshold can include a maximum baseline threshold or a minimum baseline threshold or some other baseline threshold corresponding to a PID associated with the container. As another example, the characteristic corresponding to the container can include setting a baseline threshold to an armed or unarmed state. In at least some implementations, setting a baseline threshold can cause the processor 15 to output a threshold indicator within a GUI, or more particularly, with a container. As an example, the threshold indicator can be arranged like the upper baseline threshold indicator 207 or the lower baseline threshold indicator 208 (both shown in FIG. 10).

Next, FIG. 27 to FIG. 35 show GUIs including a container corresponding to non-PID data. The GUIs in FIG. 27 to FIG. 34 include a container column 323, 324. The container column 324 includes the container corresponding to non-PID data. The container column 324 is wider than the container column 323. Other implementations including multiple container columns can include two or more container columns having different widths. The container column 323 includes a container 325, 326, 327, 328. The container column 324 includes a container 329. The container column 324 also includes a container 330 in the GUI 320 shown in FIG. 27, a container 344 in a GUI 321 shown in FIG. 29 and FIG. 30, or a container 345 in a GUI 322 shown in FIG. 31 to FIG. 35. In alternative arrangements, a container including one or more from among the container 325, 326, 327, 328, 329, 330 can be contained in a container column that is the same width as a different container in a GUI including those two containers.

The GUIs in FIG. 27 to FIG. 34 include aspects shown in one or more GUIs shown in FIG. 8 to FIG. 26. Those aspects include at least the display pointer 151, the vehicle identifier 190, the additional-features USC 215, the exit-view USC 216, the view-selection USC 217, the graph-axis control 218, the graph-axis control segment 219, the graph-axis control segment 220, the graph-axis control segment 221, the cursor position indicator 222, the first end 228 and the second end 229 of the graph-axis control 218, the USC 234, 235, 236, and the forward/reverse USC 296. The description of those aspects are applicable to FIG. 27 to FIG. 34 unless the context dictates otherwise.

The container 325, 326, 327, 328, 329 includes a VDP graph for the PID 209 identified in that container. The VDP graph includes a waveform 202 representing parameter values corresponding to the PID 209 within the container including that waveform. The container 325, 326, 327, 328, 329 also includes the PID parameter values 210 (e.g., a minimum parameter value received for the PID 209, a maximum parameter value received for the PID 209, and a cursor parameter value for the PID 209).

Figure 28:
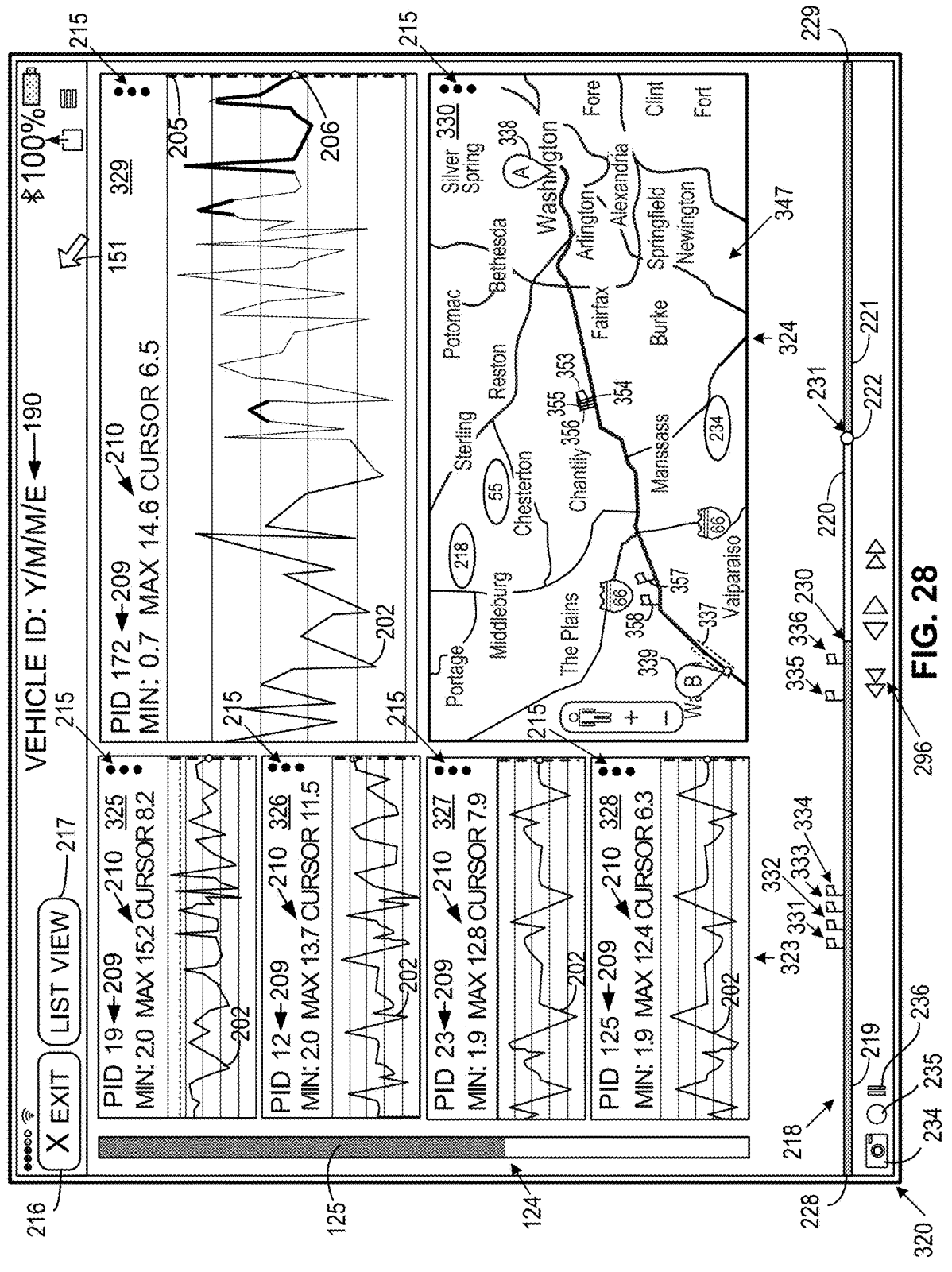
Figure 29:
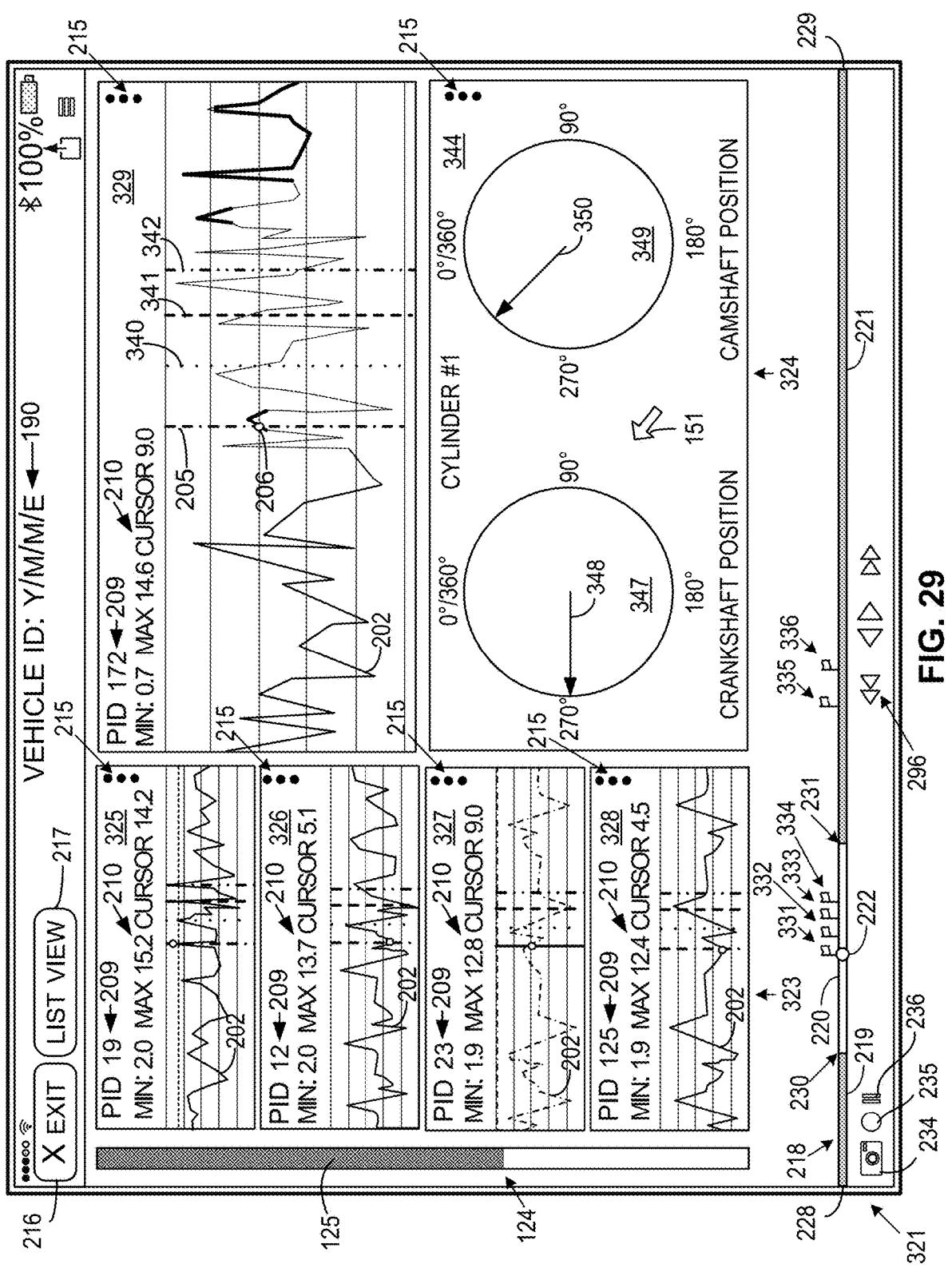
Figure 30:
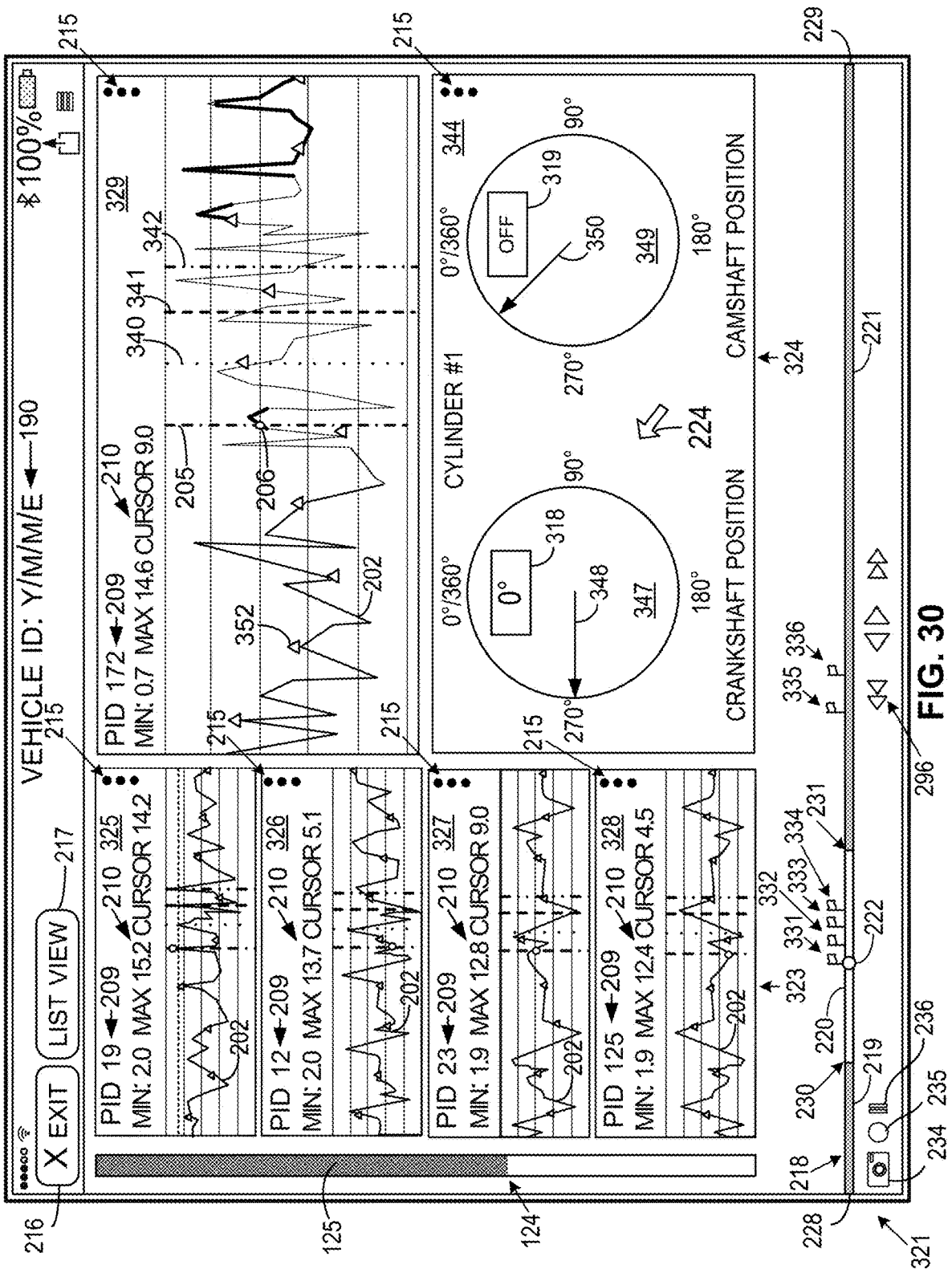

The GUI 320 in FIG. 27 and FIG. 28, the GUI 321 in FIG. 29 and FIG. 30, and the GUI 322 in FIG. 31 to FIG. 34 include the scroll bar 124 and the slider 125. The slider 125 can be repositioned within the scroll bar 124 to cause a non-displayed container within the GUI 320, 321, 322 to be displayed and a displayed container to become a non-displayed container.

A VOC indicator 331, 332, 333, 334, 335, 336 is located at the graph-axis control 218 within the GUI 320, 321, 322. In particular, the VOC indicator 332, 332, 333, 334 is located at the graph-axis control segment 220. The VDP graph in the container 325, 326, 327, 328, 329 includes the cursor 205 corresponding to the cursor position indicator 222. The cursor 205 in FIG. 27 to FIG. 32 also corresponds to the VOC indicator 332 as the cursor position indicator 222 is positioned at the VOC indicator. The VOC indicator 332, 333, 334 also correspond to a respective cursor in the VDP graph in the container 325, 326, 327, 328, 329. Those cursors are identified as the cursor 340, 341, 342 within the container 329.

The non-PID data corresponding to the container 330 includes location data. The container 330 includes a map 364. In at least some implementations, the map 364 includes a pin 338, 339. The pin 338 can correspond to a first particular frame among a number of frames represented by the graph-axis control 218. The pin 339 can correspond to a second particular frame among a number of frames represented by the graph-axis control 218. As an example, the first particular frame can correspond to a frame corresponding to the first end 228 or the divider 230. As another example, the second particular frame can correspond to a frame corresponding to the second end 229 or the divider 231.

In at least some implementations, the map 364 includes an icon 337. The icon 337 can correspond to a location on the map 364 and to one or more frames represented by a portion of the graph-axis control 218. As an example, the icon 337 can correspond to a frame that is associated with a position of the cursor position indicator 222. As another example, the icon 337 can correspond to the frames that are associated with graph-axis control segment 220.

In at least some implementations, the map 364 also includes a VOC indicator that corresponds to a VOC indicator at or on the graph-axis control 218. As an example, the map 364 includes a VOC indicator 353, 354, 355, 356, 357, 358 that corresponds to the VOC indicator 331, 332, 333, 334, 335, 336, respectively. The view of the GUI 320 shown in FIG. 27 can be displayed in response to a selection of the VOC indicator 331 or the VOC indicator 353.

In at least some implementations, one or more from among the pin 338, 339, or the VOC indicator 353, 354, 355, 356, 357, 358 is selectable from the GUI 320. In response to selecting one or more from among the pin 338, 339 or the VOC indicator 354, 355, 356, 357, 358, the processor 15 can cause an alternative view of the GUI 320 to be displayed. For example, in response to selecting the pin 339, the processor 15 can output a view of the GUI 320 as shown in FIG. 28.

As another example, in response to selecting the VOC indicator 354, the processor 15 can output a view of the GUI 320 in which the graph-axis control segment 220 is centered about the VOC indicator 332, the cursor position indicator 222 is positioned at the VOC indicator 332, and the icon 337 is centered about the VOC indicator 354 along a route traveled by the vehicle and indicated on the map 364. Likewise, in response to selecting the VOC indicator 355, the processor 15 can output a view of the GUI 320 in which the graph-axis control segment 220 is centered about the VOC indicator 333, the cursor position indicator 222 is positioned at the VOC indicator 333, and the icon 337 is centered about the VOC indicator 355 along a route traveled by the vehicle and indicated on the map 364. Similar examples based on selecting the VOC indicator 356, 357, 358 are possible.

As yet another example, in response to selecting the pin 338, the processor 15 can output a view of the GUI 320 in which the divider 230 and the first end 228 coincide with each other and the graph-axis control 218 includes the graph-axis control segment 220, 221, but not the graph-axis control segment 219. The waveform 202 within the VDP graph in the container 325, 326, 327, 328, 329 represents PID data captured during the frames represented by the graph-axis control segment 220. An end of the cursor position indicator 222 can coincide with the divider 231. In that case, the cursor 205 can be positioned at a right-most end of the VDP graph. The cursor 340, 341, 342 would not be shown in this view of GUI 320 unless the VOC indicator 332, 333, 334 are positioned on or at the graph-axis control segment 220. No cursor corresponding to the VOC indicator would be shown in this view of the GUI 320 unless the VOC indicator 331 is positioned on or at the graph-axis control segment 220.

Next, FIG. 28, as noted above, shows an alternative view of the GUI 320. In this view, the pin 339 has moved further down the road shown on the map 364 and an end of the icon 337 coincides with the pin 339. Additionally, graph-axis control segment 220 has moved closer to the second end 229, a length of the graph-axis control segment 219 has increased, and a length of the graph-axis control segment 221 has decreased, and an end of the cursor position indicator 222 coincides with the divider 231. The view of the GUI 320 shown in FIG. 28 can be displayed in response to a selection of the pin 339 or movement of the cursor position indicator 222 to its position shown in FIG. 28.

In at least some implementations, the additional-features USC 215 within a container corresponding to non-PID data (such as the container 330, 344 (shown in FIG. 29), 345 (shown in FIG. 31) can be selectable to show the USC 315, 316, 317 within the GUI including that container. In response to a selection of the USC 316, the processor 15 can cause the GUI to display the container corresponding to non-PID data in a full-screen mode.

Next, FIG. 29, as noted above, shows the GUI 321 with the container 344. The container 344 includes and/or corresponds to non-PID data captured for frames of data. The non-PID data corresponding to the container 344 includes position data representing positions of a crankshaft and a camshaft within the vehicle 4. In at least some implementations, the position data representing positions of the camshaft within the vehicle can include position data for multiple camshafts within the vehicle 4.

The position data representing a crankshaft position can be indicated by an icon 347. In the GUI 321, the icon 347 includes a dial 348 that points to a numeral indicating a number of degrees of crankshaft position from a particular position. In FIG. 29, the dial 348 indicates the crankshaft is at 270 degrees (i.e., 270°). The particular position can correspond to a particular position of the crankshaft for a particular cylinder in the engine. For example, the particular position of the crankshaft can be a position of the crankshaft when a piston for cylinder one is at a top dead center (TDC) position (e.g., when that piston is at a top position of its stroke). As the cursor position indicator 222 moves within the graph-axis control 218 in response to obtaining and/or writing additional frames of data into the memory 17 or manually within the graph-axis control 218, the dial 348 can indicate a position of a crankshaft within the vehicle 4. That crankshaft position corresponds to the non-PID crankshaft position data stored for the frame that corresponds to the cursor position indicator 222.

In at least some implementations, the icon 347 and the dial 348 can function as an analog gauge to indicate a crankshaft position. The display 40 can display the dial 348 rotating within the icon 347 as the crankshaft position changes. The speed at which the dial 348 rotates depends, at least in part, on a rate at which the crankshaft is rotating and a rate at which a crankshaft position sensor signal is sampled by the processor 15. In at least some implementations, the dial 348 rotates up to one revolution for each frame written into the memory 17. In at least some implementations, the container 344 displays a digital value of the crankshaft position in addition to or in lieu of the icon 347 and the dial 348.

The position data representing a camshaft position can be indicated by an icon 349. In the GUI 321, the icon 349 includes a dial 350 that points to a numeral indicating a number of degrees of camshaft position from a particular position. In FIG. 29, the dial 350 indicates the camshaft is at or about 315 degrees (i.e., 315°). The particular position can correspond to a particular position of the camshaft for a particular cylinder in the engine. For example, the particular position of the camshaft can be a position at which the valves for a particular cylinder are closed for a compression stroke for some number of degrees of camshaft rotation. As the cursor position indicator 222 moves within the graph-axis control 218 in response to obtaining and/or writing additional frames of data into the memory 17 or manually within the graph-axis control 218, the dial 350 can indicate a position of a camshaft within the vehicle 4. That camshaft position corresponds to the non-PID camshaft position data stored for the frame that corresponds to the cursor position indicator 222.

In at least some implementations, the icon 349 and the dial 350 can function as an analog gauge to indicate a camshaft position. The display 40 can display the dial 350 rotating within the icon 349 as the camshaft position changes. The speed at which the dial 350 rotates depends, at least in part, on a rate at which a camshaft is rotating and a rate at which a camshaft positon sensor signal is sampled by the processor 15. In at least some implementations, the dial 350 rotates up to one revolution for each frame written into the memory 17. In at least some implementations, the container 344 displays a digital value of the camshaft position in addition to or in lieu of the icon 349 and the dial 350.

Other aspects of the GUI 321 are described elsewhere. In at least some implementations, a GUI can show PID parameter value(s) that corresponds to a position of a crankshaft within the vehicle 4 and/or PID parameter value(s) that corresponds to a position of a camshaft within the vehicle 4. In at least some of those implementations, a GUI can include data indicating a crankshaft position and/or a camshaft position using only PID parameter value(s), only non-PID data, or both PID parameter value(s) and non-PID data.

Next, FIG. 30 shows an alternative view of the GUI 321 shown in FIG. 29. In this view, the GUI 321 includes a position-selector USC 318, 319. The position-selector USC 318, 319 can be configured to select a particular crankshaft or camshaft position-of-interest, respectively, and to cause the processor 15 to output (within the GUI 321) an icon corresponding to the particular crankshaft or camshaft position-of-interest within a VDP graph shown in the GUI 321. In FIG. 30, an icon 352 (e.g., a triangle) is represented within the container 329. Similar icons are shown in the container 325, 326, 327, 328. The icon 352 and similar icons represent portions of the waveform 202 at which the crankshaft was at the position-of-interest. Different icons could be used to indicate portions of the waveform 202 at which the camshaft was at the position-of-interest. The position-selector USC 318, 319 can be used as a filter to remove the icons representing portions of the waveform 202 where the crankshaft or camshaft were at a position-of-interest. As an example, the filter in the position-selector USC 319 could be enabled by selecting an "OFF" setting or in some other manner. In at least some implementations, the position-selector USC 318 is disposed within, adjacent and/or otherwise is proximity to the icon 347 and/or the position-selector USC 319 is disposed within, adjacent and/or otherwise is proximity to the icon 349.

In at least some implementations, the dial 348, 350 is a user-selectable control configured to select a crankshaft position or camshaft position, respectively. As an example, the dial 348 can be rotated via contact with the display 40 where the dial 348 is displayed, and the dial 350 can be rotated via contact with the display 40 where the dial 350 is displayed. Rotation of the dial 348, 350 can be in a first direction or a second direction. The first direction can be one of a clockwise direction or a counter-clockwise direction, and the second direction can be the other of the clockwise or counterclockwise directions. The processor 15 can change position values shown within the position-selector USC 318, 319 in response to a rotation of the dial 348, 350, respectively. The processor 15 can change position of the icon 352 shown within the displayed VDP graphs in response to a rotation of the dial 348. Likewise, if the icon 352 or the like is displayed within VDP graphs to indicate a particular camshaft position, the processor 15 can change position of the icon 352 or the like within displayed VDP graphs in response to a rotation of the dial 350.

In at least some implementations, the dial 348, 350 is a user-selectable control configured to select crankshaft or camshaft positon data that was received prior to or after a crankshaft or camshaft position datum corresponding to a current position of the dial 348, 350 and the cursor position indicator 222. As an example, the processor 15 can determine contact with the display 40 at the dial 348 is made followed by a rotation gesture made on the display 40. As another example, the processor 15 can determine contact with the display 40 at the dial 350 is made followed by a rotation gesture made on the display 40. The rotation gestures can be in a first direction (e.g., a clockwise direction) or a second direction (e.g., a counter-clockwise direction). As an example, the rotation gesture can include a circular gesture made using a finger in contact with the display 40.

As an example, the dial 348 can be rotated in the second direction to select an earlier-received crankshaft position datum. Depending on how many samples of the crankshaft position data is contained with a frame and which crankshaft position datum is represented by the dial 348, the earlier-received crankshaft position datum can be stored within the frame of data represented by the cursor position indicator 222. If there are no earlier-received crankshaft position datum within the frame of data represented by the cursor position indicator 222, the processor 15 can slide the cursor position indicator 222 towards the first end 228 to a position corresponding to an earlier-stored frame, move the cursor 205 in the VDP graphs to a position corresponding to the earlier-stored frame, and select and display crankshaft position datum stored within the earlier-stored frame within the icon 347. Moreover, the dial 348 can be rotated in the second direction to cause the cursor position indicator 222 to contact the divider 230 and then continue towards the first end 228 such that a length of the graph-axis control segment 219 decreases, a length of the graph-axis control segment 221 increases, and the VDP graph in the container 325, 326, 327, 328, 329 shows PID data from a frame written into buffer just prior to the earliest frame represented in the VDP graph.

As another example, the dial 348 can be rotated to select a later-received crankshaft position datum. Depending on how many samples of the crankshaft position data is contained with a frame and which crankshaft position datum is represented by the dial 348, the later-received crankshaft position datum can be stored within the frame of data represented by the cursor position indicator 222. If there are no later-received crankshaft position datum within the frame of data represented by the cursor position indicator 222, the processor 15 can slide the cursor position indicator 222 towards the second end 229 to a position corresponding to a later-stored frame, move the cursor 205 in the VDP graphs to a position corresponding to the later-stored frame, and select and display crankshaft position datum stored within the later-stored frame within the icon 347. Moreover, the dial 348 can be rotated in the first direction to cause the cursor position indicator 222 to contact the divider 231 and then continue towards the second end 229 such that a length of the graph-axis control segment 219 increases, a length of the graph-axis control segment 221 decreases, and the VDP graph in the container 325, 326, 327, 328, 329 shows PID data from a frame written into buffer just after to the latest frame represented in the VDP graph.

As yet another example, the dial 350 can be rotated in the second direction to select an earlier-received camshaft position datum. Depending on how many samples of the camshaft position data is contained with a frame and which camshaft position datum is represented by the dial 350, the earlier-received camshaft position datum can be stored within the frame of data represented by the cursor position indicator 222. If there are no earlier-received camshaft position datum within the frame of data represented by the cursor position indicator 222, the processor 15 can slide the cursor position indicator 222 towards the first end 228 to a position corresponding to an earlier-stored frame, move the cursor 205 in the VDP graphs to a position corresponding to the earlier-stored frame, and select and display camshaft position datum stored within the earlier-stored frame within the icon 347. Moreover, the dial 350 can be rotated in the second direction to cause the cursor position indicator 222 to contact the divider 230 and then continue towards the first end 228 such that a length of the graph-axis control segment 219 decreases, a length of the graph-axis control segment 221 increases, and the VDP graph in the container 325, 326, 327, 328, 329 shows PID data from a frame written into buffer just prior to the earliest frame represented in the VDP graph.

As yet another example, the dial 350 can be rotated to select a later-received camshaft position datum. Depending on how many samples of the camshaft position data is contained with a frame and which camshaft position datum is represented by the dial 350, the later-received camshaft position datum can be stored within the frame of data represented by the cursor position indicator 222. If there are no later-received camshaft position datum within the frame of data represented by the cursor position indicator 222, the processor 15 can slide the cursor position indicator 222 towards the second end 229 to a position corresponding to a later-stored frame, move the cursor 205 in the VDP graphs to a position corresponding to the later-stored frame, and select and display camshaft position datum stored within the later-stored frame within the icon 347. Moreover, the dial 350 can be rotated in the first direction to cause the cursor position indicator 222 to contact the divider 231 and then continue towards the second end 229 such that a length of the graph-axis control segment 219 increases, a length of the graph-axis control segment 221 decreases, and the VDP graph in the container 325, 326, 327, 328, 329 shows PID data from a frame written into buffer just after to the latest frame represented in the VDP graph.

Figure 31:
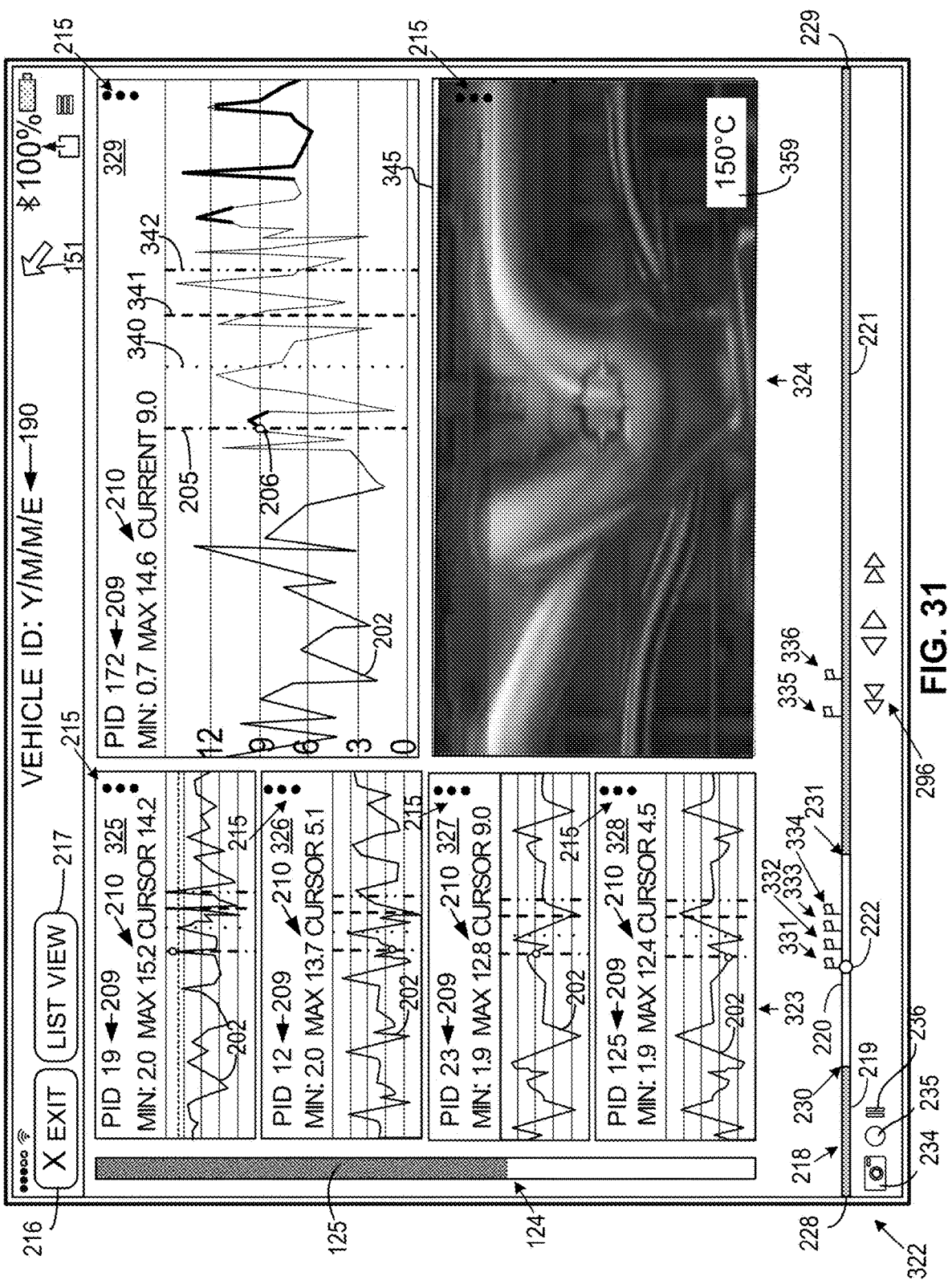

Next, FIG. 31, as noted above, shows the GUI 322 with the container 345. The container 345 includes and/or corresponds to non-PID data captured for frames of data. The non-PID data corresponding to the container 345 includes temperature data representing a temperature of a component within the vehicle 4. In at least some implementations, the temperature data representing the temperature of the vehicle component can include temperature data an exhaust manifold or some other vehicle component. In at least some implementations, the temperature data is based on temperature data provided by the remote input device 8. In accordance with at least some of those implementations, the remote input device 8 includes a remote thermal imaging device. In accordance with those implementations, the container 345 can include a thermal image captured by the thermal imaging device.

The temperature data can be represented textually in a temperature icon 359. A temperature (e.g., 150° C.) represented by the temperature icon 359 corresponds to a temperature determined by the computing system 5 for a particular frame (e.g., the frame corresponding to a position of the cursor position indicator 222. A temperature represented by the temperature icon 359 can change as the temperature data being written into and/or retrieved from the memory 17 (e.g., the buffer 33) changes.

The GUI 322 includes the display pointer 151. In the view of the GUI 322 shown in FIG. 31, the display pointer 151 is not contacting any portion of the container 345.

Figure 32:
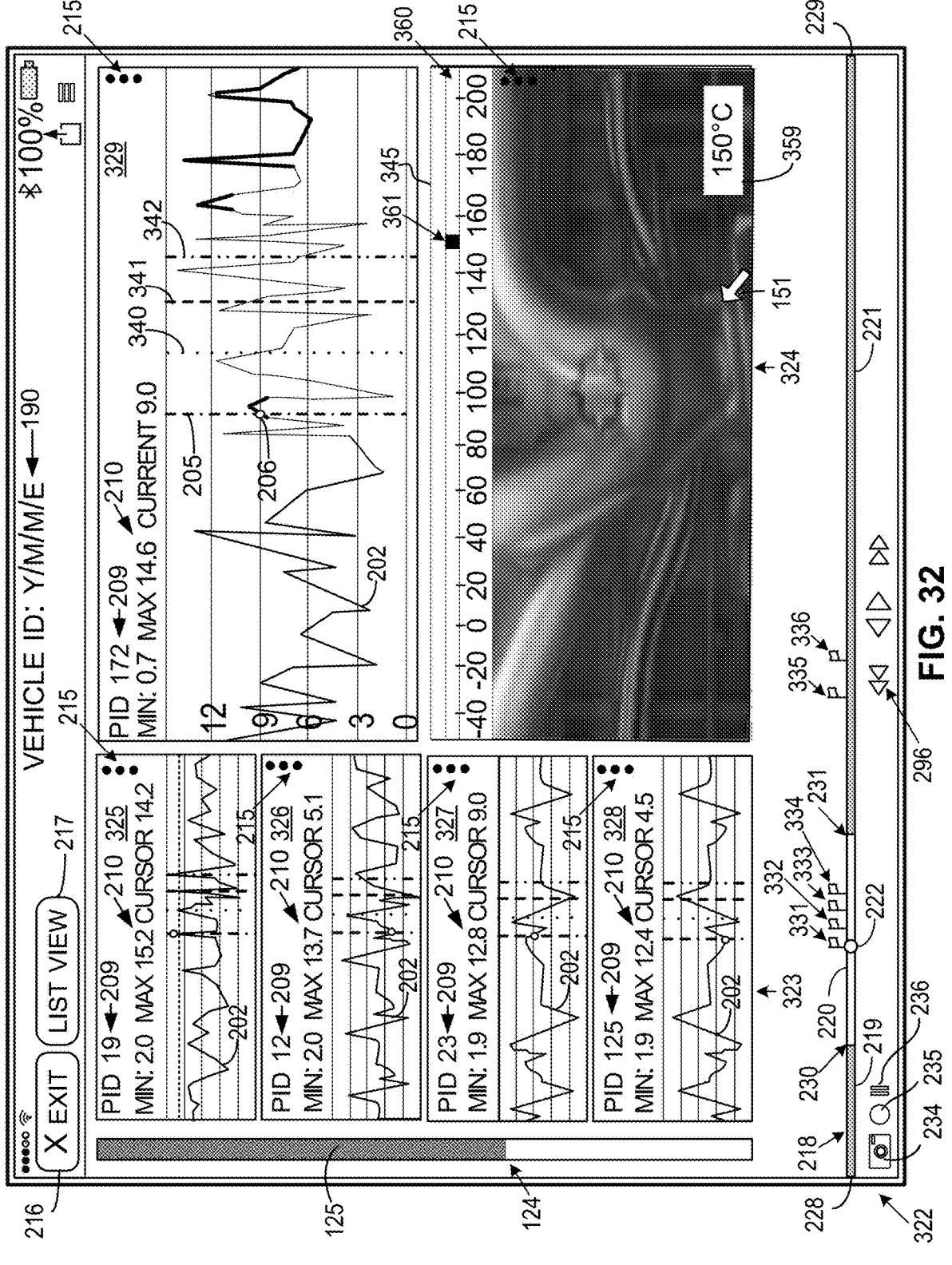

Next, FIG. 32 shows an alternative view of the GUI 322 shown in FIG. 31. In this view of the GUI 322, the GUI 322 includes a USC 360 with a temperature selector USC 361. The temperature selector USC 361 is set to 150° C. in FIG. 32. In at least some implementations, the USC 360 is displayed in the container 345 in response to the display pointer 151 being in contact with some portion of the container 345. In accordance with those implementations, the processor 15 can remove the USC 360 from the container 345 when the display pointer 151 is moved away from the container 345. The temperature selector USC 361 is configured for selecting a temperature different than the temperature indicated by the temperature icon 359. In at least some implementations, the temperature selector USC 361 is configured to slide within the USC 360 horizontally to select a different temperature. Other arrangements of the temperature selector USC 361 are also possible.

In at least some implementations, selection of a temperature using the temperature selector USC 361 includes moving the cursor 205 and the cursor point 206 move within the VDP graphs shown in the container 325, 326, 327, 328, 329 to a PID parameter value represented on the waveform 202 that corresponds to a frame that includes temperature data that equals or is closest to the temperature selected by the temperature selector USC 361.

Figure 33:
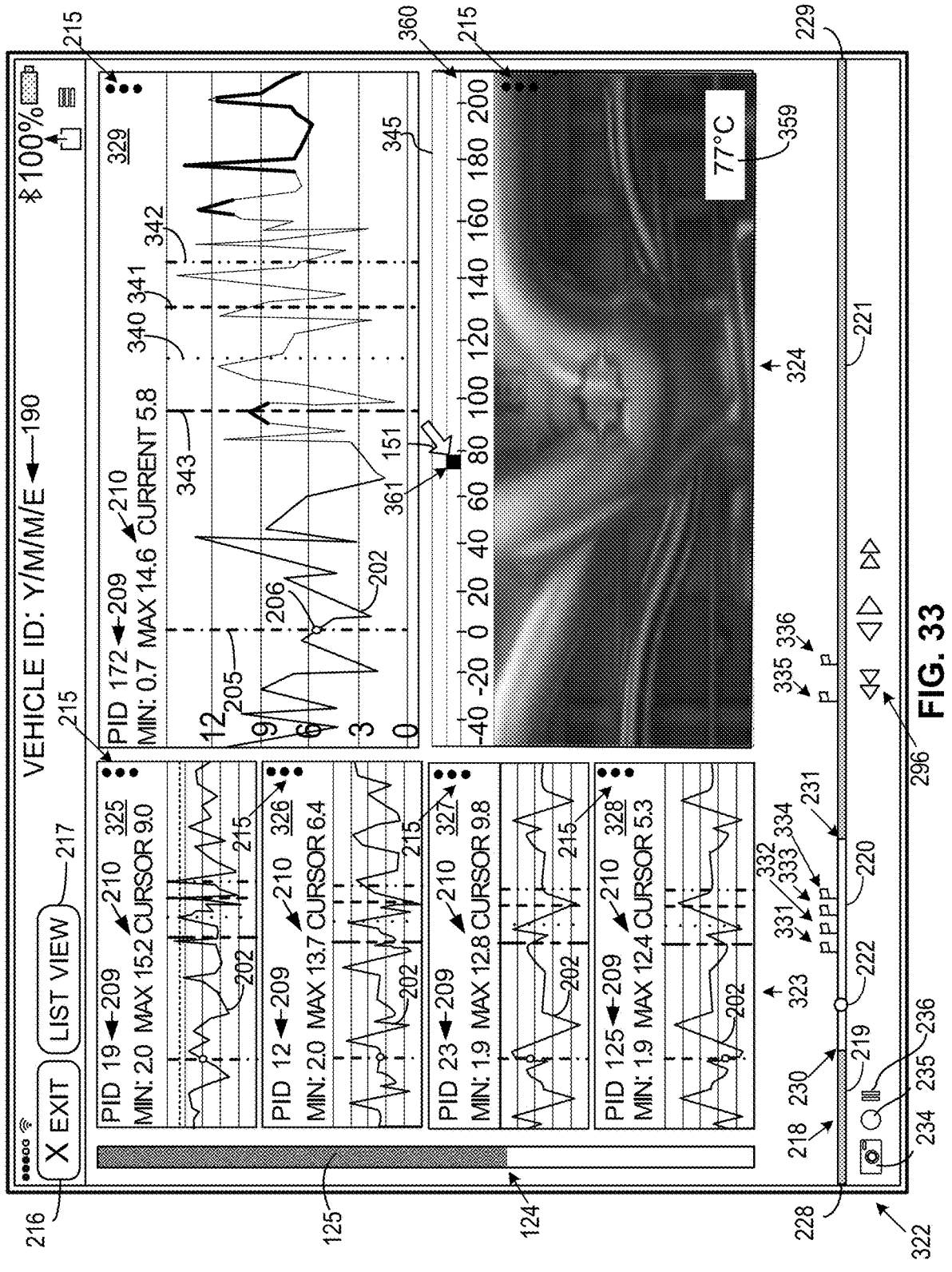

Next, FIG. 33 shows an alternative view of the GUI 322 shown in FIG. 31 and FIG. 32. In this view of the GUI 322, the temperature selector USC 361 is positioned at a different temperature (e.g., 77° C.). The temperature icon 359 is modified to display the different temperature. In this view of the GUI 322, the display pointer 151 is still in contact with the container 345. Additionally, the cursor position indicator 222 is positioned at a position in the graph-axis control 218 that corresponds to a frame that includes temperature data that equals or is closest to the temperature selected by the temperature selector USC 361. Even more, the cursor 205 and cursor point 206 are positioned at positions within the VDP graphs of the container 325, 326, 327, 328, 329 that correspond to a frame that includes temperature data that equals or is closest to the temperature selected by the temperature selector USC 361.

Figure 34:
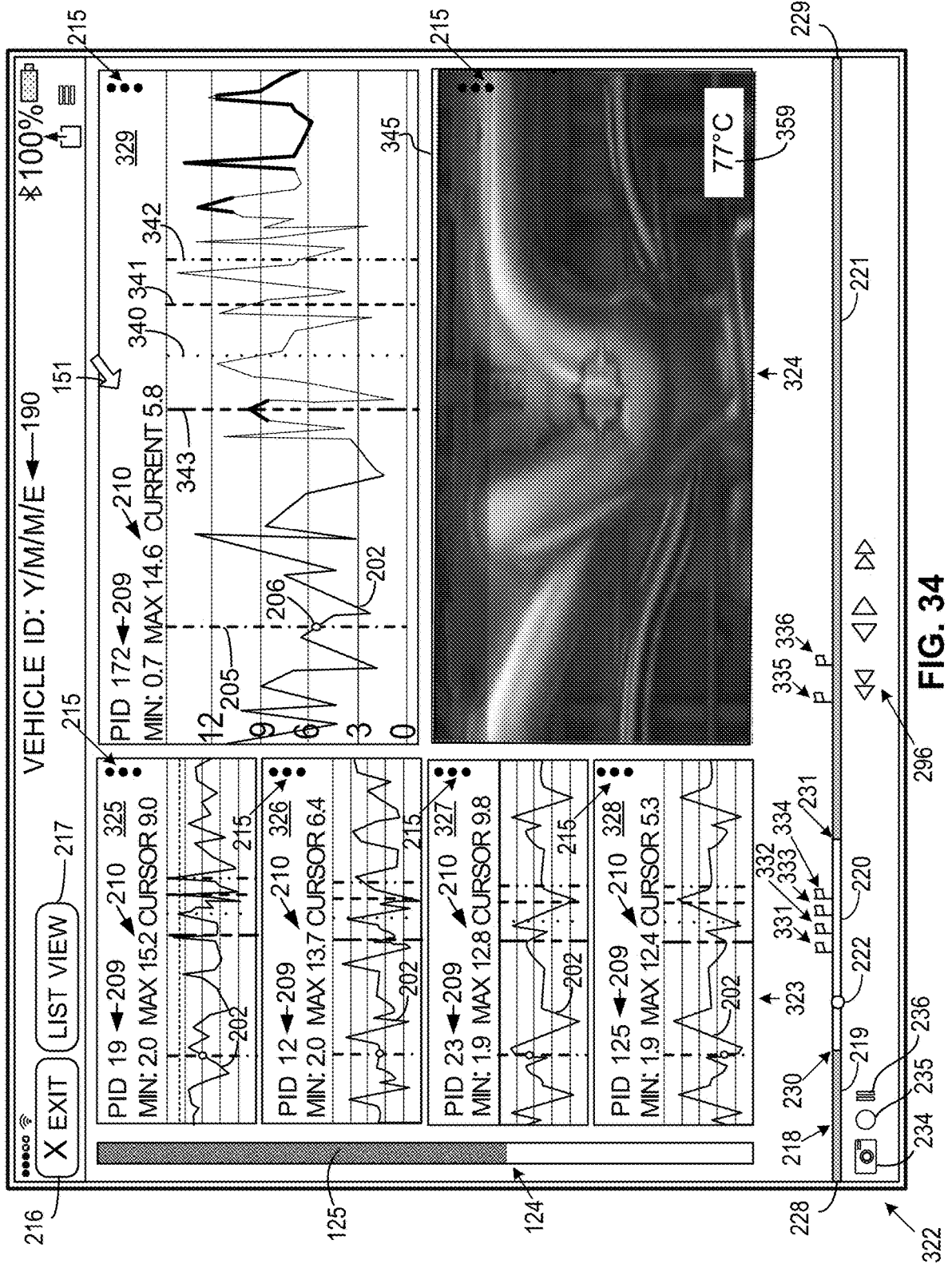

Next, FIG. 34 shows an alternative view of the GUI 322 shown in FIG. 31 to FIG. 33. In at least some implementations, the view of the GUI 322 shown in FIG. 34 is output in response to the display pointer 151 being moved out of contact with the container 345. The view of the GUI 322 shown in FIG. 34 does not include the USC 360 and the temperature selector USC 361

Figure 35:
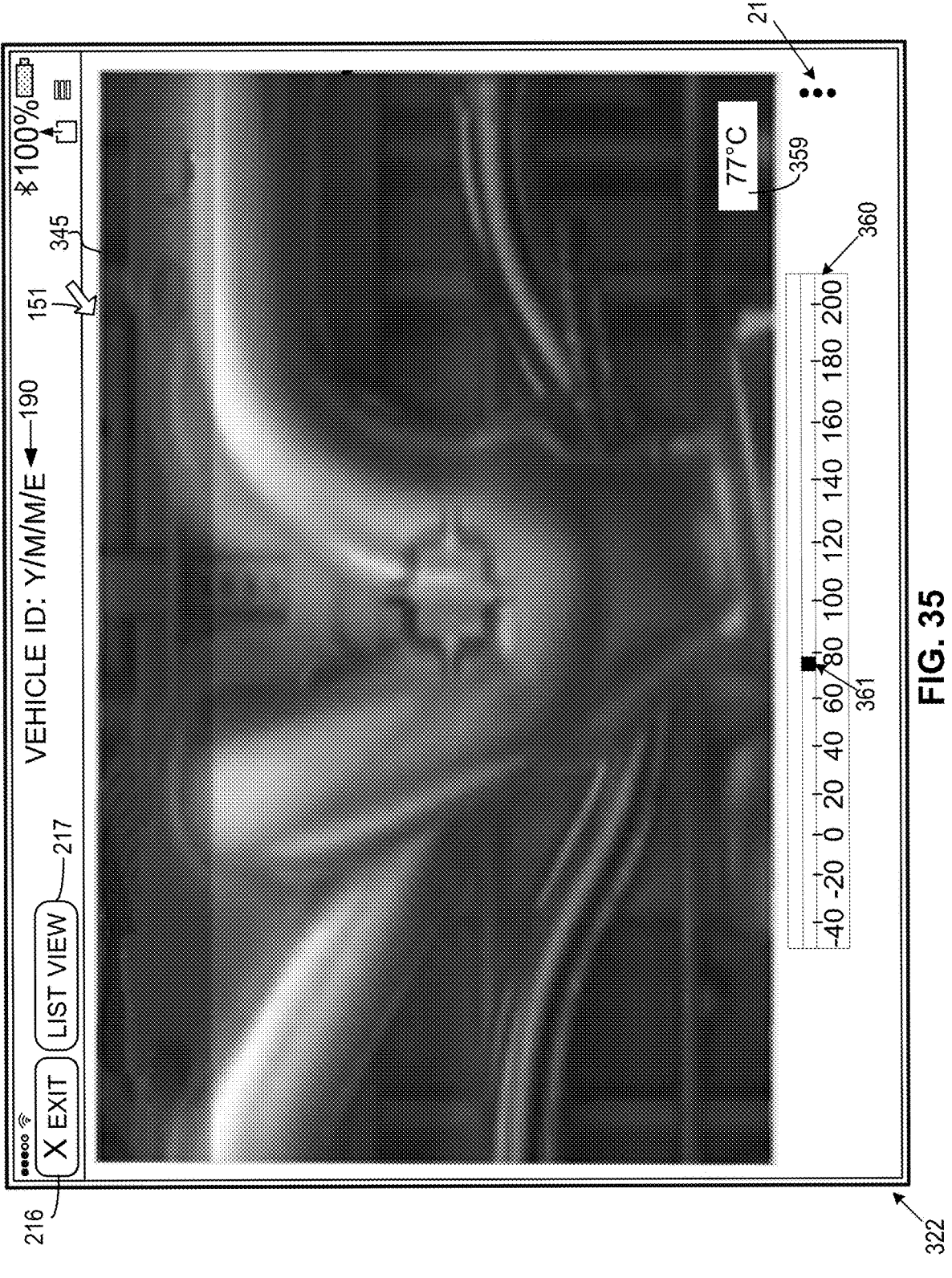

Next, FIG. 35 shows an alternative view of the GUI 322 shown in FIG. 31 to FIG. 34. In this view, the GUI 322 includes the container 345 is displayed in the full-screen mode. The USC 360 and the temperature selector USC 361 are shown below the thermal image within the container 345. The GUI 322 as shown in FIG. 35 can be output on the display 40 in response to selecting the USC 316 that is available via the additional-features USC 215 within the container 345 as shown in FIG. 34. Conversely, the GUI 322 as shown in FIG. 34 can be output on the display 40 in response to selecting the USC 316 that is available via the additional-features USC 215 within the container 345 as shown in FIG. 35.

In implementations including a container for non-PID data other than temperature data, the processor 15 can also modify the container to include a USC with a selector to select a value of the other non-PID data, similar to how the USC 360 can be used to select different temperature values. In at least some of these implementations, the USC can appear in the container when the display pointer 151 is located within the container and can disappear from the container in response to the display pointer 151 being moved outside of the container. In an alternative arrangement, the USC for selecting other non-PID data and/or the USC 360 can be displayed at all times the container corresponding to that USC or the container 345 is displayed on the display 40.

V. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® personal watercraft), a light-duty truck, a medium-duty truck, a heavy-duty truck, an on-highway truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, about 100 to 200 volts for a hybrid vehicle, about 400 to 800 volts for an electric-only vehicle, or some other voltage or voltage range. A vehicle can, but need not necessarily, include and/or use any system and/or engine to provide its mobility. Those systems and/or engines can include vehicle components that use fossil fuels, such as gasoline, diesel, natural gas, propane, and the like, electricity, such as that generated by a battery, magneto, fuel cell, solar cell and the like, wind and hybrids and/or combinations thereof. A vehicle can, but need not necessarily, include an ECU, an OBDC, and a vehicle network that connects the OBDC to the ECU. A vehicle can be configured to operate as an autonomous vehicle.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise (in a vehicle identifier format) indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMMEF or Y/M/M/E/F, where each letter in the order shown represents a model year identifier, vehicle make identifier, vehicle model name identifier, engine type identifier, and fuel type identifier, respectively, or YMMF or Y/M/M/F, where each letter in the order shown represents a model year identifier, vehicle make identifier, vehicle model name identifier, and fuel type identifier, respectively, or YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. Other example vehicle identifier formats are also possible.

An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (e.g., a four cylinder internal combustion engine) within the vehicle. Another example Y/M/M/E is 2016/Freightliner/Cascadia/Cummins ISX15 EPA, in which "2016" represents the model year the vehicle was built, "Freightliner" represents the name of the vehicle manufacturer Daimler Trucks North America, Cleveland, North Carolina, "Cascadia" represents a vehicle model built by that manufacturer, and "Cummins ISX15 EPA" represents an engine manufacturer and model within the vehicle. An example Y/M/M is 2016/Freightliner/Cascadia. An example Y/M is 2016/Freightliner. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles and on-highway trucks, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME, a YMM, and/or a YM. In some instances, a vehicle includes a one dimensional bar code and/or a multi-dimensional code indicative of a VIN associated with that vehicle.

As an example, a VIN such as 3AKJHHDR9JSJV5535 is for a particular on-highway truck referred to as a 2018 FREIGHTLINER® CASCADIA® 14.8 L L6 diesel, conventional cab. In some countries, a particular digit of a VIN is used as a check digit. For instance, for Canada, the United States, and Mexico, the ninth digit of a VIN is used as a check digit. A processor can be programmed to CRPI arranged as a check digit calculator to determine whether a VIN is valid.

Figures 36, 37:
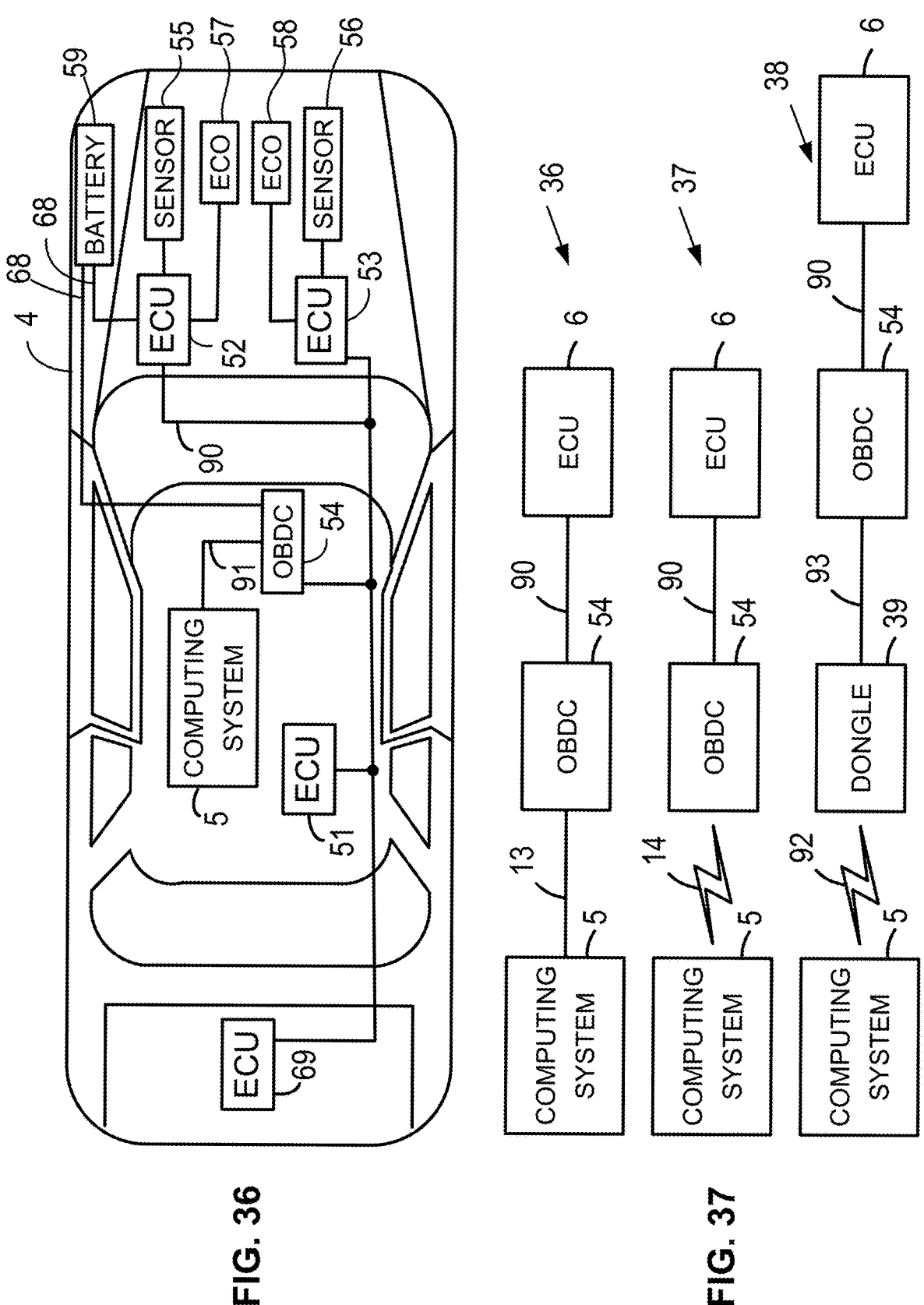
FIG. 36 is a diagram of a vehicle showing example placement of a computing system in accordance with the example implementations.
FIG. 37 shows arrangements for operatively connecting a computing system to a vehicle in accordance with at least some of the example implementations.

A vehicle network, such as a vehicle network 90 shown in FIG. 36 and FIG. 37, can include one or more conductors (e.g., copper wire conductors) and/or can be wireless. As an example, a vehicle network can include one or two conductors for carrying VDMs in accordance with a VDM protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 4. Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter configured to communicate using the SENT VDM protocol (i.e., a SENT VDM transmitter). A vehicle network can operatively connect the SENT VDM transmitter and an ECU within the vehicle. The transceiver 16 (e.g., the vehicle communications transceiver 50) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as an OBDC 54 shown in FIG. 36 and FIG. 37 can include an on-board diagnostic (OBD) connector, such as a J1939 connector, an OBD-I connector, or an OBD-II connector. A J1939 connector is a connector that complies with the SAE J1939 standard. As an example, a J1939 connector can include a J1939 type-1 connector with nine connector terminals, such as a J1939 type-1 connector; part number AHD10-9-1939P, supplied by Amphenol Sine Systems, Clinton Township, Michigan. As another example, a J1939 connector can include a J1939 type-2 connector, such as a J1939 type-2 connector with nine connector terminals; part number AHD10-9-1939P80, supplied by Amphenol Sine Systems. An OBD-I connector, for example, can include slots for retaining up to twelve connector terminals. As an example, an OBD-I connector can include a connector part number 12101918 available from dealerships selling products manufactured by General Motors, Detroit, Michigan. An OBD-II connector can include slots for retaining up to sixteen connector terminals. An OBD-II connector that meets the SAE J1962 specification includes a connector 16M, part number 12110252, available from Aptiv LLC of Dublin, Ireland. Other examples of the OBDC 54 are also possible." An OBDC can be referred to as a "data link connector."

An OBDC can include conductor terminals that connect to a conductor in a vehicle. For instance, an OBDC can include connector terminals that connect to conductors that connect to positive and negative terminals of the power supply, such as a battery 59 shown in FIG. 36, and/or a power supply circuit, such as a battery-connected circuit 68 shown in FIG. 36. An OBDC can include one or more conductor terminals that connect to a conductor of the vehicle network 90 such that the OBDC is operatively connected to one or more ECUs in the vehicle 4. A computing system, such as the computing system 5, can operatively connect directly to an OBDC in order to receive VDM from the vehicle including that OBDC.

A VDM can carry VDM data. The VDM data can, but need not necessarily, include a PID and a parameter value associated with the PID. The VDM data can, but need not necessarily, include a DTC. A VDM can be transmitted over a physical communication link, such as a copper wire or an optical cable, or using radio signals over an air interface. In many implementations, the PID and parameter value are transmitted as binary data. A processor can parse a received VDM to recover a binary representation of a PID and parameter value. The processor can translate the binary representation of a PID and parameter value into a textual a PID and parameter value displayable on a display device.

An ECU, such as the ECU 6 shown in FIG. 1, can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, a brake system ECU, an advanced driver-assistance system (ADAS) ECU, a cab climate system ECU, an instrument cluster, ECU, or some other ECU. An ECU can receive an electrical or optical input from an ECU-connected input device (e.g., a sensor input), control an ECU-connected output device (e.g., a solenoid) via an electrical or optical signal output by the ECU, generate a VDM (such as a VDM based on a received input or a controlled output), and set a DTC to a state (such as active or history). An ECU can perform a functional test in response to receiving a VDM requesting performance of the functional test. The functional test can be used to test an ECU-connected output device. As an example, the functional test can include a diesel particulate filter regeneration procedure.

Turning to FIG. 36, example details of the vehicle 4 and example placement of the computing system 5 within the vehicle 4 are shown. In particular, FIG. 36 shows the vehicle 4 includes an ECU 51, 52, 53, 69, an OBDC 54, a sensor 55, 56, an ECU controlled output (ECO) 57, 58, a battery 59, and a battery-connected circuit 68. The ECU 51, 52, 53, 69 are shown in FIG. 36 to represent that the ECU 6 shown in FIG. 1 can include multiple ECUs. The ECU 51, 52, 53, 69 are operatively connected to the OBDC 54 via the vehicle network 90 to allow transmission of a VDM between the OBDC 54 and the ECU connected to the vehicle network 90. The ECU 51, 52, 53, 69 can be arranged as one of ECU described in the preceding paragraph or an ECU of some other vehicle system. The vehicle network 90 can include a wired and/or wireless network.

The OBDC 54 can, for example, be located within a passenger compartment of the vehicle 4, within an engine compartment of the vehicle 4, or within a storage compartment within the vehicle 4 in front of or behind the passenger compartment. The computing system 5 is removably attachable to the OBDC 54. The computing system 5 can connect to the OBDC 54 via a communication link 91. The computing system can include the communication link 91 (e.g., a harness). The computing system 5 is typically removed after the vehicle 4 has been serviced. In that way, the computing system 5 can be used to diagnose other vehicles.

The battery-connected circuit 68 can include one or more electrical circuits. For example, the battery-connected circuit 68 can include the power circuits described previously. FIG. 36 shows the battery-connected circuit 68 extending between the battery 59 and the ECU 52 and between the battery 59 and the OBDC 54. For clarity of FIG. 36, other examples of the battery-connected circuit 68 that extend between the battery and some other vehicle component of the vehicle, such as the ECU 51, 53, 69 the sensor 55, 56, and the ECO 57, 58 are not shown in FIG. 36. The battery-connected circuit 68 between the battery 59 and the OBDC 54 can provide an electrical current to provide operational power for the computing system 5.

The sensor 55, 56 is a device that provides a signal to the ECU 52, 53, respectively. The signal represents some characteristic of a vehicle the ECU 52, 53 is configured to monitor. As an example, the sensor 55, 56 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other typo of sensor. The signal provided by the sensor 55, 56 can be a target signal that corresponds to a selected functional test.

The ECO 57, 58 is a device controlled by the ECU 52, 53, respectively. The ECU 52, 53 can control the ECO 57, 58, respectively, using an output signal or an output condition. The output signal from an ECU can be a target signal that corresponds to a selected functional test. As an example, the ECO 57, 58 can include one from among: a fuel injector, a motor, a pump, a relay, solenoid, a transformer, or a valve. In accordance with at least some implementations, an ECU is selectable to perform a functional test and/or provide a DTC in accordance with an industry standard, such as the SAE J1979_201202 and/or ISO 15031-5 standards for E/E diagnostic test modes. As an example, the output condition can include establishing a particular voltage level on an electrical circuit operatively connected or connectable to the ECO 57, 58. For instance, the particular voltage level can be a nominal 5-volt reference signal, a nominal 12-volt reference signal, or an electrical ground level signal (e.g., a nominal 0-volt reference level).

The output signal of the ECU 52, 53 (e.g., the ECU output signal) can be any of a variety of electrical or output signals. As an example, the ECU output signal can include an analog or digital electrical signal. As a more particular example, the ECU output signal can include a pulse-width modulated signal, a triangular waveform signal, a saw tooth waveform signal, a rectangular waveform signal, a square waveform signal, or a sinusoidal waveform signal, among others. As another example, the ECU output signal can include a video signal or an audio signal. As yet another example, the digital electrical signal can include a data transmission. As an example, a data transmission can be communicated using a serial peripheral interface (SPI) interface, an inter-integrated circuit ($I^2C$) interface, or a universal asynchronous receiver transmitter (UART) interface, among others. In response to receiving a functional test command, a processor in the ECU can execute program instructions or logic to cause the ECU output condition or output signal to appear at and/or on the ECO 57, 58.

Non-PID data can, for example, include data based on measurements of a signal carried on a circuit between an ECU and an ECO, between two ECU, between two ECO, between an ECU and a sensor, between a sensor and a battery-connected circuit, between an ECU and a battery-connected circuitry, between a ECO and a battery-circuit, between an OBDC and an ECU, or between an OBDC and a battery-connected circuit.

Turning to FIG. 37, arrangement 36, 37, 38 for operatively connecting the computing system 5 to the vehicle 4 via the communication link 91 represented in FIG. 36 are shown. In the arrangement 36, 37, 38, the OBDC 54 is operatively connected to the ECU 6 within the vehicle 4 using the vehicle network 90. In FIG. 37, the ECU 6 represents one or more ECUs in the vehicle 4, such as the ECU 51, 52, 53, 69 shown in FIG. 36.

In the arrangement 36, the computing system 5 is directly connected to the OBDC 54 using a wired network 13. As an example, the wired network 13 can be contained within a harness with multiple wires, at least one of which is configured to carry a VDM between the computing system 5 and the OBDC 54. The harness can include a connector removably attachable to the OBDC 54. The wired network 13 can include one or more wires.

In the arrangement 37, the computing system 5 is directly connected to the OBDC 54 using a wireless network 14. The wireless network 14 can include an air interface established to carry a VDM between the computing system 5 and the OBDC 54. The wireless network 14 and the air interface can be configured in accordance with a wireless communication standard or protocol, such as any wireless communication standard or protocol described in this description.

In the arrangement 38, the computing system 5 is indirectly connected to the OBDC 54 using a wireless network 92 and a dongle 39. The dongle 39 includes a connector 93 removably attachable to the OBDC 54 and a wireless transceiver and a wired transceiver. The wireless network 92 can include an air interface established to carry a VDM between the computing system 5 and the dongle 39. The wireless network 92 and the air interface can be configured in accordance with a wireless communication standard or protocol, such as any wireless communication standard or protocol described in this description. The wired transceiver of the dongle 39 can receive a VDM transmitted to the OBDC 54 over the vehicle network 90 from an ECU and can transmit a VDM onto the vehicle network 90 for transmission to an ECU in the vehicle 4.

Next, FIG. 38 shows a vehicle 680 and example placement of the computing system 5 within the vehicle 680. The vehicle 4 shown in FIG. 1 can be arranged like the vehicle 680. The vehicle 680 is an electric vehicle. In at least some implementations, the vehicle 680 includes an internal combustion engine (ICE) such that the vehicle 680 is a hybrid vehicle.

As shown in FIG. 38, the vehicle 680 includes a motor 681 at a left front location of the vehicle 680, a motor 682 at a right front location of the vehicle 680, a motor 683 at a left rear location of the vehicle 680, and a motor 684 at a right rear location of the vehicle 680. The vehicle 680 also includes an inverter 685, 686, an on-board charger 688, 689, a charge port 693, 694, an ECU 691, an on-board diagnostic connector 690, and a vehicle network 692. As an example, the charge port 693 can include an AC voltage charge port and the charge port 694 can include a DC voltage charge port. The vehicle 680 can further include battery modules 687 including multiple battery modules (BM) and multiple cell monitoring units (CMU). The CMU can determine parameters regarding the battery modules, such as a battery voltage, a battery temperature, or a battery internal resistance.

Next, FIG. 39 shows non-PID data 362. The non-PID data 362 includes an analog signal detectable by the signal detector 43. The analog signal can be received via the probe 44, the meter 46 and/or the oscilloscope 47. The analog signal can be provided to the analog-to-digital converter 48. A digital version of the non-PID data 362 can be stored in the memory 17 (e.g., the buffer 33).

As an example, the non-PID data 362 can comprise an analog signal output by a sensor, such as a crankshaft position sensor. The analog signal is substantially uniform except for a gap 363, 395 (e.g., a break between uniform portions of the analog signal (e.g., a portion of the signal referenced as "TDC" (i.e., top dead center)). The period of the gap is 0.1 seconds. As an example, a gap, such as the gap 363, 395, can be generated each time a crankshaft position sensor detects that a particular piston connected to a crankshaft is at top dead center position of its stroke. Such period can correspond to 600 revolutions per minute (RPM) of the crankshaft. Other examples of signals corresponding to non-PID data are also possible.

The processor 15 can determine a position-of-interest with respect to the crankshaft based on the non-PID data 362. With a gap representing TDC (e.g., 0° or 360°) and seventeen pulses between the left-most gap 363 and the right-most gap 395, a positive peak of the 9th pulse can represent the 1800 position, and a most-negative portion between the 4$^{th}$ and 5$^{th}$ peaks can represent the 90° position. Other examples of determining particular points-of-interest are possible.

Next, FIG. 40 shows a display element 136 and different frame-to-pixel resolutions corresponding to the display element 136. As an example, the display element 136 can include the display 40. As another example, the display element 136 can include a portion of the display 40. In accordance with that latter example, the display element 136 can include a container (such as a container including the graph-axis control 218, a container including the graphical frame counter 276, or a container including a VDP graph), or a VDP graph. In at least some implementations, one or more of the graph-axis control 218, the graphical frame counter 276, or a VDP graph do not extend over the entire width of the display 40.

The display element 136 is shown to have a height of L pixels and a width of M pixels. As an example, L can equal eight hundred pixels, such that display element 136 includes eight hundred rows of pixels, when the display element 136 is oriented as shown in FIG. 40. As another example, M can equal one thousand two hundred eighty pixels, such that the display element 136 includes one thousand two hundred eighty columns of pixels, when the display element 136 is oriented as shown in FIG. 40. As an example, the eight hundred rows of pixels can be numbered "0" to "799" or "1" to "800," and the one thousand two hundred eighty columns of pixels can be numbered "0" to "1,279" or "1" to "1,280." The orientation of the display element 136 shown in FIG. 40 can be considered a landscape display mode. Rotating the display element 136 by ninety degrees changes an orientation of the display element 136 to a portrait display mode.

The example frame-to-pixel resolutions shown in FIG. 40 are based on M equaling one thousand pixels. For those examples, the display element 136 includes one thousand columns of pixels that can be numbered "0" to "999" or "1" to "1,000."

In accordance with implementations in which temporal aspects vary across a width of the display element 136 (e.g., a VDP graph with a horizontal axis representing time), the example frame-to-pixel resolutions pertain to the width of the display element 136, not to the height of the display element 136. In accordance with at least some implementations, the height L of the display element 136 can be within a range of one to twenty pixels when the display element 136 includes the graph-axis control 218 or the graphical frame counter 276.

A frame-to-pixel resolution 365 can be an initial frame-to-pixel resolution represented by the graph-axis control 218 and/or the graphical frame counter 276. As shown in FIG. 40, one thousand frames are represented using a display width of one thousand pixels, such that the frame-to-pixel resolution is one frame per pixel. Using this frame-to-pixel resolution, the graph-axis control 218 and the graphical frame counter 276 can, for example, represent frames "1" to "1,000," even if none, only some of the frames, or all of the frames are written into the buffer 33.

A frame-to-pixel resolution 366 can be a second frame-to-pixel resolution represented by the graph-axis control 218 and/or the graphical frame counter 276 after a first additional buffer segment is engaged for storing frame data. As shown in FIG. 40, two thousand frames are represented using a display width of one thousand pixels, such that the frame-to-pixel resolution is two frames per pixel. Using this frame-to-pixel resolution, the graph-axis control 218 and the graphical frame counter 276 can, for example, represent frames "1" to "2,000," even if none, only some of the frames, or all of the frames are written into the buffer 33. Since the width of the display element 136 did not change, the graph-axis control 218 and/or the graphical frame counter 276 is compressed upon engaging the first additional buffer segment. The first two buffer segments having one thousand frames each show that buffer segments can have the same size.

A frame-to-pixel resolution 367 can be a third frame-to-pixel resolution represented by the graph-axis control 218 and/or the graphical frame counter 276 after another additional buffer segment is engaged for storing frame data. As shown in FIG. 40, five thousand frames are represented using a display width of one thousand pixels, such that the frame-to-pixel resolution is five frames per pixel. Using this frame-to-pixel resolution, the graph-axis control 218 and the graphical frame counter 276 can, for example, represent frames "1" to "5,000," even if none, only some of the frames, or all of the frames are written into the buffer 33. Since the width of the display element 136 did not change, the graph-axis control 218 and/or the graphical frame counter 276 is further compressed upon engaging the other additional buffer segment. This other additional buffer segment includes three thousand frames and the first two buffer segments having one thousand frames show that buffer segments can have different sizes.

A frame-to-pixel resolution 368 can be a fourth frame-to-pixel resolution represented by the graph-axis control 218 and/or the graphical frame counter 276 after another additional buffer segment is engaged for storing frame data. As shown in FIG. 40, ten thousand frames are represented using a display width of one thousand pixels, such that the frame-to-pixel resolution is ten frames per pixel. Using this frame-to-pixel resolution, the graph-axis control 218 and the graphical frame counter 276 can, for example, represent frames "1" to "10,000," even if none, only some of the frames, or all of the frames are written into the buffer 33. Since the width of the display element 136 did not change, the graph-axis control 218 and/or the graphical frame counter 276 is compressed upon engaging the other additional buffer segment. Additional buffer segments can be engaged during a session of collecting data from the vehicle 4. Different examples of the buffer sizes are possible.

The display element 136 shown in FIG. 40 is also applicable to a VDP graph displayed in a container and compressed or expanded using a zoom control, such as the zoom USC 237 shown in many of the drawings. As discussed, an example width M of the display element is one thousand pixels wide. In accordance with implementations in which the display element 136 represents a container to display a VDP graph, a default resolution of the VDP graph can be a width of five pixels per frame (e.g., five pixels per PID parameter value). The default resolution for that example permits displaying two hundred frames of PID parameter values across a width of the display element 136. Other examples of the default resolution of the VDP graph and/or the quantity of frames that can be displayed when using the default resolution are also possible.

The zoom USC 237 can be used to modify the resolution of the VDP graph. For example, the zoom USC 237 can be moved to a zoom-out setting such that more frames of PID parameter values are displayed across the width of the display element 136, such as five hundred frames of PID parameter values instead of two hundred frames of PID parameter values. In accordance with that example, a zoom-out resolution of the VDP graph is a width of two pixels per frame (e.g., two pixels per PID parameter value). Other examples of the resolution of the VDP graph when using a zoom-out setting and/or the quantity of frames that can be displayed when using a zoom-out setting are also possible.

As another example, the zoom USC 237 can be moved to a zoom-in setting such that fewer frames of PID parameter values are displayed across the width of the display element 136, such as one hundred frames of PID parameter values instead of two hundred frames of PID parameter values. In accordance with that example, a zoom-in resolution of the VDP graph is a width of ten pixels per frame (e.g., ten pixels per PID parameter value). Other examples of the resolution of the VDP graph when using a zoom-in setting and/or the quantity of frames that can be displayed when using a zoom-in setting are also possible In FIG. 40, the default resolution, the zoom-out resolution, and the zoom-in resolution are represented in a graph 387, 388, 389, respectively. The graph 387, 388, 389 includes a horizontal axis 393 and vertical axis 394. Spaces between the horizontal marks on the vertical axis 394 represent a height of pixel rows. Spaces between the vertical marks on the horizontal axis 393 represent a width of pixel columns. The graph 387, 388, 389 also includes a waveform 390 with a VDP parameter value-in resolution, respectively. Other examples of a pixel-to-frame (or a pixel per PID parameter value) resolution used to graph VDP parameter values are also possible.

Next, FIG. 41A, FIG. 41B, FIG. 41C, and FIG. 41D show examples of compressing frames corresponding to displayed VOC indicators in accordance with the example implementations. As a result of compression, the frame-to-pixel resolutions in these drawings is different. Each square that is not filled black represents a respective pixel among a set of pixels. The black regions represent other pixels. As an example, the set of pixels can be pixels of the display 40. As noted above, the display 40 can be arranged with "800"× "1,280" pixels, "625"×"1,000" pixels or with some other pixels arrangement.

Figures 41A, 41B:
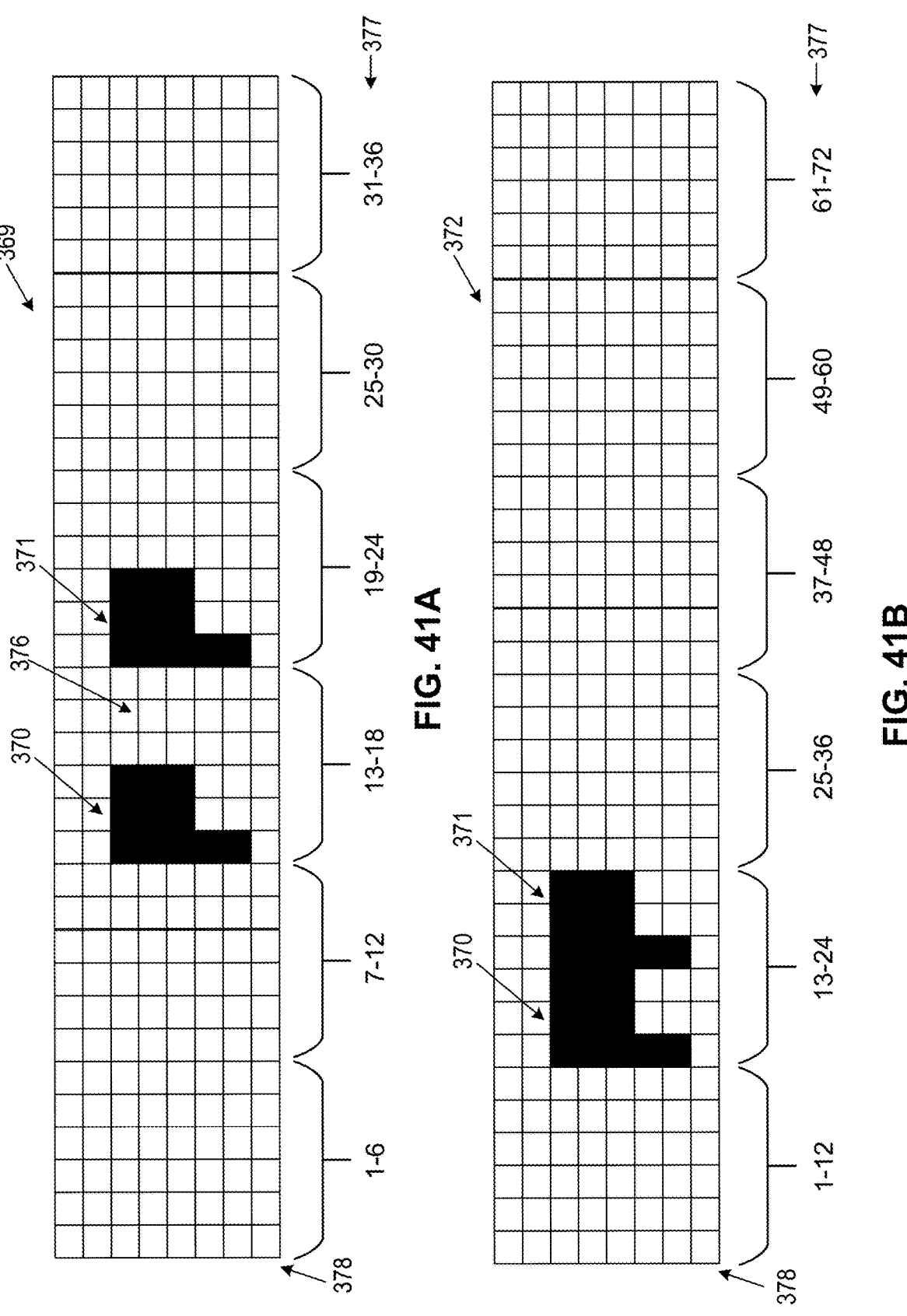
FIG. 41A, FIG. 41B, FIG. 41C, and FIG. 41D show compressing frames corresponding to displayed VOC indicators in accordance with the example implementations.

FIG. 41A shows a portion 369 of a set of pixels. The portion 369 is eight pixels high and thirty-six pixels wide. The portion 369 includes pixels arranged to show a VOC indicator 370, 371 using eleven pixels each. In the example implementations, a different number of pixels can be used to represent a VOC indicator. A gap 376 between the closest portions of the VOC indicator 370 and the VOC indicator 371 is three pixels wide. A frame counter 377 shows that a width of thirty-six frames are represented by a width of thirty-six pixels such that the frame-to-pixel resolution is one frame per pixel. The left-most portions of the VOC indicator 370 begin in a pixel corresponding to a frame "13" and left-most portions of the VOC indicator 371 begin in a pixel corresponding to a frame "19." A first end 378 of a portion of pixels (e.g., the portion 369) is shown. The first end 378 can correspond to the first end 228 of the graph-axis control 218 and/or a first end of the graphical frame counter 276.

Next, FIG. 41B shows a portion 372 of the set of pixels. The portion 372 is eight pixels high and thirty-six pixels wide. The portion 372 includes pixels arranged to show the VOC indicator 370, 371 using eleven pixels each, but there is no gap between the closest portions of the VOC indicator 370 and the VOC indicator 371. The frame counter 377 shows that a width of 72 frames are represented by a width of thirty-six pixels such that the frame-to-pixel resolution is two frames per pixel. The left-most portions of the VOC indicator 370 begin in a pixel corresponding to the frame "13" and left-most portions of the VOC indicator 371 begin in a pixel corresponding to the frame "19." In FIG. 41B, the VOC indicator 370, 371 is closer to the first end 378 as compared to the VOC indicator 370, 371 and the first end 378 in FIG. 41A. This represents a compressing of the frames within the display.

Figures 41C, 41D:
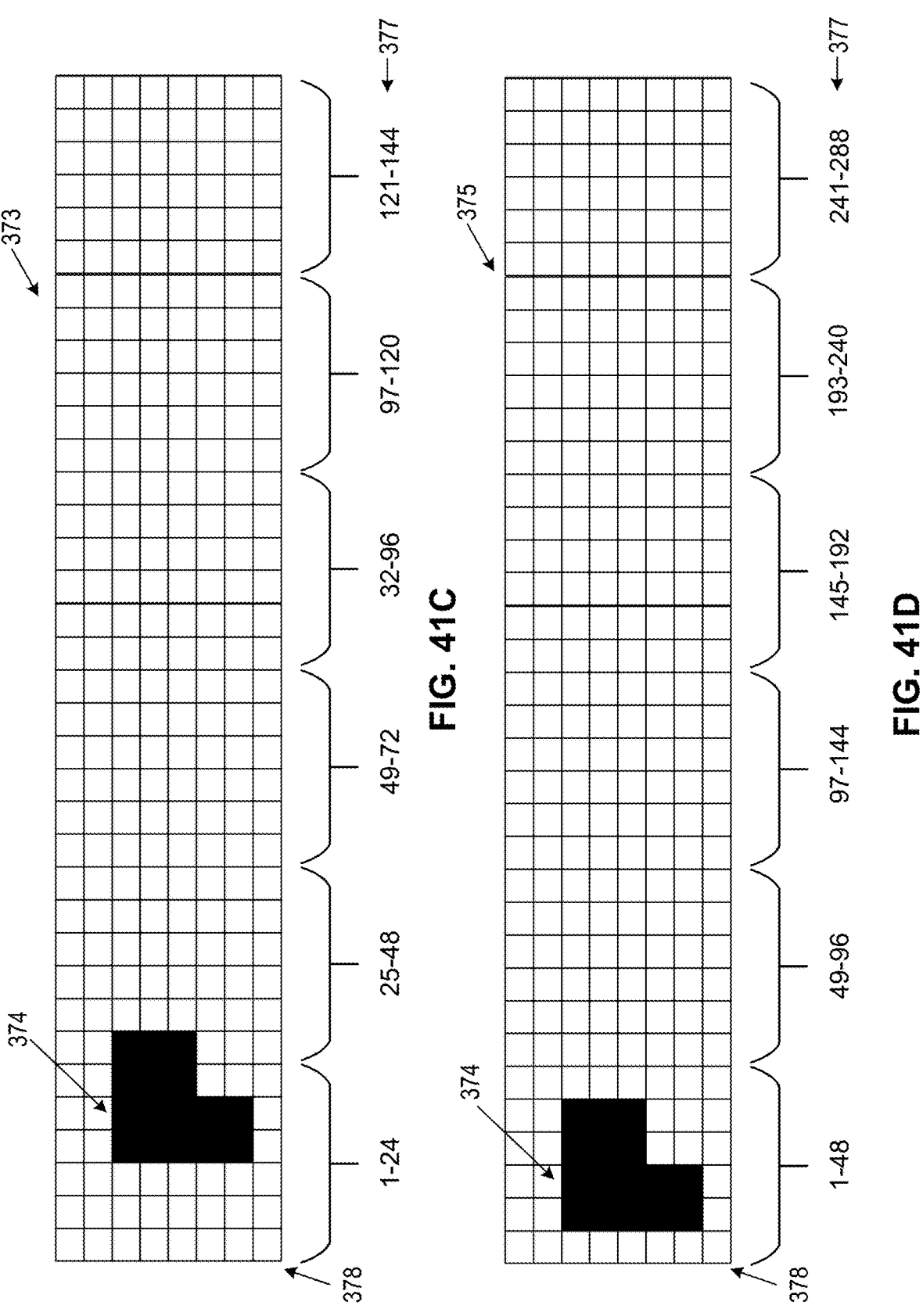

Next, FIG. 41C shows a portion 373 of the set of pixels. The portion 373 is eight pixels high and thirty-six pixels wide. The portion 373 includes sixteen pixels arranged to show a stacked VOC indicator 374. The stacked VOC indicator 374 results from increasing the frame-to-pixel resolution. The stacked VOC indicator 374 corresponds to one of the VOC indicator 370 or the VOC indicator 371 being stacked on the other. The frame counter 377 shows that a width of 144 frames are represented by a width of thirty-six pixels such that the frame-to-pixel resolution is four frames per pixel. The left-most portions of the VOC indicator 374 (corresponding to the VOC indicator 370) begin in a pixel corresponding to the frame "13" (e.g., a pixel corresponding to frames "13-18") and left-most portions of the VOC indicator 374 (corresponding to the VOC indicator 371) begin in a pixel corresponding to the frame "19" (e.g., a pixel corresponding to frames "19-24"). Compared to FIG. 41A and FIG. 41B, the pixel corresponding to the frame "13" in FIG. 41C is closer to the first end 378. This represents a further compressing of the frames within the display.

Next, FIG. 41D shows a portion 375 of the set of pixels. The portion 375 is eight pixels high and thirty-six pixels wide. The portion 375 includes sixteen pixels arranged to show the stacked VOC indicator 374. The frame counter 377 shows that a width of 288 frames are represented by a width of thirty-six pixels such that the frame-to-pixel resolution is eight frames per pixel. The left-most portions of the VOC indicator 374 (corresponding to the VOC indicator 370)

begin in a pixel corresponding to the frame "13" (e.g., a pixel corresponding to frames "8-16") and left-most portions of the VOC indicator 374 (corresponding to the VOC indicator 371) begin in a pixel corresponding to the frame "19" (e.g., a pixel corresponding to frames "17-24"). Compared to FIG. 41A, FIG. 41B, and FIG. 41C, the pixel corresponding to the frame "13" in FIG. 41D is even closer to the first end 378. This represents yet a further compressing of the frames within the display.

VI. Further Definitions

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each implementation including a listed component or function independently and each implementation comprising a combination of the listed components or functions. For example, an implementation described as comprising A, B, and/or C, or at least one of A, B, and C, or one or more of A, B, and C is intended to cover each of the following possible implementations: (i) an implementation comprising A, but not B and not C, (ii) an implementation comprising B, but not A and not C, (iii) an implementation comprising C, but not A and not B, (iv) an implementation comprising A and B, but not C, (v) an implementation comprising A and C, but not B, (v) an implementation comprising B and C, but not A, and (vi) an implementation comprising A, B, and C. For the implementations comprising component or function A, the implementations can comprise one A or multiple A. For the implementations comprising component or function B, the implementations can comprise one B or multiple B. For the implementations comprising component or function C, the implementations can comprise one C or multiple C. The use of ordinal numbers such as "first," "second," "third" and so on is to distinguish respective elements rather than to denote a particular order of those elements unless the context of using those terms explicitly indicates otherwise.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

VII. Conclusion

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

Implementations of the present disclosure may thus relate to one of the enumerated example embodiments (EEEs) listed below.

EEE 1 is a method comprising writing, into a memory, vehicle data parameters output by a particular vehicle. Each vehicle data parameter (VDP) corresponds to a parameter identifier (PID) from among a set of multiple different PIDs. The memory includes a non-transitory computer-readable memory. The method also includes displaying, on a display, a first view of a graphical user interface (GUI). The GUI includes one or more VDP graphs, a graph-axis control, and a first vehicle operating condition (VOC) indicator at the graph-axis control. The first view of the GUI includes a first set of VDP graphs from among the one or more VDP graphs. Each VDP graph of the one or more VDP graphs corresponds to at least a partial amount of the vehicle data parameters. Each partial amount of the vehicle data parameters corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the vehicle data parameters. At least some of the first portion of the vehicle data parameters are represented within the first set of VDP graphs. The second graph-axis control segment in the first view of the GUI corresponds to a second portion of the vehicle data parameters. The second portion of the vehicle data parameters is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI. The method further includes displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

EEE 2 is a method according to EEE 1, wherein a first PID of the multiple different PIDs is associated with a first threshold. The one or more VDP graphs include a particular VDP graph. The particular VDP graph is a graph of vehicle data parameters written into the memory for the first PID. The first vehicle operating condition indicator is added onto the graphical user interface in response to a VDP corresponding to the first PID breaching the first threshold. The second set of VDP graphs includes the particular VDP graph. The first set of VDP graphs does not include the particular VDP graph.

EEE 3 is a method according to EEE 1, wherein a first PID of the multiple different PIDs is associated with a first threshold. The one or more VDP graphs include a particular VDP graph. The particular VDP graph is a graph of vehicle data parameters written into the memory for the first PID. The first vehicle operating condition indicator is added onto the graphical user interface in response to a VDP corresponding to the first PID breaching a first threshold. The particular VDP graph is positioned at a first area of the display when displaying the first view of the GUI and is positioned at a second area of the display when displaying the second view of the GUI, and the first area is different than the second area.

EEE 4 is a method according to any one of EEE 1 to 3, further comprising pausing, in response to a selection of the first vehicle operating condition indicator, the writing of vehicle data parameters into the memory. The method also includes adding onto each VDP graph of the second set of VDP graphs a cursor to indicate when pausing the writing of vehicle data parameters into the memory occurred with respect to the particular vehicle outputting vehicle data parameters represented on each VDP graph of the second set of VDP graphs.

EEE 5 is a method according to any one of EEE 1 to 4, further comprising writing, into the memory, non-PID data based on an order in which the non-PID data are received. Each VDP corresponds to a non-PID datum of the non-PID data. The graphical user interface includes a user-selectable control to select which of the vehicle data parameters are shown in the first set of VDP graphs or the second set of VDP graphs based on a particular non-PID datum from among the non-PID data.

EEE 6 is a method according to EEE 5, wherein the non-PID data include location data corresponding to a location of a vehicle that output the vehicle data parameters.

EEE 7 is a method according to EEE 5, wherein the non-PID data includes images captured by a visible light camera or a thermal imager.

EEE 8 is a method according to EEE 5, further comprising determining a voltage measurement by measuring, using an oscilloscope or voltmeter, a voltage on an electrical circuit connected to a crankshaft or camshaft position sensor within an internal combustion engine in the particular vehicle. The method also includes determining the non-PID data based on the voltage measurement. The non-PID data include position data corresponding to a particular position of the crankshaft or camshaft within the internal combustion engine.

EEE 9 is a method according to EEE 8, wherein determining the non-PID data based on the voltage measurement includes determining a first particular position of the crankshaft or camshaft based on the voltage measurement indicating a particular portion of a timing rotor passing a sensor for detecting the first particular position of the crankshaft or camshaft.

EEE 10 is a method according to EEE 9, wherein determining the non-PID data based on the voltage measurement further includes determining a second particular position of the crankshaft or camshaft based on consecutive voltage measurements indicating the particular portion of the timing rotor and an amount of time occurring between the consecutive voltage measurements.

EEE 11 is a method according to any one of EEE 9 or 10, further comprising: displaying within one or more VDP graphs in the first or second set of VDP graphs a respective indicator corresponding to the non-PID data relative to when the non-PID data was determined and the vehicle data parameters shown in the one or more VDP graphs in the first or second set of VDP graphs were received.

EEE 12 is a method according to any one of EEE 5 to 11, wherein the vehicle data parameters are written into the memory based on an order in which the vehicle data parameters are output by the particular vehicle.

EEE 13 is a method according to any one of EEE 5 to 12, wherein the non-PID data includes first non-PID data from a first input and second non-PID data from a second input. The non-PID datum of the non-PID data is from among the first non-PID data. At least some of the vehicle data parameters correspond to non-PID data from among the first non-PID data and non-PID data from among the second non-PID data.

EEE 14 is a method according to any one of EEE 5 to 13, wherein the graphical user interface includes multiple containers including a particular container. The first set of VDP graphs and the second set of VDP graphs are disposed within some of the containers. The non-PID data is displayed within the particular container. The method further comprises determining, by a processor, a selection of the particular container has occurred and displaying, on the display, a third view of the graphical user interface. The third view of the graphical user interface shows the particular container in a full-screen mode. The third view of the graphical user interface includes a control to change a display of the non-PID data in the particular container instead of the graph-axis control.

EEE 15 is a method according to any one of EEE 5 to 14, wherein the user-selectable control is rotatable in a first direction to select a non-PID datum from a later-stored frame relative to a frame corresponding to a position of the cursor position indicator, and/or the user-selectable control is rotatable in a second direction to select a non-PID datum from an earlier-stored frame relative to the frame corresponding to a position of the cursor position indicator.

EEE 16 is a method according to EEE 15, wherein the user-selectable control includes a dial corresponding to an angular position of a crankshaft in an internal combustion engine.

EEE 17 is a method according to EEE 15, wherein the user-selectable control includes a dial corresponding to an angular position of a camshaft in an internal combustion engine.

EEE 18 is a method according to any one of EEE 15 to 17, wherein the user-selectable control is rotatable in the first direction to select a non-PID datum from the frame corresponding to the position of the cursor position indicator prior to selecting the non-PID data from the later-stored frame, and/or the user-selectable control is rotatable in the second direction to select a non-PID datum from the frame corresponding to the position of the cursor position indicator prior to selecting the non-PID datum from the earlier-stored frame.

EEE 19 is a method according to any one of EEE 15 to 18, wherein a use of the user-selectable control causes an icon representative of receipt of a particular non-PID datum to be displayed within a VDP graph. The icon is displayed in proximity to a particular PID parameter value represented in the VDP graph that was received closest in time to receipt of the particular non-PID datum.

EEE 20 is a method according to any one of EEE 1 to 19, further comprising determining, by a processor while displaying the first view of the GUI, a change to a zoom setting for the graphical user interface. The method further includes changing, on the display based on the change to the zoom setting, a size of the first graph-axis control segment, a size of the second graph-axis control segment, and a quantity of vehicle data parameters within the first portion of the vehicle data parameters. The change to the zoom setting includes zooming in or zooming out. In response to zooming in: (i) changing the size of the first graph-axis control segment and the size of the second graph-axis control segment includes decreasing the size of the first graph-axis control segment and increasing the size of the second graph-axis control segment, and (ii) changing the quantity of vehicle data parameters within the first portion of the vehicle data parameters includes decreasing the quantity of vehicle data parameters within the first portion of the vehicle data parameters. In response to zooming out: (i) changing the size of the first graph-axis control segment and the size of the second graph-axis control segment includes increasing the size of the first graph-axis control segment and decreasing the size of the second graph-axis control segment, and (ii) changing the quantity of vehicle data parameters within the first portion of the vehicle data parameters includes increasing the quantity of vehicle data parameters within the first portion of the vehicle data parameters.

EEE 21 is a method according to EEE 20, wherein in response to zooming in, the processor decreases a quantity of frames displayed in each VDP graph of the first set of VDP graphs, and in response to zooming out, the processor increases the quantity of frames displayed in each VDP graph of the first set of VDP graphs.

EEE 22 is a method according to any one of EEE 20 or 21, further comprising shifting two or more VOC indicators displayed on the GUI closer together in response to zooming out.

EEE 23 is a method according to any one of EEE 20 or 21, further comprising shifting two or more VOC indicators displayed on the GUI further apart from each other in response to zooming in.

EEE 24 is a method according to any one of EEE 1 to 23, wherein the graphical user interface further includes a first control and a second control. The method further comprises: determining, by a processor, a selection of the first control has occurred; stopping, by the processor in response to determining the selection of the first control has occurred, the writing of vehicle data parameters into the memory; determining, by the processor, a selection of the second control has occurred after stopping the writing of vehicle data parameters into the memory; re-starting, by the processor in response to determining the selection of the second control has occurred, the writing of vehicle data parameters into the memory; and displaying within each VDP graph of the first set of VDP graphs, a respective first cursor. Each respective first cursor represents a position within each VDP graph of the first set of VDP graphs where writing of vehicle data parameters stopped.

EEE 25 is a method according to EEE 24, wherein the first control and the second control are part of a single control, the first control toggles to the second control in response to a selection of the first control, and the second control toggles to the first control in response to a selection of the second control.

EEE 26 is a method according to EEE 25, wherein determining the selection of the first control has occurred includes determining that the first vehicle operating condition indicator displayed within the graphical user interface has been selected.

EEE 27 is a method according to any one of EEE 25 or 26, wherein each VDP graph of the first set of VDP graphs includes a second cursor that corresponds to an axis-position selector on the GUI.

EEE 28 is a method according to EEE 27, wherein the axis-position selector includes the cursor position indicator.

EEE 29 is a method according to any one of EEE 27 or 28, wherein the axis-position selector includes the second cursor.

EEE 30 is a method according to any one of EEE 1 to 29, wherein the memory includes a buffer comprising a first buffer segment and a second buffer segment. The first buffer segment is configured to store a first quantity of frames. The second buffer segment is configured to store a second quantity of frames. Writing the vehicle data parameters into the memory includes writing at least a first portion of the first quantity of frames into the first buffer segment, the graph-axis control includes a first end, a second end opposite the first end, and a first point between the first end and the second end. The cursor position indicator moves within the graph-axis control from the first end towards the first point as a first portion of the first quantity of frames are written into the first buffer segment. The cursor position indicator moves within the graph-axis control from the first point towards the second end as a second portion of the first quantity of frames are written into the first buffer segment. The cursor position indicator moves within the graph-axis control back to the first-point after the second portion of the first quantity of frames are written into the first buffer segment and then moves from the first point towards the second end as additional frames are written into the first buffer segment and/or as a first portion of the second quantity of frames are written into the second buffer segment. Prior to any of the second portion of the first quantity of frames being written into the first buffer segment, the graph-axis control represents the first quantity of frames, and after the second portion of the first quantity of frames are written into the first buffer segment and while a first portion of the second quantity of frames are written into the second buffer segment, the graph-axis control represents a particular quantity of frames based on the first quantity of frames and the second quantity of frames.

EEE 31 is a method according to EEE 30, wherein the particular quantity of frames equals a sum of the first quantity of frames and the second quantity of frames.

EEE 32 is a method according to EEE 30, wherein the particular quantity of frames equals a sum of the first quantity of frames and a portion of the second quantity of frames.

EEE 33 is a method according to EEE 29, wherein the buffer further comprises a third buffer segment. The third buffer segment is configured to store a third quantity of frames. Writing the vehicle data parameters into the memory further includes writing at least a first portion of the second quantity of frames into the second buffer segment. The graph-axis control includes a second point between the first end and the second end. The cursor position indicator moves within the graph-axis control back to the second point after the first portion of the second quantity of frames are written into the second buffer segment and then moves from the second point towards the second end as additional frames are written into the second buffer segment and/or as at least a first portion of the third quantity of frames are written into the third buffer segment. After the first portion of the first quantity of frames are written into the first buffer segment and prior to the first portion of the second quantity of frames being written into the second buffer segment, the graph-axis control represents the sum of the first quantity of frames and the second quantity of frames, and after the first portion of the second quantity of frames have been written into the second buffer segment and while a first portion of the third quantity of frames are written into the third buffer segment, the graph-axis control represents a sum of the first quantity of frames, the second quantity of frames and the third quantity of frames.

EEE 34 is a method according to EEE 33, wherein the first particular quantity of frames equals a sum of the first quantity of frames and the second quantity of frames, and the second quantity of frames equals a sum of the first quantity of frames, the second quantity of frames and the third quantity of frames.

EEE 35 is a method according to EEE 33, wherein the first particular quantity of frames equals a sum of the first quantity of frames and a portion of the second quantity of frames, and the second quantity of frames equals a sum of the first quantity of frames, the second quantity of frames and a portion of the third quantity of frames.

EEE 36 is a method according to EEE 33, wherein displaying one or more from among the first and second views of the GUI includes displaying the second point.

EEE 37 is a method according to any one of EEE 30 to 36, wherein the GUI includes a second VOC indicator at the graph-axis control. A distance between the first VOC indicator and the second VOC indicator before the cursor position indicator moves within the graph-axis control back to the first-point is a first distance. A distance between the first VOC indicator and the second VOC indicator after the cursor position indicator moves within the graph-axis control back to the first-point and while the graph-axis control represents the quantity of frames based on the first quantity of frames and the second quantity of frames is a second distance. The second distance is shorter than the first distance.

EEE 38 is a method according to EEE 37, wherein the second distance is 0.

EEE 39 is a method according to any one of EEE 30 to 38, wherein a sum of the first portion of the first quantity of frames and the second portion of the first quantity of frames equals the first quantity of frames.

EEE 40 is a method according to any one of EEE 30 to 39, wherein displaying one or more from the first view of the GUI and the second view of the GUI includes displaying the first point.

EEE 41 is a method according to any one of EEE 30 to 40, wherein the first point includes a point between the first end and a mid-point between the first end and the second end, or a point between the mid-point and the second end.

EEE 42 is a method according to any one of EEE 30 to 41, wherein the first portion of the first quantity of frames is fifty percent of the first quantity of frames.

EEE 43 is a method according to any one of EEE 30 to 42, wherein two or more buffer segments in the memory are arranged for storing a common number of frames.

EEE 44 is a method according to any one of EEE 30 to 42, wherein two or more buffer segments in the memory are arranged for storing different number of frames.

EEE 45 is a method according to EEE 44, wherein the two or more buffer segments include the first buffer segment and the second buffer segment and the second buffer segment is arranged to store more frames than the first buffer segment.

EEE 46 is a method according to any one of EEE 1 to 45, wherein the cursor position indicator is movable in response to a user input, and the cursor in each vehicle data parameter graph is re-positioned in response to the user input.

EEE 47 is a method according to any one of EEE 1 to 46, wherein a first PID of the multiple different PIDs is associated with a first threshold. The first threshold includes a minimum threshold and displaying the first VOC indicator includes displaying the first VOC indicator below the graph-axis control, or the first threshold includes a maximum threshold. Displaying the first VOC indicator includes displaying the first VOC indicator above the graph-axis control.

EEE 48 is a method according to any one of EEE 1 to 47, further comprising determining, by a processor, discontinuance of receiving vehicle data parameters for a particular PID or particular non-PID data. The method also includes displaying, on the display, an indicator of the determined discontinuance. The indicator of the determined discontinuance is displayed: (i) on the graph-axis control, (ii) adjacent the graph-axis control, (iii) within a container including a VDP graph corresponding to the particular PID, (iv) adjacent the container including the VDP graph corresponding to the particular PID, (v) within a container including the particular non-PID data received prior to the discontinuance, or (vi) adjacent the container including the particular non-PID data received prior to the discontinuance.

EEE 49 is a method according to any one of EEE 1 to 48, wherein a second PID of the multiple different PIDs is associated with a second threshold. The GUI includes a second VOC indicator at the graph-axis control. The first VOC indicator is displayed in response to receipt of a parameter value corresponding to the first PID that breaches the first threshold. The second VOC indicator is displayed in response to receipt of a parameter value corresponding to the second PID that breaches the second threshold. The first VOC indicator and the second VOC indicator are arranged as a stacked VOC indicator in that a portion of one of the first VOC indicator and the second VOC indicator is overlaid upon the other of the first VOC indicator and the second VOC indicator. The selection of the first VOC indicator includes a selection of the stacked VOC indicator.

EEE 50 is a method according to EEE 49, wherein the first PID breaches the first threshold before the second PID breaches the second threshold, and the cursor position indicator is displayed adjacent the first VOC indicator in response to the selection of the stacked VOC indicator.

EEE 51 is a method according to any one of EEE 1 to 29, wherein writing the vehicle data parameters into the memory is part of writing frames into the memory. Each frame includes one vehicle data parameter for each PID of the set of multiple different PIDs.

EEE 52 is a method according to EEE 51, wherein the GUI includes a graphical frame counter alongside the graph-axis control.

EEE 53 is a method according to EEE 52, wherein the graphical frame counter includes numerical and non-numerical indicators to represent, in connection with the cursor position indicator, a quantity of frames written into the memory.

EEE 54 is a method according to any one of EEE 51 to 53, wherein the cursor position indicator moves within the graph-axis control in a first direction as a given number of additional frames is written into the memory.

EEE 55 is a method according to EEE 54, wherein the graph-axis control has a length of M pixels. In a first particular mode of writing VDP parameters into the memory, the graph-axis control represents up to $N_1$ frames, and $N_1/M$ frames are represented by each pixel in the length of M pixels. In a second particular mode of writing VDP parameters into the memory, the graph-axis control represents up to $N_2$ frames, and $N_2/M$ frames are represented by each pixel in the length of M pixels.

EEE 56 is a method according to EEE 55, wherein $N_2$ is greater than $N_1$. The second particular mode is entered from the first particular mode in response to use of a zoom user-selectable control to increase a zoom-out setting or in response to engaging an additional buffer segment in the memory for writing vehicle data parameters beyond one or more buffer segments in the memory already engaged for writing vehicle data parameters.

EEE 57 is a method according to EEE 55, wherein $N_1$ is greater than $N_2$ and the second particular mode is entered from the first particular mode in response to use of a zoom user-selectable control to increase a zoom-in setting.

EEE 58 is a method according to any one of EEE 54 to 57, wherein the given number of additional frames is greater than one frame.

EEE 59 is a method according to any one of EEE 54 to 57, wherein the given number of additional frames is one frame.

EEE 60 is a method according to any one of EEE 54 to 59, wherein the first direction is to the right.

EEE 61 is a method according to any one of EEE 54 to 59, wherein the first direction is to the left.

EEE 62 is a method according to any one of EEE 54 to 59, wherein the first direction is an upward direction.

EEE 63 is a method according to any one of EEE 54 to 59, wherein the first direction is to a downward direction.

EEE 64 is a method according to any one of EEE 1 to 56, wherein the GUI further includes a user-selectable control for pausing the writing of vehicle data parameters into the memory. In response to a first selection of the user-selectable control, additional vehicle data parameters are not written into the memory.

EEE 65 is a method according to EEE 64, wherein in response to a selection of the user-selectable control while writing vehicle data parameters is paused, writing vehicle data parameters into the memory continues.

EEE 66 is a method according to any one of EEE 64 or 65, further comprising: adding onto each VDP graph within the GUI a cursor to indicate when pausing the writing of vehicle data parameters into the memory occurred with respect to the particular vehicle outputting vehicle data parameters represented on each VDP graph within the GUI.

EEE 67 is a method according to any one of EEE 1 to 66, wherein: the first set of VDP graphs and the second set of VDP graphs include an equal number of VDP graphs, and the first set of VDP graphs and the second set of VDP graphs correspond to a common set of parameter identifiers.

EEE 68 is method according to EEE 1, wherein a first PID of the multiple different PIDs is associated with a first threshold. A second PID of the multiple different PIDs is associated with a second threshold. The GUI includes a second VOC indicator at the graph-axis control. The first VOC indicator is displayed in response to receipt of a parameter value corresponding to the first PID that breaches the first threshold. The second VOC indicator is displayed in response to receipt of a parameter value corresponding to the second PID that breaches the second threshold. The first set of VDP graphs or the second set of VDP graphs includes a first VDP graph including a waveform of parameter values corresponding to the first PID, and a second VDP graph including a waveform of parameter values corresponding to the second PID. The first VDP graph includes a first cursor corresponding to the first VOC indicator and a first cursor corresponding to the second VOC indicator. The second VDP graph includes a second cursor corresponding to the first VOC indicator and a second cursor corresponding to the second VOC indicator. The first cursor corresponding to the first VOC indicator and the second cursor corresponding to the second VOC indicator are displayed using a first cursor format. The second cursor corresponding to the first VOC indicator and the first cursor corresponding to the second VOC indicator are displayed using a second cursor format. A cursor displayed using the first cursor format represents a position within a VDP graph at which a parameter value for a particular PID represented in the VDP graph is a parameter value that breached a threshold corresponding to the particular PID. A cursor displayed using the second cursor format represents a position within a VDP graph closest to a parameter value for a particular PID represented in the VDP graph and contained in a frame with a parameter value for a different PID that breached a threshold corresponding to the different PID.

EEE 69 is a method according to EEE 68, wherein a third PID of the multiple different PIDs is associated with a third threshold. The GUI includes a third VOC indicator at the graph-axis control. The third VOC indicator is displayed in response to receipt of a parameter value corresponding to the third PID that breaches the third threshold. The first set of VDP graphs or the second set of VDP graphs includes the first VDP graph, the second VDP graph, and a third VDP graph including a waveform of parameter values corresponding to the third PID. The first VDP graph further includes a first cursor corresponding to the third VOC indicator. The second VDP graph further includes a second cursor corresponding to the third VOC indicator. The third VDP graph includes a third cursor corresponding to the first VOC indicator, a third cursor corresponding to the second VOC indicator, and a third cursor corresponding to the third VOC indicator. The third cursor corresponding to the third VOC indicator is displayed using the first cursor format. The third cursor corresponding to the first VOC indicator and the third cursor corresponding to the second VOC indicator are displayed using the second cursor format.

EEE 70 is a method according to any one of EEE 68 to 69, wherein the cursor displayed using the first cursor format includes a solid line, and the cursor displayed using the second cursor format includes a dashed line.

EEE 71 is a method according to any one of EEE 68 to 69, wherein the cursor displayed using the first cursor format includes a dashed line, and the cursor displayed using the second cursor format includes a solid line.

EEE 72 is a method according to any one of EEE 68 to 71, wherein the cursor displayed using the first cursor format includes a first color, and the cursor displayed using the second cursor format includes a second color that is different than the first color.

EEE 73 is a method according to any one of EEE 68 to 72, wherein the first cursor corresponding to the first VOC indicator and the first cursor corresponding to the second VOC indicator are positioned at a common position in the first VDP graph. The second cursor corresponding to the first VOC indicator and the second cursor corresponding to the second VOC indicator are positioned at a common position in the second VDP graph. The first cursor corresponding to the first VOC indicator is overlaid upon the first cursor corresponding to the second VOC indicator, and the second cursor corresponding to the second VOC indicator is overlaid upon the second cursor corresponding to the first VOC indicator.

EEE 74 is a method according to any one of EEE 68 to 73, wherein the frame with the parameter value for the different PID includes the parameter value for the particular PID.

EEE 75 is a method according to any one of EEE 68 to 73, wherein the parameter value for the particular PID is contained in a frame different than the frame with the parameter value for the different PID.

EEE 76 is a method according to any one of EEE 68 to 75, wherein the cursor displayed using the first cursor format has an opacity that permits a cursor displayed using the second format to be seen when the cursor displayed using the first format is overlaid upon the cursor displayed using the second format.

EEE 77 is a method according to any one of EEE 68 to 76, wherein the cursor displayed using the second format is displayed with a drop shadow when the cursor displayed using the first format is overlaid upon the cursor displayed using the second format.

EEE 78 is a method according to EEE 77, wherein the drop shadow is visible on the GUI when the cursor displayed using the first format is overlaid upon the cursor displayed using the second format.

EEE 79 is a method according to EEE 68, wherein the first VDP graph includes one or more other cursors displayed using the second cursor format. The first cursor corresponding to the second VOC indicator and the one or more other cursors are displayed with a drop shadow when overlaid by any other cursor. An offset of the drop shadow for each cursor displayed with a drop shadow is indicative of how many cursors are overlaid upon that cursor.

EEE 80 is a method according to EEE 79, wherein the processor selects the offset of the drop shadow for the first cursor corresponding to the second VOC indicator and each of the one or more other cursors based on a z-index value assigned to each offset and an order in which the first cursor corresponding to the second VOC indicator and each of the one or more other cursors are stacked.

EEE 81 is a method according to any one of EEE 1 to 80, wherein writing vehicle data parameters into the memory includes writing frames into the memory.

EEE 82 is a method according to EEE 81, wherein each frame includes one parameter value for each PID from the set of multiple different PIDs.

EEE 83 is a method according to any one of EEE 81 or 82, wherein each frame includes a respective frame identifier.

EEE 84 is a method according to any one of EEE 81 to 83, wherein each frame includes one or more time stamps.

EEE 85 is a method according to EE 84, wherein a particular time stamp of the one more time stamps corresponds to a particular frame include the particular time stamp.

EEE 86 is a method according to any one of EEE 84 to 85, wherein at least one time stamp of the one or more time stamps corresponds to a PID parameter value within the particular frame.

EEE 87 is a method according to any one of EEE 81 to 86, wherein writing the frame into the memory includes writing the frame into a buffer.

EEE 88 is a method according to EEE 87, wherein writing the frame into the buffer includes writing the frame into a buffer segment.

EEE 89 is a computing system comprising: one or more processors, and computer readable data storage storing executable instructions, wherein execution of the executable instructions by the one or more processors causes computing system to perform the method of any one of EEE 1 to EEE 88.

EEE 90 is a non-transitory computer readable medium having stored therein instructions executable by one or more processors to cause a computing system to perform the method of any one of EEE 1 to EEE 88.

EEE 91 is a computing system comprising: a processor, a display, and a non-transitory computer-readable memory including executable instructions. Execution of the executable instructions by the processor cause the computing system to perform functions. The functions comprise writing, into the memory, vehicle data parameters output by a particular vehicle. Each vehicle data parameter (VDP) corresponds to a parameter identifier (PID) from among a set of multiple different PIDs. The functions also include displaying, on the display, a first view of a graphical user interface (GUI). The GUI includes one or more VDP graphs, a graph-axis control, and a first vehicle operating condition (VOC) indicator at the graph-axis control. The first view of the GUI includes a first set of VDP graphs from among the one or more VDP graphs. Each VDP graph of the one or more VDP graphs corresponds to at least a partial amount of the vehicle data parameters. Each partial amount of the vehicle data parameters corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the vehicle data parameters. At least some of the first portion of the vehicle data parameters are represented within the first set of VDP graphs. The second graph-axis control segment in the first view of the GUI corresponds to a second portion of the vehicle data parameters. The second portion of the vehicle data parameters is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI. The functions also include displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

EEE 92 is a non-transitory computer-readable memory having stored therein instructions executable by a processor to cause a computing system including a display to perform functions. The functions comprise writing, into the memory, vehicle data parameters output by a particular vehicle. Each vehicle data parameter (VDP) corresponds to a parameter identifier (PID) from among a set of multiple different PIDs. The functions also comprise displaying, on the display, a first view of a graphical user interface (GUI). The GUI includes one or more VDP graphs, a graph-axis control, and a first vehicle operating condition (VOC) indicator at the graph-axis control. The first view of the GUI includes a first set of VDP graphs from among the one or more VDP graphs. Each VDP graph of the one or more VDP graphs corresponds to at least a partial amount of the vehicle data parameters. Each partial amount of the vehicle data parameters corresponds to a respective PID. The graph-axis control includes a first graph-axis control segment, a second graph-axis control segment, and a cursor position indicator at the first graph-axis control segment. The first graph-axis control segment in the first view of the GUI corresponds to a first portion of the vehicle data parameters. At least some of the first portion of the vehicle data parameters are represented within the first set of VDP graphs. The second graph-axis control segment in the first view of the GUI corresponds to a second portion of the vehicle data parameters. The second portion of the vehicle data parameters is not represented within the first set of VDP graphs. Each VDP graph displayed on the display includes a cursor corresponding to a position of the cursor position indicator at the first graph-axis control segment. The first graph-axis control segment and the second graph-axis control segment cover first respective portions of the graph-axis control within the first view of the GUI. The functions also comprise displaying, on the display, a second view of the GUI in response to a selection of the first VOC indicator. The second view of the GUI includes a second set of VDP graphs from among the one or more VDP graphs, the graph-axis control, the first graph-axis control segment, and the second graph-axis control segment. The first graph-axis control segment in the second view of the GUI corresponds to a third portion of the vehicle data parameters. At least some of the third portion of the vehicle data parameters are represented within the second set of VDP graphs. The second graph-axis control segment in the second view of the GUI corresponds to a fourth portion of the vehicle data parameters. The fourth portion of the vehicle data parameters is not represented within the second set of VDP graphs. The first graph-axis control segment and the second graph-axis control segment cover second respective portions of the graph-axis control within the second view of the GUI that differ from the first respective portions of the graph-axis control.

We claim:

1. A method for modifying a graphical user interface (GUI) at a computing system in response to selection of a vehicle operating condition (VOC) indicator at a graph-axis control within the GUI, the method comprising:

writing, into a non-transitory computer-readable memory, a sequence of vehicle data parameters (VDPs) output by a particular vehicle, wherein:

the sequence of VDPs includes a first vehicle data parameter (VDP) corresponding to a first requested parameter identifier (PID) and a second VDP corresponding to a second requested PID different than the first requested PID, the first requested PID corresponds to a first threshold, the second requested PID corresponds to a second threshold, and the first VDP is earlier in the sequence than the second VDP;

displaying, on a display, a first view of a GUI, wherein:

the GUI includes a container and a graph-axis control, and the container, in the first view of the GUI, includes a waveform corresponding to a first particular PID;

determining a first breach by determining the first VDP written into the memory breached the first threshold;

determining a second breach by determining the second VDP written into the memory breached the second threshold;

displaying, at the graph-axis control within the GUI, a stacked VOC indicator after determining the first and second breach; and displaying, on the display, a second view of the GUI in response to a selection of the stacked VOC indicator, wherein the container, in the second view of the GUI, includes a waveform corresponding to a second particular PID instead of the waveform corresponding to the first particular PID.

2. The method of claim 1, wherein displaying the stacked VOC indicator results from displaying one of a first VOC indicator corresponding to the first breach and a second VOC indicator corresponding to the second breach at least partially overlaid upon the other.

3. The method of claim 2, further comprising:

displaying, at the graph-axis control within the GUI before displaying the stacked VOC indicator, the first VOC indicator separated from the second VOC indicator without any overlap of the first VOC indicator and the second VOC indicator; and engaging, while displaying the first VOC indicator separated from the second VOC indicator without any overlap of the first VOC indicator and the second VOC indicator, an additional buffer segment within the memory for storing further VDPs, wherein displaying the stacked VOC indicator occurs in response to engaging the additional buffer segment within the memory.

4. The method of claim 1, wherein:

displaying the stacked VOC indicator occurs in response to the computing system making a first, second, or third determination, the first determination indicates the first VDP and the second VDP were written into a common frame within the memory, the second determination indicates the first and second breach occurred at a common time, and the third determination indicates a time differential between when the first and second breach occurred is short relative to an amount of time represented by a horizontal axis of a VDP graph.

5. The method of claim 1, wherein:

writing the sequence of VDPs includes writing the sequence of VDPs into a buffer contained within the memory, the buffer includes a first buffer segment for storing at least a first portion of the sequence of VDPs, and displaying the stacked VOC indicator occurs in response to the computing system engaging a second buffer segment of the buffer for storing at least a second portion of the sequence of VDPs.

6. The method of claim 1, wherein:

the first requested PID and the first particular PID are identical, and the second requested PID and the second particular PID are identical.

7. The method of claim 1, wherein writing VDPs into the memory includes writing frames into the memory.

8. The method of claim 7, wherein each frame includes one or more of the following:

one parameter value for each PID represented within the sequence of VDPs, a respective frame identifier, and one or more time stamps.

9. The method of claim 8, wherein a particular time stamp of the one or more time stamps corresponds to a particular frame containing the particular time stamp.

10. The method of claim 9, wherein at least one time stamp of the one or more time stamps corresponds to a VDP within the particular frame.

11. The method of claim 7, wherein writing the frames into the memory includes writing the frames into a buffer.

12. The method of claim 11, wherein writing the frames into the buffer includes writing the frames into a buffer segment.

13. The method of claim 1, wherein:

writing the sequence of VDPs into the memory is part of writing frames into the memory, and each frame includes one VDP for each PID represented within the sequence of VDPs.

14. The method of claim 13, wherein the GUI includes a graphical frame counter alongside the graph-axis control.

15. The method of claim 14, wherein the graphical frame counter includes numerical and non-numerical indicators to represent, in connection with a cursor position indicator, a quantity of frames written into the memory.

16. The method of claim 13, wherein a cursor position indicator moves within the graph-axis control in a first direction as a given number of additional frames is written into the memory.

17. The method of claim 16, wherein:

the graph-axis control represents more frames in response to a first use of a user-selectable control or fewer frames in response to a second use of the user-selectable control, the first use of the user-selectable control is for increasing a zoom-out setting or for engaging an additional buffer segment within the memory, and the second use of the user-selectable control is for increasing a zoom-in setting.

18. The method of claim 16, wherein the given number of additional frames is one frame.

19. The method of claim 16, wherein the first direction is a rightward direction, a leftward direction, an upward direction, or a downward direction.

20. A computing system comprising:

a processor;

a display; and a non-transitory computer-readable memory including executable instructions, wherein execution of the executable instructions by the processor causes the computing system to perform functions comprising:

writing, into the memory, a sequence of vehicle data parameters (VDPs) output by a particular vehicle, wherein:

the sequence of VDPs includes a first vehicle data parameter (VDP) corresponding to a first requested parameter identifier (PID) and a second VDP corresponding to a second requested PID different than the first requested PID, the first requested PID corresponds to a first threshold, the second requested PID corresponds to a second threshold, and the first VDP is earlier in the sequence than the second VDP;

displaying, on the display, a first view of a graphical user interface (GUI), wherein:

the GUI includes a container and a graph-axis control, and the container, in the first view of the GUI, includes a waveform corresponding to a first particular PID;

determining a first breach by determining the first VDP written into the memory breached the first threshold;

determining a second breach by determining the second VDP written into the memory breached the second threshold;

displaying, at the graph-axis control within the GUI, a stacked VOC indicator after determining the first and second breach; and displaying, on the display, a second view of the GUI in response to a selection of the stacked VOC indicator, wherein the container, in the second view of the GUI, includes a waveform corresponding to a second particular PID instead of the waveform corresponding to the first particular PID.

21. A non-transitory computer-readable memory having stored therein instructions executable by a processor to cause a computing system including a display to perform functions comprising:

writing, into the non-transitory computer-readable memory, a sequence of vehicle data parameters (VDPs) output by a particular vehicle, wherein:

the sequence of VDPs includes a first vehicle data parameter (VDP) corresponding to a first requested parameter identifier (PID) and a second VDP corresponding to a second requested PID different than the first requested PID, the first requested PID corresponds to a first threshold, the second requested PID corresponds to a second threshold, and the first VDP is earlier in the sequence than the second VDP;

displaying, on the display, a first view of a graphical user
interface (GUI), wherein:
the GUI includes a container and a graph-axis control,
and
the container, in the first view of the GUI, includes a
waveform corresponding to a first particular PID;
determining a first breach by determining the first VDP
written into the memory breached the first threshold;
determining a second breach by determining the second
VDP written into the memory breached the second
threshold;
displaying, at the graph-axis control within the GUI, a
stacked VOC indicator after determining the first and
second breach; and
displaying, on the display, a second view of the GUI in
response to a selection of the stacked VOC indicator,
wherein the container, in the second view of the GUI,
includes a waveform corresponding to a second par-
ticular PID instead of the waveform corresponding to
the first particular PID.

\*    \*    \*    \*    \*